United States Patent
Mehta et al.

(10) Patent No.: US 12,349,035 B2
(45) Date of Patent: *Jul. 1, 2025

(54) SYSTEMS AND METHODS FOR EMERGENCY COMMUNICATIONS AMONGST GROUPS OF DEVICES BASED ON SHARED DATA

(71) Applicant: RapidSOS, Inc., New York, NY (US)

(72) Inventors: Anil Mehta, Makanda, IL (US); Michael John Martin, Long Island City, NY (US); Nicholas Edward Horelik, Long Island City, NY (US); Reinhard Ekl, New York, NY (US)

(73) Assignee: RapidSOS, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,204

(22) Filed: Apr. 18, 2023

(65) Prior Publication Data

US 2023/0336958 A1 Oct. 19, 2023

Related U.S. Application Data

(63) Continuation of application No. 17/856,796, filed on Jul. 1, 2022, now Pat. No. 11,665,523, which is a
(Continued)

(51) Int. Cl.
*H04W 4/90* (2018.01)
*H04M 3/51* (2006.01)
(Continued)

(52) U.S. Cl.
CPC .......... *H04W 4/90* (2018.02); *H04M 3/5116* (2013.01); *H04W 4/02* (2013.01); *H04W 4/029* (2018.02);
(Continued)

(58) Field of Classification Search
CPC ........ H04W 4/90; H04W 4/02; H04W 4/029; H04W 4/08; H04W 8/18; H04W 76/50;
(Continued)

(56) References Cited

U.S. PATENT DOCUMENTS

| | | |
|---|---|---|
| 5,379,337 A | 1/1995 | Castillo |
| 5,479,482 A | 12/1995 | Grimes |

(Continued)

FOREIGN PATENT DOCUMENTS

| | | |
|---|---|---|
| CA | 2662606 A1 | 10/2009 |
| CA | 2697986 A1 | 9/2010 |

(Continued)

OTHER PUBLICATIONS

Jeffrey J. Clawson (BR 112013015362 B1) >>> A Method, System, and Media of Computer Readable Non-Transitory Storage To Assist a Distributor in Communicating With a Caller By Phone in Connection With a Medical Emergency of a Patient (see title) (Year: 2023).*

(Continued)

*Primary Examiner* — Meless N Zewdu
(74) *Attorney, Agent, or Firm* — Fitch, Even, Tabin & Flannery LLP

(57) ABSTRACT

Described herein are systems, devices, methods, and media for managing emergency communications providing data sharing amongst groups of devices, proxy calling by one communication device on behalf of another, and seamless data extraction from a communication device by first responders.

21 Claims, 23 Drawing Sheets

Related U.S. Application Data continuation of application No. 16/940,043, filed on Jul. 27, 2020, now Pat. No. 11,445,349, which is a continuation of application No. 16/526,195, filed on Jul. 30, 2019, now Pat. No. 10,771,951, which is a continuation of application No. 15/958,398, filed on Apr. 20, 2018, now Pat. No. 10,419,915, which is a continuation of application No. 15/444,133, filed on Feb. 27, 2017, now Pat. No. 9,986,404.

(60) Provisional application No. 62/310,149, filed on Mar. 18, 2016, provisional application No. 62/300,562, filed on Feb. 26, 2016, provisional application No. 62/300,572, filed on Feb. 26, 2016.

(51) Int. Cl.
| | | |
|---|---|---|
| *H04W 4/02* | (2018.01) | |
| *H04W 4/029* | (2018.01) | |
| *H04W 4/08* | (2009.01) | |
| *H04W 8/18* | (2009.01) | |
| *H04W 76/50* | (2018.01) | |
| *H04W 8/20* | (2009.01) | |
| *H04W 84/18* | (2009.01) | |

(52) U.S. Cl.
CPC .............. *H04W 4/08* (2013.01); *H04W 8/18* (2013.01); *H04W 76/50* (2018.02); *H04M 2242/04* (2013.01); *H04M 2242/30* (2013.01); *H04M 2250/12* (2013.01); *H04W 8/20* (2013.01); *H04W 84/18* (2013.01)

(58) Field of Classification Search
CPC ....... H04W 8/20; H04W 84/18; H04W 88/00; H04W 88/02; H04W 88/08; H04W 88/18; H04W 8/005; H04W 28/0838; H04W 76/00; H04W 76/10; H04W 76/11; H04W 76/12; H04W 76/15; H04W 12/06; H04W 12/50; H04W 12/63; H04W 12/55; H04W 12/60; H04M 3/5116; H04M 2242/04; H04M 2242/30; H04M 2250/12; H04M 2203/051; H04M 3/42229; H04M 3/42348; H04M 1/72412; H04M 1/72418; H04M 1/72424
See application file for complete search history.

(56) References Cited

U.S. PATENT DOCUMENTS

| | | | |
|---|---|---|---|
| 5,563,931 | A | 10/1996 | Bishop |
| 5,596,625 | A | 1/1997 | Leblanc |
| 5,710,803 | A | 1/1998 | Kowal |
| 5,742,666 | A | 4/1998 | Alpert |
| 6,014,555 | A | 1/2000 | Tendler |
| 6,133,853 | A | 10/2000 | Obradovich |
| 6,167,255 | A | 12/2000 | Kennedy, III |
| 6,249,674 | B1 | 6/2001 | Verdonk |
| 6,252,943 | B1 | 6/2001 | Johnson |
| 6,256,489 | B1 | 7/2001 | Lichter |
| 6,262,655 | B1 | 7/2001 | Yoshioka |
| 6,292,687 | B1 | 9/2001 | Lowell |
| 6,363,138 | B1 | 3/2002 | Aprile |
| 6,459,782 | B1 | 10/2002 | Bedrosian |
| 6,477,362 | B1 | 11/2002 | Raith |
| 6,502,030 | B2 | 12/2002 | Hilleary |
| 6,510,315 | B1 | 1/2003 | Arnson |
| 6,556,816 | B1 | 4/2003 | Gafrick |
| 6,571,092 | B2 | 5/2003 | Faccin |
| 6,574,323 | B1 | 6/2003 | Manuel |
| 6,587,545 | B1 | 7/2003 | Antonucci |
| 6,594,666 | B1 | 7/2003 | Biswas |
| 6,600,812 | B1 | 7/2003 | Gentillin |
| 6,628,933 | B1 | 9/2003 | Humes |
| 6,680,998 | B1 | 1/2004 | Bell |
| 6,707,421 | B1 | 3/2004 | Drury |
| 6,731,610 | B2 | 5/2004 | Sajikawa |
| 6,993,118 | B2 | 1/2006 | Antonucci |
| 7,031,663 | B2 | 4/2006 | Heinonen |
| 7,054,611 | B2 | 5/2006 | Eisner |
| 7,058,385 | B2 | 6/2006 | Lauper |
| 7,084,775 | B1 | 8/2006 | Smith |
| 7,177,400 | B2 | 2/2007 | Eisner |
| 7,224,773 | B2 | 5/2007 | Croak |
| 7,271,704 | B2 | 9/2007 | Mcsheffrey |
| 7,277,705 | B2 | 10/2007 | Casaccia |
| 7,313,402 | B1 | 12/2007 | Rahman |
| 7,324,801 | B2 | 1/2008 | Droste |
| 7,349,706 | B2 | 3/2008 | Kim |
| 7,409,044 | B2 | 8/2008 | Leduc |
| 7,409,428 | B1 | 8/2008 | Brabec |
| 7,436,938 | B2 | 10/2008 | Savaglio |
| 7,437,143 | B1 | 10/2008 | Williams |
| 7,469,138 | B2 | 12/2008 | Dayar |
| 7,483,519 | B2 | 1/2009 | Binning |
| 7,519,351 | B2 | 4/2009 | Malone, III |
| 7,519,372 | B2 | 4/2009 | MacDonald |
| 7,548,158 | B2 | 6/2009 | Titus |
| 7,565,131 | B2 | 7/2009 | Rollender |
| 7,646,854 | B2 | 1/2010 | Anderson |
| 7,676,215 | B2 | 3/2010 | Chin |
| 7,684,782 | B2 | 3/2010 | Ashley, Jr. |
| 7,848,733 | B2 | 12/2010 | Bull |
| 7,937,067 | B2 | 5/2011 | Maier |
| 7,949,326 | B2 | 5/2011 | Gallagher |
| 8,009,810 | B2 | 8/2011 | Seidberg |
| 8,027,658 | B2 | 9/2011 | Suryanarayana |
| 8,041,335 | B2 | 10/2011 | Khetawat |
| 8,041,341 | B1 | 10/2011 | Malackowski |
| 8,045,954 | B2 | 10/2011 | Barbeau |
| 8,068,881 | B2 | 11/2011 | Schrager |
| 8,102,972 | B2 | 1/2012 | Poremba |
| 8,126,424 | B2 | 2/2012 | Piett |
| 8,150,367 | B1 | 4/2012 | Malladi |
| 8,165,560 | B2 | 4/2012 | Stenquist |
| 8,165,562 | B2 | 4/2012 | Piett |
| 8,185,087 | B2 | 5/2012 | Mitchell, Jr. |
| 8,195,121 | B2 | 6/2012 | Dunn |
| 8,219,135 | B2 | 7/2012 | De Amorim |
| 8,244,205 | B2 | 8/2012 | Wu |
| 8,249,546 | B1 | 8/2012 | Shah |
| 8,249,547 | B1 | 8/2012 | Fellner |
| 8,289,953 | B2 | 10/2012 | Ray |
| 8,306,501 | B2 | 11/2012 | Moodbidri |
| 8,326,260 | B1 | 12/2012 | Bradish |
| 8,369,488 | B2 | 2/2013 | Sennett |
| 8,396,970 | B2 | 3/2013 | Black |
| 8,401,565 | B2 | 3/2013 | Sandberg |
| 8,417,090 | B2 | 4/2013 | Fleming |
| 8,417,212 | B2 | 4/2013 | Cepuran |
| 8,442,481 | B2 | 5/2013 | Maier |
| 8,442,482 | B2 | 5/2013 | Maier |
| 8,472,973 | B2 | 6/2013 | Lin |
| 8,484,352 | B2 | 7/2013 | Piett |
| 8,489,062 | B2 | 7/2013 | Ray |
| 8,494,868 | B2 | 7/2013 | Saalsaa |
| 8,509,729 | B2 | 8/2013 | Shaw |
| 8,516,122 | B2 | 8/2013 | Piett |
| 8,538,370 | B2 | 9/2013 | Ray |
| 8,538,468 | B2 | 9/2013 | Daly |
| 8,588,733 | B2 | 11/2013 | Ferguson |
| 8,594,015 | B2 | 11/2013 | Dunn |
| 8,606,218 | B2 | 12/2013 | Ray |
| 8,625,578 | B2 | 1/2014 | Roy |
| 8,626,112 | B2 | 1/2014 | Ray |
| 8,630,609 | B2 | 1/2014 | Ray |
| 8,644,301 | B2 | 2/2014 | Tamhankar |
| 8,649,806 | B2 | 2/2014 | Cuff |
| 8,682,279 | B2 | 3/2014 | Rudolf |
| 8,682,281 | B2 | 3/2014 | Dunn |
| 8,682,286 | B2 | 3/2014 | Dickinson |
| 8,712,366 | B2 | 4/2014 | Greene |

(56) References Cited

U.S. PATENT DOCUMENTS

| | | |
|---|---|---|
| 8,747,336 B2 | 6/2014 | Tran |
| 8,751,265 B2 | 6/2014 | Piett |
| 8,755,767 B2 | 6/2014 | Maier |
| 8,760,290 B2 | 6/2014 | Piett |
| 8,761,721 B2 | 6/2014 | Li |
| 8,792,867 B1 * | 7/2014 | Negahban et al. ........ 455/414.1 |
| 8,811,935 B2 | 8/2014 | Faccin |
| 8,825,687 B2 | 9/2014 | Marceau |
| 8,848,877 B2 | 9/2014 | Seidberg |
| 8,866,606 B1 | 10/2014 | Will |
| 8,868,028 B1 | 10/2014 | Kaltsukis |
| 8,880,021 B2 | 11/2014 | Hawkins |
| 8,890,685 B1 | 11/2014 | Sookman |
| 8,903,355 B2 | 12/2014 | Biage |
| 8,918,075 B2 | 12/2014 | Maier |
| 8,948,732 B1 | 2/2015 | Negahban |
| 8,971,839 B2 | 3/2015 | Hong |
| 8,983,424 B2 | 3/2015 | Binning |
| 8,984,143 B2 | 3/2015 | Serra |
| 9,008,078 B2 | 4/2015 | Kamdar |
| 9,014,657 B2 | 4/2015 | Rohde |
| 9,019,870 B2 | 4/2015 | Khan |
| 9,020,462 B2 | 4/2015 | Hodgson |
| 9,071,643 B2 | 6/2015 | Saito |
| 9,077,676 B2 | 7/2015 | Price |
| 9,078,092 B2 | 7/2015 | Piett |
| 9,094,816 B2 | 7/2015 | Maier |
| 9,129,219 B1 | 9/2015 | Robertson |
| 9,167,379 B1 | 10/2015 | Hamilton |
| 9,244,922 B2 | 1/2016 | Marceau |
| 9,258,680 B2 | 2/2016 | Drucker |
| 9,277,389 B2 | 3/2016 | Saito |
| 9,351,142 B2 | 5/2016 | Basore |
| 9,369,847 B2 | 6/2016 | Borghei |
| 9,380,144 B1 * | 6/2016 | Kritt et al. ........ H04M 1/72538 |
| 9,384,491 B1 | 7/2016 | Briggs |
| 9,390,625 B2 | 7/2016 | Green |
| 9,402,159 B1 | 7/2016 | Self |
| 9,408,051 B2 | 8/2016 | Finney |
| 9,420,099 B1 | 8/2016 | Krishnan |
| 9,426,638 B1 | 8/2016 | Johnson |
| 9,497,585 B1 | 11/2016 | Cooley |
| 9,503,876 B2 | 11/2016 | Saito |
| 9,544,260 B2 | 1/2017 | Cuff |
| 9,544,750 B1 | 1/2017 | Self |
| 9,591,467 B2 | 3/2017 | Piett |
| 9,609,128 B2 | 3/2017 | Dahan |
| 9,629,185 B1 | 4/2017 | Gluckman |
| 9,635,534 B2 | 4/2017 | Maier |
| 9,648,479 B2 | 5/2017 | Michaelis |
| 9,659,484 B1 | 5/2017 | Mehta |
| 9,693,213 B2 | 6/2017 | Self |
| 9,734,721 B2 | 8/2017 | Stenneth |
| 9,736,670 B2 | 8/2017 | Mehta |
| 9,756,169 B2 | 9/2017 | Mehta |
| 9,767,677 B1 * | 9/2017 | Paulin ................. G08B 27/001 |
| 9,794,755 B1 | 10/2017 | South |
| 9,805,430 B2 | 10/2017 | Miasnik |
| 9,838,858 B2 | 12/2017 | Anand |
| 9,877,177 B2 | 1/2018 | Lesage |
| 9,924,043 B2 | 3/2018 | Mehta |
| 9,942,739 B2 | 4/2018 | Bozik |
| 9,986,404 B2 * | 5/2018 | Mehta et al. ........... H04W 4/22 |
| 9,992,655 B2 | 6/2018 | Anand |
| 9,994,218 B2 | 6/2018 | Pal |
| 9,998,507 B2 | 6/2018 | Mehta |
| 10,002,375 B1 | 6/2018 | Scythes |
| 10,089,854 B2 | 10/2018 | Hender |
| 10,136,294 B2 | 11/2018 | Mehta |
| 10,140,482 B2 | 11/2018 | White |
| 10,140,842 B2 | 11/2018 | Mehta |
| 10,142,213 B1 | 11/2018 | Hart |
| 10,142,469 B2 | 11/2018 | Klaban |
| 10,142,816 B2 | 11/2018 | Cavendish |
| 10,149,116 B1 | 12/2018 | Kerr |
| 10,165,431 B2 | 12/2018 | Bozik |
| 10,375,558 B2 | 8/2019 | Katz |
| 10,419,915 B2 * | 9/2019 | Mehta et al. ........... H04W 4/90 |
| 10,425,799 B2 | 9/2019 | Anand |
| 10,447,865 B2 | 10/2019 | Mehta |
| 10,524,106 B1 | 12/2019 | Skertich |
| 10,657,799 B2 | 5/2020 | Mehta |
| 10,701,541 B2 | 6/2020 | Mehta |
| 10,701,542 B2 | 6/2020 | Martin |
| 10,708,412 B1 | 7/2020 | Killpack |
| 10,771,951 B2 * | 9/2020 | Mehta et al. ........... H04W 4/90 |
| 10,795,870 B1 | 10/2020 | Kulkarni |
| 10,805,786 B2 | 10/2020 | Pellegrini |
| 10,820,181 B2 | 10/2020 | Horelik |
| 10,861,320 B2 | 12/2020 | Martin |
| 10,911,926 B2 | 2/2021 | Pellegrini |
| 10,922,776 B2 | 2/2021 | Kumar |
| 10,977,927 B2 | 4/2021 | Katz |
| 11,140,538 B2 | 10/2021 | Mehta |
| 11,146,680 B2 | 10/2021 | Leavitt |
| 11,153,737 B2 | 10/2021 | Anand |
| 11,197,145 B2 | 12/2021 | Martin |
| 11,218,584 B2 | 1/2022 | Martin |
| 11,228,891 B2 | 1/2022 | King-Berkman |
| 11,310,647 B2 | 4/2022 | Pellegrini |
| 11,330,664 B1 | 5/2022 | Martin |
| 11,356,833 B2 | 6/2022 | Martin |
| 11,445,349 B2 | 9/2022 | Mehta |
| 11,665,523 B2 * | 5/2023 | Mehta et al. ........... H04W 4/90 |
| 2001/0036224 A1 | 11/2001 | Demello |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang |
| 2002/0103622 A1 | 8/2002 | Burge |
| 2002/0120698 A1 | 8/2002 | Tamargo |
| 2003/0069035 A1 | 4/2003 | Shurvinton |
| 2003/0109245 A1 | 6/2003 | Mccalmont |
| 2003/0195775 A1 | 10/2003 | Hampton |
| 2004/0166828 A1 | 8/2004 | Yosioka |
| 2004/0203572 A1 | 10/2004 | Aerrabotu |
| 2004/0229620 A1 | 11/2004 | Zhao |
| 2004/0266390 A1 | 12/2004 | Faucher |
| 2005/0002516 A1 | 1/2005 | Shtivelman |
| 2005/0085215 A1 | 4/2005 | Kokko |
| 2005/0104745 A1 | 5/2005 | Bachelder |
| 2005/0111630 A1 | 5/2005 | Potorny |
| 2005/0151642 A1 | 7/2005 | Tupler |
| 2005/0176403 A1 | 8/2005 | Lalos |
| 2005/0190053 A1 | 9/2005 | Dione |
| 2005/0190892 A1 | 9/2005 | Dawson |
| 2005/0192746 A1 | 9/2005 | King |
| 2005/0220277 A1 | 10/2005 | Blalock |
| 2005/0222829 A1 | 10/2005 | Dumas |
| 2005/0239477 A1 | 10/2005 | Kim |
| 2005/0242944 A1 | 11/2005 | Bankert |
| 2005/0282518 A1 | 12/2005 | D Evelyn |
| 2005/0285181 A1 | 12/2005 | Yasui |
| 2006/0077053 A1 | 4/2006 | Park |
| 2006/0085275 A1 | 4/2006 | Stokes |
| 2006/0109960 A1 | 5/2006 | D Evelyn |
| 2006/0154642 A1 | 7/2006 | Scannell |
| 2006/0217105 A1 | 9/2006 | Kumar P S |
| 2006/0234726 A1 | 10/2006 | Ashley |
| 2006/0293024 A1 | 12/2006 | Benco |
| 2007/0003024 A1 | 1/2007 | Olivier |
| 2007/0030144 A1 | 2/2007 | Titus |
| 2007/0030146 A1 | 2/2007 | Shepherd |
| 2007/0033095 A1 | 2/2007 | Hodgin |
| 2007/0049287 A1 | 3/2007 | Dunn |
| 2007/0053308 A1 | 3/2007 | Dumas |
| 2007/0058528 A1 | 3/2007 | Massa |
| 2007/0060097 A1 | 3/2007 | Edge |
| 2007/0161383 A1 | 7/2007 | Caci |
| 2007/0164872 A1 | 7/2007 | Monroe |
| 2007/0171854 A1 | 7/2007 | Chen |
| 2007/0218895 A1 | 9/2007 | Saito |
| 2007/0250348 A1 * | 10/2007 | D'Ambrosia et al. ............ 705/3 |
| 2008/0019268 A1 | 1/2008 | Rollins |

(56) References Cited

U.S. PATENT DOCUMENTS

| | | |
|---|---|---|
| 2008/0063153 A1 | 3/2008 | Krivorot |
| 2008/0077474 A1 | 3/2008 | Dumas |
| 2008/0081646 A1 | 4/2008 | Morin |
| 2008/0166990 A1 | 7/2008 | Toiv |
| 2008/0175356 A1 | 7/2008 | Seidberg |
| 2008/0188198 A1 | 8/2008 | Patel |
| 2008/0194238 A1 | 8/2008 | Kwon |
| 2008/0253535 A1 | 10/2008 | Sherry |
| 2008/0274721 A1 | 11/2008 | Stagnetto |
| 2008/0294058 A1 | 11/2008 | Shklarski |
| 2008/0309486 A1 | 12/2008 | Mckenna |
| 2009/0018875 A1 | 1/2009 | Monatesti |
| 2009/0041206 A1 | 2/2009 | Hobby |
| 2009/0094602 A1 | 4/2009 | Ziskind |
| 2009/0134982 A1 | 5/2009 | Robertson |
| 2009/0186596 A1 | 7/2009 | Kaltsukis |
| 2009/0214000 A1 | 8/2009 | Patel |
| 2009/0233573 A1 | 9/2009 | Gray |
| 2009/0247111 A1* | 10/2009 | Sennett et al. ............ 455/404.1 |
| 2009/0257345 A1 | 10/2009 | King |
| 2009/0280771 A1 | 11/2009 | Bolin |
| 2009/0284348 A1 | 11/2009 | Pfeffer |
| 2009/0311987 A1 | 12/2009 | Edge |
| 2009/0322513 A1 | 12/2009 | Hwang |
| 2010/0002846 A1 | 1/2010 | Ray |
| 2010/0003954 A1 | 1/2010 | Greene |
| 2010/0003964 A1 | 1/2010 | Khare |
| 2010/0093305 A1 | 4/2010 | Reich |
| 2010/0156626 A1 | 6/2010 | Story |
| 2010/0159871 A1 | 6/2010 | Tester |
| 2010/0159976 A1 | 6/2010 | Marocchi |
| 2010/0161727 A1 | 6/2010 | Shaffer |
| 2010/0166153 A1 | 7/2010 | Guleria |
| 2010/0190468 A1 | 7/2010 | Scott |
| 2010/0202368 A1 | 8/2010 | Hans |
| 2010/0238018 A1 | 9/2010 | Kelly |
| 2010/0261448 A1 | 10/2010 | Peters |
| 2010/0262668 A1 | 10/2010 | Piett |
| 2010/0291907 A1 | 11/2010 | Macnaughtan |
| 2010/0293106 A1 | 11/2010 | Rhoads |
| 2010/0317317 A1 | 12/2010 | Maier |
| 2011/0009086 A1 | 1/2011 | Poremba |
| 2011/0029600 A1 | 2/2011 | Theimer |
| 2011/0044444 A1 | 2/2011 | Abramson |
| 2011/0051658 A1 | 3/2011 | Jin |
| 2011/0071880 A1 | 3/2011 | Spector |
| 2011/0086607 A1 | 4/2011 | Wang |
| 2011/0103266 A1 | 5/2011 | Andreasen |
| 2011/0111728 A1 | 5/2011 | Ferguson |
| 2011/0134897 A1 | 6/2011 | Montemurro |
| 2011/0151829 A1 | 6/2011 | Velusamy |
| 2011/0153368 A1 | 6/2011 | Pierre |
| 2011/0201357 A1 | 8/2011 | Garrett |
| 2011/0263219 A1 | 10/2011 | Hasenfang |
| 2011/0263319 A1 | 10/2011 | Timo |
| 2011/0281547 A1 | 11/2011 | Cordero |
| 2012/0002792 A1 | 1/2012 | Chang |
| 2012/0028599 A1 | 2/2012 | Hatton |
| 2012/0029970 A1 | 2/2012 | Stiles |
| 2012/0040636 A1 | 2/2012 | Kazmi |
| 2012/0066139 A1 | 3/2012 | Guzman |
| 2012/0092161 A1 | 4/2012 | West |
| 2012/0144019 A1 | 6/2012 | Zhu |
| 2012/0146809 A1 | 6/2012 | Oh |
| 2012/0157795 A1 | 6/2012 | Chiu |
| 2012/0196557 A1 | 8/2012 | Reich |
| 2012/0196558 A1 | 8/2012 | Reich |
| 2012/0202428 A1 | 8/2012 | Mirbaha |
| 2012/0210325 A1 | 8/2012 | De Lind Van Wijngaarden |
| 2012/0218102 A1 | 8/2012 | Bivens |
| 2012/0256745 A1 | 10/2012 | Piett |
| 2012/0257729 A1 | 10/2012 | Piett |
| 2012/0258680 A1 | 10/2012 | Piett |
| 2012/0289243 A1 | 11/2012 | Tarlow |
| 2012/0295575 A1 | 11/2012 | Nam |
| 2012/0295576 A1 | 11/2012 | Peterson |
| 2012/0309341 A1 | 12/2012 | Ward |
| 2012/0320912 A1 | 12/2012 | Estrada |
| 2013/0005295 A1 | 1/2013 | Park |
| 2013/0012155 A1 | 1/2013 | Forstall |
| 2013/0030825 A1 | 1/2013 | Bagwandeen |
| 2013/0036175 A1 | 2/2013 | Lau |
| 2013/0052983 A1 | 2/2013 | Fletcher |
| 2013/0065569 A1 | 3/2013 | Leipzig |
| 2013/0082837 A1 | 4/2013 | Cosentino |
| 2013/0084824 A1 | 4/2013 | Hursey |
| 2013/0100268 A1 | 4/2013 | Mihailidis |
| 2013/0102351 A1 | 4/2013 | Mo |
| 2013/0120106 A1 | 5/2013 | Cauwels |
| 2013/0120459 A1 | 5/2013 | Dickinson |
| 2013/0122932 A1 | 5/2013 | Patel |
| 2013/0138791 A1 | 5/2013 | Thomas |
| 2013/0143530 A1 | 6/2013 | Ehrlich |
| 2013/0183924 A1 | 7/2013 | Saigh |
| 2013/0185368 A1 | 7/2013 | Nordstrom |
| 2013/0203373 A1 | 8/2013 | Edge |
| 2013/0203376 A1 | 8/2013 | Maier |
| 2013/0222133 A1 | 8/2013 | Schultz |
| 2013/0226369 A1 | 8/2013 | Yorio |
| 2013/0237175 A1 | 9/2013 | Piett |
| 2013/0237181 A1 | 9/2013 | Ray |
| 2013/0260710 A1 | 10/2013 | H R |
| 2013/0309994 A1 | 11/2013 | Karl |
| 2013/0331055 A1 | 12/2013 | Mckown |
| 2013/0331058 A1 | 12/2013 | Harvey |
| 2013/0346333 A1* | 12/2013 | Hassler et al. ....... G06Q 50/265 |
| 2014/0002241 A1* | 1/2014 | Elghazzawi .................. 340/8.1 |
| 2014/0031000 A1 | 1/2014 | Hanover |
| 2014/0045450 A1 | 2/2014 | Ballantyne |
| 2014/0051379 A1 | 2/2014 | Ganesh |
| 2014/0057590 A1 | 2/2014 | Romero |
| 2014/0059060 A1 | 2/2014 | Yang |
| 2014/0086108 A1 | 3/2014 | Dunn |
| 2014/0086145 A1 | 3/2014 | Ramkumar |
| 2014/0087680 A1 | 3/2014 | Luukkala |
| 2014/0087780 A1 | 3/2014 | Abhyanker |
| 2014/0095425 A1 | 4/2014 | Sipple |
| 2014/0096195 A1 | 4/2014 | Morgan |
| 2014/0113606 A1 | 4/2014 | Morken |
| 2014/0126356 A1 | 5/2014 | Lee |
| 2014/0134969 A1 | 5/2014 | Jin |
| 2014/0142979 A1 | 5/2014 | Mitsunaga |
| 2014/0148117 A1 | 5/2014 | Basore |
| 2014/0148120 A1 | 5/2014 | Buck |
| 2014/0155017 A1 | 6/2014 | Fan |
| 2014/0155018 A1 | 6/2014 | Fan |
| 2014/0164505 A1 | 6/2014 | Daly |
| 2014/0199959 A1 | 7/2014 | Hassan |
| 2014/0213212 A1 | 7/2014 | Clawson |
| 2014/0218537 A1 | 8/2014 | Nepo |
| 2014/0222462 A1 | 8/2014 | Shakil |
| 2014/0248848 A1 | 9/2014 | Mufti |
| 2014/0253326 A1 | 9/2014 | Cho |
| 2014/0257846 A1 | 9/2014 | Hermiz |
| 2014/0269557 A1* | 9/2014 | Mechaley, Jr. ..... H04W 76/007 |
| 2014/0302810 A1 | 10/2014 | Inha |
| 2014/0324351 A1 | 10/2014 | Dannevik |
| 2014/0359008 A1 | 12/2014 | Finney |
| 2014/0368601 A1 | 12/2014 | Decharms |
| 2014/0370836 A1 | 12/2014 | Gladstone |
| 2014/0370839 A1 | 12/2014 | Hatton |
| 2014/0370841 A1 | 12/2014 | Roberts |
| 2015/0011176 A1 | 1/2015 | Zhu |
| 2015/0029836 A1 | 1/2015 | Hans |
| 2015/0031324 A1 | 1/2015 | Zentner |
| 2015/0038102 A1 | 2/2015 | Yoakum |
| 2015/0038109 A1 | 2/2015 | Salahshour |
| 2015/0054639 A1 | 2/2015 | Rosen |
| 2015/0055453 A1 | 2/2015 | Chaki |
| 2015/0055554 A1 | 2/2015 | Sedlacek |
| 2015/0065082 A1 | 3/2015 | Sehgal |
| 2015/0080021 A1 | 3/2015 | Bietz |
| 2015/0081209 A1 | 3/2015 | Yeh |
| 2015/0081927 A1 | 3/2015 | Xu |

(56) References Cited

U.S. PATENT DOCUMENTS

| | | |
|---|---|---|
| 2015/0085997 A1 | 3/2015 | Biage |
| 2015/0087256 A1* | 3/2015 | Carter ................. H04W 4/22 |
| 2015/0087259 A1 | 3/2015 | Hinsen |
| 2015/0094095 A1 | 4/2015 | Johnson |
| 2015/0099481 A1 | 4/2015 | Maitre |
| 2015/0109125 A1 | 4/2015 | Kaib |
| 2015/0111524 A1 | 4/2015 | South |
| 2015/0112883 A1 | 4/2015 | Orduna |
| 2015/0137972 A1 | 5/2015 | Nepo |
| 2015/0140936 A1 | 5/2015 | Sachs |
| 2015/0147995 A1 | 5/2015 | Bontu |
| 2015/0172897 A1 | 6/2015 | Mariathasan |
| 2015/0181401 A1 | 6/2015 | Dhandu |
| 2015/0201316 A1 | 7/2015 | Khatibi |
| 2015/0230072 A1* | 8/2015 | Saigh et al. ............ H04W 4/22 |
| 2015/0289121 A1 | 10/2015 | Lesage |
| 2015/0289122 A1 | 10/2015 | Friesen |
| 2015/0296351 A1 | 10/2015 | Tham |
| 2015/0304827 A1 | 10/2015 | Price |
| 2015/0317392 A1 | 11/2015 | Fernandez |
| 2015/0317809 A1 | 11/2015 | Chellappan |
| 2015/0319284 A1 | 11/2015 | Leonessi |
| 2015/0350262 A1 | 12/2015 | Rainisto |
| 2015/0350836 A1 | 12/2015 | Smith |
| 2015/0358794 A1 | 12/2015 | Nokhoudian |
| 2015/0365319 A1 | 12/2015 | Finn |
| 2016/0004224 A1 | 1/2016 | Pi |
| 2016/0012702 A1 | 1/2016 | Hart |
| 2016/0026768 A1 | 1/2016 | Singh |
| 2016/0034961 A1 | 2/2016 | May |
| 2016/0050550 A1 | 2/2016 | Anand |
| 2016/0057595 A1 | 2/2016 | Ahmed |
| 2016/0065748 A1 | 3/2016 | Li |
| 2016/0088455 A1 | 3/2016 | Bozik |
| 2016/0110991 A1 | 4/2016 | Hunter |
| 2016/0142894 A1 | 5/2016 | Papakonstantinou |
| 2016/0173689 A1 | 6/2016 | Klaban |
| 2016/0192167 A1 | 6/2016 | Piett |
| 2016/0210581 A1 | 7/2016 | Braun |
| 2016/0219084 A1 | 7/2016 | Abiezzi |
| 2016/0219397 A1 | 7/2016 | Mayor |
| 2016/0227589 A1 | 8/2016 | Marshall |
| 2016/0269535 A1 | 9/2016 | Balabhadruni |
| 2016/0307436 A1 | 10/2016 | Nixon |
| 2016/0315923 A1 | 10/2016 | Riscombe-Burton |
| 2016/0316493 A1 | 10/2016 | Davis |
| 2016/0330769 A1 | 11/2016 | Edge |
| 2016/0337831 A1 | 11/2016 | Piett |
| 2016/0345171 A1 | 11/2016 | Kulkarni |
| 2016/0353262 A1 | 12/2016 | Acevedo |
| 2016/0353266 A1 | 12/2016 | Winkler |
| 2016/0363931 A1 | 12/2016 | Yang |
| 2016/0371973 A1 | 12/2016 | Holleczek |
| 2017/0004427 A1 | 1/2017 | Bruchal |
| 2017/0005914 A1 | 1/2017 | Edge |
| 2017/0012815 A1 | 1/2017 | Nekrestyanov |
| 2017/0046216 A1 | 2/2017 | Stenneth |
| 2017/0075407 A1 | 3/2017 | Kritt |
| 2017/0078226 A1 | 3/2017 | Daly |
| 2017/0093594 A1 | 3/2017 | Peak |
| 2017/0099579 A1 | 4/2017 | Ryan |
| 2017/0108862 A1 | 4/2017 | Mikkelsen |
| 2017/0116845 A1 | 4/2017 | See |
| 2017/0124670 A1 | 5/2017 | Becker |
| 2017/0124852 A1 | 5/2017 | Pauws |
| 2017/0140637 A1 | 5/2017 | Thurlow |
| 2017/0142568 A1 | 5/2017 | Saito |
| 2017/0142570 A1 | 5/2017 | Self |
| 2017/0150335 A1 | 5/2017 | Self |
| 2017/0161614 A1 | 6/2017 | Mehta |
| 2017/0164175 A1 | 6/2017 | Bozik |
| 2017/0171735 A1 | 6/2017 | Anand |
| 2017/0180486 A1 | 6/2017 | Mehta |
| 2017/0180963 A1 | 6/2017 | Cavendish |
| 2017/0180966 A1 | 6/2017 | Piett |
| 2017/0188218 A1 | 6/2017 | Corley |
| 2017/0195475 A1 | 7/2017 | Mehta |
| 2017/0208543 A1 | 7/2017 | Zhang |
| 2017/0213251 A1 | 7/2017 | Nunally |
| 2017/0238129 A1 | 8/2017 | Maier |
| 2017/0238136 A1 | 8/2017 | Smith |
| 2017/0245113 A1 | 8/2017 | Hooker |
| 2017/0245130 A1 | 8/2017 | Mehta |
| 2017/0251347 A1 | 8/2017 | Mehta |
| 2017/0287085 A1 | 10/2017 | Smith |
| 2017/0310827 A1 | 10/2017 | Mehta |
| 2017/0316698 A1 | 11/2017 | Stenneth |
| 2017/0323209 A1 | 11/2017 | Rinzler |
| 2017/0325056 A1 | 11/2017 | Mehta |
| 2017/0330447 A1 | 11/2017 | Mehta |
| 2017/0331954 A1 | 11/2017 | Kotnis |
| 2017/0359712 A1 | 12/2017 | Meredith |
| 2017/0374538 A1 | 12/2017 | Gellens |
| 2018/0020091 A1 | 1/2018 | Self |
| 2018/0020329 A1 | 1/2018 | Smith |
| 2018/0039737 A1 | 2/2018 | Dempers |
| 2018/0053394 A1 | 2/2018 | Gersten |
| 2018/0053401 A1 | 2/2018 | Martin |
| 2018/0077282 A1 | 3/2018 | Herron |
| 2018/0077553 A1 | 3/2018 | Gideon, III |
| 2018/0089718 A1 | 3/2018 | Raisi |
| 2018/0150928 A1 | 5/2018 | Dejewski |
| 2018/0152563 A1 | 5/2018 | Mehta |
| 2018/0176271 A1 | 6/2018 | Laurent |
| 2018/0242133 A1 | 8/2018 | Anand |
| 2018/0249315 A1 | 8/2018 | Mehta |
| 2018/0262544 A1 | 9/2018 | Mehta |
| 2018/0310159 A1 | 10/2018 | Katz |
| 2018/0352408 A1 | 12/2018 | Baer |
| 2019/0020993 A1 | 1/2019 | Nguyen |
| 2019/0073894 A1 | 3/2019 | Mehta |
| 2019/0104395 A1 | 4/2019 | Mehta |
| 2019/0130719 A1 | 5/2019 | D'Amico |
| 2019/0149661 A1 | 5/2019 | Klaban |
| 2019/0166244 A1 | 5/2019 | Ravichandran |
| 2019/0166480 A1 | 5/2019 | Rauner |
| 2019/0172335 A1 | 6/2019 | Johnston-Mitchell |
| 2019/0174288 A1 | 6/2019 | Bozik |
| 2019/0174289 A1 | 6/2019 | Martin |
| 2019/0205120 A1 | 7/2019 | Sheedy |
| 2019/0230476 A1 | 7/2019 | Qi |
| 2019/0246260 A1 | 8/2019 | Edge |
| 2019/0253861 A1 | 8/2019 | Horelik |
| 2019/0261145 A1 | 8/2019 | South |
| 2019/0281165 A1 | 9/2019 | Mehta |
| 2019/0306664 A1 | 10/2019 | Mehta |
| 2019/0320310 A1 | 10/2019 | Horelik |
| 2019/0324825 A1 | 10/2019 | Schwartz |
| 2019/0327597 A1 | 10/2019 | Katz |
| 2019/0335310 A1 | 10/2019 | Anand |
| 2019/0342526 A1 | 11/2019 | Drako |
| 2019/0380020 A1 | 12/2019 | Pellegrini |
| 2020/0015058 A1 | 1/2020 | Wu |
| 2020/0059776 A1 | 2/2020 | Martin |
| 2020/0068374 A1 | 2/2020 | Mehta |
| 2020/0100084 A1 | 3/2020 | Martin |
| 2020/0126174 A1 | 4/2020 | Halse |
| 2020/0135005 A1 | 4/2020 | Katz |
| 2020/0221279 A1 | 7/2020 | Mehta |
| 2020/0242138 A1 | 7/2020 | Russ |
| 2020/0258374 A1 | 8/2020 | Mehta |
| 2020/0274962 A1 | 8/2020 | Martin |
| 2020/0314240 A1 | 10/2020 | Leavitt |
| 2020/0314623 A1 | 10/2020 | Pellegrini |
| 2020/0344602 A1 | 10/2020 | Li |
| 2021/0006961 A1 | 1/2021 | King-Berkman |
| 2021/0014659 A1 | 1/2021 | Mehta |
| 2021/0037368 A1 | 2/2021 | Pellegrini |
| 2021/0110686 A1 | 4/2021 | Slavin |
| 2021/0127228 A1 | 4/2021 | Baarman |
| 2021/0266722 A1 | 8/2021 | Pellegrini |
| 2021/0289334 A1 | 9/2021 | Martin |
| 2021/0322345 A1* | 10/2021 | Vasudevan et al. .......... 370/329 |
| 2021/0390844 A1 | 12/2021 | Katz |

(56) References Cited

U.S. PATENT DOCUMENTS

| | | |
|---|---|---|
| 2022/0014895 A1 | 1/2022 | Horelik |
| 2022/0030109 A1 | 1/2022 | Leavitt |
| 2022/0103995 A1 | 3/2022 | Horelik |
| 2022/0131637 A1 | 4/2022 | Sangal |
| 2022/0167141 A1 | 5/2022 | Anand |
| 2022/0172599 A1 | 6/2022 | Mehta |
| 2022/0174468 A1 | 6/2022 | Anand |
| 2022/0201458 A1 | 6/2022 | Pellegrini |
| 2022/0264274 A1 | 8/2022 | Bozik |
| 2022/0303380 A1 | 9/2022 | Martin |
| 2022/0322061 A1 | 10/2022 | King-Berkman |
| 2022/0353663 A1 | 11/2022 | Mehta |

FOREIGN PATENT DOCUMENTS

| | | | | |
|---|---|---|---|---|
| CA | 2773749 A1 | 10/2012 | | |
| CA | 2773881 A1 | 10/2012 | | |
| CA | 2790501 A1 | 3/2013 | | |
| CA | 2809421 A1 | 9/2013 | | |
| CA | 2947936 A1 | 11/2014 | | |
| CA | 2646607 C | 9/2016 | | |
| CA | 2886535 A1 | 10/2016 | | |
| CN | 104487976 A | 4/2015 | | |
| CN | 104539776 A | 4/2015 | | |
| CN | 205220594 U | 5/2016 | | |
| CN | 106021508 A | 10/2016 | | |
| EP | 2161912 A2 | 3/2010 | | |
| GB | 2528969 A * | 2/2016 | ............ | A61B 90/94 |
| JP | H10314133 A | 12/1998 | | |
| JP | H1170086 A | 3/1999 | | |
| JP | 2003272070 A | 9/2003 | | |
| JP | 2006319946 A | 11/2006 | | |
| JP | 2006334369 A | 12/2006 | | |
| JP | 4107777 B2 | 6/2008 | | |
| JP | 2011223285 A | 11/2011 | | |
| JP | 2012222443 A | 11/2012 | | |
| KR | 20090019606 A | 2/2009 | | |
| KR | 20090092900 A | 9/2009 | | |
| KR | 20100055746 A | 5/2010 | | |
| KR | 101305286 B1 | 9/2013 | | |
| KR | 20140052780 A | 5/2014 | | |
| KR | 20140093568 A | 7/2014 | | |
| KR | 20150097031 A | 8/2015 | | |
| KR | 101602482 B1 | 3/2016 | | |
| KR | 101612423 B1 | 4/2016 | | |
| KR | 20160097933 A | 8/2016 | | |
| KR | 20170100422 A | 9/2017 | | |
| WO | 9723104 A1 | 6/1997 | | |
| WO | 0022593 A1 | 4/2000 | | |
| WO | 0165763 A2 | 9/2001 | | |
| WO | 0167419 A2 | 9/2001 | | |
| WO | 2007109599 A2 | 9/2007 | | |
| WO | WO 2008027750 A2 * | 3/2008 | .............. | H04W 4/90 |
| WO | 2011060335 A1 | 5/2011 | | |
| WO | 2012129561 A1 | 9/2012 | | |
| WO | 2014025563 A1 | 2/2014 | | |
| WO | 2014063121 A1 | 4/2014 | | |
| WO | 2014074420 A1 | 5/2014 | | |
| WO | 2014087157 A1 | 6/2014 | | |
| WO | 2014176646 A1 | 11/2014 | | |
| WO | WO 2014182638 A2 * | 11/2014 | ........... | G06Q 50/265 |
| WO | 2015127867 A1 | 9/2015 | | |
| WO | 2015196155 A1 | 12/2015 | | |
| WO | 2016044540 A1 | 3/2016 | | |
| WO | 2016093553 A1 | 6/2016 | | |
| WO | 2017079354 A1 | 5/2017 | | |
| WO | 2017083571 A1 | 5/2017 | | |
| WO | 2017100220 A1 | 6/2017 | | |
| WO | 2017106775 A1 | 6/2017 | | |
| WO | 2017112820 A1 | 6/2017 | | |
| WO | 2017189610 A2 | 11/2017 | | |
| WO | 2017196753 A1 | 11/2017 | | |
| WO | 2018039142 A1 | 3/2018 | | |
| WO | 2019113129 A1 | 6/2019 | | |
| WO | 2020172612 A1 | 8/2020 | | |
| WO | 2020205033 A1 | 10/2020 | | |
| WO | 2021034859 A1 | 2/2021 | | |
| WO | 2021203037 A1 | 10/2021 | | |

OTHER PUBLICATIONS (JP 2013511222 A), Community-based Response System (see title) (Year: 2013).*
(KR 20150035907 A), System, Apparatus And Method Of Emergency Rescue Support (see title) (Year: 2015).*
Co-pending U.S. Appl. No. 15/342,093, filed Nov. 2, 2016.
Co-pending U.S. Appl. No. 15/371,117, filed Dec. 6, 2016.
Co-pending U.S. Appl. No. 15/382,097, filed Dec. 16, 2016.
Co-pending U.S. Appl. No. 15/387,363, filed Dec. 21, 2016.
Co-pending U.S. Appl. No. 15/436,379, filed Feb. 17, 2017.
Co-pending U.S. Appl. No. 15/436,484, filed Feb. 17, 2017.
PCT/US2015/050609 International Search Report and Written Opinion dated Dec. 16, 2015.
PCT/US2016/060189 International Search Report and Written Opinion dated Feb. 24, 2017.
PCT/US2016/065212 International Search Report and Written Opinion dated Feb. 20, 2017.
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
Co-pending U.S. Appl. No. 15/497,067, filed Apr. 25, 2017.
Co-pending U.S. Appl. No. 15/588,343, filed May 5, 2017.
Co-pending U.S. Appl. No. 15/589,847, filed May 8, 2017.
PCT/US2015/050609 International Preliminary Report on Patentability dated Mar. 30, 2017.
PCT/US2016/067366 International Search Report and Written Opinion dated Mar. 31, 2017.
PCT/US2016/068134 International Search Report and Written Opinion dated Apr. 21, 2017.
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (Jan. 2011).
U.S. Appl. No. 14/856,818 Office Action dated Apr. 12, 2017.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,484 Office Action dated May 8, 2017.
U.S. Appl. No. 15/444,133 Office Action dated Apr. 4, 2017.
U.S. Appl. No. 15/497,067 Office Action dated Jun. 23, 2017.
U.S. Appl. No. 15/589,847 Office Action dated Jun. 23, 2017.
Co-pending U.S. Appl. No. 15/682,440, filed Aug. 21, 2017.
U.S. Appl. No. 15/436,484 Office Action dated Sep. 14, 2017.
PCT/US2017/047854 International Search Report and Written Opinion dated Nov. 28, 2017.
U.S. Appl. No. 15/436,379 Office Action dated Nov. 2, 2017.
U.S. Appl. No. 15/589,847 Office Action dated Nov. 30, 2017.
U.S. Appl. No. 15/667,531 Office Action dated Nov. 8, 2017.
Co-pending U.S. Appl. No. 15/667,531, filed Aug. 2, 2017.
PCT/US2017/029465 International Search Report and Written Opinion dated Aug. 9, 2017.
PCT/US2017/031605 International Search Report and Written Opinion dated Jul. 31, 2017.
Co-pending U.S. Appl. No. 15/880,208, filed Jan. 25, 2018.
U.S. Appl. No. 15/588,343 Office Action dated Feb. 26, 2018.
U.S. Appl. No. 15/667,531 Office Action dated Apr. 5, 2018.
National Emergency Number Association (nena) Technical Committee Chairs, "NENA Functional and Interface Standards for Next Generation 9-1-1 Version 1.0 (i3)". (Dec. 18, 2007), URL: https://c.ymcdn.com/sites/nena.site-ym.com/resource/collection/2851C951-69FF-40F0-A6B8-36A714CB085D/NENA_08-002-v1_Functional_Interface_Standards_NG911_i3.pdf, (Feb. 5, 2018), XP055447667.
ArcGIS REST Services Directory. Folder: TIGERWeb. Available at https://tigerweb.geo.census.gov/arcgis/rest/services/TIGERweb. (1 pg.) (Accessed Sep. 2017).
Co-pending U.S. Appl. No. 15/958,186, filed Apr. 20, 2018.
Co-pending U.S. Appl. No. 15/960,384, filed Apr. 23, 2018.

(56) References Cited

OTHER PUBLICATIONS

Co-pending U.S. Appl. No. 15/976,600, filed May 10, 2018.
Homeland Security Science and Technology. Using Social Media for Enhanced Situational Awareness and Decision Support. Virtual Social Medial Working Group and DHS First Responders Group. (44 pgs.) (Jun. 2014).
Meier. MatchApp: Next Generation Disaster Response App? Revolution (12 pgs.) (Feb. 27, 2013).
Seattle Real Time Fire 911 Calls. Available at https://catalog.data.gov/dataset/seattle-real-time-fire-911-calls-6cdf3 (3 pgs.) (Accessed Sep. 2017).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 15/444,133 Office Action dated Aug. 17, 2017.
Weather Company Data for IBM Bluemix APIs. Available at https://twcservice.mybluemix.net/rest-api/ (100 pgs) (Accessed Sep. 2017).
Co-pending U.S. Appl. No. 16/378,363, filed Apr. 8, 2019.
PCT/US2017/047854 International Preliminary Report on Patentability dated Mar. 7, 2019.
PCT/US2018/063935 International Search Report and Written Opinion dated Mar. 22, 2019.
Co-pending U.S. Appl. No. 16/150,099, filed Oct. 2, 2018.
Co-pending U.S. Appl. No. 16/162,171, filed Oct. 16, 2018.
Co-pending U.S. Appl. No. 16/178,476, filed Nov. 1, 2018.
Co-pending U.S. Appl. No. 16/209,892, dated Dec. 4, 2018.
Co-pending U.S. Appl. No. 16/271,634, filed Feb. 8, 2019.
PCT/US2016/060189 International Preliminary Report on Patentability dated May 17, 2018.
PCT/US2016/065212 International Preliminary Report on Patentability dated Jun. 21, 2018.
PCT/US2016/067366 International Preliminary Report on Patentability dated Jun. 28, 2018.
PCT/US2016/068134 International Preliminary Report on Patentability dated Jul. 5, 2018.
PCT/US2017/029465 International Preliminary Report on Patentability dated Nov. 8, 2018.
PCT/US2018/028951 International Search Report and Written Opinion dated Aug. 10, 2018.
U.S. Appl. No. 15/589,847 Office Action dated Nov. 6, 2018.
U.S. Appl. No. 15/880,208 Office Action dated Aug. 7, 2018.
U.S. Appl. No. 15/958,186 Office Action dated Oct. 18, 2018.
U.S. Appl. No. 15/960,384 Office Action dated Jul. 12, 2018.
U.S. Appl. No. 16/209,892 Office Action dated Feb. 8, 2019.
U.S. Appl. No. 15/682,440 Office Action dated Jul. 10, 2019.
U.S. Appl. No. 16/150,099 Office Action dated Jun. 25, 2019.
U.S. Appl. No. 16/178,476 Office Action dated May 30, 2019.
U.S. Appl. No. 16/271,634 Office Action dated Jun. 13, 2019.
U.S. Appl. No. 16/378,363 Office Action dated Jul. 19, 2019.
Chowdhury et al. Tweet4act: Using incident-specific profiles for classifying crisis-related messages. Proceedings of the 10th International ISCRAM Conference (pp. 834-839) (2013).
PCT/US2019/027538 International Search Report and Written Opinion dated Aug. 2, 2019.
U.S. Appl. No. 15/371,117 Office Action dated Aug. 5, 2019.
U.S. Appl. No. 15/958,398 Office Action dated Oct. 12, 2018.
U.S. Appl. No. 16/436,810 Office Action dated Aug. 9, 2019.
Abel et al. Semantics + Filtering + Search—Twitcident exploring information in social web streams. HT'12-Proceedings of 23rd ACM Conference on Hypertext and Social Media (10 pgs) (Jun. 25-28, 2012).
Cipolla et al. A tool for Emergency Detection with Deep Learning Neural Networks. KDWeb (2016) How to predict a disaster. ICAR-National Research Council of Italy—Palermo, Italy (Dec. 1, 2016) (10 pgs).
Co-pending U.S. Appl. No. 16/537,377, filed Aug. 9, 2019.
Co-pending U.S. Appl. No. 16/740,207, filed Jan. 10, 2020.
Co-pending U.S. Appl. No. 16/798,049, filed Feb. 21, 2020.
Marcus et al. TwitInfo: Aggregating and Visualizing Microblogs for Event Exploration. ACM CHI Conference May 7-12, 2011, 2011 (10 pgs).
National Emergency No. Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).
U.S. Appl. No. 15/682,440 Office Action dated Jan. 27, 2020.
U.S. Appl. No. 15/976,600 Office Action dated Jan. 30, 2020.
U.S. Appl. No. 16/162,171 Office Action dated Nov. 4, 2019.
U.S. Appl. No. 16/271,634 Office Action dated Dec. 16, 2019.
U.S. Appl. No. 16/421,355 Office Action dated Feb. 4, 2020.
U.S. Appl. No. 16/436,810 Office Action dated Dec. 17, 2019.
U.S. Appl. No. 16/526,195 Office Action dated Dec. 27, 2019.
U.S. Appl. No. 16/740,207 Office Action dated Mar. 11, 2020.
U.S. Appl. No. 16/378,363 Office Action dated Jan. 14, 2020.
U.S. Appl. No. 16/384,600 Office Action dated Apr. 2, 2020.
U.S. Appl. No. 16/162,171 Office Action dated Apr. 9, 2020.
Co-pending U.S. Appl. No. 16/823, 192, filed on Mar. 18, 2020.
Co-pending U.S. Appl. No. 16/834,914, filed Mar. 30, 2020.
PCT/US2020/013176 International Search Report and Written Opinion dated May 8, 2020.
Song. Next Generation Emergency Call System with Enhanced Indoor Positioning, Columbia University. Thesis [online] [retrieved Apr. 20, 2020 from < url:https://scholar.google.co.kr/citations/?user=h_4uUqAAAAAJ&hl=ko > (156 pgs) (2014) < /url: < a >.
PCT/US2020/019341 International Search Report and Written Opinion dated Jun. 29, 2020.
U.S. Appl. No. 16/798,049 Office Action dated Jul. 17, 2020.
U.S. Appl. No. 15/371,117 Office Action dated Apr. 3, 2020.
U.S. Appl. No. 15/976,600 Office Action dated Aug. 3, 2020.
U.S. Appl. No. 16/162,171 Office Action dated Sep. 24, 2020.
U.S. Appl. No. 16/384,600 Office Action dated Oct. 2, 2020.
U.S. Appl. No. 16/421,355 Office Action dated Oct. 19, 2020.
U.S. Appl. No. 16/509,296 Office Action dated Sep. 3, 2020.
U.S. Appl. No. 16/740,207 Office Action dated Aug. 17, 2020.
PCT/US2020/046857 International Search Report and Written Opinion dated Nov. 18, 2020.
U.S. Appl. No. 16/823,192 Office Action dated Dec. 4, 2020.
U.S. Appl. No. 16/834,914 Office Action dated Dec. 2, 2020.
U.S. Appl. No. 16/378,363 Office Action dated Feb. 17, 2021.
U.S. Appl. No. 16/684,366 Office Action dated Dec. 23, 2020.
Botega et al. Saw-Oriented User Interfaces For Emergency Dispatch Systems. Computer Vision—Eccv 2020 : 16th European Conference, Glasgow, Uk, Aug. 23-28, 2020 : Proceedings; Part Of The Lecture Notes In Computer Science (Jul. 21, 2015).
U.S. Appl. No. 15/976,600 Office Action dated Jan. 28, 2022.
U.S. Appl. No. 15/976,600 Office Action dated May 13, 2021.
U.S. Appl. No. 16/162,171 Office Action dated Apr. 8, 2021.
U.S. Appl. No. 16/378,363 Office Action dated Sep. 17, 2021.
U.S. Appl. No. 16/384,600 Office Action dated Jun. 9, 2021.
U.S. Appl. No. 16/421,355 Office Action dated Jan. 7, 2022.
U.S. Appl. No. 16/421,355 Office Action dated May 12, 2021.
U.S. Appl. No. 16/537,377 Office Action dated Apr. 16, 2021.
U.S. Appl. No. 16/537,377 Office Action dated Dec. 27, 2021.
U.S. Appl. No. 16/539,946 Office Action dated Oct. 6, 2021.
U.S. Appl. No. 16/684,366 Office Action dated Oct. 5, 2021.
U.S. Appl. No. 16/798,049 Office Action dated Mar. 8, 2021.
U.S. Appl. No. 16/865,170 Office Action dated Feb. 24, 2022.
U.S. Appl. No. 16/865,170 Office Action dated Jul. 9, 2021.
U.S. Appl. No. 16/936,856 Office Action dated Aug. 16, 2021.
U.S. Appl. No. 17/065,337 Office Action dated Nov. 8, 2021.
U.S. Appl. No. 17/115,098 Office Action dated Mar. 9, 2021.
U.S. Appl. No. 17/143,819 Office Action dated Dec. 6, 2021.
U.S. Appl. No. 17/332,863 Office Action dated Sep. 8, 2021.
U.S. Appl. No. 17/545,244 Office Action dated Apr. 1, 2022.
U.S. Appl. No. 17/143,819 Office Action dated May 26, 2022.
U.S. Appl. No. 17/196,438 Office Action dated May 10, 2022.
U.S. Appl. No. 17/221,568 Office Action dated May 2, 2022.
U.S. Appl. No. 17/671,493 Office Action dated May 10, 2022.
U.S. Appl. No. 17/671,510 Office Action dated Apr. 22, 2022.
U.S. Appl. No. 16/684,366 Office Action dated Jul. 1, 2022.
U.S. Appl. No. 17/378,045 Office Action dated Jul. 20, 2022.

(56) References Cited

OTHER PUBLICATIONS

Chohlaswood et al. Mining 911 Calls in New York City: Temporal Patterns, Detection and Forecasting. AAAI Conference on Artificial Intelligence Workshop (Apr. 2015).
Hodgkiss et al. Spatiotemporal Analysis of 911 Call Stream Data. Proceedings of the 2005 national conference on Digital government research (2005).
Jasso et al. Prediction of 911 Call Volumes For Emergency Event Detection. Proceedings of the 8th Annual International Digital Government Research Conference (2007).
U.S. Appl. No. 16/684,366 Office Action dated Oct. 6, 2021.
U.S. Appl. No. 16/940,043 Office Action dated Oct. 18, 2021.
U.S. Appl. No. 16/539,946 Office Action dated Jul. 28, 2022.
U.S. Appl. No. 17/065,337 Office Action dated Aug. 12, 2022.
U.S. Appl. No. 17/448,610 Office Action dated Oct. 5, 2022.
U.S. Appl. No. 17/448,817 Office Action dated Dec. 7, 2022.
U.S. Appl. No. 17/468,392 Office Action dated Nov. 2, 2022.
U.S. Appl. No. 17/479,471 Ex Parte Quayle dated Oct. 14, 2022.
U.S. Appl. No. 17/671,510 Office Action dated Aug. 4, 2022.

\* cited by examiner

SYSTEMS AND METHODS FOR EMERGENCY COMMUNICATIONS AMONGST GROUPS OF DEVICES BASED ON SHARED DATA

CROSS-REFERENCE

This application is a continuation of U.S. patent application Ser. No. 17/856,796, filed Jul. 1, 2022, which is a continuation of U.S. patent application Ser. No. 16/940,043, filed Jul. 27, 2020, issued as U.S. Pat. No. 11,445,349 on Sep. 13, 2022, which is a continuation of U.S. patent application Ser. No. 16/526,195, filed Jul. 30, 2019, issued as U.S. Pat. No. 10,771,951 on Sep. 8, 2020, which is a continuation of U.S. Pat. No. 15/958,398, filed Apr. 20, 2018, issued as U.S. Pat. No. 10,419,915 on Sep. 17, 2019, which is a continuation of U.S. patent application Ser. No. 15/444,133, filed Feb. 27, 2017, issued as U.S. Pat. No. 9,986,404 on May 29, 2018, which claims the benefit of U.S. Provisional Application No. 62/300,562, filed Feb. 26, 2016, U.S. Provisional Application No. 62/300,572, filed Feb. 26, 2016, and U.S. Provisional Application No. 62/310,149, filed Mar. 18, 2016. The entire contents of these applications are incorporated by reference herein.

BACKGROUND

A person in an emergency situation may request help using a mobile communication device such as a cell phone to dial a designated emergency number like 9-1-1 or a direct access phone number for the local emergency service provider (e.g. an emergency dispatch center). This call is assigned to one or more first responders by the emergency service provider. However, these communications are typically limited to audio calls with narrow functionality since most emergency service providers that receive emergency calls currently lack the capacity for more sophisticated communications.

SUMMARY

In most countries across the world, designated 3-digit numbers exist to place calls for emergency assistance. These calls for requesting emergency assistance are normally made via analog communication channels such as a public switched telephone network (PSTN) since most emergency service providers such as emergency dispatch centers (EDC) or public-safety access points (PSAP) are generally suited to only receive analog landline based calls. However, a vast number of calls requesting emergency assistance now originate from mobile communication devices such as, for example, mobile phones that are capable of communicating via data communication channels (e.g. Internet Protocol (IP)-based communication sessions). Despite the convenience of mobile communication devices, emergency service providers have been unable to leverage these capabilities to provide enhanced emergency communications in responding to emergency requests for assistance.

When a call for emergency assistance is received by an emergency service (e.g. an EDC), the EDC verifies the purpose of the call and other information about the caller (e.g. name, address, location, etc.), and then assigns one or more first responders to assist the caller. The information shared with the dispatcher at the EDC from the communication device of the caller, including any meta-data sent from the communication device of the caller is typically information about the caller. In some instances, in the case of a land-line or an Internet Protocol (IP) based wired phone, additional information about the caller is obtained from a database, for example, an automatic location identification (ALI) database, or a master street address guide (MSAG) based on address information (e.g. home billing address) sent from the caller's communication device. In the case of a wireless calling device, location information may include the location of a nearby cell tower through which the call from the wireless device is routed. The EDC generally receives calls for emergency assistance from the person or persons who are in an emergency situation or are impacted directly by the emergency situation, for example, a fire in a building or a personal health condition. Calls for emergency assistance are typically placed from communication devices that belong to persons calling for emergency assistance. However, in some instances, a call for emergency assistance is made by another person on behalf of the person or persons in an emergency. In some instances the person or persons needing the emergency assistance may not even be in the same geographic location or GPS position as the person or persons calling to request emergency assistance. In these circumstances, the EDC is unable to pull important information necessary for coordinating an emergency response. For example, if the person calling on behalf of another person in an emergency situation does not know the location of the other person, then the EDC lacks any means of obtaining this information. Moreover, the EDC is forced to act as an intermediary between the person in the emergency situation and the first responders, often conveying critical information between the parties using an audio channel (e.g. 2-way radio), wherein there is no way for the person and the first responder to communicate directly or share important information. Additionally, many emergency situations could be prevented if people had the ability to share information more easily and monitor one another (e.g. parents monitoring their children in a crowded theme park).

Accordingly, disclosed herein are systems, methods, and devices for allowing user communication devices that are part of a group of user communication devices to autonomously share meta-data about each user and/or user communication device in the group, for example, location information, with each other on a periodic basis such that all the user communication devices are in possession of the unique meta-data about each of the users and associated user communication devices in the group and keep a cache of this location information among each other for a specified period of time. In another aspect, described herein are systems, methods, and devices for providing access to unique information of a user stored on any one, or more, of the user communication devices that are part of a group of user communication devices including the user communication device of the user needing emergency assistance to an EDC or other emergency service provider.

In addition, the systems, devices, methods, and media described herein allow a person to send a request for assistance (e.g. an emergency request) on behalf of another person (e.g. a proxy communication). In some embodiments, a proxy communication session is established by a user communication device on behalf of another device belonging to another person in an emergency situation. In some embodiments, a recipient of the emergency request is an emergency dispatch center. In some embodiments, a recipient of the emergency request is an emergency management system. In some embodiments, the recipient of the emergency request is a relative or a friend. In some embodiments, the proxy communication session enables a third party (e.g. a recipient, or in some cases, a first responder assigned to the emergency) to obtain important information (e.g. location meta-data, user identification, user health history, etc.) from the device of the person in the emergency situation. In some embodiments, the third party is authorized to extract information from the device of the person in the emergency situation without requiring confirmation or permission from the person (e.g. pre-authorized). As a result, the third party is able to provide effective and timely assistance. In some embodiments, a third party is a user of a member device belonging to a group of devices.

Finally, disclosed herein are systems, devices, and methods that enable user communication devices to communicate directly with first responders, and for EDCs to initiate and setup such communication connections and send vital emergency situation related information directly to the first responders responding to an emergency situation. In some embodiments, multiple first responders are able to receive information about an emergency situation directly from a user so that a collective awareness can be generated about a user's emergency situation. In some embodiments, an EDC is able to add first responders to an active call for emergency response and provide the first responders direct access to the information being sent from the user's communication device and to the history of the information of the communication session from the user to the EDC and other first responders.

In one aspect, disclosed herein are communication devices comprising at least one processor, a memory, a network element, and a computer program including instructions executable by the at least one processor to create a group monitoring application comprising: (a) a group module determining that the communication device belongs to a group of devices, wherein the group of devices comprises member devices that are authorized to share data with each other; (b) a data sharing module providing data associated with the communication device to one or more member devices in the group of devices; and (c) a data intake module obtaining data associated with a member device in the group of devices and using the data to update a data set associated with the member device, wherein the data intake module requests a status update from the member device upon a triggering event. In some embodiments, the device comprises a communication module sending a request for assistance to a recipient on behalf of the member device. In further embodiments, the request for assistance is on behalf of a user of the member device. In further embodiments, the communication module provides the data set associated with the member device to the recipient. In yet further embodiments, the communication module provides the data set associated with the member device to the recipient by updating a database accessed by the recipient. In yet further embodiments, the communication module provides the data set associated with the member device to the recipient by sending the data set directly to the recipient. In yet further embodiments, the communication module provides the data set associated with the member device to the recipient by giving the recipient authorization to retrieve the data set from the group of devices. In yet further embodiments, the communication module provides the data set associated with the member device to the recipient by giving the recipient authorization to retrieve the data set from the member device. In yet further embodiments, the communication module provides the data set associated with the member device to the recipient by giving the recipient authorization to retrieve the data set from a database associated with the group of devices. In yet further embodiments, the communication module provides the data set associated with the member device to the recipient by giving the recipient authorization to retrieve the data set from a different member device in the group of devices. In yet further embodiments, the request to the recipient on behalf of the member device comprises the data set associated with the member device. In yet further embodiments, the data set associated with the member device is provided as a separate communication from the request on behalf of the member device. In further embodiments, the communication device and the member device do not share the same user. In further embodiments, the communication device and the member device share the same user. In further embodiments, the request for assistance comprises a request to establish a covert communication session for the member device. In further embodiments, the request is an emergency request for assistance. In further embodiments, the recipient is an emergency service. In further embodiments, the recipient is an emergency management system. In yet further embodiments, the communication device identifies an emergency dispatch center as responsible for the jurisdiction where the member device is located using the data set associated with the member device. In yet further embodiments, the communication device communicates with the emergency dispatch center by allowing the emergency management system to bridge a first data channel between the emergency management system and the communication device with a second data channel between the emergency management system and the emergency dispatch center. In yet further embodiments, communications between the communication device and member devices in the group of devices are provided to the EMS after the communication module sends the request for assistance. In further embodiments, the recipient is an emergency dispatch center. In further embodiments, the recipient is a first responder. In further embodiments, the recipient is a private security service. In further embodiments, the recipient is a third party not associated with an emergency service. In further embodiments, the recipient is another member device in the group of devices. In some embodiments, the communications device comprises an alert module determining the existence of an emergency situation relating to the member device. In further embodiments, the alert module provides an alert to a user of the communication device, wherein the alert informs the user of the emergency situation relating to the member device. In further embodiments, the alert module autonomously determines the emergency situation exists for the member device. In further embodiments, the alert module determines the emergency situation exists for the member device by analyzing the data set associated with the member device. In further embodiments, the alert module determines the emergency situation exists when the communication device has not received a status update from the member device in response to a status update request for a threshold number of times within a defined time period. In further embodiments, the alert module determines the emergency situation exists when the communication device has not received at least a threshold number of periodic pings from the member device within a defined time period. In further embodiments, the alert module determines the emergency situation exists by detecting a request for assistance sent by the member device. In further embodiments, the alert module determines the emergency situation exists by detecting a request for assistance sent on behalf of the member device. In further embodiments, the alert module determines the emergency situation exists by detecting the member device is part of an emergency communication session. In further embodiments, the alert module requests a status update by the member device, wherein the alert module confirms the emergency situation when the member device fails to provide a status update within a defined time period. In further embodiments, the alert module confirms the emergency situation. In yet further embodiments, the alert module confirms the emergency situation by verifying the emergency situation with the group of devices. In yet further embodiments, the alert module confirms the emergency situation by polling the group of devices to verify the member device has failed to provide the status update within a defined time period before providing the alert to the user of the communication device. In yet further embodiments, the alert module confirms the emergency situation by holding a vote by member devices in the group of devices to decide whether the emergency situation exists. In still yet further embodiments, the communication device casts a first vote, wherein a general vote by remaining member devices in the group of devices is held if the first vote indicates the emergency situation exists. In still yet further embodiments, each vote is given equal weight. In still yet further embodiments, the vote comprises weighted voting. In yet further embodiments, the communications device comprises a communication module sending a request for assistance to a recipient on behalf of the member device and providing the data set associated with the member device to the recipient, wherein the request is sent after the alert module confirms the emergency situation relating to the member device. In some embodiments, the status update comprises the data set for the member device. In some embodiments, the status update comprises a confirmation that a user of the member device is okay. In some embodiments, the data sharing module receives a status update request from a member device in the group of devices, wherein the communication device sends back a status update upon input by a user of the communication device. In some embodiments, the data sharing module receives a status update request from a member device in the group of devices, wherein the communication device autonomously sends back a status update without requiring input by a user of the communication device. In some embodiments, the triggering event occurs when the device receives user input requesting the status update from the member device. In some embodiments, data for the member device is obtained directly from the member device. In some embodiments, data for the member device is obtained indirectly from the one or more other member devices in the group of devices. In some embodiments, data for the member device is obtained from a database external to the group of devices. In some embodiments, data for the member device is stored on a cache database. In some embodiments, data for the member device is selected from the group consisting of: location data, health data, user data, sensor data, and any combination thereof. In further embodiments, the location data comprises a location of the member device determined using a method selected from the group consisting of: GPS satellite triangulation, cell tower triangulation, Wi-Fi triangulation, Bluetooth triangulation, and any combination thereof. In yet further embodiments, the location of the member device comprises coordinates having an accuracy of within 10 meters. In further embodiments, the health data comprises historical health data of a user of the member device selected from the group consisting of: age, weight, height, allergies, blood type, medical history, and any combination thereof. In further embodiments, the sensor data is provided by one or more sensors of the member device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In some embodiments, the communication device autonomously obtains data from the member device without requesting data. In some embodiments, the communication device periodically obtains data from the member device. In some embodiments, the communication device obtains data from the member device upon receiving user input requesting data from the member device. In some embodiments, the data intake module comprises data intake settings configurable by a user. In some embodiments, the data sharing module comprises data sharing settings configurable by a user. In some embodiments, the data set comprises current data. In some embodiments, the communication device and one or more member devices in the group of devices share data with each other directly without routing the data through an intermediary. In some embodiments, the communication device and one or more member devices in the group of devices share data with each other indirectly by routing the data through an intermediary. In further embodiments, the intermediary is an emergency management system. In some embodiments, the communications device comprises a data settings module comprising data sharing settings configurable by a user. In some embodiments, the communication device joins the group of devices by providing authorization to share data with existing member devices. In some embodiments, the group of devices comprises member devices that provide authorization to share data with other member devices in the group. In some embodiments, the group of devices comprises an ad hoc selection of member devices that joins the group automatically when the member devices are linked to a common emergency. In some embodiments, the group module determines that the member device belongs to the group of devices based on one or more of a phone number of the member device, user input indicating association between a user of the communication device and a user of the member device, an IP network subnet the communication device and member device belong to, and a home address associated with the communication device and the member device. In some embodiments, the communication device comprises an interactive display showing a map, wherein the map displays a location of the communication device, location of one or more member devices in the group of devices, or any combination thereof. In further embodiments, the communication device requests location data from the member device when the map is opened. In some embodiments, the status request module allows a user of the communication device to send a status update to one or more member devices in the group of devices. In further embodiments, the status update comprises an indication that the user is okay. In further embodiments, the status update comprises a data set associated with the user of the communication device. In some embodiments, the communication device comprises a unique calling number assigned to it. In some embodiments, the communication device is a mobile communication device. In some embodiments, the communication device does not have a unique calling number assigned to it. In some embodiments, the member device is a mobile communication device. In some embodiments, the member device does not have a unique calling number assigned to it. In some embodiments, the communication device has a geographic location that is distinct from a geographic location of the member device. In some embodiments, the member device is not configured to be worn or carried by a user. In some embodiments, the member device is a wearable device comprising one or more sensors. In some embodiments, the member device is a home monitoring device. In some embodiments, the member device is a vehicle monitoring device. In some embodiments, the communications device communicates with a recipient through an emergency communication session comprising: (a) a first data channel with an emergency service; and (b) a second data channel with a communication device of a first responder assigned to the emergency, wherein the second data channel is a direct data channel that allows the communication device to share the data set with the communication device of the first responder to share data without routing the data set through the emergency service. In some embodiments, the communications device communicates with a recipient through an emergency communication session comprising: (a) a first data channel with an emergency management system; and (b) a second data channel between the emergency service and the communication device of the first responder, wherein the emergency communication module bridges the first data channel with the second data channel to allow the user communication device to share the data set with the communication device of the first responder by routing the data set through the emergency service.

In another aspect, disclosed herein are non-transitory computer-readable storage media encoded with a computer program including instructions executable by a processor to create a group monitoring application comprising: (a) a group module determining that the communication device belongs to a group of devices, wherein the group of devices comprises member devices that are authorized to share data with each other; (b) a data sharing module providing data associated with the communication device to one or more member devices in the group of devices; and (c) a data intake module obtaining data associated with a member device in the group of devices and using the data to update a data set associated with the member device, wherein the data intake module requests a status update from the member device upon a triggering event. In some embodiments, the media comprises a communication module sending a request for assistance to a recipient on behalf of the member device. In further embodiments, the request for assistance is on behalf of a user of the member device. In further embodiments, the communication module provides the data set associated with the member device to the recipient. In yet further embodiments, the communication module provides the data set associated with the member device to the recipient by updating a database accessed by the recipient. In yet further embodiments, the communication module provides the data set associated with the member device to the recipient by sending the data set directly to the recipient. In yet further embodiments, the communication module provides the data set associated with the member device to the recipient by giving the recipient authorization to retrieve the data set from the group of devices. In yet further embodiments, the communication module provides the data set associated with the member device to the recipient by giving the recipient authorization to retrieve the data set from the member device. In yet further embodiments, the communication module provides the data set associated with the member device to the recipient by giving the recipient authorization to retrieve the data set from a database associated with the group of devices. In yet further embodiments, the communication module provides the data set associated with the member device to the recipient by giving the recipient authorization to retrieve the data set from a different member device in the group of devices. In yet further embodiments, the request to the recipient on behalf of the member device comprises the data set associated with the member device. In yet further embodiments, the data set associated with the member device is provided as a separate communication from the request on behalf of the member device. In further embodiments, the communication device and the member device do not share the same user. In further embodiments, the communication device and the member device share the same user. In further embodiments, the request for assistance comprises a request to establish a covert communication session for the member device. In further embodiments, the request is an emergency request for assistance. In further embodiments, the recipient is an emergency service. In further embodiments, the recipient is an emergency management system. In yet further embodiments, the communication device identifies an emergency dispatch center as responsible for the jurisdiction where the member device is located using the data set associated with the member device. In yet further embodiments, the communication device communicates with the emergency dispatch center by allowing the emergency management system to bridge a first data channel between the emergency management system and the communication device with a second data channel between the emergency management system and the emergency dispatch center. In yet further embodiments, communications between the communication device and member devices in the group of devices are provided to the EMS after the communication module sends the request for assistance. In further embodiments, the recipient is an emergency dispatch center. In further embodiments, the recipient is a first responder. In further embodiments, the recipient is a private security service. In further embodiments, the recipient is a third party not associated with an emergency service. In further embodiments, the recipient is another member device in the group of devices. In some embodiments, the communications device comprises an alert module determining the existence of an emergency situation relating to the member device. In further embodiments, the alert module provides an alert to a user of the communication device, wherein the alert informs the user of the emergency situation relating to the member device. In further embodiments, the alert module autonomously determines the emergency situation exists for the member device. In further embodiments, the alert module determines the emergency situation exists for the member device by analyzing the data set associated with the member device. In further embodiments, the alert module determines the emergency situation exists when the communication device has not received a status update from the member device in response to a status update request for a threshold number of times within a defined time period. In further embodiments, the alert module determines the emergency situation exists when the communication device has not received at least a threshold number of periodic pings from the member device within a defined time period. In further embodiments, the alert module determines the emergency situation exists by detecting a request for assistance sent by the member device. In further embodiments, the alert module determines the emergency situation exists by detecting a request for assistance sent on behalf of the member device. In further embodiments, the alert module determines the emergency situation exists by detecting the member device is part of an emergency communication session. In further embodiments, the alert module requests a status update by the member device, wherein the alert module confirms the emergency situation when the member device fails to provide a status update within a defined time period. In further embodiments, the alert module confirms the emergency situation. In yet further embodiments, the alert module confirms the emergency situation by verifying the emergency situation with the group of devices. In yet further embodiments, the alert module confirms the emergency situation by polling the group of devices to verify the member device has failed to provide the status update within a defined time period before providing the alert to the user of the communication device. In yet further embodiments, the alert module confirms the emergency situation by holding a vote by member devices in the group of devices to decide whether the emergency situation exists. In still yet further embodiments, the communication device casts a first vote, wherein a general vote by remaining member devices in the group of devices is held if the first vote indicates the emergency situation exists. In still yet further embodiments, each vote is given equal weight. In still yet further embodiments, the vote comprises weighted voting. In yet further embodiments, the communications device comprises a communication module sending a request for assistance to a recipient on behalf of the member device and providing the data set associated with the member device to the recipient, wherein the request is sent after the alert module confirms the emergency situation relating to the member device. In some embodiments, the status update comprises the data set for the member device. In some embodiments, the status update comprises a confirmation that a user of the member device is okay. In some embodiments, the data sharing module receives a status update request from a member device in the group of devices, wherein the media sends back a status update upon input by a user of the communication device. In some embodiments, the data sharing module receives a status update request from a member device in the group of devices, wherein the media autonomously sends back a status update without requiring input by a user of the communication device. In some embodiments, the triggering event occurs when the media receives user input requesting the status update from the member device. In some embodiments, data for the member device is obtained directly from the member device. In some embodiments, data for the member device is obtained indirectly from the one or more other member devices in the group of devices. In some embodiments, data for the member device is obtained from a database external to the group of devices. In some embodiments, data for the member device is stored on a cache database. In some embodiments, data for the member device is selected from the group consisting of: location data, health data, user data, sensor data, and any combination thereof. In further embodiments, the location data comprises a location of the member device determined using a method selected from the group consisting of: GPS satellite triangulation, cell tower triangulation, Wi-Fi triangulation, Bluetooth triangulation, and any combination thereof. In yet further embodiments, the location of the member device comprises coordinates having an accuracy of within 10 meters. In further embodiments, the health data comprises historical health data of a user of the member device selected from the group consisting of: age, weight, height, allergies, blood type, medical history, and any combination thereof. In further embodiments, the sensor data is provided by one or more sensors of the member device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In some embodiments, the communication device autonomously obtains data from the member device without requesting data. In some embodiments, the communication device periodically obtains data from the member device. In some embodiments, the communication device obtains data from the member device upon receiving user input requesting data from the member device. In some embodiments, the data intake module comprises data intake settings configurable by a user. In some embodiments, the data sharing module comprises data sharing settings configurable by a user. In some embodiments, the data set comprises current data. In some embodiments, the communication device and one or more member devices in the group of devices share data with each other directly without routing the data through an intermediary. In some embodiments, the communication device and one or more member devices in the group of devices share data with each other indirectly by routing the data through an intermediary. In further embodiments, the intermediary is an emergency management system. In some embodiments, the communications device comprises a data settings module comprising data sharing settings configurable by a user. In some embodiments, the communication device joins the group of devices by providing authorization to share data with existing member devices. In some embodiments, the group of devices comprises member devices that provide authorization to share data with other member devices in the group. In some embodiments, the group of devices comprises an ad hoc selection of member devices that joins the group automatically when the member devices are linked to a common emergency. In some embodiments, the group module determines that the member device belongs to the group of devices based on one or more of a phone number of the member device, user input indicating association between a user of the communication device and a user of the member device, an IP network subnet the communication device and member device belong to, and a home address associated with the communication device and the member device. In some embodiments, the communication device comprises an interactive display showing a map, wherein the map displays a location of the communication device, location of one or more member devices in the group of devices, or any combination thereof. In further embodiments, the communication device requests location data from the member device when the map is opened. In some embodiments, the status request module allows a user of the communication device to send a status update to one or more member devices in the group of devices. In further embodiments, the status update comprises an indication that the user is okay. In further embodiments, the status update comprises a data set associated with the user of the communication device. In some embodiments, the communication device comprises a unique calling number assigned to it. In some embodiments, the communication device is a mobile communication device. In some embodiments, the communication device does not have a unique calling number assigned to it. In some embodiments, the member device is a mobile communication device. In some embodiments, the member device does not have a unique calling number assigned to it. In some embodiments, the communication device has a geographic location that is distinct from a geographic location of the member device. In some embodiments, the member device is not configured to be worn or carried by a user. In some embodiments, the member device is a wearable device comprising one or more sensors. In some embodiments, the member device is a home monitoring device. In some embodiments, the member device is a vehicle monitoring device. In some embodiments, the communications device communicates with a recipient through an emergency communication session comprising: (a) a first data channel with an emergency service; and (b) a second data channel with a communication device of a first responder assigned to the emergency, wherein the second data channel is a direct data channel that allows the communication device to share the data set with the communication device of the first responder to share data without routing the data set through the emergency service. In some embodiments, the communications device communicates with a recipient through an emergency communication session comprising: (a) a first data channel with an emergency management system; and (b) a second data channel between the emergency service and the communication device of the first responder, wherein the emergency communication module bridges the first data channel with the second data channel to allow the user communication device to share the data set with the communication device of the first responder by routing the data set through the emergency service.

In another aspect, disclosed herein are methods for monitoring a group of devices by a communication device, the methods comprising: (a) determining, by the communication device, that the communication device belongs to a group of devices, wherein the group of devices comprises member devices that are authorized to share data with each other; (b) providing, by the communication device, data associated with the communication device to one or more member devices in the group of devices; and (c) obtaining, by the communication device, data associated with a member device in the group of devices and using the data to update a data set associated with the member device, wherein the communication device requests a status update from the member device upon a triggering event. In some embodiments, the method comprises sending, by the communication device, a request for assistance to a recipient on behalf of the member device. In further embodiments, the request for assistance is on behalf of a user of the member device. In further embodiments, the method comprises providing, by the communication device, the data set associated with the member device to the recipient. In yet further embodiments, the communication module provides the data set associated with the member device to the recipient by updating a database accessed by the recipient. In yet further embodiments, the communication device provides the data set associated with the member device to the recipient by sending the data set directly to the recipient. In yet further embodiments, the communication device provides the data set associated with the member device to the recipient by giving the recipient authorization to retrieve the data set from the group of devices. In yet further embodiments, the communication device provides the data set associated with the member device to the recipient by giving the recipient authorization to retrieve the data set from the member device. In yet further embodiments, the communication device provides the data set associated with the member device to the recipient by giving the recipient authorization to retrieve the data set from a database associated with the group of devices. In yet further embodiments, the communication device provides the data set associated with the member device to the recipient by giving the recipient authorization to retrieve the data set from a different member device in the group of devices. In yet further embodiments, the request to the recipient on behalf of the member device comprises the data set associated with the member device. In yet further embodiments, the data set associated with the member device is provided as a separate communication from the request on behalf of the member device. In further embodiments, the communication device and the member device do not share the same user. In further embodiments, the communication device and the member device share the same user. In further embodiments, the request for assistance comprises a request to establish a covert communication session for the member device. In further embodiments, the request is an emergency request for assistance. In further embodiments, the recipient is an emergency service. In further embodiments, the recipient is an emergency management system. In yet further embodiments, the communication device identifies an emergency dispatch center as responsible for the jurisdiction where the member device is located using the data set associated with the member device. In yet further embodiments, the communication device communicates with the emergency dispatch center by allowing the emergency management system to bridge a first data channel between the emergency management system and the communication device with a second data channel between the emergency management system and the emergency dispatch center. In yet further embodiments, communications between the communication device and member devices in the group of devices are provided to the EMS after the communication module sends the request for assistance. In further embodiments, the recipient is an emergency dispatch center. In further embodiments, the recipient is a first responder. In further embodiments, the recipient is a private security service. In further embodiments, the recipient is a third party not associated with an emergency service. In further embodiments, the recipient is another member device in the group of devices. In some embodiments, the method comprises determining, by the communication device, an existence of an emergency situation relating to the member device. In further embodiments, the method comprises providing, by the communication device, an alert to a user of the communication device, wherein the alert informs the user of the emergency situation relating to the member device. In further embodiments, the communication device autonomously determines the emergency situation exists for the member device. In further embodiments, the communication device determines the emergency situation exists for the member device by analyzing the data set associated with the member device. In further embodiments, the communication device determines the emergency situation exists when the communication device has not received a status update from the member device in response to a status update request for a threshold number of times within a defined time period. In further embodiments, the communication device determines the emergency situation exists when the communication device has not received at least a threshold number of periodic pings from the member device within a defined time period. In further embodiments, the communication device determines the emergency situation exists by detecting a request for assistance sent by the member device. In further embodiments, the communication device determines the emergency situation exists by detecting a request for assistance sent on behalf of the member device. In further embodiments, the communication device determines the emergency situation exists by detecting the member device is part of an emergency communication session. In further embodiments, the communication device requests a status update by the member device, wherein the communication device confirms the emergency situation when the member device fails to provide a status update within a defined time period. In further embodiments, the communication device confirms the emergency situation. In yet further embodiments, the communication device confirms the emergency situation by verifying the emergency situation with the group of devices. In yet further embodiments, the communication device confirms the emergency situation by polling the group of devices to verify the member device has failed to provide the status update within a defined time period before providing the alert to the user of the communication device. In yet further embodiments, the communication device confirms the emergency situation by holding a vote by member devices in the group of devices to decide whether the emergency situation exists. In still yet further embodiments, the communication device casts a first vote, wherein a general vote by remaining member devices in the group of devices is held if the first vote indicates the emergency situation exists. In still yet further embodiments, each vote is given equal weight. In still yet further embodiments, the vote comprises weighted voting. In yet further embodiments, the communications device comprises a communication module sending a request for assistance to a recipient on behalf of the member device and providing the data set associated with the member device to the recipient, wherein the request is sent after the communication device confirms the emergency situation relating to the member device. In some embodiments, the status update comprises the data set for the member device. In some embodiments, the status update comprises a confirmation that a user of the member device is okay. In some embodiments, the communication device receives a status update request from a member device in the group of devices, wherein the communication device sends back a status update upon input by a user of the communication device. In some embodiments, the communication device receives a status update request from a member device in the group of devices, wherein the communication device autonomously sends back a status update without requiring input by a user of the communication device. In some embodiments, the triggering event occurs when the device receives user input requesting the status update from the member device. In some embodiments, data for the member device is obtained directly from the member device. In some embodiments, data for the member device is obtained indirectly from the one or more other member devices in the group of devices. In some embodiments, data for the member device is obtained from a database external to the group of devices. In some embodiments, data for the member device is stored on a cache database. In some embodiments, data for the member device is selected from the group consisting of: location data, health data, user data, sensor data, and any combination thereof. In further embodiments, the location data comprises a location of the member device determined using a method selected from the group consisting of: GPS satellite triangulation, cell tower triangulation, Wi-Fi triangulation, Bluetooth triangulation, and any combination thereof. In yet further embodiments, the location of the member device comprises coordinates having an accuracy of within 10 meters. In further embodiments, the health data comprises historical health data of a user of the member device selected from the group consisting of: age, weight, height, allergies, blood type, medical history, and any combination thereof. In further embodiments, the sensor data is provided by one or more sensors of the member device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In some embodiments, the communication device autonomously obtains data from the member device without requesting data. In some embodiments, the communication device periodically obtains data from the member device. In some embodiments, the communication device obtains data from the member device upon receiving user input requesting data from the member device. In some embodiments, the communication device comprises data intake settings configurable by a user. In some embodiments, the data sharing module comprises data sharing settings configurable by a user. In some embodiments, the data set comprises current data. In some embodiments, the communication device and one or more member devices in the group of devices share data with each other directly without routing the data through an intermediary. In some embodiments, the communication device and one or more member devices in the group of devices share data with each other indirectly by routing the data through an intermediary. In further embodiments, the intermediary is an emergency management system. In some embodiments, the communications device comprises data sharing settings configurable by a user. In some embodiments, the communication device joins the group of devices by providing authorization to share data with existing member devices. In some embodiments, the group of devices comprises member devices that provide authorization to share data with other member devices in the group. In some embodiments, the group of devices comprises an ad hoc selection of member devices that joins the group automatically when the member devices are linked to a common emergency. In some embodiments, the communication device determines that the member device belongs to the group of devices based on one or more of a phone number of the member device, user input indicating association between a user of the communication device and a user of the member device, an IP network subnet the communication device and member device belong to, and a home address associated with the communication device and the member device. In some embodiments, the communication device comprises an interactive display showing a map, wherein the map displays a location of the communication device, location of one or more member devices in the group of devices, or any combination thereof. In further embodiments, the communication device requests location data from the member device when the map is opened. In some embodiments, the communication device allows a user of the communication device to send a status update to one or more member devices in the group of devices. In further embodiments, the status update comprises an indication that the user is okay. In further embodiments, the status update comprises a data set associated with the user of the communication device. In some embodiments, the communication device comprises a unique calling number assigned to it. In some embodiments, the communication device is a mobile communication device. In some embodiments, the communication device does not have a unique calling number assigned to it. In some embodiments, the member device is a mobile communication device. In some embodiments, the member device does not have a unique calling number assigned to it. In some embodiments, the communication device has a geographic location that is distinct from a geographic location of the member device. In some embodiments, the member device is not configured to be worn or carried by a user. In some embodiments, the member device is a wearable device comprising one or more sensors. In some embodiments, the member device is a home monitoring device. In some embodiments, the member device is a vehicle monitoring device. In some embodiments, the communications device communicates with a recipient through an emergency communication session comprising: (a) a first data channel with an emergency service; and (b) a second data channel with a communication device of a first responder assigned to the emergency, wherein the second data channel is a direct data channel that allows the communication device to share the data set with the communication device of the first responder to share data without routing the data set through the emergency service. In some embodiments, the communications device communicates with a recipient through an emergency communication session comprising: (a) a first data channel with an emergency management system; and (b) a second data channel between the emergency service and the communication device of the first responder, wherein the emergency communication module bridges the first data channel with the second data channel to allow the user communication device to share the data set with the communication device of the first responder by routing the data set through the emergency service.

In another aspect, disclosed herein are emergency management systems comprising at least one processor, a memory, a network element, and a computer program including instructions executable by the at least one processor to create a server software application for managing emergency communication sessions comprising: (a) a proxy detection module for processing a proxy request for assistance, wherein the proxy detection module: (i) receives a request for assistance from a communication device, wherein the request is associated with a member device in a group of devices, wherein the group of devices comprises member devices that are authorized to share data with each other; (ii) determines the communication device is authorized to send the request for assistance associated on behalf of the member device; and (iii) obtains a data set associated with the member device in the group of communication devices; (b) an emergency communication module establishing a communication session with a recipient and at least one of the communication device and the member device, wherein the emergency communication module: (i) sends the request to the recipient; and (ii) provides the data set associated with the member device to the recipient. In some embodiments, the emergency communication module provides the data set associated with the member device to the recipient by updating a database accessed by the recipient. In some embodiments, the emergency communication module provides the data set associated with the member device to the recipient by sending the data set directly to the recipient. In some embodiments, the proxy detection module obtains authorization to obtain the data set. In some embodiments, the proxy detection module obtains the data set associated with the member device from the communication device. In some embodiments, the proxy detection module obtains the data set associated with the member device from the group of devices. In some embodiments, the proxy detection module obtains the data set from a different member device in the group of devices. In some embodiments, the proxy detection module obtains the data set from a database associated with the group of devices. In some embodiments, the request for assistance comprises the data set associated with the member device. In some embodiments, the data set associated with the member device is obtained in a separate communication from the request for assistance. In some embodiments, the communication device and the member device do not share the same user. In some embodiments, the communication device and the member device share the same user. In some embodiments, the request is a request to establish a covert communication session for the member device. In some embodiments, the request is an emergency request for assistance. In some embodiments, the recipient is an emergency service. In some embodiments, the recipient is an emergency dispatch system. In further embodiments, the emergency communication module uses the data set associated with the member device to select an emergency dispatch center suitable for handling the request for assistance. In further embodiments, the communication session comprises: (a) a first data channel between the EMS and the communication device; and (b) a second data channel between the EMS and the EDC, wherein the emergency communication module bridges the first and second data channels to enable communications between the communication device and the EDC. In further embodiments, the communication session comprises: (a) a first data channel between the EMS and the member device; and (b) a second data channel between the EMS and the EDC, wherein the emergency communication module bridges the first and second data channels to enable communications between the member device and the EDC. In further embodiments, the communication session comprises: (a) a first data channel between the EMS and the communication device; (b) a second data channel between the EMS and the member device; and (c) a third data channel between the EMS and the EDC, wherein the emergency communication module bridges the first and second data channels with the third data channel to enable communications between the communication device, the member device, and the EDC. In further embodiments, the EMS obtains communications between the communication device and member devices in the group of devices after the communication module receives the request for assistance. In some embodiments, the recipient is a first responder. In some embodiments, the recipient is a private security service. In some embodiments, the recipient is a third party not associated with an emergency service. In some embodiments, the recipient is another member device in the group of devices. In some embodiments, the system comprises a cache database storing the data set associated with the member device. In some embodiments, the system comprises a database storing communications between the communication device, the member device, other member devices in the group of devices, and the recipient. In some embodiments, the data set comprises data for the member device that is selected from the group consisting of: location data, health data, user data, sensor data, and any combination thereof. In further embodiments, the location data comprises a location of the member device determined using a method selected from the group consisting of: GPS satellite triangulation, cell tower triangulation, Wi-Fi triangulation, Bluetooth triangulation, and any combination thereof. In yet further embodiments, the location of the member device comprises coordinates having an accuracy of within 10 meters. In further embodiments, the health data comprises historical health data of a user of the member device selected from the group consisting of: age, weight, height, allergies, blood type, medical history, and any combination thereof. In further embodiments, the sensor data is provided by one or more sensors of the member device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In further embodiments, the proxy detection module autonomously obtains data from the member device after receiving the request for assistance. In further embodiments, the proxy detection module periodically obtains data from the member device after receiving the request for assistance. In further embodiments, the proxy detection module requests an update to the data set associated with the member device. In further embodiments, the data set comprises current data. In further embodiments, the data shared between the communication device and one or more member devices in the group of devices is routed through the EMS. In some embodiments, the group of devices comprises an ad hoc selection of member devices that joins the group automatically when the member devices are linked to a common emergency. In some embodiments, the proxy detection module determines that the member device belongs to the group of devices based on one or more of a phone number of the member device, user input indicating association between a user of the communication device and a user of the member device, an IP network subnet the communication device and member device belong to, and a home address associated with the communication device and the member device. In some embodiments, the communication device comprises a unique calling number assigned to it. In some embodiments, the communication device is a mobile communication device. In some embodiments, the communication device does not have a unique calling number assigned to it. In some embodiments, the member device is a mobile communication device. In some embodiments, the member device does not have a unique calling number assigned to it. In some embodiments, the communication device has a geographic location that is distinct from a geographic location of the member device. In some embodiments, the member device is not configured to be worn or carried by a user. In some embodiments, the member device is a wearable device comprising one or more sensors. In some embodiments, the member device is a home monitoring device. In some embodiments, the member device is a vehicle monitoring device. In some embodiments, the communication session comprises: (a) a first data channel with the user communication device; (b) a second data channel with a communication device of a first responder assigned to the emergency; and (c) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the communication session comprises: (a) a first data channel with the user communication device; and (b) a second data channel with a communication device of a first responder assigned to the emergency, wherein the emergency communication module bridges the first data channel with the second data channel to allow the user communication device and the communication device of the first responder to share data with each other by routing the data through the emergency management system.

In another aspect, disclosed herein are non-transitory computer-readable storage media encoded with a computer program including instructions executable by a processor to create a server software application for managing emergency communication sessions comprising: (a) a proxy detection module for processing a proxy request for assistance, wherein the proxy detection module: (i) receives a request for assistance from a communication device, wherein the request is associated with a member device in a group of devices, wherein the group of devices comprises member devices that are authorized to share data with each other; (ii) determines the communication device is authorized to send the request for assistance associated on behalf of the member device; and (iii) obtains a data set associated with the member device in the group of communication devices; (b) an emergency communication module establishing a communication session with a recipient and at least one of the communication device and the member device, wherein the emergency communication module: (i) sends the request to the recipient; and (ii) provides the data set associated with the member device to the recipient. In some embodiments, the emergency communication module provides the data set associated with the member device to the recipient by updating a database accessed by the recipient. In some embodiments, the emergency communication module provides the data set associated with the member device to the recipient by sending the data set directly to the recipient. In some embodiments, the proxy detection module obtains authorization to obtain the data set. In some embodiments, the proxy detection module obtains the data set associated with the member device from the communication device. In some embodiments, the proxy detection module obtains the data set associated with the member device from the group of devices. In some embodiments, the proxy detection module obtains the data set from a different member device in the group of devices. In some embodiments, the proxy detection module obtains the data set from a database associated with the group of devices. In some embodiments, the request for assistance comprises the data set associated with the member device. In some embodiments, the data set associated with the member device is obtained in a separate communication from the request for assistance. In some embodiments, the communication device and the member device do not share the same user. In some embodiments, the communication device and the member device share the same user. In some embodiments, the request is a request to establish a covert communication session for the member device. In some embodiments, the request is an emergency request for assistance. In some embodiments, the recipient is an emergency service. In some embodiments, the recipient is an emergency dispatch system. In further embodiments, the emergency communication module uses the data set associated with the member device to select an emergency dispatch center suitable for handling the request for assistance. In further embodiments, the communication session comprises: (a) a first data channel between the EMS and the communication device; and (b) a second data channel between the EMS and the EDC, wherein the emergency communication module bridges the first and second data channels to enable communications between the communication device and the EDC. In further embodiments, the communication session comprises: (a) a first data channel between the EMS and the member device; and (b) a second data channel between the EMS and the EDC, wherein the emergency communication module bridges the first and second data channels to enable communications between the member device and the EDC. In further embodiments, the communication session comprises: (a) a first data channel between the EMS and the communication device; (b) a second data channel between the EMS and the member device; and (c) a third data channel between the EMS and the EDC, wherein the emergency communication module bridges the first and second data channels with the third data channel to enable communications between the communication device, the member device, and the EDC. In further embodiments, the EMS obtains communications between the communication device and member devices in the group of devices after the communication module receives the request for assistance. In some embodiments, the recipient is a first responder. In some embodiments, the recipient is a private security service. In some embodiments, the recipient is a third party not associated with an emergency service. In some embodiments, the recipient is another member device in the group of devices. In some embodiments, the media comprises a cache database storing the data set associated with the member device. In some embodiments, the media comprises a database storing communications between the communication device, the member device, other member devices in the group of devices, and the recipient. In some embodiments, the data set comprises data for the member device that is selected from the group consisting of: location data, health data, user data, sensor data, and any combination thereof. In further embodiments, the location data comprises a location of the member device determined using a method selected from the group consisting of: GPS satellite triangulation, cell tower triangulation, Wi-Fi triangulation, Bluetooth triangulation, and any combination thereof. In yet further embodiments, the location of the member device comprises coordinates having an accuracy of within 10 meters. In further embodiments, the health data comprises historical health data of a user of the member device selected from the group consisting of: age, weight, height, allergies, blood type, medical history, and any combination thereof. In further embodiments, the sensor data is provided by one or more sensors of the member device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In further embodiments, the proxy detection module autonomously obtains data from the member device after receiving the request for assistance. In further embodiments, the proxy detection module periodically obtains data from the member device after receiving the request for assistance. In further embodiments, the proxy detection module requests an update to the data set associated with the member device. In further embodiments, the data set comprises current data. In further embodiments, the data shared between the communication device and one or more member devices in the group of devices is routed through the EMS. In some embodiments, the group of devices comprises an ad hoc selection of member devices that joins the group automatically when the member devices are linked to a common emergency. In some embodiments, the proxy detection module determines that the member device belongs to the group of devices based on one or more of a phone number of the member device, user input indicating association between a user of the communication device and a user of the member device, an IP network subnet the communication device and member device belong to, and a home address associated with the communication device and the member device. In some embodiments, the communication device comprises a unique calling number assigned to it. In some embodiments, the communication device is a mobile communication device. In some embodiments, the communication device does not have a unique calling number assigned to it. In some embodiments, the member device is a mobile communication device. In some embodiments, the member device does not have a unique calling number assigned to it. In some embodiments, the communication device has a geographic location that is distinct from a geographic location of the member device. In some embodiments, the member device is not configured to be worn or carried by a user. In some embodiments, the member device is a wearable device comprising one or more sensors. In some embodiments, the member device is a home monitoring device. In some embodiments, the member device is a vehicle monitoring device. In some embodiments, the communication session comprises: (a) a first data channel with the user communication device; (b) a second data channel with a communication device of a first responder assigned to the emergency; and (c) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the communication session comprises: (a) a first data channel with the user communication device; and (b) a second data channel with a communication device of a first responder assigned to the emergency, wherein the emergency communication module bridges the first data channel with the second data channel to allow the user communication device and the communication device of the first responder to share data with each other by routing the data through the emergency management system.

In another aspect, disclosed herein are methods for managing emergency communication sessions by an EMS, the methods comprising: (a) processing, by the EMS, a proxy request for assistance by: (i) receiving a request for assistance from a communication device, wherein the request is associated with a member device in a group of devices, wherein the group of devices comprises member devices that are authorized to share data with each other; (ii) determining the communication device is authorized to send the request for assistance associated on behalf of the member device; and (iii) obtaining a data set associated with the member device in the group of communication devices; and (b) establishing, by the EMS, a communication session with a recipient and at least one of the communication device and the member device by: (i) sending the request to the recipient; and (ii) providing the data set associated with the member device to the recipient. In some embodiments, the EMS provides the data set associated with the member device to the recipient by updating a database accessed by the recipient. In some embodiments, the EMS provides the data set associated with the member device to the recipient by sending the data set directly to the recipient. In some embodiments, the EMS obtains authorization to obtain the data set. In some embodiments, the EMS obtains the data set associated with the member device from the communication device. In some embodiments, the EMS obtains the data set associated with the member device from the group of devices. In some embodiments, the EMS obtains the data set from a different member device in the group of devices. In some embodiments, the EMS obtains the data set from a database associated with the group of devices. In some embodiments, the request for assistance comprises the data set associated with the member device. In some embodiments, the data set associated with the member device is obtained in a separate communication from the request for assistance. In some embodiments, the communication device and the member device do not share the same user. In some embodiments, the communication device and the member device share the same user. In some embodiments, the request is a request to establish a covert communication session for the member device. In some embodiments, the request is an emergency request for assistance. In some embodiments, the recipient is an emergency service. In some embodiments, the recipient is an emergency dispatch system. In further embodiments, the method comprises using, by the EMS, the data set associated with the member device to select an emergency dispatch center suitable for handling the request for assistance. In further embodiments, the communication session comprises: (a) a first data channel between the EMS and the communication device; and (b) a second data channel between the EMS and the EDC, wherein the emergency communication module bridges the first and second data channels to enable communications between the communication device and the EDC. In further embodiments, the communication session comprises: (a) a first data channel between the EMS and the member device; and (b) a second data channel between the EMS and the EDC, wherein the emergency communication module bridges the first and second data channels to enable communications between the member device and the EDC. In further embodiments, the communication session comprises: (a) a first data channel between the EMS and the communication device; (b) a second data channel between the EMS and the member device; and (c) a third data channel between the EMS and the EDC, wherein the EMS bridges the first and second data channels with the third data channel to enable communications between the communication device, the member device, and the EDC. In further embodiments, the method comprises obtaining, by the EMS, communications between the communication device and member devices in the group of devices after the communication module receives the request for assistance. In some embodiments, the recipient is a first responder. In some embodiments, the recipient is a private security service. In some embodiments, the recipient is a third party not associated with an emergency service. In some embodiments, the recipient is another member device in the group of devices. In some embodiments, the media comprises a cache database storing the data set associated with the member device. In some embodiments, the media comprises a database storing communications between the communication device, the member device, other member devices in the group of devices, and the recipient. In some embodiments, the data set comprises data for the member device that is selected from the group consisting of: location data, health data, user data, sensor data, and any combination thereof. In further embodiments, the location data comprises a location of the member device determined using a method selected from the group consisting of: GPS satellite triangulation, cell tower triangulation, Wi-Fi triangulation, Bluetooth triangulation, and any combination thereof. In yet further embodiments, the location of the member device comprises coordinates having an accuracy of within 10 meters. In further embodiments, the health data comprises historical health data of a user of the member device selected from the group consisting of: age, weight, height, allergies, blood type, medical history, and any combination thereof. In further embodiments, the sensor data is provided by one or more sensors of the member device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In further embodiments, method comprises autonomously obtaining, by the EMS, data from the member device after receiving the request for assistance. In further embodiments, the method comprises periodically obtaining, by the EMS, data from the member device after receiving the request for assistance. In further embodiments, the EMS requests an update to the data set associated with the member device. In further embodiments, the data set comprises current data. In further embodiments, the data shared between the communication device and one or more member devices in the group of devices is routed through the EMS. In some embodiments, the group of devices comprises an ad hoc selection of member devices that joins the group automatically when the member devices are linked to a common emergency. In some embodiments, the EMS determines that the member device belongs to the group of devices based on one or more of a phone number of the member device, user input indicating association between a user of the communication device and a user of the member device, an IP network subnet the communication device and member device belong to, and a home address associated with the communication device and the member device. In some embodiments, the communication device comprises a unique calling number assigned to it. In some embodiments, the communication device is a mobile communication device. In some embodiments, the communication device does not have a unique calling number assigned to it. In some embodiments, the member device is a mobile communication device. In some embodiments, the member device does not have a unique calling number assigned to it. In some embodiments, the communication device has a geographic location that is distinct from a geographic location of the member device. In some embodiments, the member device is not configured to be worn or carried by a user. In some embodiments, the member device is a wearable device comprising one or more sensors. In some embodiments, the member device is a home monitoring device. In some embodiments, the member device is a vehicle monitoring device. In some embodiments, the communication session comprises: (a) a first data channel with the user communication device; (b) a second data channel with a communication device of a first responder assigned to the emergency; and (c) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the communication session comprises: (a) a first data channel with the user communication device; and (b) a second data channel with a communication device of a first responder assigned to the emergency, wherein the emergency communication module bridges the first data channel with the second data channel to allow the user communication device and the communication device of the first responder to share data with each other by routing the data through the emergency management system.

In another aspect, disclosed herein are communication devices comprising at least one processor, a memory, a network element, and a computer program including instructions executable by the at least one processor to create an emergency alert application comprising: (a) a user input module receiving an indication to send a request for assistance associated with a second device to a recipient; (b) a communication module communicating with the recipient after the indication to send a request for assistance is received, wherein the communication module: (i) determines the communication device is authorized to send the request for assistance on behalf of the second device to the recipient; (ii) sends the request associated with the second device to the recipient; and (iii) provides a data set associated with the second device to the recipient. In some embodiments, the request for assistance is on behalf of a user of the member device. In some embodiments, the communication module provides the data set associated with the second device to the recipient by updating a database accessed by the recipient. In some embodiments, the communication module provides the data set associated with the second device to the recipient by sending the data set directly to the recipient. In some embodiments, the communication module provides the data set associated with the second device to the recipient by giving the recipient authorization to retrieve the data set from the member device. In some embodiments, the request to the recipient on behalf of the second device comprises the data set associated with the second device. In some embodiments, the data set associated with the second device is provided as a separate communication from the request on behalf of the second device. In some embodiments, the communication device and the second device do not share the same user. In some embodiments, the communication device and the second device share the same user. In some embodiments, the request is a request to establish a covert communication session for the second device. In some embodiments, the request is an emergency request for assistance. In some embodiments, the recipient is an emergency service. In some embodiments, the recipient is an emergency management system. In further embodiments, the communication device identifies the emergency dispatch center as responsible for the jurisdiction where the second device is located using the data set associated with the second device. In yet further embodiments, the communication device communicates with the emergency dispatch center by allowing the emergency management system to bridge a first data channel between the emergency management system and the communication device with a second data channel between the emergency management system and the emergency dispatch center. In some embodiments, communications between the communication device and the second device are relayed to the EMS after the communication module sends the request for assistance. In some embodiments, the recipient is an emergency dispatch center. In some embodiments, the recipient is a first responder. In some embodiments, the recipient is a private security service. In some embodiments, the recipient is a third party not associated with an emergency service. In some embodiments, data for the second device is obtained from the second device. In some embodiments, data for the second device is obtained from a database external to second device. In some embodiments, data for the second device is stored on a cache database. In some embodiments, data for the second device is selected from the group consisting of: location data, health data, user data, sensor data, and any combination thereof. In further embodiments, the location data comprises a location of the second device determined using a method selected from the group consisting of: GPS satellite triangulation, cell tower triangulation, Wi-Fi triangulation, Bluetooth triangulation, and any combination thereof. In yet further embodiments, the location of the second device comprises coordinates having an accuracy of within 10 meters. In further embodiments, the health data comprises historical health data of a user of the second device selected from the group consisting of: age, weight, height, allergies, blood type, medical history, and any combination thereof. In further embodiments, the sensor data is provided by one or more sensors of the second device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In some embodiments, the communication device autonomously obtains data from the second device without requesting data. In some embodiments, the communication device periodically obtains data from the second device. In some embodiments, the communication device obtains data from the second device upon receiving user input requesting the data from the second device. In some embodiments, the data intake module comprises data intake settings configurable by a user. In some embodiments, the data set comprises current data. In some embodiments, the communications device comprises an alert module providing an alert to a user of the communication device after determining an emergency situation relating to the second device. In further embodiments, the alert module autonomously determines an emergency situation for the second device. In some embodiments, the communication device obtains authorization from the second device to access the data set associated with the second device. In some embodiments, the second device provides authorization to share the data set associated with the recipient. In some embodiments, the communication device comprises an interactive display showing a map, wherein the map displays a location of the communication device, location of the second device, or any combination thereof. In some embodiments, the communication device comprises a unique calling number assigned to it. In some embodiments, the communication device is a mobile communication device. In some embodiments, the communication device does not have a unique calling number assigned to it. In some embodiments, the second device is a mobile communication device. In some embodiments, the second device does not have a unique calling number assigned to it. In some embodiments, the communication device has a geographic location that is distinct from a geographic location of the second device. In some embodiments, the second device is not configured to be worn or carried by a user. In some embodiments, the second device is a wearable device comprising one or more sensors. In some embodiments, the second device is a home monitoring device. In some embodiments, the second device is a vehicle monitoring device. In some embodiments, the communication device and the second device both belong to a group of devices, wherein member devices in the group of devices are authorized to share data with each other. In some embodiments, the second device is authorized to share data with a recipient when a request for assistance is made on behalf of the second device or its user. In some embodiments, the communications device communicates with a recipient through an emergency communication session comprising: (a) a first data channel with an emergency service; and (b) a second data channel with a communication device of a first responder assigned to the emergency, wherein the second data channel is a direct data channel that allows the communication device to share the data set with the communication device of the first responder to share data without routing the data set through the emergency service. In some embodiments, the communications device communicates with a recipient through an emergency communication session comprising: (a) a first data channel with an emergency management system; and (b) a second data channel between the emergency service and the communication device of the first responder, wherein the emergency communication module bridges the first data channel with the second data channel to allow the user communication device to share the data set with the communication device of the first responder by routing the data set through the emergency service.

In another aspect, disclosed herein are non-transitory computer-readable storage media encoded with a computer program including instructions executable by a processor to create an emergency alert application comprising: (a) a user input module receiving an indication to send a request for assistance associated with a second device to a recipient; (b) a communication module communicating with the recipient after the indication to send a request for assistance is received, wherein the communication module: (i) determines the communication device is authorized to send the request for assistance on behalf of the second device to the recipient; (ii) sends the request associated with the second device to the recipient; and (iii) provides a data set associated with the second device to the recipient. In some embodiments, the request for assistance is on behalf of a user of the member device. In some embodiments, the communication module provides the data set associated with the second device to the recipient by updating a database accessed by the recipient. In some embodiments, the communication module provides the data set associated with the second device to the recipient by sending the data set directly to the recipient. In some embodiments, the communication module provides the data set associated with the second device to the recipient by giving the recipient authorization to retrieve the data set from the member device. In some embodiments, the request to the recipient on behalf of the second device comprises the data set associated with the second device. In some embodiments, the data set associated with the second device is provided as a separate communication from the request on behalf of the second device. In some embodiments, the communication device and the second device do not share the same user. In some embodiments, the communication device and the second device share the same user. In some embodiments, the request is a request to establish a covert communication session for the second device. In some embodiments, the request is an emergency request for assistance. In some embodiments, the recipient is an emergency service. In some embodiments, the recipient is an emergency management system. In further embodiments, the communication device identifies the emergency dispatch center as responsible for the jurisdiction where the second device is located using the data set associated with the second device. In yet further embodiments, the communication device communicates with the emergency dispatch center by allowing the emergency management system to bridge a first data channel between the emergency management system and the communication device with a second data channel between the emergency management system and the emergency dispatch center. In some embodiments, communications between the communication device and the second device are relayed to the EMS after the communication module sends the request for assistance. In some embodiments, the recipient is an emergency dispatch center. In some embodiments, the recipient is a first responder. In some embodiments, the recipient is a private security service. In some embodiments, the recipient is a third party not associated with an emergency service. In some embodiments, data for the second device is obtained from the second device. In some embodiments, data for the second device is obtained from a database external to second device. In some embodiments, data for the second device is stored on a cache database. In some embodiments, data for the second device is selected from the group consisting of: location data, health data, user data, sensor data, and any combination thereof. In further embodiments, the location data comprises a location of the second device determined using a method selected from the group consisting of: GPS satellite triangulation, cell tower triangulation, Wi-Fi triangulation, Bluetooth triangulation, and any combination thereof. In yet further embodiments, the location of the second device comprises coordinates having an accuracy of within 10 meters. In further embodiments, the health data comprises historical health data of a user of the second device selected from the group consisting of: age, weight, height, allergies, blood type, medical history, and any combination thereof. In further embodiments, the sensor data is provided by one or more sensors of the second device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In some embodiments, the communication device autonomously obtains data from the second device without requesting data. In some embodiments, the communication device periodically obtains data from the second device. In some embodiments, the communication device obtains data from the second device upon receiving user input requesting the data from the second device. In some embodiments, the data intake module comprises data intake settings configurable by a user. In some embodiments, the data set comprises current data. In some embodiments, the communications device comprises an alert module providing an alert to a user of the communication device after determining an emergency situation relating to the second device. In further embodiments, the alert module autonomously determines an emergency situation for the second device. In some embodiments, the communication device obtains authorization from the second device to access the data set associated with the second device. In some embodiments, the second device provides authorization to share the data set associated with the recipient. In some embodiments, the communication device comprises an interactive display showing a map, wherein the map displays a location of the communication device, location of the second device, or any combination thereof. In some embodiments, the communication device comprises a unique calling number assigned to it. In some embodiments, the communication device is a mobile communication device. In some embodiments, the communication device does not have a unique calling number assigned to it. In some embodiments, the second device is a mobile communication device. In some embodiments, the second device does not have a unique calling number assigned to it. In some embodiments, the communication device has a geographic location that is distinct from a geographic location of the second device. In some embodiments, the second device is not configured to be worn or carried by a user. In some embodiments, the second device is a wearable device comprising one or more sensors. In some embodiments, the second device is a home monitoring device. In some embodiments, the second device is a vehicle monitoring device. In some embodiments, the communication device and the second device both belong to a group of devices, wherein member devices in the group of devices are authorized to share data with each other. In some embodiments, the second device is authorized to share data with a recipient when a request for assistance is made on behalf of the second device or its user. In some embodiments, the communications device communicates with a recipient through an emergency communication session comprising: (a) a first data channel with an emergency service; and (b) a second data channel with a communication device of a first responder assigned to the emergency, wherein the second data channel is a direct data channel that allows the communication device to share the data set with the communication device of the first responder to share data without routing the data set through the emergency service. In some embodiments, the communications device communicates with a recipient through an emergency communication session comprising: (a) a first data channel with an emergency management system; and (b) a second data channel between the emergency service and the communication device of the first responder, wherein the emergency communication module bridges the first data channel with the second data channel to allow the user communication device to share the data set with the communication device of the first responder by routing the data set through the emergency service.

In another aspect, disclosed herein are methods for proxy emergency communications by a communication device, the methods comprising: (a) receiving, by the communication device, an indication to send a request for assistance associated with a second device to a recipient; (b) communicating, by the communication device, with the recipient after the indication to send a request for assistance is received by: (i) determining the communication device is authorized to send the request for assistance on behalf of the second device to the recipient; (ii) sending the request associated with the second device to the recipient; and (iii) providing a data set associated with the second device to the recipient. In some embodiments, the request for assistance is on behalf of a user of the member device. In some embodiments, the data set associated with the second device is provided to the recipient by updating a database accessed by the recipient. In some embodiments, the data set associated with the second device is provided to the recipient by sending the data set directly to the recipient. In some embodiments, the data set associated with the second device is provided to the recipient by giving the recipient authorization to retrieve the data set from the member device. In some embodiments, the request to the recipient on behalf of the second device comprises the data set associated with the second device. In some embodiments, the data set associated with the second device is provided as a separate communication from the request on behalf of the second device. In some embodiments, the communication device and the second device do not share the same user. In some embodiments, the communication device and the second device share the same user. In some embodiments, the request is a request to establish a covert communication session for the second device. In some embodiments, the request is an emergency request for assistance. In some embodiments, the recipient is an emergency service. In some embodiments, the recipient is an emergency management system. In further embodiments, the method comprises identifying an emergency dispatch center responsible for the jurisdiction where the second device is located using the data set associated with the second device. In yet further embodiments, the communication device communicates with the emergency dispatch center by allowing the emergency management system to bridge a first data channel between the emergency management system and the communication device with a second data channel between the emergency management system and the emergency dispatch center. In some embodiments, communications between the communication device and the second device are relayed to the EMS after the communication module sends the request for assistance. In some embodiments, the recipient is an emergency dispatch center. In some embodiments, the recipient is a first responder. In some embodiments, the recipient is a private security service. In some embodiments, the recipient is a third party not associated with an emergency service. In some embodiments, data for the second device is obtained from the second device. In some embodiments, data for the second device is obtained from a database external to second device. In some embodiments, data for the second device is stored on a cache database. In some embodiments, data for the second device is selected from the group consisting of: location data, health data, user data, sensor data, and any combination thereof. In further embodiments, the location data comprises a location of the second device determined using a method selected from the group consisting of: GPS satellite triangulation, cell tower triangulation, Wi-Fi triangulation, Bluetooth triangulation, and any combination thereof. In yet further embodiments, the location of the second device comprises coordinates having an accuracy of within 10 meters. In further embodiments, the health data comprises historical health data of a user of the second device selected from the group consisting of: age, weight, height, allergies, blood type, medical history, and any combination thereof. In further embodiments, the sensor data is provided by one or more sensors of the second device. In further embodiments, the sensor data is provided by one or more sensors that are physically separate from the member device. In further embodiments, user data is selected from the group consisting of: identity, home address, work address, occupation, family information, user contact information, emergency contact information, and any combination thereof. In some embodiments, the communication device autonomously obtains data from the second device without requesting data. In some embodiments, the communication device periodically obtains data from the second device. In some embodiments, the communication device obtains data from the second device upon receiving user input requesting the data from the second device. In some embodiments, the communications device comprises data intake settings configurable by a user. In some embodiments, the data set comprises current data. In some embodiments, the communications device comprises an alert module providing an alert to a user of the communication device after determining an emergency situation relating to the second device. In further embodiments, the alert module autonomously determines an emergency situation for the second device. In some embodiments, the method comprises obtaining, by the communication device, authorization from the second device to access the data set associated with the second device. In some embodiments, the second device provides authorization to share the data set associated with the recipient. In some embodiments, the communication device comprises an interactive display showing a map, wherein the map displays a location of the communication device, location of the second device, or any combination thereof. In some embodiments, the communication device comprises a unique calling number assigned to it. In some embodiments, the communication device is a mobile communication device. In some embodiments, the communication device does not have a unique calling number assigned to it. In some embodiments, the second device is a mobile communication device. In some embodiments, the second device does not have a unique calling number assigned to it. In some embodiments, the communication device has a geographic location that is distinct from a geographic location of the second device. In some embodiments, the second device is not configured to be worn or carried by a user. In some embodiments, the second device is a wearable device comprising one or more sensors. In some embodiments, the second device is a home monitoring device. In some embodiments, the second device is a vehicle monitoring device. In some embodiments, the communication device and the second device both belong to a group of devices, wherein member devices in the group of devices are authorized to share data with each other. In some embodiments, the second device is authorized to share data with a recipient when a request for assistance is made on behalf of the second device or its user. In some embodiments, the method comprises communicating, by the communication device, with a recipient through an emergency communication session comprising: (a) a first data channel with an emergency service; and (b) a second data channel with a communication device of a first responder assigned to the emergency, wherein the second data channel is a direct data channel that allows the communication device to share the data set with the communication device of the first responder to share data without routing the data set through the emergency service. In some embodiments, the method comprises communicating, by the communication device, with a recipient through an emergency communication session comprising: (a) a first data channel with an emergency management system; and (b) a second data channel between the emergency service and the communication device of the first responder, wherein the emergency communication module bridges the first data channel with the second data channel to allow the communication device to share the data set with the communication device of the first responder by routing the data set through the emergency service.

In another aspect, disclosed herein are emergency management systems comprising at least one processor, a memory, a network element, and a computer program including instructions executable by the at least one processor to create server software application for managing emergency communications comprising: (a) a proxy detection module for processing a proxy request for assistance, wherein the proxy detection module: (i) receives a request for assistance from a communication device intended for a recipient, wherein the request is associated with a second device; (ii) determines that the communication device is authorized to make the request for assistance on behalf of the second device; and (iii) obtains a data set associated with the second device; and (b) an emergency communication module establishing a communication session, wherein the emergency communication module: (i) sends the request to the recipient; and (ii) provides the data set associated with the member device to the recipient. In some embodiments, the request for assistance is on behalf of a user of the member device. In some embodiments, the emergency communication module provides the data set associated with the second device to the recipient by updating a database accessed by the recipient. In some embodiments, the emergency communication module provides the data set associated with the second device to the recipient by sending the data set directly to the recipient. In some embodiments, the proxy detection module obtains authorization to obtain the data set. In some embodiments, the proxy detection module obtains the data set associated with the second device from the communication device. In some embodiments, the proxy detection module obtains the data set associated with the second device from the second device. In some embodiments, the request for assistance comprises the data set associated with the second device. In some embodiments, the data set associated with the second device is provided as a separate communication from the request for assistance. In some embodiments, the communication device and the second device do not share the same user. In some embodiments, the communication device and the second device share the same user. In some embodiments, the request is a request to establish a covert communication session for the second device. In some embodiments, the request is an emergency request for assistance. In some embodiments, the recipient is an emergency service. In some embodiments, the recipient is an emergency dispatch system. In further embodiments, the emergency communication module uses the data set associated with the second device to select an emergency dispatch center suitable for handling the emergency request. In yet further embodiments, the communication session comprises: (a) a first data channel between the EMS and the communication device; and (b) a second data channel between the EMS and the EDC, wherein the emergency communication module bridges the first and second data channels to enable communications between the communication device and the EDC. In yet further embodiments, the communication session comprises: (a) a first data channel between the EMS and the second device; and (b) a second data channel between the EMS and the EDC, wherein the emergency communication module bridges the first and second data channels to enable communications between the second device and the EDC. In yet further embodiments, the communication session comprises: (a) a first data channel between the EMS and the communication device; (b) a second data channel between the EMS and the second device; and (c) a third data channel between the EMS and the EDC, wherein the emergency communication module bridges the first and second data channels with the third data channel to enable communications between the communication device, the second device, and the EDC. In some embodiments, the EMS obtains communications between the communication device and the second device after the communication module receives the request for assistance. In some embodiments, the recipient is a first responder. In some embodiments, the recipient is a private security service. In some embodiments, the recipient is a third party not associated with an emergency service. In some embodiments, the system comprises a cache database storing the data set associated with the second device. In some embodiments, the system comprises a database storing communications between the communication device, the second device, and the recipient. In some embodiments, the data set comprises data for the second device that is selected from the group consisting of: location data, health data, user data, sensor data, and any combination thereof. In further embodiments, the location data comprises a location of the second device determined using a method selected from the group consisting of: GPS satellite triangulation, cell tower triangulation, Wi-Fi triangulation, Bluetooth triangulation, and any combination thereof. In yet further embodiments, the location of the second device comprises coordinates having an accuracy of within 10 meters. In further embodiments, the health data comprises historical health data of a user of the second device selected from the group consisting of: age, weight, height, allergies, blood type, medical history, and any combination thereof. In further embodiments, the sensor data is provided by one or more sensors of the second device. In further embodiments, the sensor data is provided by one or more sensors that are physically separate from the second device. In further embodiments, user data is selected from the group consisting of: identity, home address, work address, occupation, family information, user contact information, emergency contact information, and any combination thereof. In some embodiments, the proxy detection module autonomously obtains data from the second device after receiving the request for assistance. In some embodiments, the proxy detection module periodically obtains data from the second device after receiving the request for assistance. In some embodiments, the proxy detection module requests an update to the data set associated with the second device. In some embodiments, the data set comprises current data. In some embodiments, data shared between the communication device and the second device is routed through the EMS. In some embodiments, the communication device comprises a unique calling number assigned to it. In some embodiments, the communication device is a mobile communication device. In some embodiments, the communication device does not have a unique calling number assigned to it. In some embodiments, the second device is a mobile communication device. In some embodiments, the second device does not have a unique calling number assigned to it. In some embodiments, the communication device has a geographic location that is distinct from a geographic location of the second device. In some embodiments, the second device is not configured to be worn or carried by a user. In some embodiments, the second device is a wearable device comprising one or more sensors. In some embodiments, the second device is a home monitoring device. In some embodiments, the second device is a vehicle monitoring device. In some embodiments, the communication session comprises: (a) a first data channel with the user communication device; (b) a second data channel with a communication device of a first responder assigned to the emergency; and (c) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the communication session comprises: (a) a first data channel with the user communication device; and (b) a second data channel with a communication device of a first responder assigned to the emergency, wherein the emergency communication module bridges the first data channel with the second data channel to allow the user communication device and the communication device of the first responder to share data with each other by routing the data through the emergency management system.

In another aspect, disclosed herein are non-transitory computer-readable storage media encoded with a computer program including instructions executable by a process to create a server software application for managing emergency communications comprising: (a) a proxy detection module for processing a proxy request for assistance, wherein the proxy detection module: (i) receives a request for assistance from a communication device intended for a recipient, wherein the request is associated with a second device; (ii) determines that the communication device is authorized to make the request for assistance on behalf of the second device; and (iii) obtains a data set associated with the second device; and (b) an emergency communication module establishing a communication session, wherein the emergency communication module: (i) sends the request to the recipient; and (ii) provides the data set associated with the member device to the recipient. In some embodiments, the request for assistance is on behalf of a user of the member device. In some embodiments, the emergency communication module provides the data set associated with the second device to the recipient by updating a database accessed by the recipient. In some embodiments, the emergency communication module provides the data set associated with the second device to the recipient by sending the data set directly to the recipient. In some embodiments, the proxy detection module obtains authorization to obtain the data set. In some embodiments, the proxy detection module obtains the data set associated with the second device from the communication device. In some embodiments, the proxy detection module obtains the data set associated with the second device from the second device. In some embodiments, the request for assistance comprises the data set associated with the second device. In some embodiments, the data set associated with the second device is provided as a separate communication from the request for assistance. In some embodiments, the communication device and the second device do not share the same user. In some embodiments, the communication device and the second device share the same user. In some embodiments, the request is a request to establish a covert communication session for the second device. In some embodiments, the request is an emergency request for assistance. In some embodiments, the recipient is an emergency service. In some embodiments, the recipient is an emergency dispatch system. In further embodiments, the emergency communication module uses the data set associated with the second device to select an emergency dispatch center suitable for handling the emergency request. In yet further embodiments, the communication session comprises: (a) a first data channel between the EMS and the communication device; and (b) a second data channel between the EMS and the EDC, wherein the emergency communication module bridges the first and second data channels to enable communications between the communication device and the EDC. In yet further embodiments, the communication session comprises: (a) a first data channel between the EMS and the second device; and (b) a second data channel between the EMS and the EDC, wherein the emergency communication module bridges the first and second data channels to enable communications between the second device and the EDC. In yet further embodiments, the communication session comprises: (a) a first data channel between the EMS and the communication device; (b) a second data channel between the EMS and the second device; and (c) a third data channel between the EMS and the EDC, wherein the emergency communication module bridges the first and second data channels with the third data channel to enable communications between the communication device, the second device, and the EDC. In some embodiments, the EMS obtains communications between the communication device and the second device after the communication module receives the request for assistance. In some embodiments, the recipient is a first responder. In some embodiments, the recipient is a private security service. In some embodiments, the recipient is a third party not associated with an emergency service. In some embodiments, the media comprises a cache database storing the data set associated with the second device. In some embodiments, the media comprises a database storing communications between the communication device, the second device, and the recipient. In some embodiments, the data set comprises data for the second device that is selected from the group consisting of: location data, health data, user data, sensor data, and any combination thereof. In further embodiments, the location data comprises a location of the second device determined using a method selected from the group consisting of: GPS satellite triangulation, cell tower triangulation, Wi-Fi triangulation, Bluetooth triangulation, and any combination thereof. In yet further embodiments, the location of the second device comprises coordinates having an accuracy of within 10 meters. In further embodiments, the health data comprises historical health data of a user of the second device selected from the group consisting of: age, weight, height, allergies, blood type, medical history, and any combination thereof. In further embodiments, the sensor data is provided by one or more sensors of the second device. In further embodiments, the sensor data is provided by one or more sensors that are physically separate from the second device. In further embodiments, user data is selected from the group consisting of: identity, home address, work address, occupation, family information, user contact information, emergency contact information, and any combination thereof. In some embodiments, the proxy detection module autonomously obtains data from the second device after receiving the request for assistance. In some embodiments, the proxy detection module periodically obtains data from the second device after receiving the request for assistance. In some embodiments, the proxy detection module requests an update to the data set associated with the second device. In some embodiments, the data set comprises current data. In some embodiments, data shared between the communication device and the second device is routed through the EMS. In some embodiments, the communication device comprises a unique calling number assigned to it. In some embodiments, the communication device is a mobile communication device. In some embodiments, the communication device does not have a unique calling number assigned to it. In some embodiments, the second device is a mobile communication device. In some embodiments, the second device does not have a unique calling number assigned to it. In some embodiments, the communication device has a geographic location that is distinct from a geographic location of the second device. In some embodiments, the second device is not configured to be worn or carried by a user. In some embodiments, the second device is a wearable device comprising one or more sensors. In some embodiments, the second device is a home monitoring device. In some embodiments, the second device is a vehicle monitoring device. In some embodiments, the communication session comprises: (a) a first data channel with the user communication device; (b) a second data channel with a communication device of a first responder assigned to the emergency; and (c) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the communication session comprises: (a) a first data channel with the user communication device; and (b) a second data channel with a communication device of a first responder assigned to the emergency, wherein the emergency communication module bridges the first data channel with the second data channel to allow the user communication device and the communication device of the first responder to share data with each other by routing the data through the emergency management system.

In another aspect, disclosed herein are methods for managing emergency communications by an emergency management system, the method comprising: processing, by the EMS, a proxy request for assistance by: (i) receiving a request for assistance from a communication device intended for a recipient, wherein the request is associated with a second device; (ii) determining that the communication device is authorized to make the request for assistance on behalf of the second device; and (iii) obtaining a data set associated with the second device; and (b) establishing, by the EMS, a communication session by: (i) sending the request to the recipient; and (ii) providing the data set associated with the member device to the recipient. In some embodiments, the request for assistance is on behalf of a user of the member device. In some embodiments, the method comprises providing, by the EMS, the data set associated with the second device to the recipient by updating a database accessed by the recipient. In some embodiments, the method comprises providing, by the EMS, the data set associated with the second device to the recipient by sending the data set directly to the recipient. In some embodiments, the method comprises obtaining, by the EMS, authorization to obtain the data set. In some embodiments, the EMS obtains the data set associated with the second device from the communication device. In some embodiments, the EMS obtains the data set associated with the second device from the second device. In some embodiments, the request for assistance comprises the data set associated with the second device. In some embodiments, the data set associated with the second device is provided as a separate communication from the request for assistance. In some embodiments, the communication device and the second device do not share the same user. In some embodiments, the communication device and the second device share the same user. In some embodiments, the request is a request to establish a covert communication session for the second device. In some embodiments, the request is an emergency request for assistance. In some embodiments, the recipient is an emergency service. In some embodiments, the recipient is an emergency dispatch system. In further embodiments, the method comprises using, by the EMS, the data set associated with the second device to select an emergency dispatch center suitable for handling the emergency request. In yet further embodiments, the communication session comprises: (a) a first data channel between the EMS and the communication device; and (b) a second data channel between the EMS and the EDC, wherein the emergency communication module bridges the first and second data channels to enable communications between the communication device and the EDC. In yet further embodiments, the communication session comprises: (a) a first data channel between the EMS and the second device; and (b) a second data channel between the EMS and the EDC, wherein the emergency communication module bridges the first and second data channels to enable communications between the second device and the EDC. In yet further embodiments, the communication session comprises: (a) a first data channel between the EMS and the communication device; (b) a second data channel between the EMS and the second device; and (c) a third data channel between the EMS and the EDC, wherein the emergency communication module bridges the first and second data channels with the third data channel to enable communications between the communication device, the second device, and the EDC. In some embodiments, the method comprises obtaining, by the EMS, communications between the communication device and the second device after the communication module receives the request for assistance. In some embodiments, the recipient is a first responder. In some embodiments, the recipient is a private security service. In some embodiments, the recipient is a third party not associated with an emergency service. In some embodiments, the EMS comprises a cache database storing the data set associated with the second device. In some embodiments, the EMS comprises a database storing communications between the communication device, the second device, and the recipient. In some embodiments, the data set comprises data for the second device that is selected from the group consisting of: location data, health data, user data, sensor data, and any combination thereof. In further embodiments, the location data comprises a location of the second device determined using a method selected from the group consisting of: GPS satellite triangulation, cell tower triangulation, Wi-Fi triangulation, Bluetooth triangulation, and any combination thereof. In yet further embodiments, the location of the second device comprises coordinates having an accuracy of within 10 meters. In further embodiments, the health data comprises historical health data of a user of the second device selected from the group consisting of: age, weight, height, allergies, blood type, medical history, and any combination thereof. In further embodiments, the sensor data is provided by one or more sensors of the second device. In further embodiments, the sensor data is provided by one or more sensors that are physically separate from the second device. In further embodiments, user data is selected from the group consisting of: identity, home address, work address, occupation, family information, user contact information, emergency contact information, and any combination thereof. In some embodiments, the proxy detection module autonomously obtains data from the second device after receiving the request for assistance. In some embodiments, the method comprises periodically obtaining, by the EMS, data from the second device after receiving the request for assistance. In some embodiments, the EMS requests an update to the data set associated with the second device. In some embodiments, the data set comprises current data. In some embodiments, data shared between the communication device and the second device is routed through the EMS. In some embodiments, the communication device comprises a unique calling number assigned to it. In some embodiments, the communication device is a mobile communication device. In some embodiments, the communication device does not have a unique calling number assigned to it. In some embodiments, the second device is a mobile communication device. In some embodiments, the second device does not have a unique calling number assigned to it. In some embodiments, the communication device has a geographic location that is distinct from a geographic location of the second device. In some embodiments, the second device is not configured to be worn or carried by a user. In some embodiments, the second device is a wearable device comprising one or more sensors. In some embodiments, the second device is a home monitoring device. In some embodiments, the second device is a vehicle monitoring device. In some embodiments, the communication session comprises: (a) a first data channel with the user communication device; (b) a second data channel with a communication device of a first responder assigned to the emergency; and (c) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the communication session comprises: (a) a first data channel with the user communication device; and (b) a second data channel with a communication device of a first responder assigned to the emergency, wherein the emergency communication module bridges the first data channel with the second data channel to allow the user communication device and the communication device of the first responder to share data with each other by routing the data through the emergency management system.

In another aspect, disclosed herein are communication devices comprising at least one processor, a memory, a network element, and a computer program including instructions executable by the at least one processor to create an emergency alert application comprising: (a) a data module providing a data set comprising current data associated with a user of the communication device; (b) an emergency communication module communicating through an emergency communication session comprising: (i) a first data channel with an emergency service; and (ii) a second data channel with a communication device of a first responder assigned to the emergency, wherein the second data channel is a direct data channel that allows the communication device to share the data set with the communication device of the first responder to share data without routing the data set through the emergency service. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the data module updates the data set with current data for the communication device. In further embodiments, the data module continuously updates the data set with current data for the communication device. In further embodiments, the data module periodically updates the data set with current data for the communication device. In further embodiments, the data module updates the data set after the emergency detection module detects the emergency situation. In further embodiments, the data module updates the data set with current data from one or more devices associated with the communication device. In yet further embodiments, the one or more devices associated with the communication device are physically separated from the communication device. In further embodiments, the data set comprises current data that is relevant to the emergency situation. In some embodiments, the data set shared by the communication device is screened by the emergency service before being routed to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, health data comprises historical health data of a user of the communication device selected from the group consisting of: age, weight, height, allergies, blood type, medical history, and any combination thereof. In further embodiments, sensor data is provided by one or more sensors of the communication device. In further embodiments, sensor data is provided by one or more sensors that are physically separate from the communication device. In further embodiments, user data is selected from the group consisting of: identity, home address, work address, occupation, family information, user contact information, emergency contact information, and any combination thereof. In some embodiments, the communications device comprises a data settings module comprising data sharing settings configurable by a user. In some embodiments, the data set comprises current data. In some embodiments, the communication device provides authorization to share data with the communication device of the first responder. In some embodiments, the communication device provides an authorization prompt to a user of the communication device requesting authorization to share data, wherein the device shares the data set with the communication device of the first responder upon receiving a user response authorizing data sharing. In some embodiments, the emergency service is an emergency management system. In further embodiments, the emergency management system is preauthorized to provide data associated with the communication device to the communication device of the first responder. In some embodiments, the device is preauthorized to share data with the communication device of the first responder. In some embodiments, the communication device comprises an interactive display showing a map, wherein the map displays a location of the communication device, a location of the communication device of the first responder, or any combination thereof. In further embodiments, the communication device requests location data from the member device when the map is opened. In some embodiments, the device sends a status update to the communication device of the first responder. In further embodiments, the status update comprises an indication that the user is okay. In further embodiments, the status update comprises an updated data set associated with the user of the communication device. In some embodiments, the user communication device receives a warning sent by the communication device associated with the first responder. In further embodiments, the user communication device is sent the warning when the communication device of the first responder determines that the user communication device is qualified to receive the signal. In further embodiments, the user communication device receives an updated warning sent by the communication device of the first responder. In further embodiments, the user communication device is cut off from receiving one or more updated warnings when the communication device of the first responder determines that the user communication device is no longer qualified to receive the signal. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are non-transitory computer-readable storage media encoded with instructions executable by a processor to create an emergency alert application comprising: (a) a data module providing a data set comprising current data associated with a user of the communication device; (b) an emergency communication module communicating through an emergency communication session comprising: (i) a first data channel with an emergency service; and (ii) a second data channel with a communication device of a first responder assigned to the emergency, wherein the second data channel is a direct data channel that allows the communication device to share the data set with the communication device of the first responder to share data without routing the data set through the emergency service. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the data module updates the data set with current data for the communication device. In further embodiments, the data module continuously updates the data set with current data for the communication device. In further embodiments, the data module periodically updates the data set with current data for the communication device. In further embodiments, the data module updates the data set after the emergency detection module detects the emergency situation. In further embodiments, the data module updates the data set with current data from one or more devices associated with the communication device. In yet further embodiments, the one or more devices associated with the communication device are physically separated from the communication device. In further embodiments, the data set comprises current data that is relevant to the emergency situation. In some embodiments, the data set shared by the communication device is screened by the emergency service before being routed to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, health data comprises historical health data of a user of the communication device selected from the group consisting of: age, weight, height, allergies, blood type, medical history, and any combination thereof. In further embodiments, sensor data is provided by one or more sensors of the communication device. In further embodiments, sensor data is provided by one or more sensors that are physically separate from the communication device. In further embodiments, user data is selected from the group consisting of: identity, home address, work address, occupation, family information, user contact information, emergency contact information, and any combination thereof. In some embodiments, the communications device comprises a data settings module comprising data sharing settings configurable by a user. In some embodiments, the data set comprises current data. In some embodiments, the communication device provides authorization to share data with the communication device of the first responder. In some embodiments, the communication device provides an authorization prompt to a user of the communication device requesting authorization to share data, wherein the device shares the data set with the communication device of the first responder upon receiving a user response authorizing data sharing. In some embodiments, the emergency service is an emergency management system. In further embodiments, the emergency management system is preauthorized to provide data associated with the communication device to the communication device of the first responder. In some embodiments, the device is preauthorized to share data with the communication device of the first responder. In some embodiments, the communication device comprises an interactive display showing a map, wherein the map displays a location of the communication device, a location of the communication device of the first responder, or any combination thereof. In further embodiments, the communication device requests location data from the member device when the map is opened. In some embodiments, the device sends a status update to the communication device of the first responder. In further embodiments, the status update comprises an indication that the user is okay. In further embodiments, the status update comprises an updated data set associated with the user of the communication device. In some embodiments, the user communication device receives a warning sent by the communication device associated with the first responder. In further embodiments, the user communication device is sent the warning when the communication device of the first responder determines that the user communication device is qualified to receive the signal. In further embodiments, the user communication device receives an updated warning sent by the communication device of the first responder. In further embodiments, the user communication device is cut off from receiving one or more updated warnings when the communication device of the first responder determines that the user communication device is no longer qualified to receive the signal. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are methods for a communication device to share data with a communication device of a first responder during an emergency communication session, the methods comprising: (a) providing, by the communication device, a data set comprising current data associated with a user of the communication device; (b) communicating, by the communication device, through an emergency communication session comprising: (i) a first data channel with an emergency service; and (ii) a second data channel with a communication device of a first responder assigned to the emergency, wherein the second data channel is a direct data channel that allows the communication device to share the data set with the communication device of the first responder to share data without routing the data set through the emergency service. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the method comprises updating, by the communication device, the data set with current data for the communication device. In further embodiments, data set is updated continuously with current data for the communication device. In further embodiments, data set is updated periodically updates with current data for the communication device. In further embodiments, the data set is updated after the emergency detection module detects the emergency situation. In further embodiments, the data set is updated with current data from one or more devices associated with the communication device. In yet further embodiments, the one or more devices associated with the communication device are physically separated from the communication device. In further embodiments, the data set comprises current data that is relevant to the emergency situation. In some embodiments, the data set shared by the communication device is screened by the emergency service before being routed to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, health data comprises historical health data of a user of the communication device selected from the group consisting of: age, weight, height, allergies, blood type, medical history, and any combination thereof. In further embodiments, sensor data is provided by one or more sensors of the communication device. In further embodiments, sensor data is provided by one or more sensors that are physically separate from the communication device. In further embodiments, user data is selected from the group consisting of: identity, home address, work address, occupation, family information, user contact information, emergency contact information, and any combination thereof. In some embodiments, the communications device comprises a data settings module comprising data sharing settings configurable by a user. In some embodiments, the data set comprises current data. In some embodiments, the method comprises providing, by the communication device, authorization to share data with the communication device of the first responder. In some embodiments, the communication device provides an authorization prompt to a user of the communication device requesting authorization to share data, wherein the device shares the data set with the communication device of the first responder upon receiving a user response authorizing data sharing. In some embodiments, the emergency service is an emergency management system. In further embodiments, the emergency management system is preauthorized to provide data associated with the communication device to the communication device of the first responder. In some embodiments, the device is preauthorized to share data with the communication device of the first responder. In some embodiments, the communication device comprises an interactive display showing a map, wherein the map displays a location of the communication device, a location of the communication device of the first responder, or any combination thereof. In further embodiments, the method comprises requesting, by the communication device, location data from the communication device of the first responder when the map is opened. In some embodiments, the method comprises sending, by the communication device, a status update to the communication device of the first responder. In further embodiments, the status update comprises an indication that the user is okay. In further embodiments, the status update comprises an updated data set associated with the user of the communication device. In some embodiments, the user communication device receives a warning sent by the communication device associated with the first responder. In further embodiments, the user communication device is sent the warning when the communication device of the first responder determines that the user communication device is qualified to receive the signal. In further embodiments, the method comprises receiving, by the communication device, an updated warning sent by the communication device of the first responder. In further embodiments, the user communication device is cut off from receiving one or more updated warnings when the communication device of the first responder determines that the user communication device is no longer qualified to receive the signal. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are communication devices comprising at least one processor, a memory, a network element, and a computer program including instructions executable by the at least one processor to create an emergency alert application comprising: (a) a data module providing a data set comprising current data associated with a user of the communication device; (b) an emergency communication module communicating through an emergency communication session comprising: (b) a first data channel with an emergency service; and (b) a second data channel between the emergency service and the communication device of the first responder, wherein the emergency communication module bridges the first data channel with the second data channel to allow the user communication device to share the data set with the communication device of the first responder by routing the data set through the emergency service. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the data module updates the data set with current data for the communication device. In further embodiments, the data module continuously updates the data set with current data for the communication device. In further embodiments, the data module periodically updates the data set with current data for the communication device. In further embodiments, the data module updates the data set after the emergency detection module detects the emergency situation. In further embodiments, the data module updates the data set with current data from one or more devices associated with the communication device. In yet further embodiments, the one or more devices associated with the communication device are physically separated from the communication device. In further embodiments, the data set comprises current data that is relevant to the emergency situation. In some embodiments, the data set shared by the communication device is screened by the emergency service before being routed to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, health data comprises historical health data of a user of the communication device selected from the group consisting of: age, weight, height, allergies, blood type, medical history, and any combination thereof. In further embodiments, sensor data is provided by one or more sensors of the communication device. In further embodiments, sensor data is provided by one or more sensors that are physically separate from the communication device. In further embodiments, user data is selected from the group consisting of: identity, home address, work address, occupation, family information, user contact information, emergency contact information, and any combination thereof. In some embodiments, the communications device comprises a data settings module comprising data sharing settings configurable by a user. In some embodiments, the data set comprises current data. In some embodiments, the communication device provides authorization to share data with the communication device of the first responder. In some embodiments, the communication device provides an authorization prompt to a user of the communication device requesting authorization to share data, wherein the device shares the data set with the communication device of the first responder upon receiving a user response authorizing data sharing. In some embodiments, the emergency service is an emergency management system. In further embodiments, the emergency management system is preauthorized to provide data associated with the communication device to the communication device of the first responder. In some embodiments, the device is preauthorized to share data with the communication device of the first responder. In some embodiments, the communication device comprises an interactive display showing a map, wherein the map displays a location of the communication device, a location of the communication device of the first responder, or any combination thereof. In further embodiments, the communication device requests location data from the member device when the map is opened. In some embodiments, the device sends a status update to the communication device of the first responder. In further embodiments, the status update comprises an indication that the user is okay. In further embodiments, the status update comprises an updated data set associated with the user of the communication device. In some embodiments, the user communication device receives a warning sent by the communication device associated with the first responder. In further embodiments, the user communication device is sent the warning when the communication device of the first responder determines that the user communication device is qualified to receive the signal. In further embodiments, the user communication device receives an updated warning sent by the communication device of the first responder. In further embodiments, the user communication device is cut off from receiving one or more updated warnings when the communication device of the first responder determines that the user communication device is no longer qualified to receive the signal. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are non-transitory computer-readable storage media encoded with instructions executable by a processor to create an emergency alert application comprising: (a) a data module providing a data set comprising current data associated with a user of the communication device; (b) an emergency communication module communicating through an emergency communication session comprising: (b) a first data channel with an emergency service; and (b) a second data channel between the emergency service and the communication device of the first responder, wherein the emergency communication module bridges the first data channel with the second data channel to allow the user communication device to share the data set with the communication device of the first responder by routing the data set through the emergency service. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the data module updates the data set with current data for the communication device. In further embodiments, the data module continuously updates the data set with current data for the communication device. In further embodiments, the data module periodically updates the data set with current data for the communication device. In further embodiments, the data module updates the data set after the emergency detection module detects the emergency situation. In further embodiments, the data module updates the data set with current data from one or more devices associated with the communication device. In yet further embodiments, the one or more devices associated with the communication device are physically separated from the communication device. In further embodiments, the data set comprises current data that is relevant to the emergency situation. In some embodiments, the data set shared by the communication device is screened by the emergency service before being routed to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, health data comprises historical health data of a user of the communication device selected from the group consisting of: age, weight, height, allergies, blood type, medical history, and any combination thereof. In further embodiments, sensor data is provided by one or more sensors of the communication device. In further embodiments, sensor data is provided by one or more sensors that are physically separate from the communication device. In further embodiments, user data is selected from the group consisting of: identity, home address, work address, occupation, family information, user contact information, emergency contact information, and any combination thereof. In some embodiments, the communications device comprises a data settings module comprising data sharing settings configurable by a user. In some embodiments, the data set comprises current data. In some embodiments, the communication device provides authorization to share data with the communication device of the first responder. In some embodiments, the communication device provides an authorization prompt to a user of the communication device requesting authorization to share data, wherein the device shares the data set with the communication device of the first responder upon receiving a user response authorizing data sharing. In some embodiments, the emergency service is an emergency management system. In further embodiments, the emergency management system is preauthorized to provide data associated with the communication device to the communication device of the first responder. In some embodiments, the device is preauthorized to share data with the communication device of the first responder. In some embodiments, the communication device comprises an interactive display showing a map, wherein the map displays a location of the communication device, a location of the communication device of the first responder, or any combination thereof. In further embodiments, the communication device requests location data from the member device when the map is opened. In some embodiments, the device sends a status update to the communication device of the first responder. In further embodiments, the status update comprises an indication that the user is okay. In further embodiments, the status update comprises an updated data set associated with the user of the communication device. In some embodiments, the user communication device receives a warning sent by the communication device associated with the first responder. In further embodiments, the user communication device is sent the warning when the communication device of the first responder determines that the user communication device is qualified to receive the signal. In further embodiments, the user communication device receives an updated warning sent by the communication device of the first responder. In further embodiments, the user communication device is cut off from receiving one or more updated warnings when the communication device of the first responder determines that the user communication device is no longer qualified to receive the signal. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are methods for a communication device to share data with a communication device of a first responder during an emergency communication session, the method comprising: (a) providing, by the communication device, a data set comprising current data associated with a user of the communication device; (b) communicating, by the communication device, through an emergency communication session comprising: (i) a first data channel with an emergency service; and (ii) a second data channel between the emergency service and the communication device of the first responder, wherein the emergency communication module bridges the first data channel with the second data channel to allow the user communication device to share the data set with the communication device of the first responder by routing the data set through the emergency service. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the method comprises updating, by the communication device, the data set with current data for the communication device. In further embodiments, data set is updated continuously with current data for the communication device. In further embodiments, data set is updated periodically updates with current data for the communication device. In further embodiments, the data set is updated after the emergency detection module detects the emergency situation. In further embodiments, the data set is updated with current data from one or more devices associated with the communication device. In yet further embodiments, the one or more devices associated with the communication device are physically separated from the communication device. In further embodiments, the data set comprises current data that is relevant to the emergency situation. In some embodiments, the data set shared by the communication device is screened by the emergency service before being routed to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, health data comprises historical health data of a user of the communication device selected from the group consisting of: age, weight, height, allergies, blood type, medical history, and any combination thereof. In further embodiments, sensor data is provided by one or more sensors of the communication device. In further embodiments, sensor data is provided by one or more sensors that are physically separate from the communication device. In further embodiments, user data is selected from the group consisting of: identity, home address, work address, occupation, family information, user contact information, emergency contact information, and any combination thereof. In some embodiments, the communications device comprises a data settings module comprising data sharing settings configurable by a user. In some embodiments, the data set comprises current data. In some embodiments, the method comprises providing, by the communication device, authorization to share data with the communication device of the first responder. In some embodiments, the communication device provides an authorization prompt to a user of the communication device requesting authorization to share data, wherein the device shares the data set with the communication device of the first responder upon receiving a user response authorizing data sharing. In some embodiments, the emergency service is an emergency management system. In further embodiments, the emergency management system is preauthorized to provide data associated with the communication device to the communication device of the first responder. In some embodiments, the device is preauthorized to share data with the communication device of the first responder. In some embodiments, the communication device comprises an interactive display showing a map, wherein the map displays a location of the communication device, a location of the communication device of the first responder, or any combination thereof. In further embodiments, the method comprises requesting, by the communication device, location data from the communication device of the first responder when the map is opened. In some embodiments, the method comprises sending, by the communication device, a status update to the communication device of the first responder. In further embodiments, the status update comprises an indication that the user is okay. In further embodiments, the status update comprises an updated data set associated with the user of the communication device. In some embodiments, the user communication device receives a warning sent by the communication device associated with the first responder. In further embodiments, the user communication device is sent the warning when the communication device of the first responder determines that the user communication device is qualified to receive the signal. In further embodiments, the method comprises receiving, by the communication device, an updated warning sent by the communication device of the first responder. In further embodiments, the user communication device is cut off from receiving one or more updated warnings when the communication device of the first responder determines that the user communication device is no longer qualified to receive the signal. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are emergency management systems comprising at least one processor, a memory, a network element, and a computer program including instructions executable by the at least one processor to create server software application for managing emergency communications comprising: (a) an emergency management module managing an emergency communication session by, upon receiving a request for assistance associated with a user communication device, locating a communication device of a first responder assigned to the emergency; and (b) an emergency communication module establishing an emergency communication session upon receiving the request for assistance associated with the user communication device, the communication session comprising: (i) a first data channel with the user communication device; (ii) a second data channel with the communication device of the first responder assigned to the emergency; and (iii) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the emergency communication session comprises one or more additional data channels with one or more additional devices, wherein the emergency management system bridges the data channel between the EMS and the communication device of the first responder with the one or more data channels to allow the one or more additional devices to share data with the communication device of the first responder. In some embodiments, the one or more additional devices are selected from the group consisting of: a sensor, a communication device, a camera, a smart device, a smart phone, a tablet, a computer, a laptop, a mobile device, and a wearable device. In some embodiments, the one or more additional devices are associated with the user communication device. In some embodiments, the one or more additional devices comprise data that is relevant to the request for assistance. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the emergency management system routes a warning sent by the communication device associated with the first responder to the user communication device. In further embodiments, the warning is sent when the communication device of the first responder determines that the user communication device is qualified to receive the signal. In further embodiments, the emergency management system routes an updated warning sent by the communication device of the first responder to the user communication device. In further embodiments, the user communication device is cut off from receiving one or more updated warnings when the communication device of the first responder determines that the user communication device is no longer qualified to receive the signal. In some embodiments, the emergency management system screens the data shared by the communication device before routing the data to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, the location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, the health data comprises historical health data of a user of the communication device selected from the group consisting of: age, weight, height, allergies, blood type, medical history, and any combination thereof. In further embodiments, the sensor data is provided by one or more sensors of the communication device. In further embodiments, the sensor data is provided by one or more sensors that are physically separate from the communication device. In further embodiments, the user data is selected from the group consisting of: identity, home address, work address, occupation, family information, user contact information, emergency contact information, and any combination thereof. In some embodiments, the data set comprises current data. In some embodiments, the emergency management system sends an authorization request to the communication device for sharing data with the first responder. In some embodiments, the emergency management system is preauthorized to route data associated with the communication device to the communication device of the first responder. In some embodiments, the device is preauthorized to share data with the communication device of the first responder. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are non-transitory computer-readable storage media encoded with a computer program including instructions executable by a processor to create a server software application for managing emergency communications comprising: (a) an emergency management module managing an emergency communication session by, upon receiving a request for assistance associated with a user communication device, locating a communication device of a first responder assigned to the emergency; and (b) an emergency communication module establishing an emergency communication session upon receiving the request for assistance associated with the user communication device, the communication session comprising: (i) a first data channel with the user communication device; (ii) a second data channel with the communication device of the first responder assigned to the emergency; and (iii) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the emergency communication session comprises one or more additional data channels with one or more additional devices, wherein the emergency management system bridges the data channel between the EMS and the communication device of the first responder with the one or more data channels to allow the one or more additional devices to share data with the communication device of the first responder. In some embodiments, the one or more additional devices are selected from the group consisting of: a sensor, a communication device, a camera, a smart device, a smart phone, a tablet, a computer, a laptop, a mobile device, and a wearable device. In some embodiments, the one or more additional devices are associated with the user communication device. In some embodiments, the one or more additional devices comprise data that is relevant to the request for assistance. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the emergency management system routes a warning sent by the communication device associated with the first responder to the user communication device. In further embodiments, the warning is sent when the communication device of the first responder determines that the user communication device is qualified to receive the signal. In further embodiments, the emergency management system routes an updated warning sent by the communication device of the first responder to the user communication device. In further embodiments, the user communication device is cut off from receiving one or more updated warnings when the communication device of the first responder determines that the user communication device is no longer qualified to receive the signal. In some embodiments, the emergency management system screens the data shared by the communication device before routing the data to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, the location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, the health data comprises historical health data of a user of the communication device selected from the group consisting of: age, weight, height, allergies, blood type, medical history, and any combination thereof. In further embodiments, the sensor data is provided by one or more sensors of the communication device. In further embodiments, the sensor data is provided by one or more sensors that are physically separate from the communication device. In further embodiments, the user data is selected from the group consisting of: identity, home address, work address, occupation, family information, user contact information, emergency contact information, and any combination thereof. In some embodiments, the data set comprises current data. In some embodiments, the emergency management system sends an authorization request to the communication device for sharing data with the first responder. In some embodiments, the emergency management system is preauthorized to route data associated with the communication device to the communication device of the first responder. In some embodiments, the device is preauthorized to share data with the communication device of the first responder. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are methods for an emergency management system to manage emergency communications, the methods comprising: (a) managing, by the EMS, an emergency communication session by, upon receiving a request for assistance associated with a user communication device, locating a communication device of a first responder assigned to the emergency; and (b) establishing, by the EMS, an emergency communication session upon receiving the request for assistance associated with the user communication device, the communication session comprising: (i) a first data channel with the user communication device; (ii) a second data channel with the communication device of the first responder assigned to the emergency; and (iii) a third data channel between the user communication device and the communication device of the first responder assigned to the emergency, wherein the third data channel is a direct data channel that allows the user communication device and the communication device of the first responder to share data with each other without routing the data through the emergency management system. In some embodiments, the emergency communication session comprises one or more additional data channels with one or more additional devices, wherein the emergency management system bridges the data channel between the EMS and the communication device of the first responder with the one or more data channels to allow the one or more additional devices to share data with the communication device of the first responder. In some embodiments, the one or more additional devices are selected from the group consisting of: a sensor, a communication device, a camera, a smart device, a smart phone, a tablet, a computer, a laptop, a mobile device, and a wearable device. In some embodiments, the one or more additional devices are associated with the user communication device. In some embodiments, the one or more additional devices comprise data that is relevant to the request for assistance. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the emergency management system routes a warning sent by the communication device associated with the first responder to the user communication device. In further embodiments, the warning is sent when the communication device of the first responder determines that the user communication device is qualified to receive the signal. In further embodiments, the method comprises routing, by the EMS, an updated warning sent by the communication device of the first responder to the user communication device. In further embodiments, the user communication device is cut off from receiving one or more updated warnings when the communication device of the first responder determines that the user communication device is no longer qualified to receive the signal. In some embodiments, the method comprises screening, by the EMS, the data shared by the communication device before routing the data to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, the location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, the health data comprises historical health data of a user of the communication device selected from the group consisting of: age, weight, height, allergies, blood type, medical history, and any combination thereof. In further embodiments, the sensor data is provided by one or more sensors of the communication device. In further embodiments, the sensor data is provided by one or more sensors that are physically separate from the communication device. In further embodiments, the user data is selected from the group consisting of: identity, home address, work address, occupation, family information, user contact information, emergency contact information, and any combination thereof. In some embodiments, the data set comprises current data. In some embodiments, the emergency management system sends an authorization request to the communication device for sharing data with the first responder. In some embodiments, the emergency management system is preauthorized to route data associated with the communication device to the communication device of the first responder. In some embodiments, the device is preauthorized to share data with the communication device of the first responder. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

Another aspect, as disclosed herein are emergency management systems comprising at least one processor, a memory, a network element, and a computer program including instructions executable by the at least one processor to create server software application for managing emergency communications comprising: (a) an emergency management module managing an emergency communication session by, upon receiving a request for assistance associated with a user communication device, locating a communication device of a first responder assigned to the emergency; and (b) an emergency communication module establishing an emergency communication session upon receiving the request for assistance associated with the user communication device, the communication session comprising: (i) a first data channel with the user communication device; and (ii) a second data channel with the communication device of the first responder assigned to the emergency, wherein the emergency communication module bridges the first data channel with the second data channel to allow the user communication device and the communication device of the first responder to share data with each other by routing the data through the emergency management system. In some embodiments, the emergency communication session comprises one or more additional data channels with one or more additional devices, wherein the emergency management system bridges the data channel between the EMS and the communication device of the first responder with the one or more data channels to allow the one or more additional devices to share data with the communication device of the first responder. In some embodiments, the one or more additional devices are selected from the group consisting of: a sensor, a communication device, a camera, a smart device, a smart phone, a tablet, a computer, a laptop, a mobile device, and a wearable device. In some embodiments, the one or more additional devices are associated with the user communication device. In some embodiments, the one or more additional devices comprise data that is relevant to the request for assistance. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the emergency management system routes a warning sent by the communication device associated with the first responder to the user communication device. In further embodiments, the warning is sent when the communication device of the first responder determines that the user communication device is qualified to receive the signal. In further embodiments, the emergency management system routes an updated warning sent by the communication device of the first responder to the user communication device. In further embodiments, the user communication device is cut off from receiving one or more updated warnings when the communication device of the first responder determines that the user communication device is no longer qualified to receive the signal. In some embodiments, the emergency management system screens the data shared by the communication device before routing the data to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, the location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, the health data comprises historical health data of a user of the communication device selected from the group consisting of: age, weight, height, allergies, blood type, medical history, and any combination thereof. In further embodiments, the sensor data is provided by one or more sensors of the communication device. In further embodiments, the sensor data is provided by one or more sensors that are physically separate from the communication device. In further embodiments, the user data is selected from the group consisting of: identity, home address, work address, occupation, family information, user contact information, emergency contact information, and any combination thereof. In some embodiments, the data set comprises current data. In some embodiments, the emergency management system sends an authorization request to the communication device for sharing data with the first responder. In some embodiments, the emergency management system is preauthorized to route data associated with the communication device to the communication device of the first responder. In some embodiments, the device is preauthorized to share data with the communication device of the first responder. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are non-transitory computer-readable storage media encoded with a computer program including instructions executable by a processor to create a server software application for managing emergency communications comprising: (a) an emergency management module managing an emergency communication session by, upon receiving a request for assistance associated with a user communication device, locating a communication device of a first responder assigned to the emergency; and (b) an emergency communication module establishing an emergency communication session upon receiving the request for assistance associated with the user communication device, the communication session comprising: (i) a first data channel with the user communication device; and (ii) a second data channel with the communication device of the first responder assigned to the emergency, wherein the emergency communication module bridges the first data channel with the second data channel to allow the user communication device and the communication device of the first responder to share data with each other by routing the data through the emergency management system. In some embodiments, the emergency communication session comprises one or more additional data channels with one or more additional devices, wherein the emergency management system bridges the data channel between the EMS and the communication device of the first responder with the one or more data channels to allow the one or more additional devices to share data with the communication device of the first responder. In some embodiments, the one or more additional devices are selected from the group consisting of: a sensor, a communication device, a camera, a smart device, a smart phone, a tablet, a computer, a laptop, a mobile device, and a wearable device. In some embodiments, the one or more additional devices are associated with the user communication device. In some embodiments, the one or more additional devices comprise data that is relevant to the request for assistance. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the emergency management system routes a warning sent by the communication device associated with the first responder to the user communication device. In further embodiments, the warning is sent when the communication device of the first responder determines that the user communication device is qualified to receive the signal. In further embodiments, the emergency management system routes an updated warning sent by the communication device of the first responder to the user communication device. In further embodiments, the user communication device is cut off from receiving one or more updated warnings when the communication device of the first responder determines that the user communication device is no longer qualified to receive the signal. In some embodiments, the emergency management system screens the data shared by the communication device before routing the data to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, the location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, the health data comprises historical health data of a user of the communication device selected from the group consisting of: age, weight, height, allergies, blood type, medical history, and any combination thereof. In further embodiments, the sensor data is provided by one or more sensors of the communication device. In further embodiments, the sensor data is provided by one or more sensors that are physically separate from the communication device. In further embodiments, the user data is selected from the group consisting of: identity, home address, work address, occupation, family information, user contact information, emergency contact information, and any combination thereof. In some embodiments, the data set comprises current data. In some embodiments, the emergency management system sends an authorization request to the communication device for sharing data with the first responder. In some embodiments, the emergency management system is preauthorized to route data associated with the communication device to the communication device of the first responder. In some embodiments, the device is preauthorized to share data with the communication device of the first responder. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

In another aspect, disclosed herein are methods for an emergency management system to manage emergency communications, the methods comprising: (a) managing, by the EMS, an emergency communication session by, upon receiving a request for assistance associated with a user communication device, locating a communication device of a first responder assigned to the emergency; and (b) establishing, by the EMS, an emergency communication session upon receiving the request for assistance associated with the user communication device, the communication session comprising: (i) a first data channel with the user communication device; and (ii) a second data channel with the communication device of the first responder assigned to the emergency, wherein the emergency communication module bridges the first data channel with the second data channel to allow the user communication device and the communication device of the first responder to share data with each other by routing the data through the emergency management system. In some embodiments, the emergency communication session comprises one or more additional data channels with one or more additional devices, wherein the emergency management system bridges the data channel between the EMS and the communication device of the first responder with the one or more data channels to allow the one or more additional devices to share data with the communication device of the first responder. In some embodiments, the one or more additional devices are selected from the group consisting of: a sensor, a communication device, a camera, a smart device, a smart phone, a tablet, a computer, a laptop, a mobile device, and a wearable device. In some embodiments, the one or more additional devices are associated with the user communication device. In some embodiments, the one or more additional devices comprise data that is relevant to the request for assistance. In some embodiments, the communication session is initiated upon request of the communication device. In some embodiments, the communication session is initiated upon request of the emergency service. In some embodiments, the communication session is initiated upon request of the communication device of the first responder. In some embodiments, the communication device shares data with the communication device of the first responder after receiving a data request from the communication device of the first responder. In further embodiments, the communication device automatically shares data after receiving the data request. In further embodiments, the data request comprises a push notification to a user of the communication device. In further embodiments, the data request comprises a request for location data associated with the communication device. In some embodiments, the emergency management system routes a warning sent by the communication device associated with the first responder to the user communication device. In further embodiments, the warning is sent when the communication device of the first responder determines that the user communication device is qualified to receive the signal. In further embodiments, the method comprises routing, by the EMS, an updated warning sent by the communication device of the first responder to the user communication device. In further embodiments, the user communication device is cut off from receiving one or more updated warnings when the communication device of the first responder determines that the user communication device is no longer qualified to receive the signal. In some embodiments, the method comprises screening, by the EMS, the data shared by the communication device before routing the data to the communication device of the first responder. In some embodiments, the data set comprises data obtained from the communication device. In some embodiments, the data set comprises data obtained from one or more devices associated with the communication device. In some embodiments, the data set comprises data associated with a different communication device. In some embodiments, the data set comprises data selected from the group consisting of: location data, health data, user data, sensor data, and any combination thereof. In further embodiments, the location data comprises a location of the communication device determined using a method selected from the group consisting of: GPS satellite triangulation, cell tower triangulation, Wi-Fi triangulation, Bluetooth triangulation, and any combination thereof. In yet further embodiments, the location of the communication device comprises coordinates having an accuracy of within 10 meters. In further embodiments, the health data comprises historical health data of a user of the communication device selected from the group consisting of: age, weight, height, allergies, blood type, medical history, and any combination thereof. In further embodiments, the sensor data is provided by one or more sensors of the communication device. In further embodiments, the sensor data is provided by one or more sensors that are physically separate from the communication device. In further embodiments, the user data is selected from the group consisting of: identity, home address, work address, occupation, family information, user contact information, emergency contact information, and any combination thereof. In some embodiments, the data set comprises current data. In some embodiments, the emergency management system sends an authorization request to the communication device for sharing data with the first responder. In some embodiments, the emergency management system is preauthorized to route data associated with the communication device to the communication device of the first responder. In some embodiments, the device is preauthorized to share data with the communication device of the first responder. In some embodiments, the communication device comprises a unique calling number assigned to it. In some embodiments, the communication device is a mobile communication device. In some embodiments, the communication device does not have a unique calling number assigned to it. In some embodiments, the communication device is not configured to be worn or carried by a user. In some embodiments, the communication device is a wearable device comprising one or more sensors. In some embodiments, the communication device is a home monitoring device. In some embodiments, the communication device is a vehicle monitoring device.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
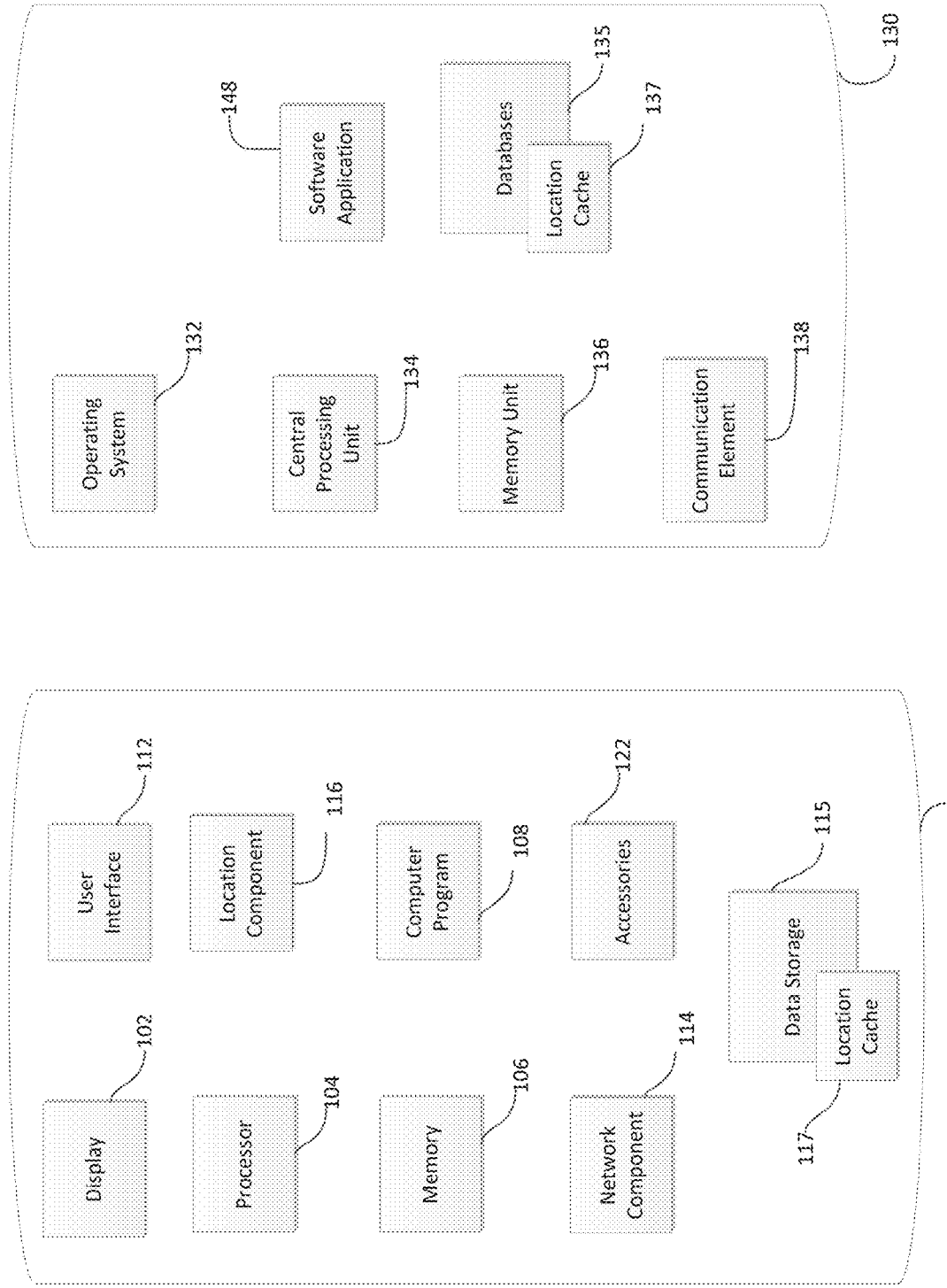
FIGS. 1A and 1B illustrate embodiments of the device, emergency management system, and software applications for the device and emergency management system.

In certain embodiments, disclosed herein are communication devices comprising at least one processor, a memory, a network element, and a computer program including instructions executable by the at least one processor to create a group monitoring application comprising: (a) a group module determining that the communication device belongs to a group of devices, wherein the group of devices comprises member devices that are authorized to share data with each other; (b) a data sharing module providing data associated with the communication device to one or more member devices in the group of devices; and (c) a data intake module obtaining data associated with a member device in the group of devices and using the data to update a data set associated with the member device, wherein the data intake module requests a status update from the member device upon a triggering event.

In certain embodiments, disclosed herein are non-transitory computer-readable storage media encoded with a computer program including instructions executable by a processor to create a group monitoring application comprising: (a) a group module determining that the communication device belongs to a group of devices, wherein the group of devices comprises member devices that are authorized to share data with each other; (b) a data sharing module providing data associated with the communication device to one or more member devices in the group of devices; and (c) a data intake module obtaining data associated with a member device in the group of devices and using the data to update a data set associated with the member device, wherein the data intake module requests a status update from the member device upon a triggering event. In some embodiments, the media comprises a communication module sending a request for assistance to a recipient on behalf of the member device.

In certain embodiments, disclosed herein are methods for monitoring a group of devices by a communication device, the methods comprising: (a) determining, by the communication device, that the communication device belongs to a group of devices, wherein the group of devices comprises member devices that are authorized to share data with each other; (b) providing, by the communication device, data associated with the communication device to one or more member devices in the group of devices; and (c) obtaining, by the communication device, data associated with a member device in the group of devices and using the data to update a data set associated with the member device, wherein the communication device requests a status update from the member device upon a triggering event.

In certain embodiments, disclosed herein are emergency management systems comprising at least one processor, a memory, a network element, and a computer program including instructions executable by the at least one processor to create a server software application for managing emergency communication sessions comprising: (a) a proxy detection module for processing a proxy request for assistance, wherein the proxy detection module: (i) receives a request for assistance from a communication device, wherein the request is associated with a member device in a group of devices, wherein the group of devices comprises member devices that are authorized to share data with each other; (ii) determines the communication device is authorized to send the request for assistance associated on behalf of the member device; and (iii) obtains a data set associated with the member device in the group of communication devices; (b) an emergency communication module establishing a communication session with a recipient and at least one of the communication device and the member device, wherein the emergency communication module: (i) sends the request to the recipient; and (ii) provides the data set associated with the member device to the recipient.

In certain embodiments, disclosed herein are non-transitory computer-readable storage media encoded with a computer program including instructions executable by a processor to create a server software application for managing emergency communication sessions comprising: (a) a proxy detection module for processing a proxy request for assistance, wherein the proxy detection module: (i) receives a request for assistance from a communication device, wherein the request is associated with a member device in a group of devices, wherein the group of devices comprises member devices that are authorized to share data with each other; (ii) determines the communication device is authorized to send the request for assistance associated on behalf of the member device; and (iii) obtains a data set associated with the member device in the group of communication devices; (b) an emergency communication module establishing a communication session with a recipient and at least one of the communication device and the member device, wherein the emergency communication module: (i) sends the request to the recipient; and (ii) provides the data set associated with the member device to the recipient.

In certain embodiments, disclosed herein are methods for managing emergency communication sessions by an EMS, the methods comprising: (a) processing, by the EMS, a proxy request for assistance by: (i) receiving a request for assistance from a communication device, wherein the request is associated with a member device in a group of devices, wherein the group of devices comprises member devices that are authorized to share data with each other; (ii) determining the communication device is authorized to send the request for assistance associated on behalf of the member device; and (iii) obtaining a data set associated with the member device in the group of communication devices; and (b) establishing, by the EMS, a communication session with a recipient and at least one of the communication device and the member device by: (i) sending the request to the recipient; and (ii) providing the data set associated with the member device to the recipient. In some embodiments, the EMS provides the data set associated with the member device to the recipient by updating a database accessed by the recipient.

In certain embodiments, disclosed herein are communication devices comprising at least one processor, a memory, a network element, and a computer program including instructions executable by the at least one processor to create an emergency alert application comprising: (a) a user input module receiving an indication to send a request for assistance associated with a second device to a recipient; (b) a communication module communicating with the recipient after the indication to send a request for assistance is received, wherein the communication module: (i) determines the communication device is authorized to send the request for assistance on behalf of the second device to the recipient; (ii) sends the request associated with the second device to the recipient; and (iii) provides a data set associated with the second device to the recipient.

In certain embodiments, disclosed herein are non-transitory computer-readable storage media encoded with a computer program including instructions executable by a processor to create an emergency alert application comprising: (a) a user input module receiving an indication to send a request for assistance associated with a second device to a recipient; (b) a communication module communicating with the recipient after the indication to send a request for assistance is received, wherein the communication module: (i) determines the communication device is authorized to send the request for assistance on behalf of the second device to the recipient; (ii) sends the request associated with the second device to the recipient; and (iii) provides a data set associated with the second device to the recipient.

In certain embodiments, disclosed herein are methods for proxy emergency communications by a communication device, the methods comprising: (a) receiving, by the communication device, an indication to send a request for assistance associated with a second device to a recipient; (b) communicating, by the communication device, with the recipient after the indication to send a request for assistance is received by: (i) determining the communication device is authorized to send the request for assistance on behalf of the second device to the recipient; (ii) sending the request associated with the second device to the recipient; and (iii) providing a data set associated with the second device to the recipient.

In certain embodiments, disclosed herein are emergency management systems comprising at least one processor, a memory, a network element, and a computer program including instructions executable by the at least one processor to create server software application for managing emergency communications comprising: (a) a proxy detection module for processing a proxy request for assistance, wherein the proxy detection module: (i) receives a request for assistance from a communication device intended for a recipient, wherein the request is associated with a second device; (ii) determines that the communication device is authorized to make the request for assistance on behalf of the second device; and (iii) obtains a data set associated with the second device; and (b) an emergency communication module establishing a communication session, wherein the emergency communication module: (i) sends the request to the recipient; and (ii) provides the data set associated with the member device to the recipient.

In certain embodiments, disclosed herein are non-transitory computer-readable storage media encoded with a computer program including instructions executable by a process to create a server software application for managing emergency communications comprising: (a) a proxy detection module for processing a proxy request for assistance, wherein the proxy detection module: (i) receives a request for assistance from a communication device intended for a recipient, wherein the request is associated with a second device; (ii) determines that the communication device is authorized to make the request for assistance on behalf of the second device; and (iii) obtains a data set associated with the second device; and (b) an emergency communication module establishing a communication session, wherein the emergency communication module: (i) sends the request to the recipient; and (ii) provides the data set associated with the member device to the recipient.

In certain embodiments, disclosed herein are methods for managing emergency communications by an emergency management system, the method comprising: processing, by the EMS, a proxy request for assistance by: (i) receiving a request for assistance from a communication device intended for a recipient, wherein the request is associated with a second device; (ii) determining that the communication device is authorized to make the request for assistance on behalf of the second device; and (iii) obtaining a data set associated with the second device; and (b) establishing, by the EMS, a communication session by: (i) sending the request to the recipient; and (ii) providing the data set associated with the member device to the recipient.

In certain embodiments, disclosed herein are communication devices comprising at least one processor, a memory, a network element, and a computer program including instructions executable by the at least one processor to create an emergency alert application comprising: (a) a data module providing a data set comprising current data associated with a user of the communication device; (b) an emergency communication module communicating through an emergency communication session comprising: (i) a first data channel with an emergency service; and (ii) a second data channel with a communication device of a first responder assigned to the emergency, wherein the second data channel is a direct data channel that allows the communication device to share the data set with the communication device of the first responder to share data without routing the data set through the emergency service.

In certain embodiments, disclosed herein are non-transitory computer-readable storage media encoded with instructions executable by a processor to create an emergency alert application comprising: (a) a data module providing a data set comprising current data associated with a user of the communication device; (b) an emergency communication module communicating through an emergency communication session comprising: (i) a first data channel with an emergency service; and (ii) a second data channel with a communication device of a first responder assigned to the emergency, wherein the second data channel is a direct data channel that allows the communication device to share the data set with the communication device of the first responder to share data without routing the data set through the emergency service.

In certain embodiments, disclosed herein are methods for a communication device to share data with a communication device of a first responder during an emergency communication session, the methods comprising: (a) providing, by the communication device, a data set comprising current data associated with a user of the communication device; (b)

communicating, by the communication device, through an emergency communication session comprising: (i) a first data channel with an emergency service; and (ii) a second data channel with a communication device of a first responder assigned to the emergency, wherein the second data channel is a direct data channel that allows the communication device to share the data set with the communication device of the first responder to share data without routing the data set through the emergency service.

In certain embodiments, disclosed herein are communication devices comprising at least one processor, a memory, a network element, and a computer program including instructions executable by the at least one processor to create an emergency alert application comprising: (a) a data module providing a data set comprising current data associated with a user of the communication device; (b) an emergency communication module communicating through an emergency communication session comprising: (b) a first data channel with an emergency service; and (b) a second data channel between the emergency service and the communication device of the first responder, wherein the emergency communication module bridges the first data channel with the second data channel to allow the user communication device to share the data set with the communication device of the first responder by routing the data set through the emergency service.

In certain embodiments, disclosed herein are non-transitory computer-readable storage media encoded with instructions executable by a processor to create an emergency alert application comprising: (a) a data module providing a data set comprising current data associated with a user of the communication device; (b) an emergency communication module communicating through an emergency communication session comprising: (b) a first data channel with an emergency service; and (b) a second data channel between the emergency service and the communication device of the first responder, wherein the emergency communication module bridges the first data channel with the second data channel to allow the user communication device to share the data set with the communication device of the first responder by routing the data set through the emergency service.

In certain embodiments, disclosed herein are methods for a communication device to share data with a communication device of a first responder during an emergency communication session, the method comprising: (a) providing, by the communication device, a data set comprising current data associated with a user of the communication device; (b) communicating, by the communication device, through an emergency communication session comprising: (i) a first data channel with an emergency service; and (ii) a second data channel between the emergency service and the communication device of the first responder, wherein the emergency communication module bridges the first data channel with the second data channel to allow the user communication device to share the data set with the communication device of the first responder by routing the data set through the emergency service.

In certain embodiments, disclosed herein are emergency management systems comprising at least one processor, a memory, a network element, and a computer program including instructions executable by the at least one processor to create server software application for managing emergency communications comprising: (a) an emergency management module managing an emergency communication session by, upon receiving a request for assistance associated with a user communication device, locating a communication device of a first responder assigned to the emergency; and (b) an emergency communication module establishing an emergency communication session upon receiving the request for assistance associated with the user communication device, the communication session comprising: (i) a first data channel with the user communication device; (ii) a second data channel with the communication device of the first responder assigned to the emergency; and (iii) a third data channel between the user communication device and the communication device of the first responder assigned to the emergency, wherein the third data channel is a direct data channel that allows the user communication device and the communication device of the first responder to share data with each other without routing the data through the emergency management system.

In certain embodiments, disclosed herein are non-transitory computer-readable storage media encoded with a computer program including instructions executable by a processor to create a server software application for managing emergency communications comprising: (a) an emergency management module managing an emergency communication session by, upon receiving a request for assistance associated with a user communication device, locating a communication device of a first responder assigned to the emergency; and (b) an emergency communication module establishing an emergency communication session upon receiving the request for assistance associated with the user communication device, the communication session comprising: (i) a first data channel with the user communication device; (ii) a second data channel with the communication device of the first responder assigned to the emergency; and (iii) a third data channel between the user communication device and the communication device of the first responder assigned to the emergency, wherein the third data channel is a direct data channel that allows the user communication device and the communication device of the first responder to share data with each other without routing the data through the emergency management system.

In certain embodiments, disclosed herein are methods for an emergency management system to manage emergency communications, the methods comprising: (a) managing, by the EMS, an emergency communication session by, upon receiving a request for assistance associated with a user communication device, locating a communication device of a first responder assigned to the emergency; and (b) establishing, by the EMS, an emergency communication session upon receiving the request for assistance associated with the user communication device, the communication session comprising: (i) a first data channel with the user communication device; (ii) a second data channel with the communication device of the first responder assigned to the emergency; and (iii) a third data channel between the user communication device and the communication device of the first responder assigned to the emergency, wherein the third data channel is a direct data channel that allows the user communication device and the communication device of the first responder to share data with each other without routing the data through the emergency management system.

In certain embodiments, disclosed herein are emergency management systems comprising at least one processor, a memory, a network element, and a computer program including instructions executable by the at least one processor to create server software application for managing emergency communications comprising: (a) an emergency management module managing an emergency communication session by, upon receiving a request for assistance associated with a user communication device, locating a communication device of a first responder assigned to the emergency; and (b) an emergency communication module establishing an emergency communication session upon receiving the request for assistance associated with the user communication device, the communication session comprising: (i) a first data channel with the user communication device; and (ii) a second data channel with the communication device of the first responder assigned to the emergency, wherein the emergency communication module bridges the first data channel with the second data channel to allow the user communication device and the communication device of the first responder to share data with each other by routing the data through the emergency management system.

In certain embodiments, disclosed herein are non-transitory computer-readable storage media encoded with a computer program including instructions executable by a processor to create a server software application for managing emergency communications comprising: (a) an emergency management module managing an emergency communication session by, upon receiving a request for assistance associated with a user communication device, locating a communication device of a first responder assigned to the emergency; and (b) an emergency communication module establishing an emergency communication session upon receiving the request for assistance associated with the user communication device, the communication session comprising: (i) a first data channel with the user communication device; and (ii) a second data channel with the communication device of the first responder assigned to the emergency, wherein the emergency communication module bridges the first data channel with the second data channel to allow the user communication device and the communication device of the first responder to share data with each other by routing the data through the emergency management system.

In certain embodiments, disclosed herein are methods for an emergency management system to manage emergency communications, the methods comprising: (a) managing, by the EMS, an emergency communication session by, upon receiving a request for assistance associated with a user communication device, locating a communication device of a first responder assigned to the emergency; and (b) establishing, by the EMS, an emergency communication session upon receiving the request for assistance associated with the user communication device, the communication session comprising: (i) a first data channel with the user communication device; and (ii) a second data channel with the communication device of the first responder assigned to the emergency, wherein the emergency communication module bridges the first data channel with the second data channel to allow the user communication device and the communication device of the first responder to share data with each other by routing the data through the emergency management system.

Existing filings, for example, U.S. patent application Ser. No. 14/856,818, titled "METHOD AND SYSTEM FOR EMERGENCY CALL MANAGEMENT," filed on Sep. 17, 2015 and incorporated herein by reference, take advantage of Voice over Internet Protocol (VoIP) technology to make emergency calls, including multi-media messaging, from communication devices such as cellular phones to EDCs.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a piece of electronic equipment designed with one or more functionality. A "communication device" refers to a device with a communication component, which will allow it to send and receive information over a wireless channel, a wired channel, or any combination thereof (e.g. sending/receiving information over the Internet). Exemplary communication devices include a mobile phone (e.g. a smartphone), a laptop, a desktop, a tablet, a radio (e.g. a two-way radio), and a vehicular communication system. In some embodiments, a communication device includes a car security system (e.g. OnStar®), a home security system, or a home control system (e.g. a networked control system for providing network controlled and/or smart temperature control such as a Wi-Fi smart thermostat, lighting, entertainment, and/or door control). In some embodiments, a communication device is a wearable device (e.g. a communication device worn by a user). In some embodiments, a communication (e.g. a wearable device) comprises one or more sensors. In some embodiments, a communication device is connected to a communication network, for example, a cellular network or the Internet. As used herein, a "mobile wireless device" refers to a device that is portable and communicates wirelessly. In some embodiments, a user wears or carries the mobile wireless device on the user's person or in the user's vehicle. Exemplary mobile wireless devices include mobile or cellular phones, wearable devices (e.g. smart watch, fitness tracker, wearable sensor, smart glasses, etc.).

As used herein, a "group of communication devices," a "group of devices," and/or a "web of devices" refers to two or more member devices grouped together based on certain criterion. In some embodiments, at least one member device in a group of devices authorizes data sharing with other member devices. In some embodiments, a group of devices comprises member devices authorized to share data with each other. In further embodiments, a subset of the member devices is authorized to share data with other member devices in the group (e.g. only one device in the group authorizes data sharing with two other devices in the group, but the two other devices do not authorize data sharing). In some embodiments, a user of each member device configures data sharing settings for the member device within the group (e.g. a user chooses which other member devices are allowed to access data from his/her member device). In some embodiments, a group of devices comprises a selection of devices based on a predefined relation between the users of the devices, for example, family members. In some embodiments, a group of devices comprises a selection of devices based on the geographic location of the devices. In some embodiments, a group of devices comprises a selection of devices based on one or more factors selected from geographic location of each device in the group, an emergency indication sent by or on behalf of each device in the group, and a data set for each device in the group. In some embodiments, a group of devices is manually predefined (e.g. by a user of the device, for example, selecting devices to be in the group from a contact list on the device). In some embodiments, a group of devices comprises a selection of devices that is automatically chosen using a software algorithm.

As used herein, a "second device" or "second communication device" refers to a device other than the communication device. For example, in some embodiments, a communication device is able to place a proxy call on behalf of a second device (or a user of the second device). In some embodiments, a second device is a member device in a group of devices, wherein the communication device is able to place a proxy call on behalf of the second/member device because it has been pre-authorized to do so since it is also a member of the group of devices. For example, in some embodiments, the communication device and the second device both belong to a group of devices, wherein member devices in the group are authorized to share data with each other (e.g. member devices give each other explicit authority to obtain data and/or provides data upon request or autonomously). In some embodiments, the communication device and the second device both belong to a group of devices, wherein member devices in the group are authorized to send requests for assistance on behalf of one another (e.g. proxy call or communication). The data sharing authorization allows the communication device to obtain information from the second device, which allows the communication device to determine/confirm the second device is in an emergency. The data sharing authorization also allows the communication device to provide the data set associated with the second device to a recipient in case the communication device sends a request for assistance (e.g. a proxy call) to the recipient. This enables the rapid sharing of relevant information that can help expedite the response (e.g. emergency response by a first responder). In some embodiments, a second device is not a member device in a group of devices. For example, in some embodiments, a user communication device is able to place a proxy call and/or communication with a recipient on behalf of a second device (or a member device in a group of devices), wherein the second device does not share its data set with the user communication device. The recipient (e.g. an EMS) is able to obtain or access the data set associated with the second device directly from the second device (e.g. second device provides authorization for the recipient to extract the data) or from an external database or cache storing the data (e.g. second device stores its data set on a $3^{rd}$ party cache database accessible by an EMS or EDC). As a result, the proxy call enables a rapid and efficient emergency response (based on the recipient and/or first responders having access to relevant data in the data set) without requiring the user communication device and the second device to be part of a group of devices that would enable data sharing between them.

As used herein, a "request for assistance" refers to a request or message sent to a recipient asking for help. In some embodiments, a request for assistance is an emergency request for assistance (e.g. the request is associated with an emergency situation). In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g. request for a tow truck after car breaks down). In some embodiments, a request for assistance is associated with a device sending the request. In other embodiments, a request for assistance is associated with a device not sending the request (e.g. a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "first responder" refers to any person or persons responsible for addressing an emergency situation. In some embodiments, a first responder refers to government personnel responsible for addressing an emergency situation. In some embodiments, a first responder is responsible for a particular jurisdiction (e.g. a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, security personnel at a university, or other persons employed to protect and serve the public and/or certain subsets of the population.

As used herein, a "recipient" refers to one or more persons, services, or systems that receive a request for assistance. The recipient varies depending on the type of request. In some embodiments, a recipient is an emergency service. In some embodiments, a recipient is an emergency service when he request for assistance pertains to an emergency (e.g. a tier 2 emergency). In some embodiments, a recipient is an emergency management system. In some embodiments, a recipient is an emergency dispatch center. In exemplary embodiments, an emergency dispatch center is a public safety answering point which is a call center responsible for answering calls to an emergency phone number. In some embodiments, an emergency dispatch center is a private security dispatch center. In some embodiments, an emergency dispatch center is a non-public dispatch center. In some embodiments, a recipient is an emergency dispatch center, wherein the request is first routed through an emergency management system (e.g. request is sent to the EMS, but ultimately is sent to an EDC). In some embodiments, a recipient is a first responder (e.g. a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security who are closer to the child than the parent. Security is then able to pick up the child quickly using the data set associated with the member device, which they are given authorization to access by the parent's communication device.

As used herein, a "user" refers to one or more person or persons associated with a device (e.g. communication device, member device, second device, device of a first responder, etc). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g. a phone or wearable device). In some embodiments, a device associated with a user is not carried or worn on the person of the user (e.g. a home security sensor or camera installed in the home of the user, a vehicle tracking system installed in a vehicle of the user, etc).

As used herein, "data" refers to a collection of information about one or more entities (e.g. user of a user communication device) and/or an environment that pertains to characteristics of the one or more entities. In some embodiments, an entity is a person. In some embodiments, an entity is a thing (e.g. a house). For example, in some embodiments, data comprises sensor data from home sensors associated with a house. In this example, the data is also associated with one or more persons (e.g. the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g. surrounding temperature, location, elevation, barometric pressure, ambient noise level, ambient light level, surrounding geography, etc.). In some embodiments, data comprises information about other users that is pre-stored in a device or in a database (e.g. a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g. by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g. GPS coordinates), biosensor data for one or both devices (e.g. biosensor data such as heart rate and blood pressure can be important in case of injury), and information about the vehicle driven by each user (e.g. make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g. when a sensor first detects a sensed parameter such as, for example, heart rate).

As used herein, "data set" refers to a collection of information (e.g. meta-data) comprising the most recent and relevant information about an emergency situation and/or imminent emergency situation. Data set is used interchangeably with "meta-data set." In some embodiments, a "data set" comprises information about a user, information about a surrounding environment of the user and/or the user device. In some embodiments, the data set refers to a collection of information about an emergency situation not involving a user (e.g. emergency situation involves a device or something associated with the device). As an example, in one embodiment, when a home security device sends an emergency request (e.g. fire emergency based on internal thermostat sensor readings) to an emergency service (e.g. local fire department), the data set for the home security device comprises the sensor readings from one or more thermostats or heat sensors located around the home. In some embodiments, a data set is stored on a database or database cache of a device (e.g. communication device). In some embodiments, a data set is stored on a database or database cache external to a device (e.g. on a network). In some embodiments, a data set is stored on a database or database cache of an emergency management system.

As used herein, "emergency data" refers to a collection of information about a person or a situation that provide awareness about the emergency situation. In some embodiments, emergency data comprises information on devices involved in the emergency situation (e.g. devices belonging to persons involved in the emergency situation). In some embodiments, emergency data comprises the type of emergency (e.g. car accident, crime, medical emergency, or fire emergency), data associated with the user of the device requesting emergency assistance (e.g. location data for the user's device), data about other users in the vicinity of the user, and data about the devices involved in the emergency situation. In some embodiments, emergency data comprises one or more of location data, health data, user data, and sensor data.

Location data, as the term is used herein, includes one or more of GPS location information, Wi-Fi based location information, location information manually entered by a user into the user's communication device, position information from the cellular network provider obtained via triangulation of the received signal strengths from three or more separate cellular phone base stations, location information derived from received signal strengths indicators (RSSI) received at a Wi-Fi router and/or signal strengths of signals received at a Wi-Fi router of digital signals sent from the user communication device, and any other form of location information. In some embodiments, location data comprises a location of a device determined using a location determination method. In further embodiments, a location determination method is selected from GPS satellite triangulation, cell tower triangulation, Wi-Fi triangulation, Bluetooth triangulation, RSSI, time-of-flight, angle of arrival, fingerprinting, barometric pressure, or any combination thereof. In some embodiments, location is determined using more than one method in combination to obtain a more accurate location. In some embodiments, location data comprises coordinates (e.g. XYZ coordinates, longitude, latitude, altitude, etc), an address (e.g. an address equivalent to coordinates that provides a current dispatchable location for emergency response). In some embodiments, location data comprises historical location (e.g. where user has traveled in the past). In some embodiments, historical location comprises one or more locations of the user and/or user device equal to or greater than 1, 2, 3, 4, 5, 10, 15, 20, 25, 30, 40, 50, or 60 minutes old, including increments therein. In some embodiments, the historical location comprises one or more locations of the user and/or user device equal to or greater than 1, 2, 3, 4, 5, 6, 7, 8, 9, 10, 11, 12, 13, 14, 15, 16, 17, 18, 19, 20, 21, 22, 23, or 24 hours old. In some embodiments, location data comprises current location, wherein current location comprises one or more locations of the user and/or user device within the past 1, 2, 3, 4, 5, 10, 15, 20, 25, 30, 40, 50, or 60 minutes, including increments therein. In some embodiments, location data comprises current location, wherein current location comprises one or more locations of the user and/or user device within the past 1, 2, 3, 4, 5, 6, 7, 8, 9, 10, 11, 12, 13, 14, 15, 16, 17, 18, 19, 20, 21, 22, 23, or 24 hours.

As used herein, "health data" refers to medical information associated with a user of a device. In some embodiments, health data comprises medical history such as, for example, past illnesses, surgery, food and/or drug allergies, diseases, disorders, medical diagnostic information (e.g. genetic profile screen), or any combination thereof. In some embodiments, health data comprises family medical history (e.g. family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, health data comprises a "limited data set" of identifiable patient information as defined by the Health Insurance Portability and Accountability Act (HIPAA) (e.g. for purposes of protecting patient confidentiality and/or privacy). In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g. whether user needs corrective lenses), home address, work address, occupation, family information, user contact information, emergency contact information, social security number, alien registration number, driver's license number, vehicle VIN, organ donor (e.g. whether user is an organ donor), or any combination thereof. In some embodiments, user data is obtained via user input.

As used herein, "sensor data" refers to information obtained or provided by one or more sensors. In some instances, a sensor is associated with a device (e.g. user has a communication device with a data link via Bluetooth with a wearable sensor, such as, for example, a heart rate monitor or a pedometer). Accordingly, in some embodiments, the device obtains sensor data from the sensor (e.g. heart rate from the heart rate monitor or distance traveled from the pedometer). In some instances, the sensor data is relevant to an emergency situation (e.g. heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g. detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g. on a football helmet to measure impact), a barometer, a pressure gauge (e.g. to estimate altitude for locating which floor a person is on during an emergency), a thermometer, a proximity sensor, a motion detector (e.g. in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g. user device is a wearable device having a sensor or sensing component). In some embodiments, sensors are calibrated using one or more calibration standards or calibration process to provide known accuracies or uncertainties in the sensor values.

As used herein, "communication link" refers to a communication pathway from a device (e.g. communication device) to another device or to an intermediate device (e.g. a router) on a network. In some embodiments, the communication device establishes a communication link with another device or an intermediate device to transfer information (e.g. a location of the device) or to obtain information from a recipient such as, for example, location of a first responder assigned to a request for assistance associated with the communication device (e.g. device of first responder). A communication link refers to the point-to-point communication channels, point-to-point and end-to-end data sessions, and the physical hardware facilitating the communication channel(s) (e.g. antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g. a previously agreed upon protocol). In some embodiments, the data session is routed through an EMS, which stores the multi-media, voice, and/or other data from any of the devices that are part of the data session. In further embodiments, the EMS shares the data from the data session with the other device (e.g. device of a first responder). In some embodiments, the EMS manages the data session.

As used herein, a "Received Signal Strength Indicator (RSSI)" refers to a measurement of the power present in a received radio signal. In some embodiments, the RSSI refers to a number assigned to the signal levels (e.g. power level) of packets as detected by a device receiving the packets from a device sending the packets. For example, an RSSI value may be a number within an arbitrary range such as from 0 to 100. In some embodiments, the RSSI refers to the decibel level of the power of the received data packets. In other embodiments, the RSSI refers to the actual power, for example measured in mW, as detected by the receiver. In some embodiments, RSSI is replaced with received channel power indicator (RCPI), which is a measure of the received radio signal power in a selected channel over the preamble and the entire received frame.

As used herein, a "mass message" refers to one or more data packets that are sent from any device to a group of devices. In some embodiments, the mass message is a broadcast message sent from the transmitting device to all devices within the subnet of the sending device. In some embodiments, the mass message is a multicast message send from the transmitting device to a group of devices within the subnetwork of the device. In some embodiments, the mass message is a broadcast message sent to a group of devices, which the group of devices comprises a selection of devices grouped by the users, by the software on the device, or by the EMS. In some embodiments, the selection of devices in the group of devices is based on certain criterion, for example, geographic location, relationship of the users, and predefined connections. In some embodiments, these devices are not within the same subnetwork.

As used herein, a "covert communication session" or "covert communication channel" refers to a communication session between two or more devices and/or systems, that can be one-hop or a multi-hop session, that is setup without alerting the user of the devices (or anyone else nearby) regarding the placement of the call. In some embodiments, the data call placed using the covert communication channel comprises a voice call that does not ring, or provide any other audible sounds, at the receiving device. In other embodiments, the covert communication channel comprises the initiation of a data session, for example a data voice call, with another device without the knowledge of the user of the sending or the receiving device. In some embodiments, the cover communication channel does not generate audible sounds at the sending device when initiating the communication session using the covert communication channel.

In some embodiments, a communication device autonomously generates and transmits messages in the form of sequences of data packets over data communication channels, including, for example, data regarding location and/or data about a user's health status. In some embodiments, a communication device autonomously receives and stores such messages from other user communication devices. In some embodiments, a group of user communication devices is formed, wherein member devices in the group regularly or periodically share such messages among each other. In some embodiments, member devices in the group autonomously share data about each user and/or each user's communication device in the group with each other on a periodic basis such that all the member devices are in possession of the data associated with each of the users and their communication devices in the group. In further embodiments, the data is stored in a location cache (e.g. a location cache database) for a period of time. In some embodiments, the cache is located on a network server. In some embodiments, the cache is located on a network server of an emergency management system. In some embodiments, the cache is located on one or more of the member devices in the group of devices. In some embodiments, the data comprises location information, wherein the cache is a location cache. In some embodiments, when an emergency request is made on behalf of a member device in the group of devices, other member devices in the group make the data stored in the cache available to emergency services (e.g. EDC, EMS, first responder, etc) to facilitate the emergency response.

Modern user communication devices, for example, smart phones, tablet computers, wearable communication devices, smart sensor devices and/or systems are often equipped with a variety of features for determining location information of the communication device using, for example, GPS, or triangulation with cellular phone towers. Modern user communication devices also often include functionality to store data regarding a user of the communication device, for example, health information about the user.

In some embodiments, a user using a user communication device to call to report an emergency situation is calling on behalf of another person or persons who are not in a position to place a call for emergency assistance themselves from their own user communication device(s). Moreover, in some embodiments, the person or persons on whose behalf the call is being made are not in the same geographic location as the user who is calling on their behalf. In such situations, the data on the user communication device(s) of the person or persons on whose behalf the call is being is useful in assisting an emergency response to the emergency situation, for example, by allowing the nearest public-safety access point (PSAP) to be located and notified about the emergency situation. The PSAP is then able to identify first responders who are best able to respond (e.g. a police squad car closest to the emergency not already dealing with another situation), and assign them to respond to the emergency situation.

Historically, if a first user wished to request data about a second user (e.g. health status, location of second user's communication device), the first user was required to send a request for this information to the second user's communication device. An automated method for requesting and receiving this information at the communication device of the first user from the communication device of the second user has not been available. A first user requesting emergency assistance from a public safety access point (e.g. a police or a fire response unit) on behalf of the second user is then able to provide the information to the public safety access point. Alternatively, the first user is able to get a status update on the second user (e.g. checking in on the second user without calling emergency services) by accessing the information from the second user's communication device (e.g. checking the geographic location of the second user). Normally, when a first user places a request for emergency assistance on behalf of a second user who is believed to be in need of emergency assistance, the first user is likely unable to provide the recipient of the request (e.g. EDC) with current location information for the second user. Additionally, if a third user would also like to request data from the second user (e.g. health status, location of the user communication device of the second user), the third user is required to send a message to the second user's communication device containing such a request. This effectively doubles the requests sent to the user communication device of the other user and burdens the communication networks. The same process is repeated for each additional user requesting a status update on the second user, further burdening the communication networks.

It is important for EDC personnel or first responders to have access to data about a user in need of emergency assistance to facilitate providing effective assistance to the user. In some embodiments, location information about the user communication device is cached on the device itself. In some embodiments, the location information (e.g. location data) comprises GPS coordinates. In some embodiments, a user communication device stores data, such as, for example, health records or other personal user information. In some embodiments, this information is made accessible to emergency response personnel in emergency situations to enhance the emergency assistance provided to the user, for example, by enabling the identification of the most suitable first responder unit to call for responding to a request for emergency assistance for the user. In some embodiments, the most suitable first responder unit is determined by finding the first responder unit closest to the site of the accident (e.g. proximity in distance and/or in travel time), the first responder unit with training and/or equipment required to handle the emergency (e.g. victim is stuck in a car wreck, so first responder will need to have tools for effecting rescue, e.g., hydraulic rescue tools). In some embodiments, the systems, devices, and methods described herein provide EDCs with access to data, for example, location information cached on a user communication device of a user needing emergency assistance.

In some embodiments, a user's communication device belongs to a group of communication devices that maintains a cache of data for the user, wherein emergency personnel (e.g. EDC, EMS, first responders, etc.) are able to access the cache of data when the user communication device is unreachable and/or when the request for emergency assistance is received from a user communication device of a different user, wherein the devices in the group are associated with each other and able to share data (e.g. devices belong to family or friends of the user who are authorized to access and/or share data with other devices in the group).

In some embodiments, a communication device belongs to a group of devices, wherein member devices in the group of devices are authorized to share data. In some embodiments, some of the devices in the group are authorized to share data (e.g. not all the members are authorized to share data). In some embodiments, member devices are authorized to share data with each other. In some embodiments, member devices are authorized to share data with one or more recipients. In further embodiments, authorization to share data with one or more recipients is limited to emergency situations. For example, in some embodiments, a member device in a group of devices provides authorization to share or send data associated with the member device to a recipient when the recipient belongs to the group of devices. In some embodiments, a member device in a group of devices provides authorization to share or send data associated with the member device to a recipient when the recipient is an emergency service, an EMS, an EDC, a first responder, and/or a private security service. In some embodiments, a member device in a group of devices provides authorization to share or send data associated with the member device to a recipient when the recipient is a spouse, family member, close relative, distant relative, friend, and/or acquaintance. In some embodiments, authorization for a device to share data is set by a user of the device via a software module (e.g. an authorization module). In some embodiments, a user configures data sharing settings and/or data intake settings via a software module (e.g. a data settings module).

Alternatively, in some embodiments, a group of devices is not predefined by users of member devices. For example, a typical scenario is when a family decides to configure their data sharing settings to form a group and share data with each other. In these situations, users of the member devices already know one another and want to share data in order to anticipate possible future emergency situations in which data sharing allows them to monitor one another and to send out proxy requests for assistance as needed. However, in some instances, an emergency situation arises that involves otherwise unrelated users and/or user devices. For example, a large fire in a crowded office building gives rise to a large scale emergency involving many persons. In this scenario, individuals do not have time to predefine groups of devices for data sharing to facilitate the emergency response. Accordingly, in some embodiments, a group of devices forms ad hoc. In some embodiments, the ad hoc group of devices is formed when individual devices send out one or more requests for assistance that are in proximity with each other. In some embodiments, requests for assistance are determined to be in proximity based on one or more factors relevant to the proximity of the requests. In further embodiments, a factor is similarity of the requests for assistance. As an example, in some embodiments, a request for assistance comprises an emergency indication selected from, for example, a car accident, a medical emergency, a police emergency, a fire emergency, or any combination thereof. In this example, requests for assistance are determined to be proximate in emergency indication when they share the same emergency indication. In further embodiments, a factor is timing of the requests for assistance. As an example, in some embodiments, requests for assistance are determined to be proximate in time when they are sent (e.g. based on time stamp when packet(s) is sent) and/or received (e.g. by an EMS) within a time window of less than or equal to about 1, 2, 3, 4, 5, 6, 7, 8, 9, 10, 15, 20, 25, 30, 35, 40, 45, 50, 60, 70, 80, 90 or 100 seconds. In some embodiments, requests for assistance are determined to be proximate in time when they are sent and/or received within a time window of less than or equal to about 1, 2, 3, 4, 5, 6, 7, 8, 9, 10, 15, 20, 25, 30, 35, 40, 45, 50, 60, 70, 80, 90 or 100 minutes.

In some embodiments, once a group of devices is formed, data sharing allows member devices to keep track of one another. For example, in some embodiments, a communication device that is a member of a group of devices comprises a display showing the location of one or more member devices. In further embodiments, the display shows a map populated with one or more member devices (e.g. map has indicators showing location of each member device). In further embodiments, the display shows a map populated with the communication device. In further embodiments, the display comprises a button for centering the map on the location of the communication device. In further embodiments, the display allows the map to be centered on the communication device, one or more member devices, and/or a third party device (e.g. a device of a recipient such as a first responder). In some embodiments, the communication device indicates the distance (and, in some cases, an estimated time to intercept) between the communication device and one or more member devices.

Group Module

In some embodiments, a communication device comprises a software module for determining that the communication device belongs to a group of devices, wherein the group of devices comprises member devices that are authorized to share data with each other. In some embodiments, the software module is referred to as a group module. In some embodiments, the one or more functions of the group module are carried out by one or more other software modules described herein. In some embodiments, the group module receives authorization from a user of the communication device to share data with one or more member devices in a group of devices. In some embodiments, the group module receives authorization from a user of the communication device to join a group of devices. As an example, in some embodiments, a user accesses a user interface on his communication device to select one or more other devices (e.g. based on phone number, social media identifier, or other identifying information) and add them to a group, wherein the user agrees to share data with the selected devices. In further embodiments, the users of the selected devices also agree to share data with the user's communication device. For example, in one embodiment, the group comprises family members who want to keep track of each other's location during a trip to the zoo.

Data Sharing Module

In some embodiments, a communication device comprises a software module for sharing data (e.g. a data set) with one or more other devices. In some embodiments, the software module is referred to as a data sharing module. In some embodiments, the one or more functions of the data sharing module are carried out by one or more other software modules described herein. In some embodiments, the data sharing module shares data with one or more other devices, wherein the one or more other devices are member devices in a group of devices. In further embodiments, the communication device is a member device in the group.

In some embodiments, the data sharing module shares data with one or more member devices in the group of devices. In some embodiments, the data sharing module shares data with one or more member devices in the group of devices upon user request (e.g. by request of the user of the communication device). In some embodiments, the data sharing module shares data with one or more member devices in the group of devices upon receiving a request to share data from the one or more member devices. For example, in some embodiments, the communication device receives a request to share location data from a member device. In some embodiments, the data sharing module shares data periodically. In some embodiments, data is shared periodically at an interval of about every 1, 2, 3, 4, 5, 6, 7, 8, 9, 10, 15, 20, 25, 30, 35, 40, 45, 50, 60, 70, 80, 90 or 100 seconds. In some embodiments, data is shared periodically at an interval of about 1, 2, 3, 4, 5, 6, 7, 8, 9, 10, 15, 20, 25, 30, 35, 40, 45, 50, 60, 70, 80, 90 or 100 minutes. In some embodiments, data is shared periodically at an interval of about every 1, 2, 3, 4, 5, 6, 7, 8, 9, 10, 15, 20, 21, 22, 23, or 24 hours. In some embodiments, data is shared at least once every 1, 2, 3, 4, 5, 6, 7, 8, 9, 10, 15, 20, 25, 30, 35, 40, 45, 50, 60, 70, 80, 90 or 100 seconds. In some embodiments, data is shared at least once every 1, 2, 3, 4, 5, 6, 7, 8, 9, 10, 15, 20, 25, 30, 35, 40, 45, 50, 60, 70, 80, 90 or 100 minutes. In some embodiments, data is shared at least once every 1, 2, 3, 4, 5, 6, 7, 8, 9, 10, 15, 20, 21, 22, 23, or 24 hours. In some embodiments, the data sharing module shares data aperiodically (e.g. not at regular intervals). In some embodiments, the data sharing module shares data continuously (e.g. constantly at short intervals such as, for example, every 1-5 seconds). In some embodiments, the data sharing module shares data with a member device indirectly. For example, in some embodiments, data associated with a communication device is stored on other member devices in the group of devices and/or on one or more external databases (e.g. on a network). Accordingly, the data sharing module is able to store or send data on the other member devices or the external databases. This is useful in situations when the communication device becomes unresponsive and/or has not authorized the member device to obtain data directly. In some embodiments, the data sharing module comprises settings configurable by a user to determine what data is shared (e.g. location data, user data, sensor data, or any combination of data), how the data is shared (e.g. directly with the member device, indirectly via another member device, via a cache database storing data for the group of devices, via an EMS, etc), and how often the data is shared (e.g. every X minutes or hours, or whenever the current location data changes).

In some embodiments, the data sharing module provides a status update in response to a status update request from a member device. In some embodiments, the status update request is received from the member device after a triggering event. For example, in some embodiments, a triggering event occurs when the member device receives user input requesting a status update from the communication device (e.g. the user of the member device has not received a status update from the communication device for some time and is worried, and so sends a status update request). In some embodiments, a triggering event occurs when the member device determines and/or confirms an emergency situation exists (e.g. determination/confirmation is made by an alert module as described herein). In some embodiments, the data sharing module automatically provides a status update in response to a status update request. In other embodiments, the data sharing module prompts a user of the communication device to confirm the status update before providing the status update to the member device that sent the status update request.

Data Intake Module

In some embodiments, a communication device comprises a software module for obtaining data associated with a member device in a group of devices and using the data to update a data set associated with the member device. In some embodiments, the software module is referred to as a data intake module. In some embodiments, the one or more functions of the data intake module are carried out by one or more other software modules described herein. In some embodiments, the data intake module autonomously obtains data from one or more member devices in the group of devices. In some embodiments, the data intake module obtains data from one or more member devices in the group of devices upon user request (e.g. by request of the user of the communication device). In some embodiments, the data intake module obtains data periodically. In some embodiments, the data intake module obtains data aperiodically (e.g. not at regular intervals). In some embodiments, the data intake module obtains data continuously (e.g. constantly at short intervals such as, for example, every 5 seconds). In some embodiments, the data intake module obtains data associated with a member device indirectly. For example, in some embodiments, data associated with a member device is stored on other member devices in the group of devices and/or on one or more external databases (e.g. on a network). Accordingly, the data intake module is able to obtain data from the other member devices or the external databases. This is useful in situations when the member device is unresponsive and/or has not authorized the communication device to obtain data directly. In some embodiments, the data intake module comprises settings configurable by a user to determine what data is obtained (e.g. location data, user data, sensor data, or any combination of data), how the data is obtained (e.g. directly from the member device, indirectly from another member device, from a cache database storing data for the group of devices, from an EMS, etc), and how often the data is obtained (e.g. every X minutes or hours, or whenever the current location data changes). In some embodiments, the data intake module obtains data (e.g. a data set) comprising one or more categories of data. In some embodiments, data is selected from location data, health data, user data, sensor data, and any combination thereof.

In some embodiments, the data intake module requests a status update from the member device upon a triggering event (e.g. after a triggering event has occurred). In some embodiments, the triggering event occurs when the device receives user input requesting a status update from the member device (e.g. the user of the communication device has not received a status update from the member device for some time and is worried, and so sends a status update request). In some embodiments, a triggering event occurs when the device determines and/or confirms an emergency situation to exist (e.g. determination/confirmation is made by an alert module as described herein). For example, various ways in which an emergency situation is determined and/or confirmed are described at least in the alert module section and elsewhere throughout the specification and figures.

In some embodiments, the data intake module of a communication device requests a status update from a member device. In some embodiments, the status update request is sent to the member device after a triggering event. For example, in some embodiments, a triggering event occurs when the communication device receives user input requesting a status update from the member device. In some embodiments, a triggering event occurs when the communication device determines and/or confirms an emergency situation to exist involving the member device and/or its user (e.g. determination/confirmation is made by an alert module as described herein). In some embodiments, the data intake module automatically requests a status update in response to the triggering event. In other embodiments, the data intake module prompts a user of the communication device to confirm the status update request before sending the status update request to the member device.

Alert Module

In some embodiments, a communication device comprises a software module for determining the existence of an emergency situation relating to a member device belonging to a group of devices. In further embodiments, the software module is an alert module. In some embodiments, the one or more functions of the alert module are carried out by one or more other software modules described herein. In some embodiments, the alert module determines that a member device (or a user associated with the member device) is in an emergency situation. In some embodiments, the alert module determines that the communication device (or a user associated with the community device) is in an emergency situation. In some embodiments, the alert module determines a device (or user thereof) is in an emergency situation using data (e.g. a data set) associated with the device. In further embodiments, the data is selected from one or more of the group consisting of: location data, sensor data, health data, and user data. In further embodiments, the data comprises current data. For example, in some embodiments, the alert module determines a device (e.g. user communication device, communication device, member device, second device, device of another user, etc.) is in an emergency situation using sensor data from a wearable heart rate monitor associated with a user of the device. In further embodiments, the device analyzes the sensor data and determines the user is experiencing cardiac arrhythmia (e.g. heartbeat is too fast, too slow, or irregular). In some embodiments, the sensor data is compared to a baseline reference (either a generic baseline or a baseline established using historical sensor data for the particular user) to determine if the sensor data is deviating significantly from the baseline reference (e.g. using statistical measures known in the art to test statistical significance of the deviation). As another example, in some embodiments, the alert module determines a device is in an emergency situation using sensor data showing the user of the device is experiencing hypothermia (e.g. core body temperature has dropped below a threshold skin or core temperature such as, for example, 98, 97, 96, 95, 94, 93, 92, 91, or 90 degrees Fahrenheit). In some embodiments, sensor or data thresholds for determining an emergency situation is predefined (e.g. by a user, an EMS, or by the device manufacturer). In some embodiments, sensor or data thresholds for determining an emergency situation is user configurable (e.g. user can adjust settings to set thresholds). In some embodiments, the alert module determines a device is in an emergency situation using location data. In some embodiments, the alert module determines a device is in an emergency situation using location data to determine that a user of the device has traveled into a dangerous area (e.g. within a zone of danger such as, for example, an area subject to a current tornado warning). In further embodiments, the alert module obtains information about a dangerous area from an emergency service (e.g. EMS, EDC, first responder, private security, etc). In yet further embodiments, the information about a dangerous area is sent to the alert module via push notification. In some embodiments, the dangerous area comprises an area subject to a weather warning (e.g. tornado, hurricane, snow, sleet, hail, thunderstorm, etc), an earthquake warning, a wildfire warning, a heat warning, a UV index warning, an accident, tide alert (e.g. rip tide), animal warning (e.g. wild animal attack, dangerous animal(s) present/spotted/escaped, diseased animal(s), etc), or any other dangerous condition. In some embodiments, the dangerous area refers to a zone of danger.

In some embodiments, the alert module determines a device is in an emergency situation when a user of the device has failed to check-in and/or provide a status update for a specified period of time and/or for a specified number of times. For example, in some embodiments, the alert module determines a user of a device is in an emergency situation when the user has failed to provide a status update for at least 1, 2, 3, 4, 5, 6, 7, 8, 9, 10, 15, 20, 30, 40, 50, or 60 minutes, at least 1, 2, 3, 4, 5, 6, 7, 8, 9, 10, 11, 12, 13, 14, 15, 16, 17, 18, 19, 20, 21, 22, 23, or 24 hours, or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days. In some embodiments, the alert module determines a user of a device is in an emergency situation when the user has failed to provide a status update at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 times (e.g. user has failed to provide status updates when given an opportunity to do so for a threshold number of times). In some embodiments, the alert module determines a user of a device is in an emergency situation when the user has failed to provide a status update at least 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 times during a time period of no more than 10, 20, 30, 40, 50, or 60 minutes, or 1, 2, 3, 4, 5, 6, 7, 8, 9, 10, 11, 12, 13, 14, 15, 16, 17, 18, 19, 20, 21, 22, 23, or 24 hours, or 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days (e.g. user has failed to provide status updates for a threshold number of times within a defined time period). In some embodiments, the alert module requires periodic status updates. In some embodiments, the alert module requires aperiodic status updates. In some embodiments, the alert module requires a status update based on a request for a status update received from another device (or user of another device). For example, in some embodiments, the alert module of the communication device receives a request for a status update from a user of a member device in the group of devices. In some embodiments, the alert module determines the device is in an emergency situation when a member device has failed to provide a status update in response to a status update request for at least 1, 2, 3, 4, 5, 6, 7, 8, 9, 10, 15, 20, 30, 40, 50, or 60 minutes, or at least 1, 2, 3, 4, 5, 6, 7, 8, 9, 10, 11, 12, 13, 14, 15, 16, 17, 18, 19, 20, 21, 22, 23, or 24 hours. In some embodiments, a status update comprises data associated with the device providing the status update. In some embodiments, a status update comprises a data set associated with the device providing the status update. In some embodiments, a status update comprises a confirmation by a user of the device that the user is okay (e.g. not in an emergency). As an example, in one embodiment, the user of the device (e.g. member device that is allegedly in an emergency) presses a soft button/icon on an interface display (e.g. touchscreen) of the device indicating he/she is okay. In this example, in one embodiment, the user provides the status update independently. Alternatively, in another embodiment, the user provides the status update in response to a status update request by another member device in the group of devices. In some embodiments, the alert module determines the emergency situation exists when the device has not received at least a threshold number of periodic pings from the member device in a defined time period (e.g. user communication device determines member device is in emergency because member device has failed to send periodic pings for 30 minutes). In some embodiments, a ping is part of a status update. In some embodiments, a ping does not comprise additional information normally found in a status update.

In some embodiments, the alert module autonomously determines and/or confirms the member device is in an emergency situation (e.g. without requiring user input). In further embodiments, the alert module determines and/or confirms the emergency situation by detecting a request for assistance sent by the member device (e.g. member device has already sent request for assistance, so the alert module notifies the user of the communication device of the ongoing emergency situation). In yet further embodiments, the alert module provides an alert to the user of the communication device informing the user of the emergency situation associated with the member device in the group of devices. In further embodiments, the alert module determines and/or confirms the emergency situation by detecting a request for assistance sent on behalf of the member device (e.g. another device in the group sent a request on behalf of the member device, so the alert module notifies the user of the communication device of the ongoing emergency situation). In some embodiments, the alert module determines and/or confirms the emergency situation (associated with the member device) by detecting the member device is part of an emergency communication session (e.g. member device is engaged in ongoing emergency communication session). In some embodiments, the alert module determines and/or confirms the emergency situation by verifying the emergency situation with the group of devices (e.g. with one or more member devices in the group). In further embodiments, the alert module verifies the emergency situation with all the member devices in the group of devices. In alternative embodiments, the alert module verifies the emergency situation with less than all the member devices in the group of devices (e.g. when one or more member devices are unavailable). In some embodiments, the alert module confirms the emergency situation by polling the group of devices to verify the member device has failed to provide a status update (e.g. within a defined time period) before providing an alert to the user of the communication device. In some embodiments, the alert module holds a vote by member devices in the group of devices to confirm the emergency situation (e.g. members in group vote to decide if there is really an emergency for the particular member device). In further embodiments, the communication device casts a first vote. In yet further embodiments, the remaining member devices in the group of devices hold a general vote if the first vote indicates the emergency situation exists. In still yet further embodiments, each vote is given equal weighting (e.g. each vote has the same value/weight as every other vote). In still yet further embodiments, the vote comprises weighted voting. For example, in some embodiments, the communication device casting the first vote (e.g. first user/device to claim an emergency situation exists for the member device) is given more weight in the vote than a single vote. As an example, in some embodiments, when the vote is to determine and/or confirm an emergency situation for a user and/or the user's member device, the vote by a spouse of the user is given more weight than a single vote. As another example, in some embodiments, when the vote is to determine and/or confirm an emergency situation for a user and/or the user's member device, the vote by a close relative (e.g. parent, child, or sibling) of the user is given more weight than a single vote. As an example, in some embodiments, when the vote is to determine and/or confirm an emergency situation for a user and/or the user's member device, the vote by a distant relative (e.g. aunt, uncle, nephew, niece, cousin, grandparents, grandchildren, etc) of the user is given more weight than a single vote. As an example, in some embodiments, when the vote is to determine and/or confirm an emergency situation for a user and/or the user's member device, the vote by a friend of the user is given more weight than a single vote. In some embodiments, the votes are weighted according to the relationship between the voter and the user for whom the emergency situation is being voted on. For example, in some embodiments, a vote by a spouse is given more weight than a vote by a close relative, which is given more weight than a vote by a distant relative and/or a vote by a friend. In some embodiments, one or more member devices in the group are not authorized by the member device (that is allegedly in an emergency) to vote. In some embodiments, the member devices in the group require authorization by the member device (that is allegedly in an emergency) to vote. In some embodiments, the device that casts the first vote acts as the tie-breaker in case of a tie vote (e.g. the first vote breaks the tie). In some embodiments, a vote that is given more weight counts as 2, 3, 4, 5, 6, 7, 8, 9, or 10 or more votes. In some embodiments, the vote comprises fulcrum voting.

In some embodiments, the emergency situation is ranked in one or more tiers corresponding to the level of danger. For example, in one embodiment, emergency situations are ranked in two tiers: a first tier and a second tier. In this example, the first tier corresponds to emergency situations that do not require assistance, wherein the alert module provides an alert regarding the emergency situation. In this example, the second tier corresponds to emergency situations that do require assistance, wherein the alert module prompts the user to request assistance or sends the request for assistance automatically. In some embodiments, the alert module provides an alert to the user regarding the emergency situation. In further embodiments, the alert module prompts the user to decide to send a request for assistance. In further embodiments, the alert module provides the user with an option to send a request for assistance. In further embodiments, the alert module allows the user to send a request for assistance after receiving the alert. In some embodiments, the alert module must confirm the emergency situation before providing an alert to the user and/or sending a request for assistance. In some embodiments, the alert module confirms the emergency situation after determining the existence of the emergency situation (e.g. alert module calculates emergency situation exists, but has to confirm, for example, with other devices or users, or obtain additional data such as sensor data from surrounding sensors). In some embodiments, an alert comprises a message informing a user of the device about the emergency situation. In some embodiments, the alert comprises information on the emergency situation (e.g. statistical likelihood of emergency, a broadcasted warning from a government agency regarding the emergency, data relevant to the emergency such as, for example, heart monitor data for a medical emergency, etc). In some embodiments, the alert comprises summarized information containing the most relevant information condensed from raw data and/or information. For example, in one embodiment, the alert for a medical emergency based on sensor data from a heart monitor showing heart arrhythmic comprises summarized information indicating the user appears to be experiencing heart arrhythmia in the form of an irregular heartbeat based on sensor readings from the past 5 minutes (does not show the raw sensor readings, but in some embodiments, provides a representative sensor reading). In some embodiments, the alert module determines an emergency situation exists by analyzing the data. In further embodiments, the data is a data set comprising current data associated with the device. In some embodiments, after the emergency situation is determined and/or confirmed to exist, the communication device sends a request for assistance to a recipient on behalf of a user of the member device. In further embodiments, the communication device provides a data set associated with the member device to the recipient.

Communication Module

In some embodiments, a communication device comprises a communication module for sending a request for assistance to a recipient. In some embodiments, the one or more functions of the communication module are carried out by one or more other software modules described herein. In some embodiments, the communication module sends a request for assistance to a recipient on behalf of a second device (or a user thereof). In some embodiments, the communication module sends a request for assistance to a recipient on behalf of a member device (or a user thereof) belonging to a group of devices, wherein member devices in the group are authorized to share data. The function of the communication module in sending a request for assistance on behalf of a second device is the same as when sending a request for assistance on behalf of a member device belonging to a group of devices. In both scenarios, the communication module is sending a request for assistance on behalf of a device other than itself. In further embodiments, the communication module sends a request for assistance to a recipient on behalf of a user of a member device belonging to a group of devices. The need for proxy calling (or sending a proxy request) arises when a second device and/or user of the device is unable to send a request for assistance to a recipient. For example, in some instances, the user is incapacitated, injured, in shock, has misplaced or lost his/her device, or is otherwise unable to send a request for assistance. In other instances, the user is unaware of the emergency situation (e.g. user has hiked into an area subject to a flash flood without realizing the danger). As another example, in some instances, the device is damaged or destroyed, out of power, out of range of a communication network (e.g. cellular, Wi-Fi, Bluetooth, etc), or otherwise unable to send a request for assistance. Therefore, a communication device comprising a communication module for sending a request for assistance to a recipient on behalf of a user of a second device (or, alternatively, a member device belonging to a group of devices) enables a user of the communication device to obtain help for the user of the second device. In some embodiments, the communication module provides a data set associated with the second device to the recipient. In further embodiments, the communication module provides the data set by sending the data set to the recipient. In further embodiments, the communication module provides the data set by updating a database accessed by the recipient (e.g. inserting a location associated with the member device phone number into an automatic lookup identification database used by EDCs to look up location information for emergency calls). In further embodiments, the communication module provides the data set by authorizing the recipient to retrieve the data set from the group of devices (e.g. data set is stored collectively amongst the group, stored by one or more devices in the group, or stored on a database external to the group). In further embodiments, the second device is authorized to share data with an emergency service (e.g. an EMS or EDC) during an emergency situation. As an example, in one embodiment, the second device is authorized (e.g. its user configured its data sharing settings) to share data with an EMS and/or EDC when the second device is involved in an emergency situation, for example, when the second device has sent a request for assistance and/or a proxy request for assistance has been placed on its behalf. In some embodiments, when the communication device and the second device both belong to a group of devices (e.g. both are member devices authorized to share data), the communication device authorizes a recipient of a request for assistance sent on behalf of the second device to retrieve the data set for the second device stored on a database associated with the group of devices.

In some embodiments, the communication device comprises a communication module for sending a request for assistance to a recipient on behalf of a user of a member device belonging to a group of devices, wherein the user is also a user of the communication device. For example, in some embodiments, a user sets up a group of devices all belonging to him (e.g. a home temperature sensor connected to a home Wi-Fi network router that is linked to the Internet, a wearable device communicating with his communication device over Bluetooth, and a home fire alarm also connected to the home Wi-Fi network router). In this example, the user has adjusted data sharing settings for all the member devices in the group to periodically share data with his communication device. In addition, the data sharing settings are set so that the fire alarm sends his communication device an alert if it detects a fire. In this example, the user has left the stove on, which starts a small fire. The fire sets off the fire alarm, which immediately sends an alert to the user's communication device. The user then immediately sends a request for assistance to a recipient (in this case, the fire department). Next, the communication module sends the request and provides a data set associated with the fire alarm. In this example, the data set comprises current information (data) relevant to the fire emergency, wherein the data set comprises an address location associated with the fire alarm, sensor readings from the home temperature sensor, identifying information of the user, and a location of the user based on his communication device. In some embodiments, the request comprises an emergency indication (e.g. a fire emergency in this example). In some embodiments, the request comprises a data set associated with the member device. In some embodiments, the request comprises a data set associated with an emergency situation involving the member device. In some embodiments the data set is not provided as part of the request for assistance. In some embodiments, the request for assistance and the data set are provided as separate communications (e.g. request is sent in one set of one or more communications, and the data set is provided as another set of one or more communications). For example, in one embodiment, the communication module sends the request for assistance to a recipient, and then provides the data set in response to receiving a data request from the recipient.

In some embodiments, the communication module sends a request to establish a covert communication session for the member device. In some instances, a user of the member device is in a dangerous situation and does not wish to draw attention to himself (e.g. the user is being mugged and does not want the phone to ring, buzz, or for its display to light up). Accordingly, in some embodiments, the covert communication session enables covert communications between the member device with the recipient, wherein the member device sends and receives data and/or communications while appearing to be inactive. As an example, in some embodiments, the member device appears to be inactive during active communications, wherein a display of the device is powered off (or, alternatively, does not light up or brighten) when communications are sent and/or received. In some embodiments, the phone appears to be inactive by making no sounds or vibrations when communications are sent and/or received.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g. data set) from the communication device into a format suitable for the EDC (e.g. analog or digital, audio, SMS, data, etc) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g. information that the user of member device who is experiencing a medical emergency suffers from diabetes). Accordingly, in some embodiments, the information is sent autonomously, at request of a user of the communication device, or at request of the recipient (e.g. EMS, EDC, first responder, etc).

In some embodiments, the communication device identifies a recipient as responsible for the jurisdiction where the second device is located using the data set associated with the second device. This is useful in situations when the communication device and the second device are located in different geographical areas. A recipient needs to be sufficiently close to the geographical location of the communication device in order to render timely assistance regarding an emergency situation involving the second device and/or its user. Normally, a recipient such as an EDC is identified as being responsible for the jurisdiction where the calling device is located (e.g. based on a nearby cell tower through which the call is routed). This process is inadequate when the caller is contacting the EDC on behalf of someone else in a different location. Therefore, in some embodiments, the communication device (e.g. a software module of the device) identifies a recipient who is responsible for the jurisdiction where the second device is located. In further embodiments, the communication device identifies the recipient using the data set associated with the second device, wherein the data set comprises location data. In some embodiments, location data comprises one or more of GPS coordinates, Wi-Fi beacon triangulation coordinates, cell tower triangulation coordinates, Bluetooth triangulation coordinates, wireless access point triangulation, location of nearby beacons, X/Y/Z coordinates, altitude, barometric pressure, an address based on coordinate and other location information, and other location determination methods. In some embodiments, location determination methods include one or more of received signal strength indication (RSSI), fingerprinting, angle of arrival, and time of flight to calculate location of a device using triangulation and/or trilateration. In some embodiments, location data comprises a predicted accuracy of the determined location (address and/or coordinates). For example, in some embodiments, location data comprises a radius around the determined location having at least an accuracy within 0.1, 0.5, 1, 2, 3, 4, 5, 6, 7, 8, 9, 10, 11, 12, 13, 14, 15, 16, 17, 18, 19, 20, 30, 40, 50, 60, 70, 80, 90, or 100 meters of the determined location (e.g. coordinates and/or address).

Emergency Communication Module

In some embodiments, an emergency management system comprises a server software application for managing emergency communication sessions. In some embodiments, the application comprises one or more software modules for receiving and/or processing proxy requests for assistance. In some embodiments, a software module for receiving and/or processing proxy requests for assistance is called a proxy detection module. In some embodiments, the one or more functions of the proxy detection module are carried out by one or more other software modules described herein. In some embodiments, a proxy detection module receives a request for assistance from a communication device, wherein the request is associated with a second device. In further embodiments, the second device is a member device in a group of devices. In yet further embodiments, the both the second device and the communication device sending the request for assistance on behalf of the second device belong to the same group of devices, wherein one or more member devices in the group are authorized to share data. In some embodiments, the proxy detection module determines that the communication device is authorized to send the request for assistance on behalf of the second device (or member device). In some embodiments, the proxy detection module obtains a data set associated with the second device (or member device). Obtaining a data set comprises one or more steps as described elsewhere in this specification.

In some embodiments, an emergency management system comprises a server software application comprising a software module for establishing a communication session between a communication device and a recipient of a request for assistance. In some embodiments, the software module is referred to as an emergency communication module. It is understood that one or more functions of the emergency communication module is capable of being performed by one or more other software modules described herein. In some embodiments, the communication session includes a communication device sending a request for assistance on behalf of a second device (or a member device) and a recipient. In some embodiments, the communication session includes the second device and a recipient. In some embodiments, the communication session includes the communication device, the second device, and the recipient. In some embodiments, the emergency communication module sends the request for assistance to a recipient (e.g. an EDC, PSAP, first responder, private security service, friend or relative, etc.). In further embodiments, the emergency communication module provides the data set associated with the second device (or member device) to the recipient. For example, when the second device is in a different geographic location from the communication device sending the request for assistance on its behalf, EDCs typically only receive location information pertaining to the calling device. By providing the data set (in this case, comprising location information) associated with the second device, the emergency communication module is ensuring that the EDC sends a first responder to the appropriate location rather than to the location of the communication device. In some embodiments, the emergency communication module uses the data set associated with the second device (or member device) to identify an EDC serving the jurisdiction where the second device is located prior to contacting the EDC. For example, in some embodiments, the EMS receives the request for assistance, determines it is a proxy request, obtains the data set for the second device, identifies an EDC based on the data set, and then sends the request to the EDC while also providing the data set to the EDC. In further embodiments, the data set comprises additional information relevant and/or useful to facilitating the emergency response (e.g. medical data relevant to a medical emergency).

In some embodiments, an emergency communication module establishes a communication session that includes a communication device of a first responder. In some embodiments, the emergency communication module establishes a first data channel with a communication device sending a request for assistance (or when request for assistance was made on behalf of the communication device), and a second data channel with a communication device of a first responder. In further embodiments, the emergency communication module bridges the first and second data channels to enable communication between the devices. In some embodiments, the first responder is able to send messages and/or data to the communication device of the user (e.g. indicating help is on the way, an ETA of the first responder, self-help information, location of the first responder, etc.). In some embodiments, the communication device of the user is able to send messages and/or data to the first responder (e.g. asking an estimated ETA of the first responder, question on self-help, location of the user, etc.). In some embodiments, the EMS screens the information sent between the devices before allowing them to be routed to their destination. In some embodiments, the EMS routes the information between devices without screening the information (e.g. when user communication device is recognized by EDCs and/or first responders as being trustworthy). In some embodiments, a user communication device is authorized to communicate with a first responder, wherein the user is a first responder, a government agent, emergency response personnel, or a government official. In some embodiments, the emergency communication module establishes a first data channel with a communication device sending a request for assistance (or when request for assistance was made on behalf of the communication device), a second data channel with a communication device of a first responder, and a third data channel between the communication device sending the request for assistance and the communication device of the first responder, wherein the third data channel is a direct data channel. In some embodiments, the third data channel is established when the EMS determines that the communication device sending a request for assistance is authorized to communicate directly with the communication device of the first responder. In some embodiments, an EMS, EDC, and/or communication device of a first responder accesses a database comprising a list of devices authorized to communicate with a first responder in deciding whether to establish the third data channel.

Emergency Management Module

In some embodiments, an emergency management system comprises a server software application comprising a software module for managing an emergency communication session. In some embodiments, the software module for managing an emergency communication session is referred to as an emergency management module. In some embodiments, one or more functions of the emergency management module are carried out by one or more other software modules disclosed herein. In some embodiments, the emergency management module manages an emergency communication session comprising communications between a communication device requesting assistance (or a device associated with the request for assistance such as, for example, a second or member device) and a communication device of a first responder. In some embodiments, the emergency management module receives a request for assistance associated with a communication device. In further embodiments, the emergency management module locates a communication device of a first responder assigned to the request for assistance or emergency (or about to be assigned). In some embodiments, the emergency management module connects with an EDC or PSAP responsible for assigning a first responder to the emergency and requests identifying information about a communication device of the first responder or contact information of the first responder (e.g. phone number, vehicle console, and/or vehicle radio frequency). In some embodiments, the emergency management module provides the contact information of the first responder to the emergency communication module for establishing communications between the communication device associated with the emergency and the communication device of the first responder.

Additional Software Modules

In some embodiments, an EMS comprises a session data module storing session data comprising information received during an emergency communication session. In further embodiments, the information received during the emergency session comprises user information, emergency indication, location information, user health history, user login, sensor information, photo(s), video(s), text message(s), audio message(s), or any combination thereof.

In some embodiments, a communication device comprises a software module for receiving user input. In some embodiments, the software module for receiving user input is referred to as a user input module. In some embodiments, one or more functions of the user input module are carried out by one or more other software modules described herein. In some embodiments, the user input module receives an indication to send a request for assistance to a recipient. In some embodiments, the indication comprises an emergency indication (e.g. traffic accident, medical emergency, police emergency, and/or fire emergency). In some embodiments, the indication is for a proxy request for assistance associated with a second device (or member device in a group of devices).

DETAILED FIGURE DESCRIPTIONS

FIG. 1A shows a schematic diagram of one embodiment of a device described herein. In some embodiments, the device 106 is an electronic device such as a communication device (e.g. mobile or cellular phone, computer, laptop, etc.). In some embodiments, a communication device is a wearable device. In some embodiments, a communication device is a wireless mobile device or a smart phone. In some embodiments, a communication device is a walkie-talkie or a two-way radio. In some embodiments, a user 100 (not shown) is selected from one or more persons who are the primary users of the device 106.

In some embodiments, the device 106 comprises at least one processor 104, a memory 106 (e.g. an EPROM memory, a RAM, a solid-state memory), a display 102, a user interface 112, a network component 114 (e.g. an antenna and associated components, Wi-Fi adapters, Bluetooth® adapters, etc.) and a computer program 108 (e.g. mobile application, server application, computer program, application). In some embodiments, the device is equipped with a location component 116, for example, a global positioning system (GPS). In some embodiments, the device comprises data storage 115. In further embodiments, the device comprises a location cache 117.

In some embodiments, the device 106 has several components including a display 102 and user interface 112, which allow the user 100 to interact with the device 106. In some embodiments, the display 102 is a part of the user interface 112 (e.g. a touchscreen is both a display and provides an interface to accept user interactions). In some embodiments, the display 102 and/or the user interface 112 comprises a touch screen (e.g. a capacitive touch screen), which is capable of displaying information and receiving user input. In some embodiments, the device 106 comprises hardware components not including a display 102 and a user interface 112, wherein the device functions autonomously without requiring active user guidance or interaction.

In some embodiments, a device 106 includes various accessories 122 that allow additional functionality. In some embodiments, the accessories 122 include one or more of the following: microphone (e.g. for user voice interaction), a camera (e.g. for input of gestures commands or pictures from the user 100), speakers, one or more sensors such as a fingerprint reader or scanner, USB/micro-USB port, headphone jack, a card reader, SIM card slot, Bluetooth button, and any combination thereof.

FIG. 1A also shows a schematic diagram of one embodiment of an emergency management system 130 as described herein. In some embodiments, the emergency management system 130 comprises one or more of an operating system 132, at least one central processing unit or processor 134, a memory unit 136, a communication element 138, and a software application 148 (e.g. server application). In some embodiments, the emergency management system 130 comprises one or more databases 135. In some embodiments, the emergency management system 130 comprises a location cache 137.

Figure 1B:
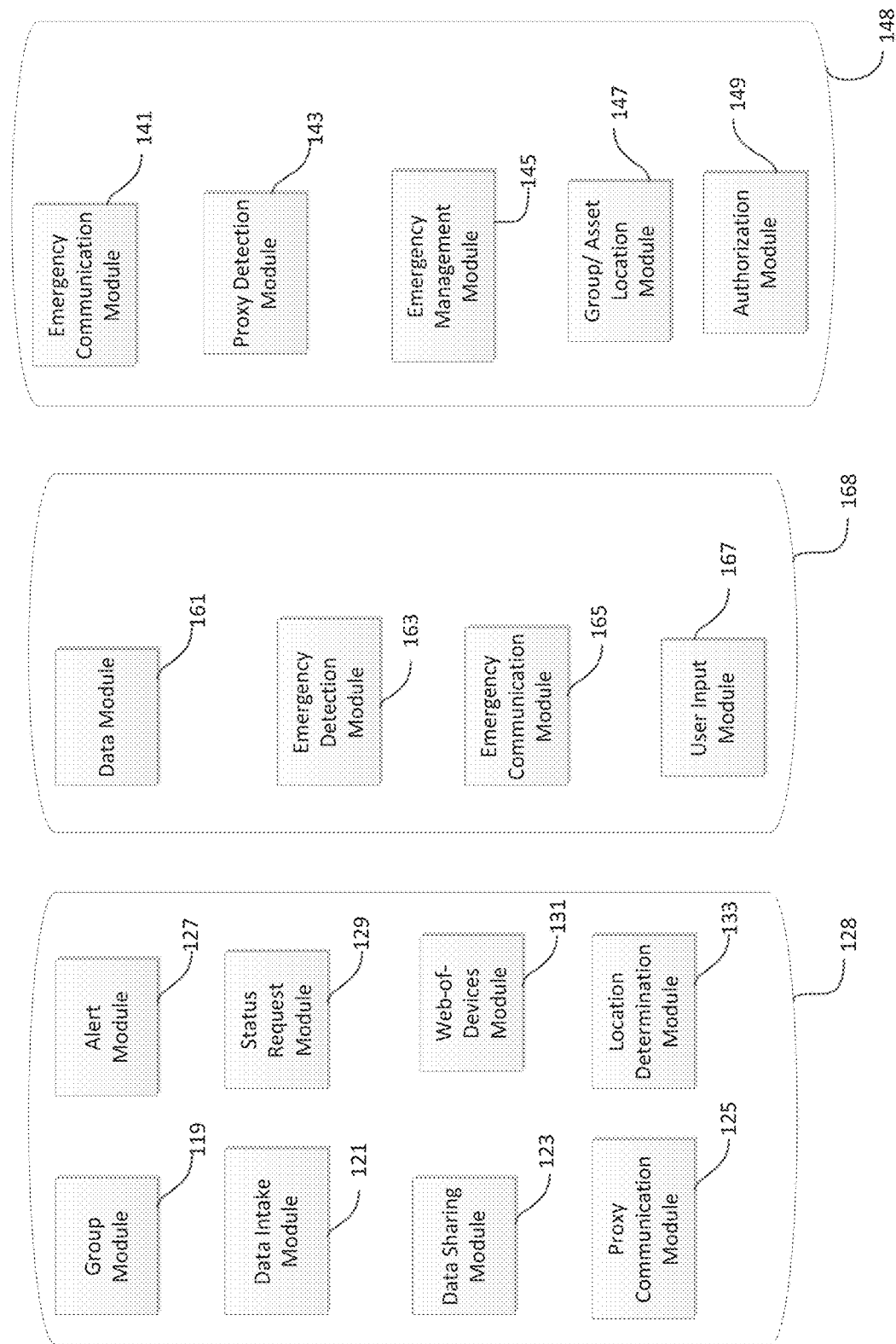

FIG. 1B shows a schematic diagram of one embodiment of a software application 128 installed on a device. In some embodiments, the software application 128 comprises one or more device software modules selected from a group module 119, a data intake module 121, a data sharing module 123, a proxy communication module 125, an alert module 127, a status request module 129, a web of devices module 131, a location determination module 133, or any combination thereof. In some embodiments, the software application 168 comprises one or more device software modules selected from a data module 161, an emergency detection module 163, a communication module 165, a user input module 167, or any combination thereof.

FIG. 1B also shows a schematic diagram of one embodiment of a server application 148 installed on a server (e.g. a server in an EMS). In some embodiments, the server application 148 comprises one or more server software modules selected from an emergency communication module 141, a proxy detection module 143, an emergency management module 145, a group/asset location module 149, an authorization module 149, or any combination thereof.

Figure 2:
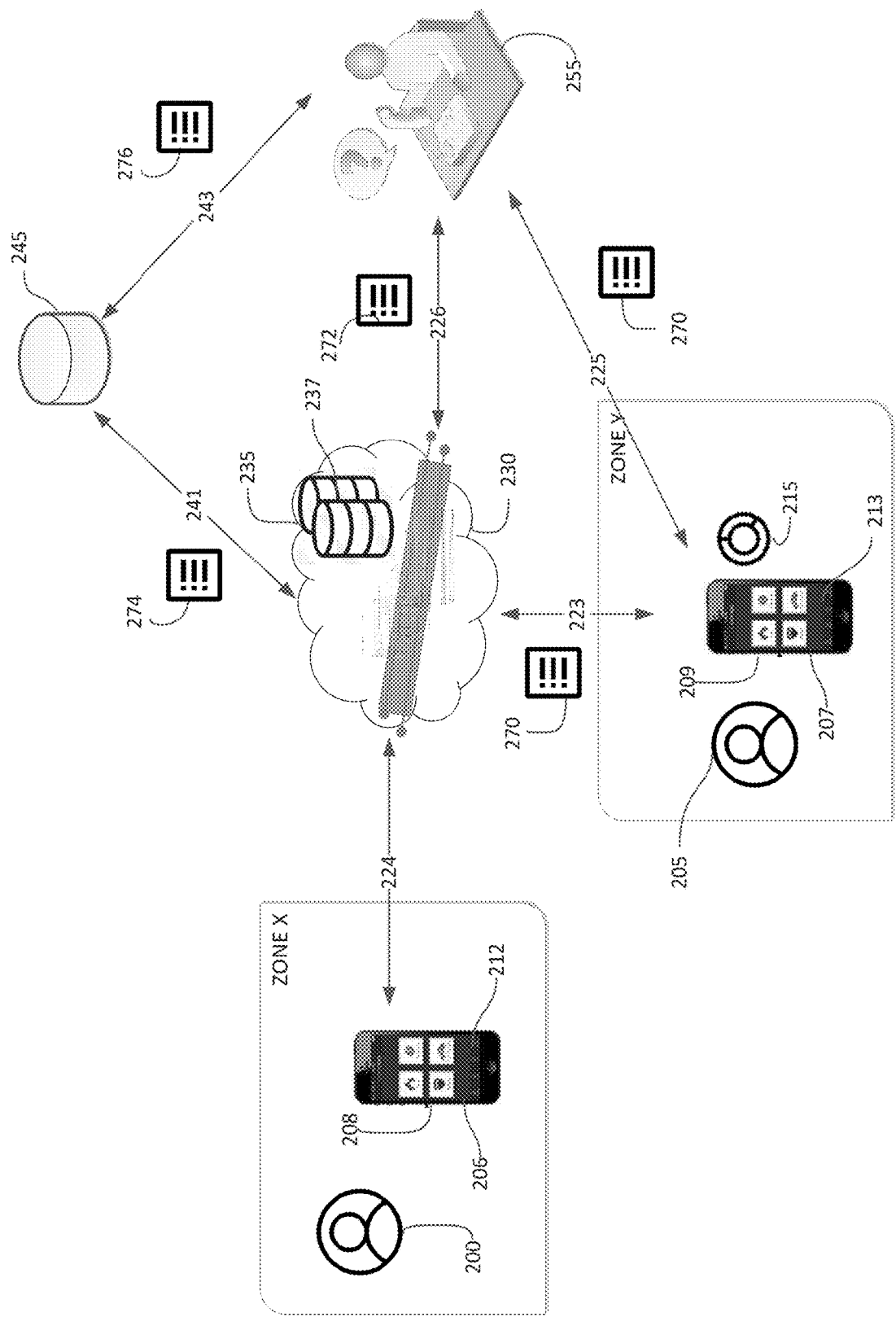
FIG. 2 illustrates an embodiment of a system, including devices and an emergency management system, for sending a request for assistance on behalf of another person.

FIG. 2 illustrates an embodiment of proxy calling where a user 200 of a first communication device 206 sends an emergency alert on behalf of a second device 207 (or a user thereof 205). In some embodiments, a second device 207 is a member device in a group of devices, wherein member devices in the group are authorized to share data. In some embodiments, a user 200 of a communication device 206 initiates the process to send a request for assistance to an EDC 255 on behalf of a user 205 of the second device 207. In some embodiments, the user 205 has authorized the second device 207 to share his or her location with the user 200. In some embodiments, user 200 and 205 are in a group of family and/or friends who have joined their devices to a group of devices and authorized sharing their location data with each other.

In some embodiments, the communication device 206 includes a computer program 208, such as, for example, a software application as shown in FIG. 1B. In some embodiments, a user 200 interacts with the communication device 206 using the user interface 212 (e.g. soft keys on a touch screen, press or tap buttons on the front or sides of the device 206). In some embodiments, user 200 and device 206 are located in "zone X", which is a geographical area that is within the jurisdiction of an EDC 250 (not shown), such as a Public Safety Answering Point (PSAP). In some embodiments, the zone is an Emergency Service Zone (ESZ).

Historically, a request for emergency assistance sent from zone X by the user 200 with his communication device 206 is routed to EDC 250, which then sends first responders to a location (often inaccurate) of the communication device 206. The present disclosure describes "proxy calling", which, in some embodiments, allows a user 200 to initiate a request for emergency assistance on behalf of another user 205. As shown, in some embodiments, user 205 is located in "zone Y", which is within the jurisdiction of another EDC 255 that is different from the EDC 250 serving the jurisdiction of In other embodiments, both users 200 and 205 are located within the same zone within the jurisdiction of the same recipient including private or public emergency service providers. In such cases, the EDC will send first responders to the location of the user 205.

In some embodiments, a data set (270, 272, 276) associated with the second device 207 or its user 205 is provided to the recipient of the request. In some embodiments, the request for assistance includes a data set (270, 272, 276) associated with the second device 207 or the user 205 on whose behalf the request is being sent. In some embodiments, the data set (270, 272, 276) associated with the second device 207 or its user 205 is provided separately from the request for assistance. In some embodiments, a data set includes data (including meta-data) regarding the user 205 or the second device 207 (e.g. user location, phone numbers, medical conditions, emergency contacts, etc.). In some embodiments, the data set (270, 272, 276) is provided to the recipient, such as an EDC 255, through one or more ways. For example, in some embodiments, the data set is provided by the second device 207 through a communication path 225 to the EDC 255 without routing through an EMS. In other embodiments, the data set is provided by the second device 207 through a communication path 223 and 226 via the EMS 230. In still other embodiments, the data set is provided by the second device 207 through a third party database 245 accessed by the EDC 255. For example, in some embodiments, the EMS 230 uses a third party VoIP Positioning Center (VPC) provider to associate an address location of the second device 207 with its phone number in an Automatic Location Information (ALI) database. Subsequently, an EDC 255, such as a PSAP, is able to query the ALI database for the phone number and the location provisioned at the ALI database to determine the location where assistance needs to be sent. In other embodiments, the location is provisioned into a database within a Location Information Server (LIS) within the EMS 230, which the EDC 255 (e.g. a PSAP) is able to query for the location of the second device 207. In some embodiments, the EDC 255 uses various methods to access location data including via authenticated HTTPS, or unauthenticated HTTP over a dedicated VPN connection between the EMS 230 and the EDC 255 (e.g. using the HELD protocol to return data in PIDF-LO format). In some embodiments, the EDC 255 such as a PSAP queries an HTTPS API service in the EMS 230.

In some embodiments, the data set 270 includes data from one or more caches, databases or other forms of storage located at the second device 207, at the EMS 230, or at a third-party database 285 (not shown). For example, in some embodiments, the data is retrieved from a data storage medium 215, such as a location cache 217 (not shown), for storing location information regarding the second device 207. In addition, in some embodiments, the data is retrieved from one or more databases 235 within the EMS 230, such as a location cache 237. In other embodiments, the data is stored and obtained from a database 285 (not shown) outside of the EMS 230 for privacy or security reasons. In some embodiments, the second device 207 transmits the data through any network (Wi-Fi, Ethernet, cellular data connection, etc.) over the internet or through private connections, such as HTTPS, unauthenticated HTTP, binary data SMS over a cellular network and other means.

In some embodiments, the data set 270 includes data from the second device 207, wherein the data includes one or more of the following: current location of the second device 207 ("Current Location Data"), pre-saved or user-defined locations (e/g., home address) ("Saved Location Data"), pre-determined locations ("Historical Location Data"), the type of emergency or the type of emergency assistance requested (e.g. police, medical, fire, etc.), or user data such as demographic or medical information. In some embodiments, the data set 270 is provided to the EDC 255 directly (communication link 225), via the EMS 230 (communication link 223, 226), or via a third party (communication link 223, 241, 243). In some embodiments, the EMS 270 processes the data set 270 into a data set 272 with a format compatible for sending to the recipient (such as EDC 255) such as, for example, through a voice call, SMS, or other acceptable communication channels. In some embodiments, the data set 272 comprises a location of the device with an accuracy within 1, 2, 3, 4, 5, 6, 7, 8, 9, 10, 11, 12, 13, 14, 15, 16, 17, 18, 19, 20, 30, 40, or 50 meters of the location coordinates and/or address (e.g. a current dispatchable location or address). In some embodiments, a current dispatchable address has an accuracy within at least 1, 2, 3, 4, 5, 6, 7, 8, 9, 10, 11, 12, 13, 14, 15, 16, 17, 18, 19, 20, 30, 40, or 50 meters of the address, including increments therein. In some embodiments, the data set 272 comprises current location data that is provisioned into a database in the EMS 230. In further embodiments, the EDC 255 queries the database for location or location data. In some embodiments, the data set 274 comprises current location data (e.g. X-Y coordinates with a level of accuracy and/or a dispatchable address) as determined by the EMS 230 and that is associated with a phone number in a third party database 245. In some embodiments, the data set 276 includes current location data comprising a dispatchable address, wherein the EDC 255 is able to query the third party database 245 for the data set.

In some embodiments, providing accurate location information for the second device 207 to the EDC 255 is critical for effective emergency response. For that reason, the location cache (217, 237) has to maintain accurate location information regarding the second device 207 and make it accessible to the EDC 253 and/or EMS 230 during an emergency. In some embodiments, the location information is obtained from one or more sources such as, for example, a location component 216 (such as a GPS, not shown), Wi-Fi access points information using a Wi-Fi antenna (not shown), Bluetooth beacon data using a Bluetooth antenna (not shown), cellular trilateration using an cellular transmitter capable of supporting various technologies such as CDMA, LTE, or WiMAX, and barometric pressure using a pressure sensor to estimate altitude. It is contemplated that any known methods for determination of location such as triangulation or multilateration is applicable to obtaining an accurate location for a device to be used in the systems, devices, and methods described herein. In some embodiments, a location based service (LBS) is installed on the second device 207 and used for determination of location (e.g. a geolocation API). For example, in some embodiments, Android Location Services is used to locate the second device 207 using GPS, cell-ID and Wi-Fi access point, wherein the second device 207 provides service set identifier (SSID) and Media Access Control (MAC) data for the Wi-Fi access point(s).

In some embodiments, location accuracy from the sources is evaluated. For example, in some embodiments, Wi-Fi access points, Bluetooth beacons, and/or hotspots are used to triangulate a position for the second device 207. In addition, in some embodiments, cellular trilateration and GPS coordinates are obtained. In some embodiments, the Wi-Fi access point's name or ID is used to determine location. For example, in some embodiments, the Wi-Fi access point name or ID is referenced against an address lookup database that provides the address location of Wi-Fi access points. In addition to the location itself, in some embodiments, an estimate of the location accuracy from each source is determined. For example, in some embodiments, the location accuracy is reported as a circle of confidence around a center point (bivariate normal distribution). In some embodiments, the location accuracy from FCC guidelines is that location must be accurate within 300×300 meter area (FCC). However, greater location accuracy is preferred, such as within 100×100 meters. In some embodiments, location data for a device comprises a location having an accuracy within a distance (or radius from the calculated location) of 100, 90, 80, 70, 60, 50, 40, 30, 20, 10, or 5 meters. For example, in some embodiments, location data associated with a device comprises a calculated location (e.g. X-Y coordinates) that is no more than 10 meters from the actual location of the device. In some embodiments, if the location is determined to be within 10 meters of a pre-determined or pre-saved location (such as a user-defined home or work address), the location then "snaps" to the pre-determined or pre-saved location, wherein the location is determined to be the same as the pre-determined or pre-saved location.

In some cases, the location is sent to a recipient (e.g. EDC 255) as geographical coordinates (e.g. X-Y coordinates, and sometimes Z coordinates if available). In some embodiments, the geographical coordinates comprise latitude and longitude coordinates as defined by a reference (e.g. the EPSG 4326 spatial reference). In other embodiments, the recipient requires the location to be converted to a physical address (also referred to as reverse geocoding). In some embodiments, the physical address is obtained from a Master Street Address Guide (MSAG) database which links street names and house numbers to their communities defining Emergency Service Zones (ESZs) and their Emergency Service Numbers (ESNs) to enable proper emergency call routing. Although user 200 and user 205 are shown in different zones in FIG. 2, it is understood that user 200 and user 205 may be in the same zone or even in the same location. For example, in some embodiments, user 205 is experiencing a medical emergency and user 200, who is in the same location, makes an emergency call on his or her behalf. Data regarding user 205 cached on member device 207 or in the EMS 230 is provided to facilitate an effective and efficient emergency response. For example, in one embodiment, historical location data for user 207 is provided to determine the risk that user 207 has been exposed to geographically-linked pathogens, such as Zika viral infection. Therefore, although current location data (for user 207) is highly valuable when a user 200 is making a proxy call for a user 207 who is in a different geographic location, other types of data are also relevant to facilitating an emergency response.

In some embodiments, location information (e.g. x-y coordinates) is converted into a dispatchable address (based on FCC guidelines) on the second device (207) in the EMS 230 or via a third party (not shown). In some embodiments, the x-y coordinates and the dispatchable address are both provided to the EDC 255 while in other embodiments, one of the coordinates and the dispatchable address is provided.

In some embodiments, the data set is a limited data set as defined by HIPAA. To avoid security breaches and protect the privacy of users, in some embodiments, the data set is sent via secured or encrypted communication link or following any other known security measures.

In some embodiments, user 200 or the communication device 206 senses an emergency situation being faced by another user 205 (e.g. user 205 is located outside his or her normal area). For example, in some instances, the second device 207 is a mobile cellular device or a sensor or routing device, for example, an Internet of Things device. In some embodiments, the user 200 utilizes the user interface 212 to request a status update from the second device 207. In further embodiments, the user 205 interacts with the user interface 213 to respond to the status update request by providing a status update (e.g. check-in). In some embodiments, the check-in provides the current location of the second device 207 to the communication device 206. In addition, in some embodiments, the user 205 indicates that he or she is in an emergency situation, wherein the user 200 sends a request for assistance on his or her behalf while providing the location information of second device 207 to a recipient such as an EMS or EDC.

In some cases, when the user 205 does not provide user input in response to a request for status update for some time or with repeated requests, user 200 is able to send a request for assistance on behalf of the user 205 (e.g. user 200 decides that user 205 is in need for assistance). In further embodiments, the device 206 requests (e.g. through push notifications) or queries the current location data (e.g. within the location cache 217 in the storage 215) for the second device 207.

In some embodiments, the EMS 230 includes software with a proxy detection module and the emergency communication module (see FIG. 1B). After it receives a request for assistance that does not contain additional data, in some embodiments, the EMS 230 queries the second device 207 for a data set including location information regarding the second device 207. In addition, in some embodiments, the EMS 230 confirms the identity of the user 200 and verifies the association of the user 200 with the user 205 on whose behalf the request was sent. In some embodiments, the EMS 230 locates and selects an EDC 255 that serves the location of the second device 207 (i.e., the location of the user 205). In some embodiments, the location of user 205 is estimated based on location information in the data set 270 received from the member device 206 or from location cache 237 at the EMS 230.

In some embodiments, the EMS 230 sends the request for emergency assistance to the selected EDC 255, either via a data call over a data communication channel 106 or a partial data call over a data communication channel to a gateway (not shown) and a public switched telephone network (PSTN) call to the EDC 255 via a time-division multiplexing (TDM) or analog channel. In some embodiments, upon successfully setting up a data communication session with an EDC 255, or a partial data communication session to a gateway and a PSTN call from the gateway to the EDC 255 via a TDM or analog channel, the EMS 255 provides the EDC 255 with all available and relevant data (e.g. location data, user data, etc) regarding the user 205 of the second device 207.

In some cases, the EMS 230 attempts to establish a covert data communication session with the second device 207. In some embodiments, a covert data communication session is established with the second device 207 without alerting the user 205 or anyone nearby of the communication session. For example, in some embodiments, a covert data communication session is a data call that does not cause the second device 207 on the end of the call to ring, buzz, or otherwise give any indication of an incoming call. Moreover, in some embodiments, the covert data communication session is established without requiring a user 205 of the receiving device 207 to accept the call (e.g. press a button to accept the call). In some embodiments, the EMS 230 sends a covert request for receiving location information and other relevant user data cached on the second device 207. In some embodiments, when the second device 207 is responsive to the covert data communication session (e.g. accepts the covert request), a communication session on communication link 225 is then established, for example, between the EMS 230 and the second device 207. In some embodiments, the communication session is a data communication session or, alternatively, an analog voice session depending on the capabilities of the EDC 225 and second device 207. In further embodiments, the EMS 230 then bridges or conferences the communication links with one or both devices (206, 207) and shares all relevant information, including location information, with the EDC 255. In further embodiments, the EMS 230 then manages all communication sessions with the devices (206, 207) while keeping the covert data communication session active. In some embodiments, if the covert data communication session cannot be set up with the second device 207, the EMS 230 keeps track of the location of the second device 207 and periodically attempts to setup the covert data communication session, while sharing all relevant and updated information with the EDC 255.

Figure 3:
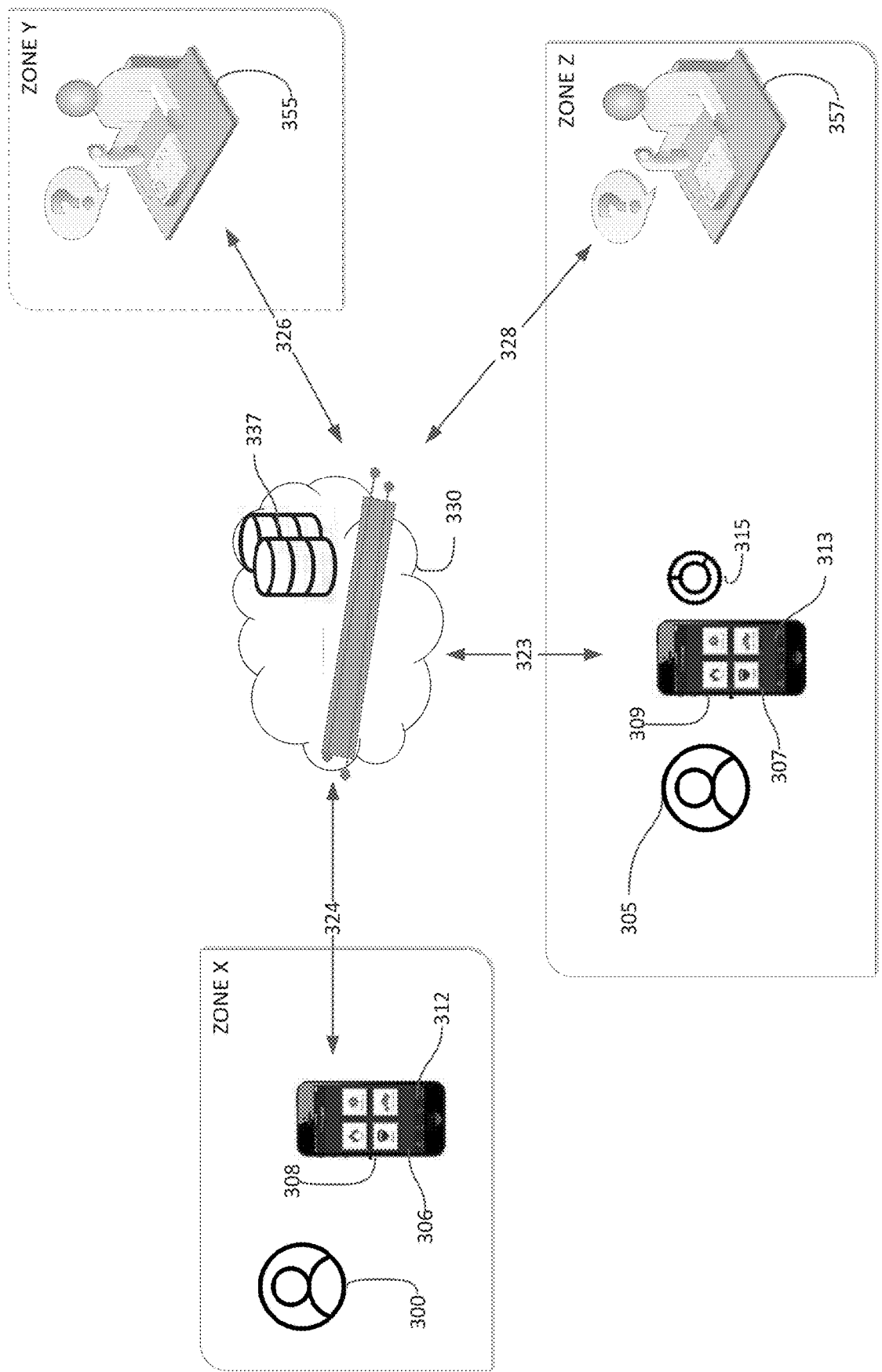
FIG. 3 illustrates an embodiment of a system, including devices and an emergency management system, for sending a request for assistance to recipients for two different zones.

FIG. 3 illustrates an embodiment of systems, devices, and methods for sending a request for assistance to recipients in two different zones. In some embodiments, a user 300 using a communication device 306 in a first zone (zone X) sends a request for assistance to an EDC on behalf of another user 305 of a second communication device 307 in a different zone (zone Z). In some embodiments, the communication device 306 and the second device 307 are member devices belonging to a group of devices. In some embodiments, the request comprises cached location information on the devices (306, 307) or the EMS 330, and any relevant user data (including meta-data) regarding the second device 307 or its user 305. In some embodiments, the request comprises user data about the calling user 300 for verification purposes.

In some embodiments, when both devices (306, 307) are member devices belonging to a group of devices, the EMS 330 confirms the identity of the user 300 after receiving the request for assistance and verifies the association of the user 300 with the beneficiary user 305, including authorization to share location and other information (for example, by checking a database 357 at the EMS 330, EDC 355, EDC 357, or the devices 305, 307). In further embodiments, based on the best estimate of the location of member device 307 and/or the user 305, the EMS 330 locates an EDC 355 that serves the location.

In some embodiments, a request for assistance is sent via a data communication link 324 and 326 or partially over a data communication link and a TDM or analog channel via one or more gateways (not shown). In some embodiments, upon successfully setting up of a communication to an EDC 355, the EMS 330 exchanges relevant location and meta-data regarding the user 305 of the second device 307. In some embodiments, the EMS 330 confirms that the EDC 355 is the correct dispatch center serving the location and type of assistance needed for user 305 and second device 307.

In some embodiments, after connecting to an EDC 355 (serving zone Y), the EMS 330 receives updated location information from the second device 307 indicating the second device 307 is no longer located in zone Y and is now in zone Z. In further embodiments, the EMS 330 attempts to identify and connect to another EDC 357 (serving zone Z) via a communication link 328, which is now a better choice for providing assistance. Alternatively, in some embodiments, after connecting to an EDC 355 (serving zone Y), the EMS 330 determines that the EDC 355 is not able to handle the request and attempts to identify and connect to another EDC 357 (serving zone Z). In some embodiments, the EMS 330 establishes a data communication session with the second device 307. In further embodiments, the data communication session is a covert data communication session (e.g. a data call that does not ring). In some embodiments, upon establishing the data session via communication link 323, the EMS 330 sends a request for the location information and other relevant user data for the second device 307, including meta-data cached on the device 307 (e.g. in data storage 315). In some embodiments, when the second device 307 is responsive to the data communication session, the EMS 330 then bridges the data communication session with the devices (305, 307) with the EDC 357, and shares all relevant data, including location information, with the EDC (357 and/or 355). In some embodiments, the EMS 330 manages one or more of communication links 324, 326, 323, and 328, for example, by ensuring the session parameters are appropriately adjusted and that all devices are responsive. In some embodiments, when the communication link 323 with the second device 307 has not been successfully established, the EMS 330 keeps track of the best estimated location of the device 307 using other means. In further embodiments, when the connection is lost after establishment, the EMS 330 periodically attempts to re-establish the connection. In some embodiments, the EMS 330 terminates the data communication link 326 with the EDC 355 as needed, for example, when the emergency situation has been resolved.

Figure 4:
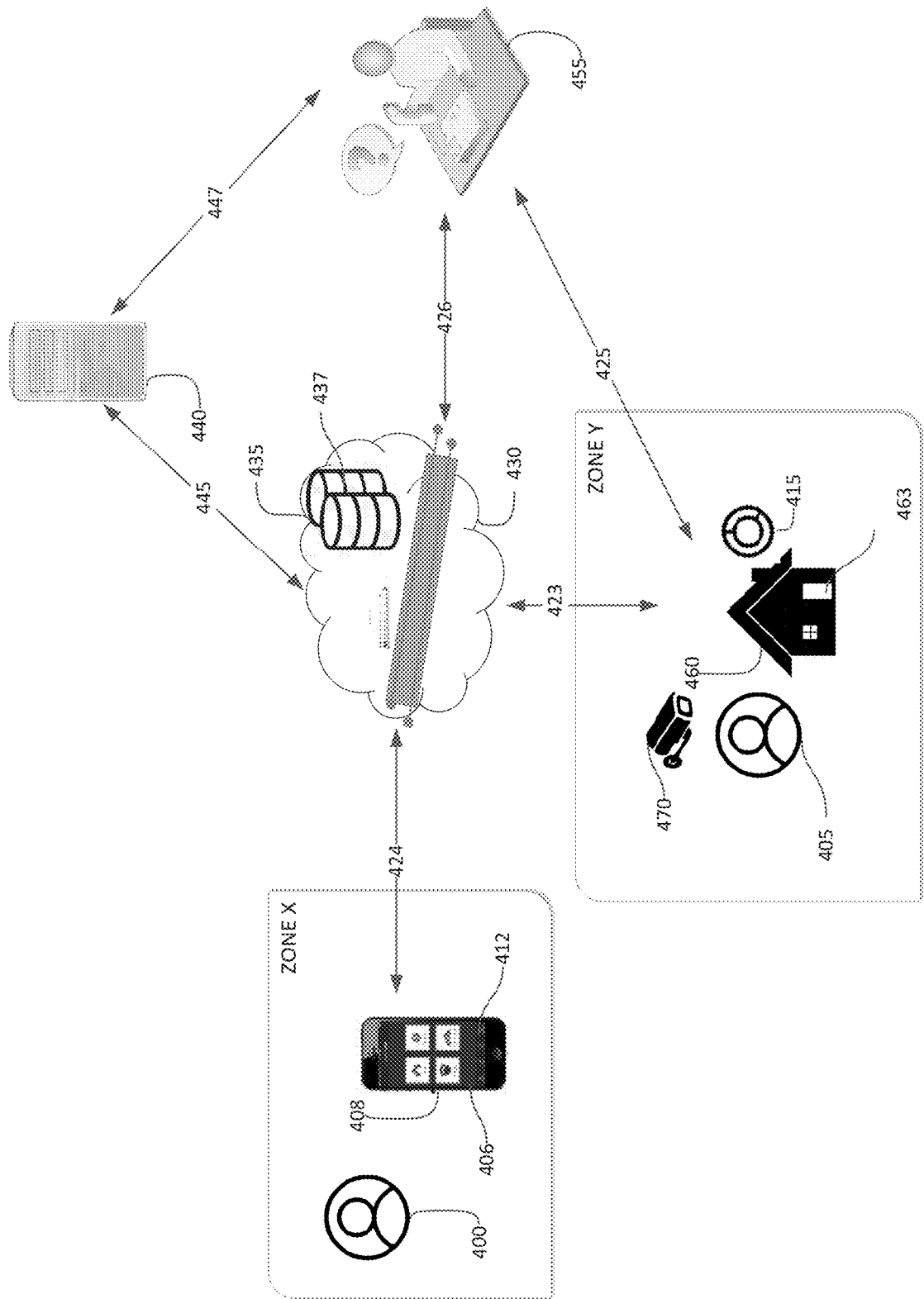
FIG. 4 illustrates an embodiment of a system, including devices and an emergency management system, for sending a request for assistance to a member device in a different zone.

FIG. 4 illustrates an embodiment of systems, devices, and methods for sending a request for assistance for a member device in a different zone. In some embodiments, a user 400 (located in zone X) sends a request for assistance for a member device 467 (not shown), which is associated with the user 400 or a group member 405 (not shown). In some embodiments, the member device 467 (located in another zone Y) is a sensor, a routing device, a smart home 460, a vehicular system, or an Internet of Things (IOT) device. In some embodiments, the request comprises one or more of location information, user data, and sensor data regarding a smart home 460 or user 400. In some embodiments, a communication device 406 detects an emergency situation in the smart home 460, for example, triggered by a member device 467 (not shown) such as an alarm system in the home 460. In further embodiments, the communication device 406 sends a request for assistance to an EMS 430 on behalf of either user 400, user 405 (who is the owner, manager, resident of the smart home 460), or the member device 467. After receiving the request, in some embodiments, the EMS 430 confirms the identity of the user 400 and verifies the association of the user 400 with the smart home 460. Alternatively, in some embodiments, the EMS 430 confirms the identity of the user 405 and verifies the association of the user 405 with the smart home 460. In further embodiments, the EMS 430 identifies and selects an EDC 455 that serves location of the smart home 460.

In some embodiments, the EMS 430 establishes a communication link (426, 426) with the EDC 455 via a data call over a data communication links (424, 426) or a partially over data communication channel 425 and a PSTN call over a TDM or analog link 427 via a gateway 440. In some embodiments, upon successfully establishing communication links (424, 426) with an EDC 455, the EMS 430 exchanges relevant location, user data, and/or sensor data associated with the smart home 460 or user 400. In some embodiments, the EMS 430 attempts to set up a data communication session 434, for example, an IP-based data link, with the smart device 460 and the sensor 470 (e.g. security camera feed). In some embodiments, relevant data, for example, the location information and other relevant meta-data on the smart device 460 and sensor 470 is retrieved from storage databases or caches (not shown) and shared with authorized parties (e.g. other member devices in the group or recipients such as an EMS).

In some embodiments, the member device 467 comprises several devices such as, for example, one or more sensors 470 (e.g. a group of sensors or Internet of Things devices). In further embodiments, the EMS 430 attempts to connect with the devices and gather relevant information pertaining to the emergency situation after receiving a request for assistance. In further embodiments, the EMS 430 attempts to connect with multiple devices within the smart home 460 via a routing device (not shown). In some embodiments, the EMS 430 bridges the communication session (via 423) with the smart home 460 and the communication session (via 424, 426) with the EDC 455, and shares relevant data and manages connections as described with respect to other embodiments described herein. In some embodiments, the member device 467 obtains sensor data from associated sensors such as, for example, a camera 470, a home thermostat 415 (e.g. Wi-Fi connected thermostat), or any other device.

Figure 5:
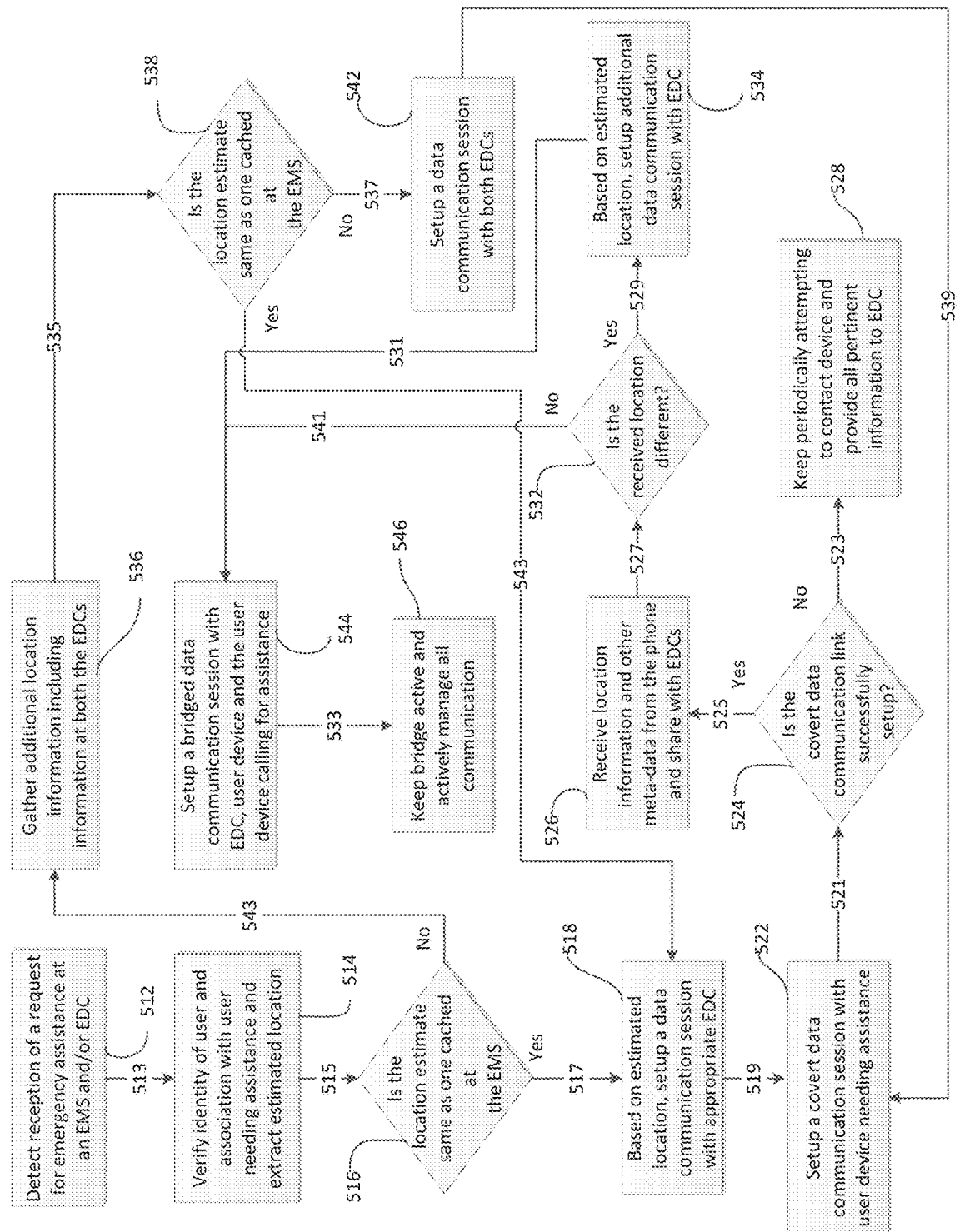
FIG. 5 illustrates an exemplary method for establishing a proxy call to one or more EDCs and updating location information.

FIG. 5 illustrates an exemplary method for establishing a proxy call to one or more EDCs and updating location information. It is noted that this method is meant to be exemplary and various variations are contemplated. In some embodiments, an EMS 330 (see FIG. 3) establishes an emergency call with a selected EDC 355 or 357 and a covert data session with a device 407 of a user 405 on whose behalf a request is received, and bridges the sessions with the user 400 and communication device 406 (see FIG. 4) In some embodiments, the device 406 sending the request and the device 407 the request is made on behalf of are both member devices belonging to a group of devices. In other embodiments, the device 407 the request is made on behalf of is a second device that is not a member device belonging to a group of devices. In some embodiments, the EMS detects reception of a request for emergency assistance from a communication device on behalf of a member device (or user thereof), for example, a smart home (act 512). In further embodiments, the EMS confirms the identity of the user sending the request for emergency assistance and the details of the communication device, and verifies the association of the user sending the request for emergency assistance to the member device (or user thereof), or property on whose behalf the request was sent, for example, via checking a previously populated database at the EMS (e.g. 235 in FIG. 2) or one or more EDCs.

In some embodiments, the EMS extracts location information (for example, from location caches 237, 215 in the EMS or the devices in FIG. 2) received within the request for emergency assistance (act 514). In some embodiments, when the location information received with the request for assistance from the communication device is not the same as location information of the member device that is cached via control messages received from the device (act 516), the EMS contacts EDCs in both locations (one using location information from the requesting device and one using location information from the beneficiary member device). In some embodiments, the EMS attempts to gather additional data about the location of the member device from the selected EDCs (act 536). In some embodiments, if none of the EDCs confirm the location of the device to be in their service area (act 544), the EMS establishes a data communication session with both the EDCs (act 542), and then attempts to set up a covert data communication channel with the beneficiary member device (act 522). In some embodiments, when at least one of the EDCs confirms the location of the member device to be in the service area (act 544), the EMS establishes a data communication session either via a data call over a data communication channel with the EDC, and sends the request for emergency assistance to this selected EDC 115 (act 544).

In some embodiments, when the location information received within the request for emergency assistance is same or substantially the same as the location information cached at the EMS (act 516), then the EMS locates an EDC that serves this best estimated location and establishes a communication session with the EDC and routes the request for emergency assistance to this selected EDC 115 (act 544). In further embodiments, the EMS establishes a covert data communication session with the beneficiary member device of the group of devices on whose behalf the request for assistance was received (act 522), for example, a data call that does not ring, vibrate, or indicate an incoming communication at the receiving device. In some embodiments, when the covert data communication channel is unsuccessful (act 524), the EMS periodically attempt to establish the covert data communication channel and provide all relevant information to the EDC (act 528). In some embodiments, once the covert data communication channel has been successfully set up (act 524), the EMS receives updated location information and other relevant data cached on the member device, and shares this information with the EDC (act 526). In some embodiments, when the received location information from the member device (such as a smart home 460 in FIG. 4) is the same as the best estimated location information cached at the EMS (act 532), the EMS sets up a bridged communication session between the EDC and the device requesting assistance and/or the member device via a data communication channel. Alternatively, in some embodiments, when the received location information from the member device is not the same as the best estimated location information cached at the EMS (act 532), then the EMS identifies another EDC that best serves the new received location of the member device and sets up a communication session (act 534). In some embodiments, the EMS sets up a bridge between the EDC via the data communication channel either directly to EDC or through data and TDM channels (act 544). In some embodiments, the EMS keeps the communication bridge alive and actively manage all data communication sessions between the communication devices (including the member device) and the EDC(s) (act 546).

Figure 6:
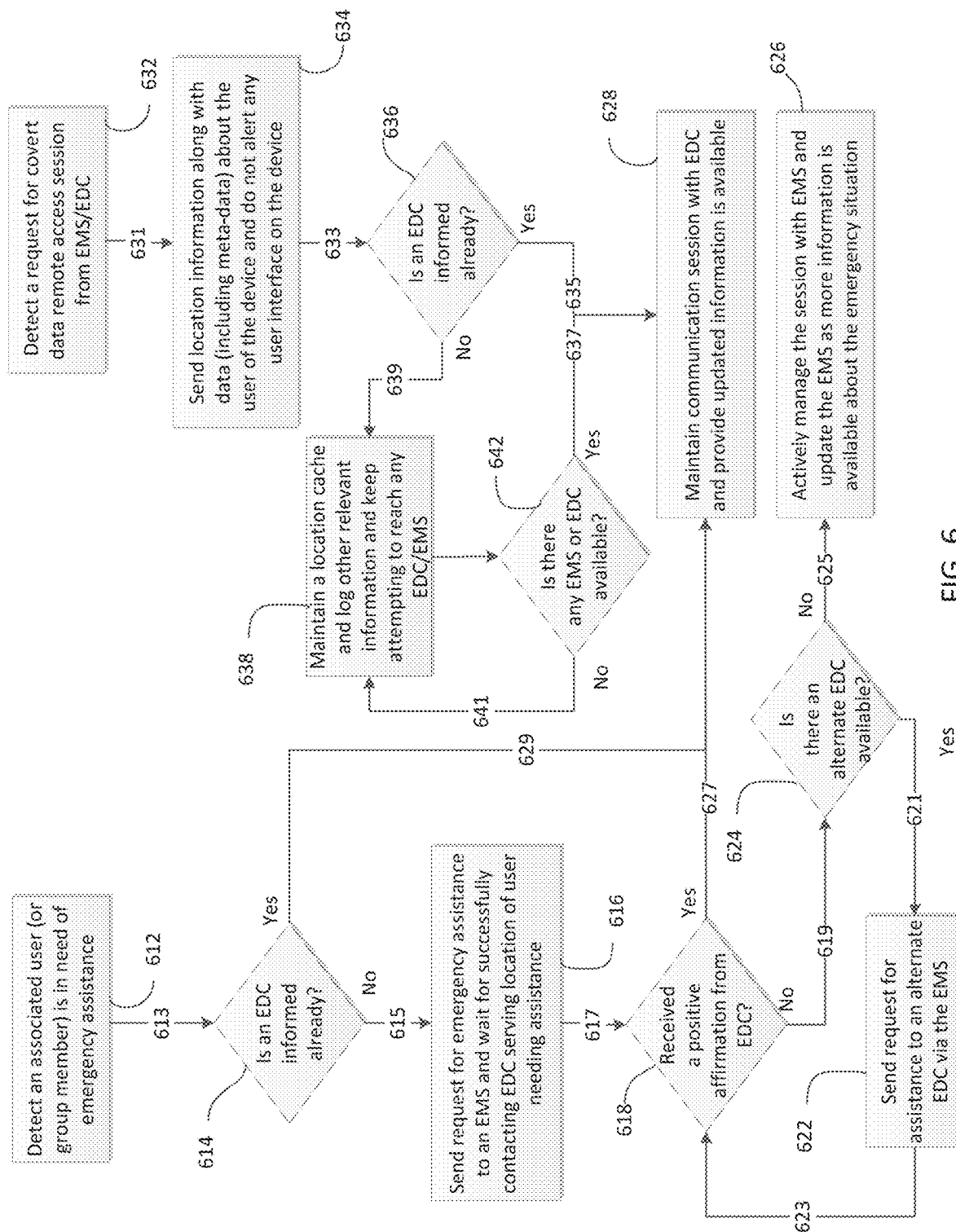
FIG. 6 illustrates an exemplary method for an emergency call and finding the appropriate EDC for the location.

FIG. 6 illustrates an exemplary method for an emergency call and finding the appropriate EDC for the location. It is noted that this method is meant to be exemplary and multiple variations are contemplated. In some embodiments, a communication device sends a request for emergency assistance on behalf of another user or group member, wherein the member responds using his or her member device to a request for a covert data session from an EMS or an EDC. In some embodiments, a communication device or its user detects that a group member using member device appears to be in need of emergency assistance (act 612). In some embodiments, the communication device checks if an EDC has already been alerted regarding that emergency (act 614).

In further embodiments, when an EDC is already informed (act 614), the communication device maintains a communication session with the EDC and provides updated information to the EDC as the information becomes available (e.g. upon receiving updated information from the member device), and in some embodiments, provides the information to the EDC via an EMS (act 628). In some embodiments, when an EDC has not already been informed of the emergency situation (act 614), the communication device sends a request for emergency assistance to an EDC via an EMS and waits for a response from the EDC (act 616). In further embodiments, when a positive affirmation is not received from the EDC (act 618), the communication device contacts the EMS to locate an alternate EDC to send the request for emergency assistance (act 624). In further embodiments, when an alternate EDC is not available (act 624), the communication device actively manages the communication session with the EMS (e.g. by modifying session variables as needed to keep the session "alive") and updates the EMS with the most updated information the communication device has about the emergency situation including location information about the user communication device and any meta-data associated with the group member and his or her member device (act 626).

In some embodiments, when an alternate EDC is located and available (act 624), the communication device sends a request for emergency assistance to this EDC via the EMS the communication device is associated with and waits for a positive affirmation from the EDC (act 622). In some embodiments, when a positive affirmation is received (act 618) from the EDC, the communication device maintains a communication session with the EDC via an EMS and provides updated information about the emergency situation including location information about the communication device and meta-data about the user needing assistance (act 628).

In some embodiments, a communication device belonging to a group of devices detects a request for a covert data communication session from an EMS or directly from an EDC (act 632). In further embodiments, the communication device sends its most updated location information to the EMS and/or EDC that sent the request (act 634). In some embodiments, the communication device does not provide any alert on its user interface in the process of receiving, setting up, and/or responding to messages on the covert data communication channel (act 634). In some embodiments, when a positive affirmation is received by the communication device from the EMS and/or EDC (act 636), the communication device actively maintains the data communication sessions with the EMS and/or the EDC (act 628) and sends, on a periodic basis, information such as, for example, location information and other information logged on the device to the EMS and/or EDC (act 628).

In some embodiments, when a positive affirmation is not received from either the EMS or the EDC (act 626), the communication device maintains a log of its location on a periodic basis while also logging other relevant information associated (act 638). In further embodiments, relevant information includes one or more of the speed of the device, direction of travel, altitude of the device, battery lifetime of the device, any nearby cellular or Wi-Fi networks sensed by the device and their identity, and other information that the device senses at the user interfaces, such as voice inputs, touch input on a touch interface, inputs received by a camera on the device, and/or any other form of inputs or user interactions that the device detects. In some embodiments, the communication device periodically checks to verify if any other EMS or EDC are available (act 642), and upon not finding any other EMS or EDC the communication device continues to log the location and other relevant information (act 638). In some embodiments, when the communication device finds an alternate EMS or EDC, the communication device sends a request for a covert data communication session and sends, on a periodic basis, various information logged on the communication device to the EMS and/or EDC and actively maintains the data communication sessions with the EMS and/or the EDC (act 628).

Figure 7B:
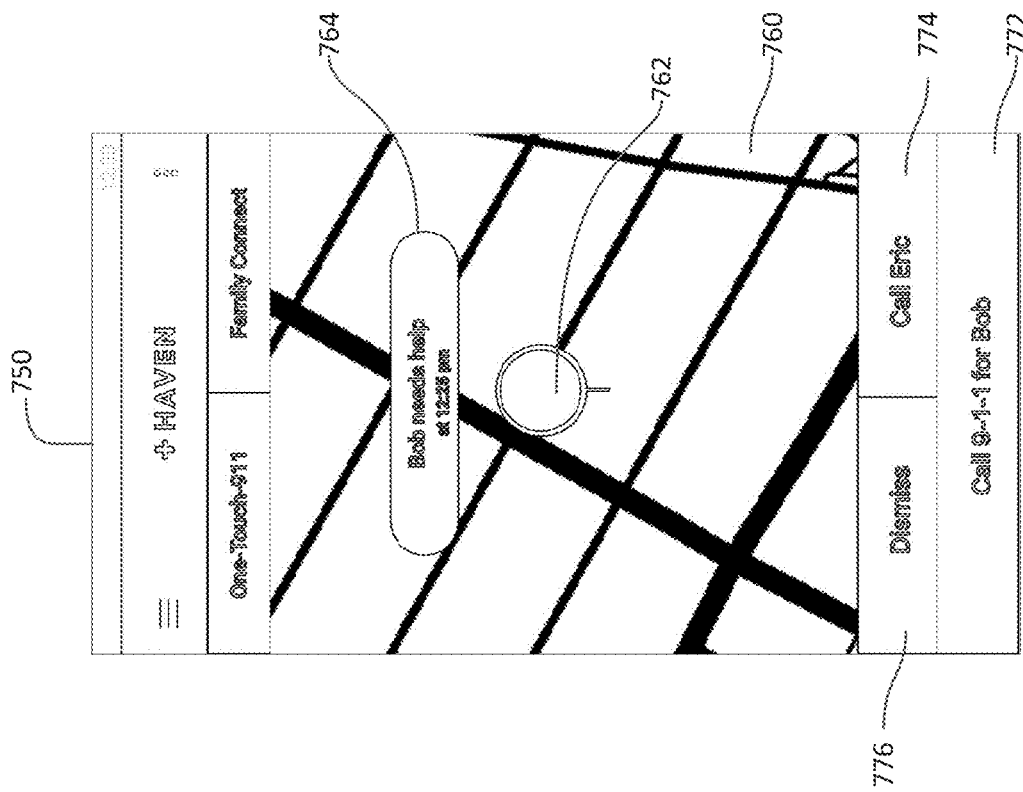
FIGS. 7A and 7B depict screenshots of a communication device showing embodiments of the status update and proxy calling features.
Figure 7A:
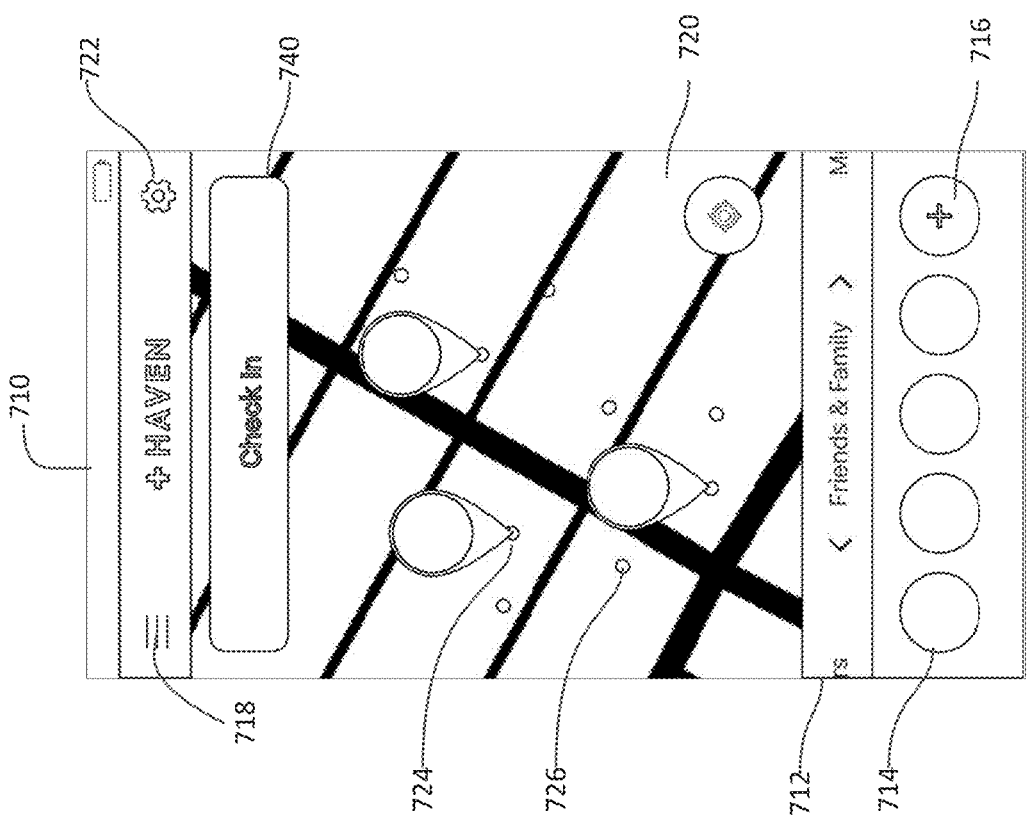

FIG. 7A depicts a screenshot of a communication device showing one embodiment of a status update feature. The screenshot of locations of member devices 710 in a group of devices (also referred to as a web of devices) shows the geographical location of member devices (e.g. group members) on a map 720. The navigation bar 712 at the bottom of the screenshot 710 shows group members 714 and a button for adding more group members 716. The location of group members 714 are shown on the map based on the location data from their associated member devices.

Figure 20:
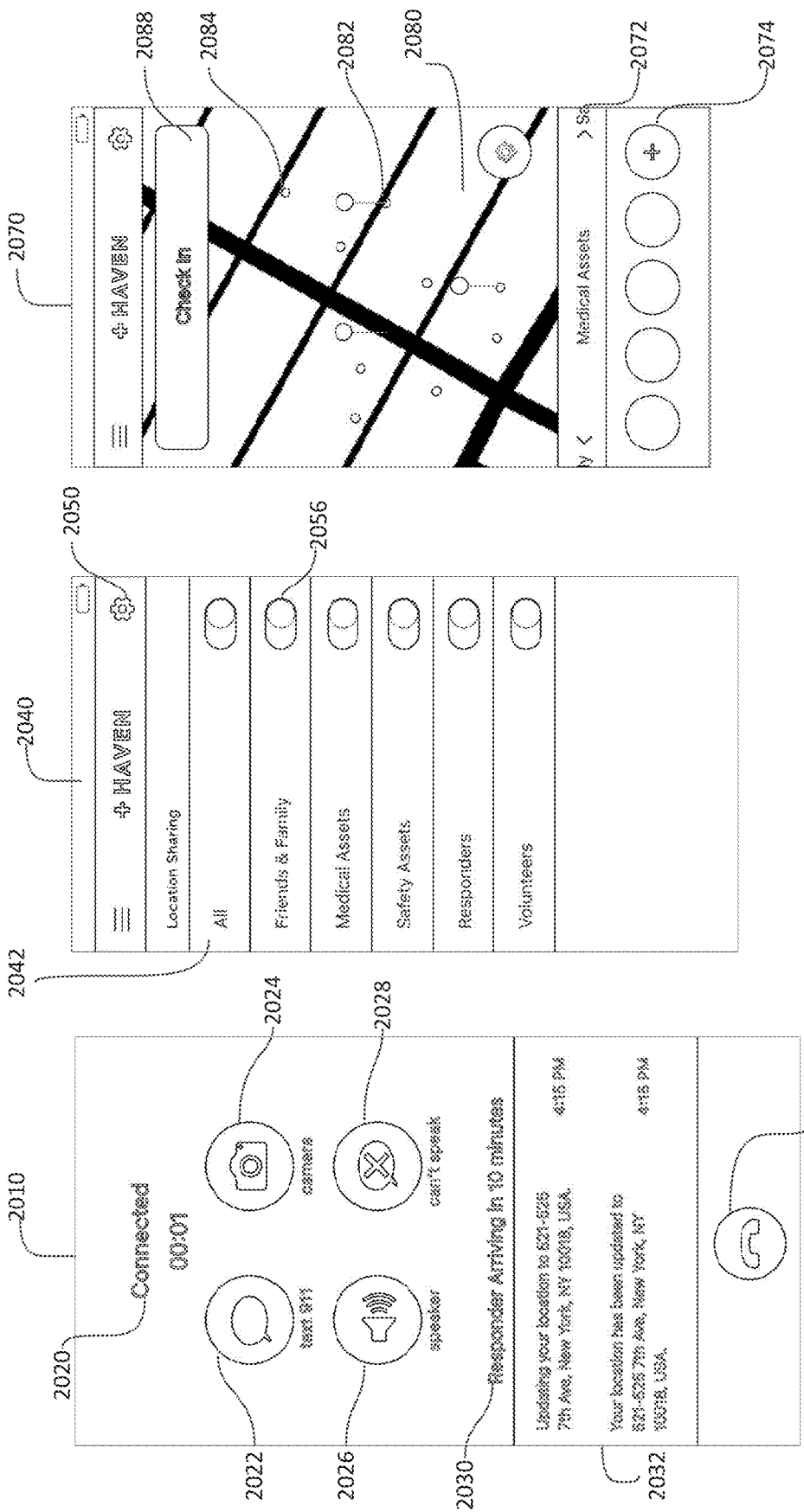
FIGS. 20A-20C depict exemplary screenshots of a communication device.

In some cases, the user (e.g. user 200 from FIG. 2) has created a group association (such as "Friends and Family") with individuals and their associated member devices, thus forming a group of devices. In some embodiments, the group members 714 share data (by status updates, such as Check-ins 740) or authorize the user of the communication device (during a registration process or via user configurable settings 722) to access location data associated with the member devices. An exemplary settings menu is shown in FIG. 20B, where a user is able to share his or her location with "friends and family" group by using the toggle button. In some embodiments, the user is able to choose to share data (e.g. location) with one or more members of the group and not with others using individualized settings for each group member.

In some embodiments, the map 720 shows location pins 724 for group members 714 in relation to streets and intersections. In further embodiments, the map 720 includes points of interest 726 such as, for example, restaurants, train stations, hospitals, stadiums, landmarks, and other similar locations. Although not shown, in some embodiments, other points-of-interest are marked on the map such as police stations, museums, shopping centers, etc. In addition, in some embodiments, when the user (e.g. user 200 from FIG. 2) is within the area of the map 720, his or her location is indicated by a user pin 728 (not shown).

In some embodiments, the screenshot 710 includes a status update feature such as a button for sending a status update 740 (e.g. a check-in) to one or more members in the group. The user is able to press the button for "Check In" 740 to share his or her location with group members and/or sends a message that the user has checked-in, indicating that he or she is okay. In some embodiments, user check-ins are saved as check-in or status update data with time stamp, location, and other relevant information in the user's communication device, the member device, or databases in the EMS. In some embodiments, transmission of location data is accomplished through secured and encrypted pathways to reduce the risk of security breaches. In some embodiments, storage of location data is anonymized by encryption or removal of personally identifiable information from the location data for privacy protection. Although not disclosed, other types of status updates are contemplated including status updates from the member device without user input such as timestamped location data, or any other types of messages or signals.

In addition to viewing the location of group members, the user (e.g. user 200 from FIG. 2) is able to send a request for assistance to a recipient (e.g. EDC, or a private or public emergency service provider) on behalf of a group member. FIG. 7B depicts a screenshot 750 of a communication device showing proxy calling for Bob, a group member. In some embodiments, the screen includes a map 760 showing the location pin for the group member 762. In some cases, there is an alert displayed on the screenshot 750 indicating that Bob is in need of assistance (e.g. "Bob needs help"). In some embodiments, the assistance is emergency assistance from an EDC. In some embodiments, assistance includes services from a private or public emergency service provider. In some embodiments, a determination is made by the communication device, member device, or the EMS that Bob needs assistance. In some embodiments, determination of a likely emergency is based on a lack of status updates for a period of time, movement outside of usual and safe locations, user input (e.g. group member may implement a pattern of covert button presses), and/or sensor data from a wearable device or a nearby IOT device. As shown, in some embodiments, a user has the option of sending the request for assistance (e.g. proxy call to an EDC) on behalf of Bob 772, calling another group member or contact (Eric) 774, or dismissing the alert 776. In further embodiments, the request for emergency is sent to the jurisdiction based on Bob's current location shown by location pin 762. Accordingly, in some embodiments, the proxy call connects the user (e.g. user 200 from FIG. 2) with the EDC serving Bob's location. In some embodiments, a three-way call is established between the user communication device, the EDC, and the member device (Bob's device). In some embodiments, a third party is included in the proxy call such as, for example, a private security provider.

Figure 8:
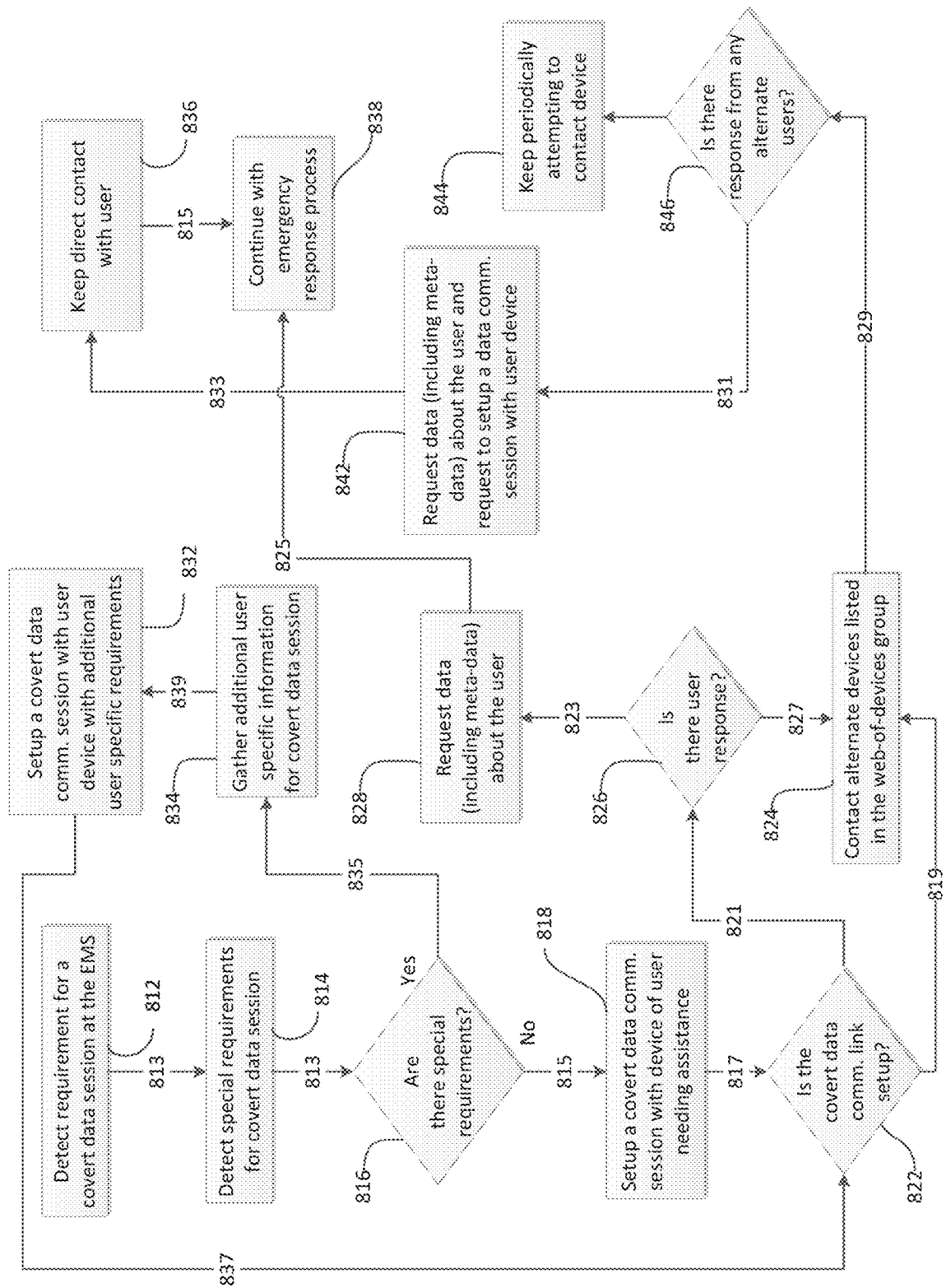
FIG. 8 illustrates an exemplary method for the EMS to send or request a covert data session with a communication device.

FIG. 8 illustrates an exemplary method for the EMS to send or request a covert data session with a communication device, such as a member device. It is noted that this method is meant to be exemplary and multiple variations are contemplated. In some embodiments, the EMS detects a request from a communication device for emergency assistance and verifies if the request contains specific requirements for contacting the user needing assistance. In some embodiments, these specific requirements comprise a request for a covert data communication session (e.g. a request that a voice call not be initiated on the data communication session with the device, and/or other such specific requests). In such cases, the EMS establishes a covert communication session with the device with regards to the specific requests in response to any requests that are received or detected.

In other embodiments, the EMS receives a request from a second communication device for setting up a covert communication session with a member device of a user needing emergency assistance. Upon detecting the member device and the second communication device are not the same device, the EMS initiates a covert communication session with the member device and retrieves data such as, for example, emergency data, location data, and/or other forms of data pertaining to the emergency request.

As shown in FIG. 8, upon detecting that the covert communication session with the user communication device is established (act 812), the EMS requests meta-data from the device regarding the user and the emergency situation (act 828). In some embodiments, upon detecting that the covert communication session with the communication device is not setup (act 812), the EMS attempts to setup a communication session with any one of another communication device, which are part of a group of devices (act 824).

In some embodiments, upon detecting that the communication session with any one of a second communication device is not established (act 846), the EMS periodically attempts to reach the user communication device or any other member devices in the group of devices (act 844). In further embodiments, upon detecting another member device group of devices is responsive (act 846), the EMS requests meta-data from the device regarding the user and the emergency situation (act 828). In another embodiment, after requesting meta-data from the communication device, the EMS checks if the user of the communication device is responsive (act 826) to the covert communication session, and upon detecting that the user is responsive to the covert communication session the EMS, requests data from the user regarding the emergency situation (act 842) and keeps in direct contact with the user for the duration of the emergency response (act 836) and continues with the emergency response process (act 838).

Figure 9:
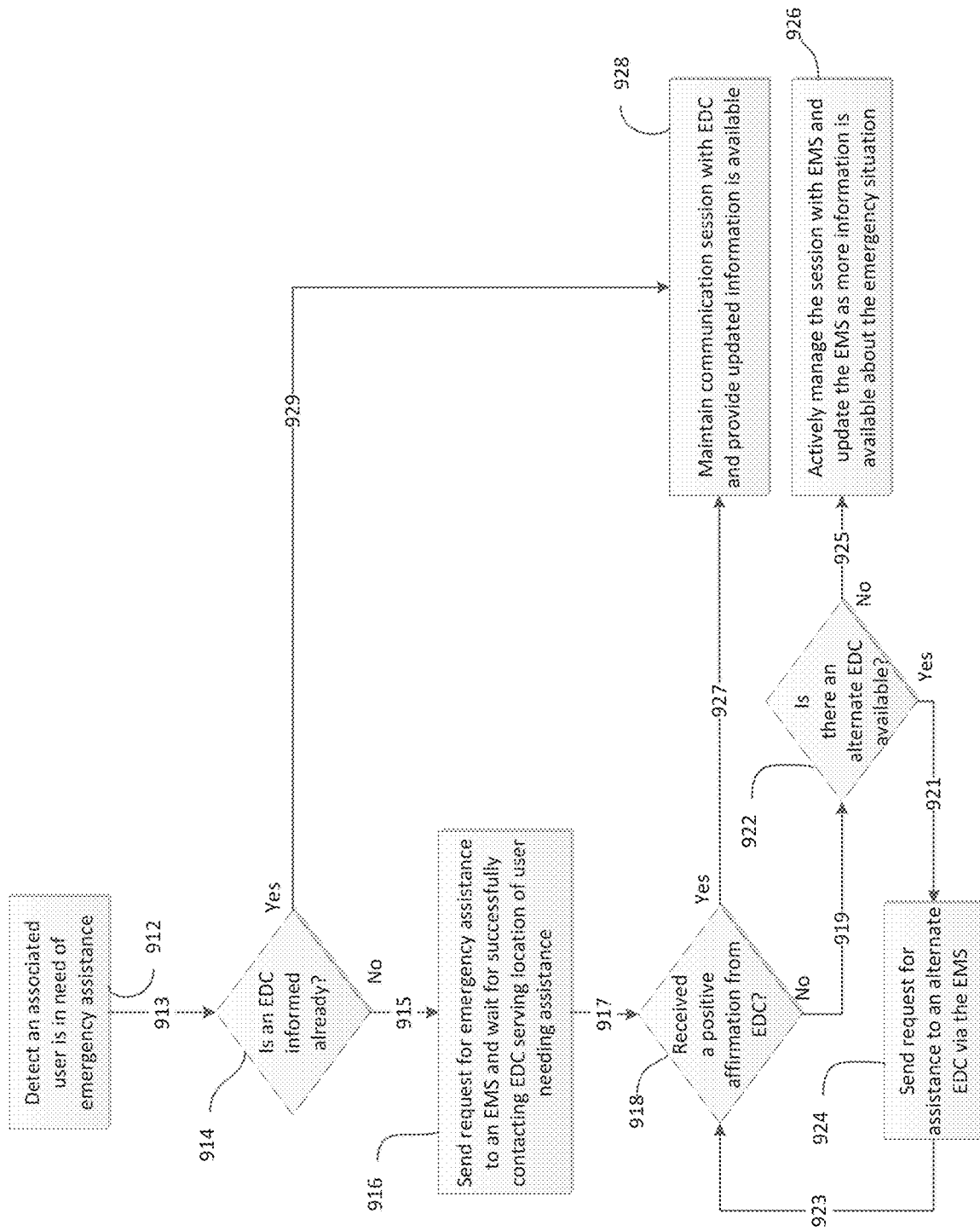
FIG. 9 illustrates an exemplary method for a communication device to send or request for assistance on behalf of another communication device.

FIG. 9 illustrates an exemplary method for communication device to send or request for emergency on behalf of another communication device, such as a member device. It is noted that this method is meant to be exemplary and several variations are contemplated. In some embodiments, the communication device detects, either via user interaction or autonomously that another user in the group, a group member, may be in need of emergency assistance (act 912).

Furthermore, in another embodiment, the communication device, upon successfully detecting a need for emergency assistance, checks if an EDC is already informed about the emergency situation (act 914). If an EDC is already informed (act 914), or if a positive affirmation is received from the EDC to a request for emergency assistance sent from the communication device (act 918), then the communication device maintains a communication session with this EDC, via an EMS, and provides updated information about the emergency situation including location information about the communication device and any meta-data about the member needing assistance (act 928). In certain embodiments, the user communication device 101 maintains a communication session with the EDC 115 and provides updated information as available directly to the EDC 115 without routing information through an EMS 113 (act 928).

In certain embodiments, upon determining an EDC is not already informed of the emergency situation (act 914), the communication device sends a request for emergency assistance to an EDC serving the best estimate of the location of the group member needing assistance, via an EMS, and waits for a response from the EDC (act 916). In certain embodiments, upon determining that a positive affirmation has not been received from the EDC (act 918), the communication device contacts the EMS to locate an alternate EDC to send the request for emergency assistance (act 922). If an alternate EDC is located and is available (act 922), the communication device sends a request for emergency assistance to this EDC via the EMS and the communication device associated with and waits for a positive affirmation from the EDC (act 924).

In some embodiments, upon determining an alternate EDC is not available (act 922), the communication device actively manages the communication session with the EMS (including setting of session variables and keeping the session "alive") and updates the EMS with updated information the communication device has about the emergency situation (act 926).

Figure 10:
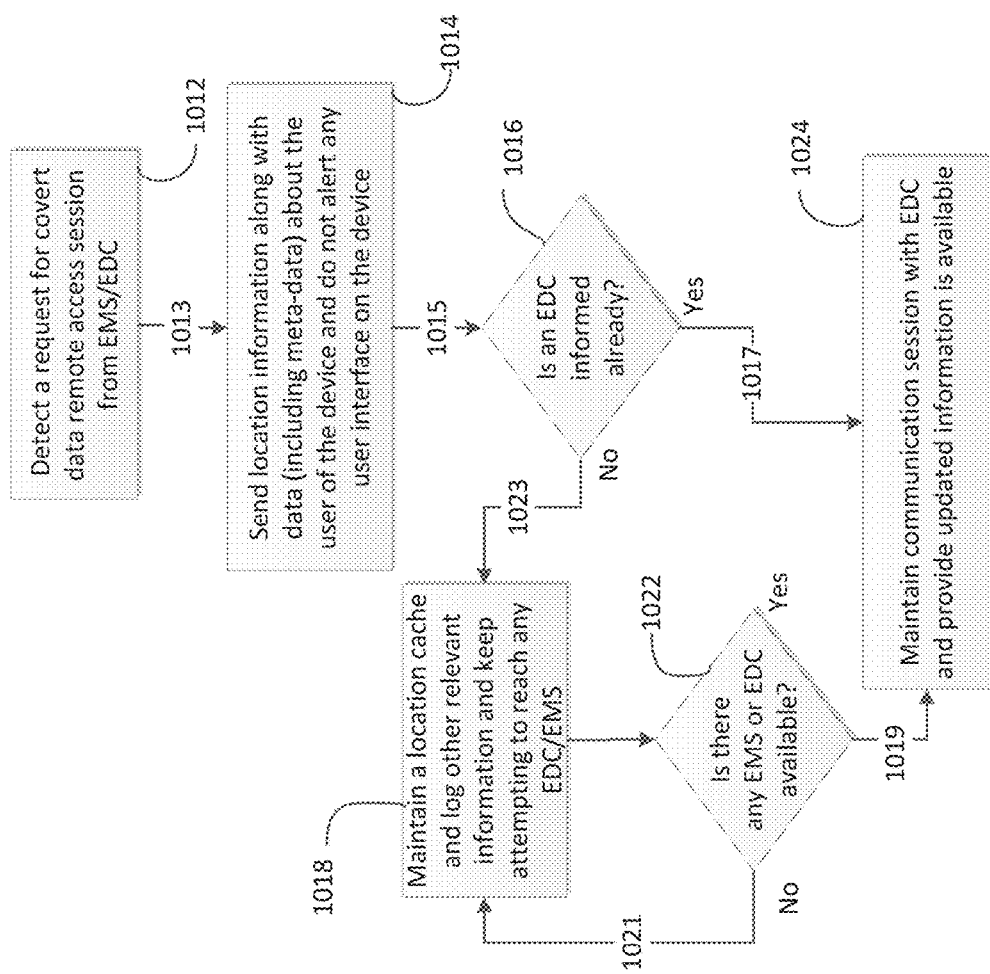
FIG. 10 illustrates an exemplary method for a communication device to respond to a request for covert data session from an EMS or EDC.

FIG. 10 illustrates an exemplary method for a communication device, such as a beneficiary or member device to send to respond to a request for covert data session from an EMS or EDC. It is noted that this method is meant to be exemplary and multiple variations are contemplated. In some embodiments, the communication device detects a request for a covert data communication session from an EMS or directly from an EDC (act 1012). In some embodiments, the communication device sends updated location information about the communication device to the EMS and/or EDC that sent the request (act 1014). Further, the communication device does not produce any user interaction signals, e.g., a ringing tone at the speaker, or a brightening up of the screen of the device, in order to ensure that any other persons or devices are not alerted about the presence of a data communication session connecting the communication device and the EMS. Accordingly, no audiovisual alerts on any user interface of the communication device are provided in the process of receiving, setting up, or responding to messages on the covert data communication channel (act 1014).

In certain other embodiments, upon detecting a positive affirmation is received by the communication device from the EMS and/or EDC (act 1016), the communication device actively maintains the data communication sessions with the EMS and/or the EDC (act 1024) and sends, on a periodic basis, various information (for example, location information and other information logged on the communication device to the EMS and/or EDC (act 1024).

In some embodiments, upon detecting that a positive affirmation is not received from either the EMS or the EDC (act 1016), the communication device maintains a log of its location on a periodic basis while also logging other relevant information about the communication device (act 1018). In some embodiments, relevant information includes one or more of the speed of the device, direction of travel, altitude of the device, battery lifetime of the device, any cellular or Wi-Fi networks sensed by the device and their identity, and other information that the device senses at the user interfaces, for example, voice inputs, touch input on a touch interface, inputs received by a camera on the device, and/or any other form of inputs or user interactions that the device detects.

In some embodiments, upon detecting that a positive affirmation is not received from either the EMS or the EDC (act 1016) and upon maintaining a log of the data about the communication device, device periodically checks to verify if any other EMS or EDC are available (act 1022), and upon not finding another EMS or EDC, the communication device continues to log the location and other relevant information on the device (act 1081). Upon detecting that a positive affirmation is not received from either the EMS or the EDC (act 1016) and upon maintaining a log of the data about the communication device, the device periodically checks to verify if any other EMS or EDC are available (act 1022). Upon finding an alternate EMS or EDC, the communication device sends a request for a covert data communication session and sends, on a periodic basis, various information logged on the communication device to the EMS and/or EDC and actively maintains the data communication sessions with the EMS and/or the EDC (act 1024).

Figure 11:
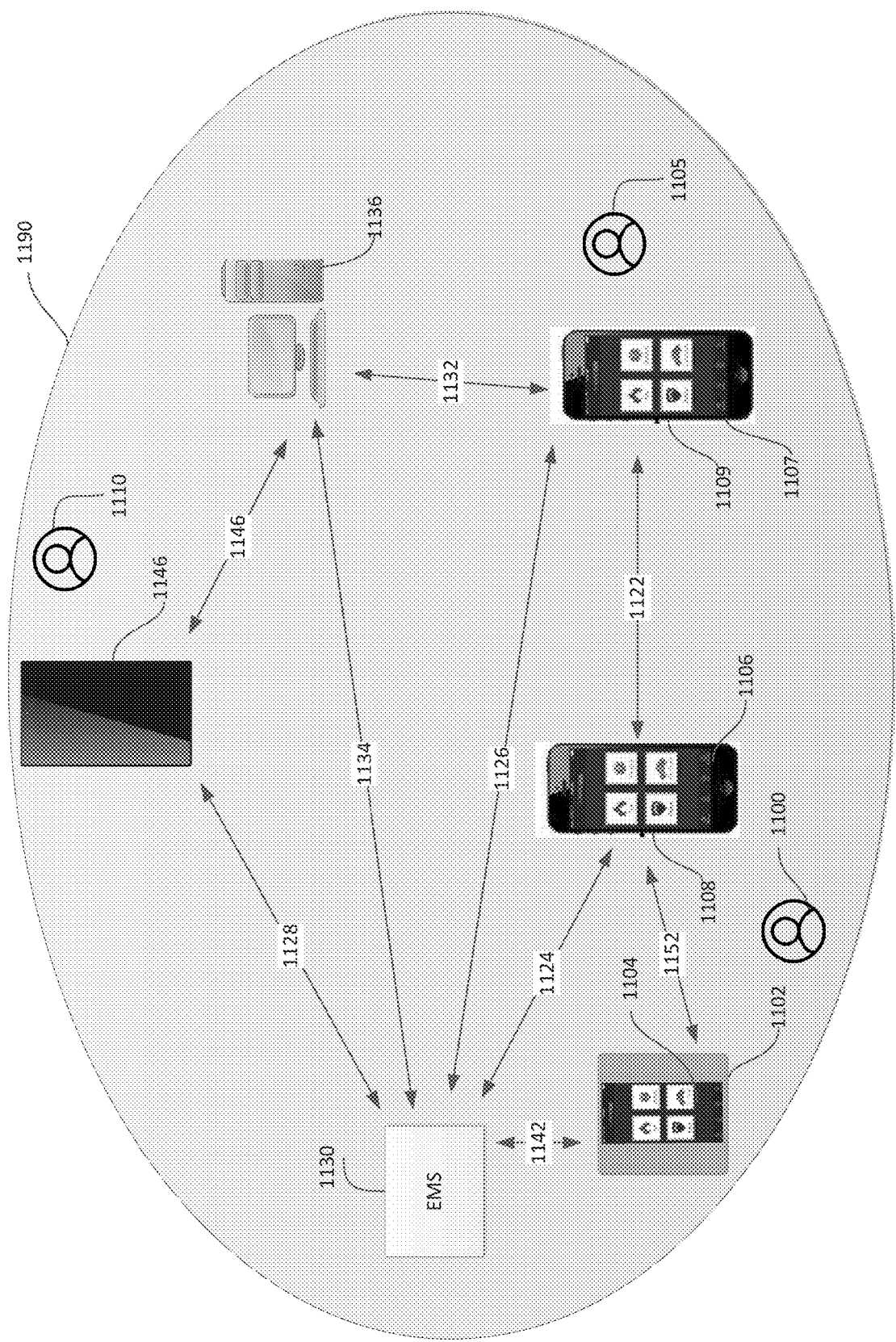
FIG. 11 is an illustration of one embodiment of a group of communication devices.

FIG. 11 illustrates an exemplary embodiment of a group of communication devices 1190 (also referred to as a web of devices) configured to share data with each other and/or other devices (e.g. recipients such as an EMS or EDC). In further embodiments, the sharing of data is periodic or aperiodic. In further embodiments, the data comprises important information, including meta-data regarding the users (1100, 1105, 1110) of communication devices (1106, 1107, 1136, 1146, 1102).

In some embodiments, communication devices (1106, 1107, 1136, 1146, 1102) participating in a web of devices 1190 communicate directly over a peer-to-peer connection using data communication channels (1136, 1146, 1152) without routing the communications over one or more intermediate routing devices (e.g. a router or a switch, used to route messages between the devices). In some embodiments, the devices uses certain technologies to communicate, for example, Bluetooth, ad-hoc networks on unlicensed radio frequency bands (for example the 2.4 GHz bands or the 5 GHz bands), near field communication (NFC), HAM radio network, or other technologies and/or frequency bands to communicate with each other. In certain embodiments, these devices communicate via a routing device for example a Wi-Fi router over a Wi-Fi network, or via a Base Station tower in a cellular network, a Wi-MAX base station, a Femtocell, a Switch, a Hub, a networking router, or any other routing device. In certain embodiments, the devices communicate to an EMS 1130 over data or analog communication channels (1124, 1126, 1128, 1134, 1142) utilizing various forms of networks to communication over the general Internet, for example, Wi-Fi, cellular, 2G cellular, 3G cellular, Long-term Evolution (LTE; 4G), 5G, Wi-MAX, the Internet at large, VoIP network, a co-operative spectrum shared network, a PSTN network, a EPABX network, a Token Ring, IEEE 802.3 based network, a ZigBee network, a WSN, a IEEE 802.16 standard based network, a IEEE 802.15 standard based network, or other form of data or analog communication protocols based network.

In some embodiments, the communication device (e.g. 1102, 1106) comprise application clients (1104, 1108) that send data (including meta-data, location data, user data, etc.) directly over a data communication channel 1152 or via an EMS 1130 over data or analog communication channels (1124, 1126, 1128, 1134) to the rest of the communication devices (1107, 1136, 1146) in the web of devices 1190. In some embodiments, the communication device sends the data update in a periodic fashion. For example, in some embodiments, a data update is sent every 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes. In some embodiments, a data update is sent every 1, 2, 3, 4, 5, 6, 7, 8, 9, 10, 11, 12, 13, 14, 15, 16, 17, 18, 19, 20, 21, 22, 23, or 24 hours. In some embodiments, a data update is sent at least once every 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 minutes. In some embodiments, a data update is sent at least once every 1, 2, 3, 4, 5, 6, 7, 8, 9, 10, 11, 12, 13, 14, 15, 16, 17, 18, 19, 20, 21, 22, 23, or 24 hours. In some embodiments, the communication device sends the data update not in a periodic fashion (e.g. aperiodic update), such that the time duration between updates is not same. In some embodiments, a data update is sent in response to a request for a data update received from another device (e.g. a member device belonging to the same group of devices as the communication device). In some embodiments, the updates sent by a communication device contains critical meta-data identifying health status of the users (1100, 1105, 1110) and/or location information.

In some embodiments, the data identifying health status (e.g. health data) of the users (1100, 1105, 1110) comprises blood group type of the user, pre-existing health conditions, any allergies that the user is sensitive to, medical history of the user, any heart related issues, emergency contact personnel for the user, current heart-rate, current pulse-rate, body temperature, blood pressure, blood oxygen levels, temperature of the environment, pressure of the environment, air flow near the user, and any other indicator of health of the user.

In some embodiments, a first communication device (e.g. 1106, 1107, 1136, 1146, or 1102) in the web of devices 1109 determines that the user of the second communication device (e.g. 1106, 1107, 1136, 1146, or 1102) in the web of devices 1190 is in need of emergency assistance. In some embodiments the first communication device (1106, 1107, 1136, 1146, or 1102) confirms the data about the user of the second communication device with other devices in the web of devices, to ensure that the communication device has the most updated data about the user of the certain another user communication device. Responsive to successfully confirming the data, the first communication device sends a request for emergency assistance to the EMS 1130 indicating that the user of certain another communication device is in need of emergency assistance. In some embodiments, a first communication device (1106, 1107, 1136, 1146, 1102), responsive to successfully confirming the data associated with the user of the second communication device (e.g. user data, health data, location data, sensor data, etc), combines all the available information about the user of the second communication device and any possible emergency situation being faced by the user of the second communication device, and informs the other devices in the web of devices 1190 regarding the current status of the user of the second communication device.

In some embodiments, the first communication device (e.g. 1106, 1107, 1136, 1146, 1102) sends periodic updates to the rest of the devices in the web of devices 1190 on the status of the emergency response as received from the EMS 1130. In some embodiments, the first communication device (e.g. 1106, 1107, 1136, 1146, 1102) sends periodic updates to the rest of the devices in the web of devices 1190 on the health status of the user of the second communication device (e.g. 1106, 1107, 1136, 1146, 1102). In some embodiments, the determination that the user of the second communication device in the web of devices 1190 is in need of emergency assistance is made based on the data received from the communication devices or based on a lack of receipt of expected data information from the communication device for more than a predetermined number of update cycles.

In some embodiments, a communication device (1106, 1107, 1136, 1146, 1102) in the web of devices 1190, initiates a periodic meta-data update, for example, an update regarding health status of a user 1100, and sends this to the other devices in the web of devices 1190. In some embodiments, the periodic meta-data update is initiated by a communication device (1106, 1107, 1136, 1146, 1102) in the web of devices 1190. In further embodiments, the update comprises sensor data from one or more sensors on the user communication device or sensor data from any other device(s) associated with the same user of the user communication device (e.g. a wearable sensor worn by the user with a data connection to the user communication device for uploading sensor data), the location of the user communication device, and any other relevant data that is relevant to the status of the user. In some embodiments, in order to ensure that an update contains the most relevant and updated information about the user, the communication collects information from all associated devices in a list of devices, which contains all devices that belong to the user of the communication device or are associated with the communication device. For example, in some embodiments, the user configures his communication device to connect with a wearable sensor (e.g. a fitness tracker with heart rate and blood pressure monitors) and his home Wi-Fi enabled thermostat. In certain embodiments, the communication device polls or queries the list of devices for the requested data (e.g. sends data request(s)). In some embodiments, the communication device polls communication device(s) in the list of devices on a periodic basis or when a certain event occurs, for example, when a request for emergency assistance is received, or detected, at the user communication device.

In some embodiments, the list of devices is stored in a memory (e.g. a cache or database) internal to the user communication device. In other embodiments, the list of devices is stored in a memory external to the user communication device (e.g. an external database provided by a third party). Further, in some embodiments, the specific list of devices is stored in a memory unit at the EMS 1130.

In some embodiments, responsive to the EMS 1130 receiving a periodic meta-data update from any one of the devices in the web of devices 1190, the EMS 1130 sends a multicast message to the rest of the devices in the web of devices 1190, containing the update, and sends a confirmation of the reception of the meta-data update at the EMS 1130 to the communication device (1106, 1107, 1136, 1146, or 1102) that initiated the meta-data update. In some embodiments, the EMS 1130 decides whether a particular periodic meta-data update is to be sent to the rest of the users in the web of devices.

Figure 12:
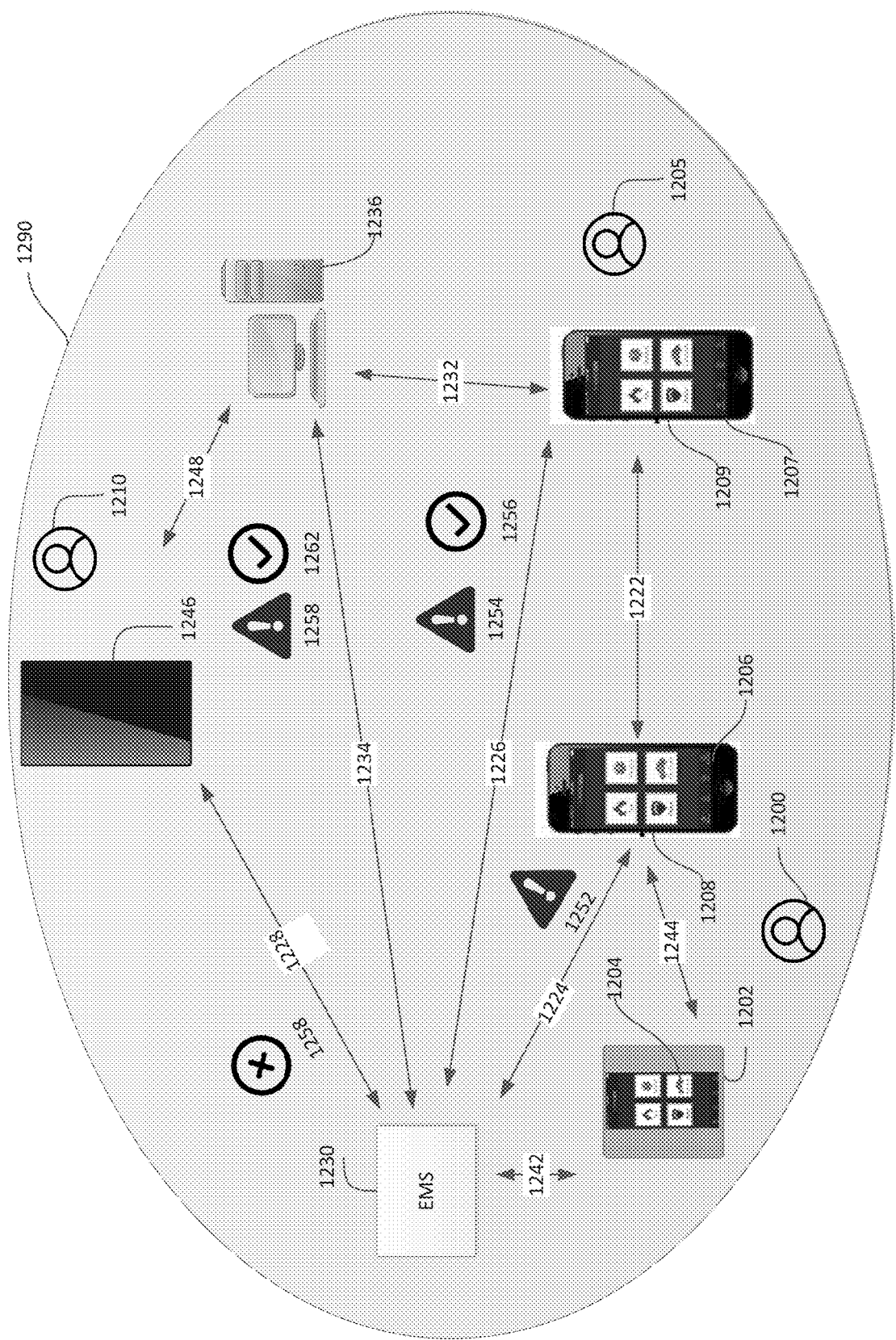
FIG. 12 is an illustration of one embodiment of a group of communication devices for sharing critical data.

FIG. 12 is an illustration of one embodiment of a group of communication devices for sharing critical data (including meta-data and location data). For example, in some embodiments, the user 1200 sends an alert (e.g. 1252), via communication device 1206, and a response (e.g. 1256) to the alert issued by a second communication device (e.g. 1207, 1236, 1246, 1202) in the web of devices 1290.

In another embodiment, a communication device (1206, 1207) in the web of devices 1290 determines that certain data (e.g. periodic signals) from a second communication device 1246 (e.g. a laptop) in the web of devices 1290 has not been received as expected (denoted by 1258). In some embodiments, the determination that the data from the communication device 1246 was not received is made by determining that more than a defined number of periodic information updates, over a certain time period or over a certain number of update cycles, were not received from the second communication device 1246 by one or more of the communication devices (1206, 1207) in the web of devices. In some embodiments, the communication device (1206, 1207) estimates the health status of a user 1210 of the communication device 1246 based on the determination that certain data was not received as expected. In some embodiments, the communication device (1206, 1207) uses the health status estimate of the user 1210 of the communication device 1246 to determine that the user 1210 is in need of emergency assistance.

In some embodiments, the communication device (1206, 1207) sends an alert message (1252, 1254) (e.g. a request for assistance) to the EMS 1230 after making a determination that the user 1210 is in need of emergency assistance. Subsequently, the EMS 1230 detects the reception of alert messages (1252, 1254) from communication devices (1206, 1207). Thus, the alert messages (1252, 1254) include an indication that the user 1210 is in need of emergency assistance. In some embodiments, the alert messages (1252, 1254) include an indication of a possible need for emergency assistance and a request to share the latest one or more updates from the communication device 1246, or any other information available regarding the user 1210 of communication device or regarding the communication device 1246 itself, with the communication device (1206, 1207) that generated the alert messages (1252, 1254).

In some embodiments, the EMS 1230, after detecting the reception of alert messages 1240 from a communication device 1207, and after verifying the identity and association of the user communication device 1207 to the web of device 1290, forwards an alert (e.g. 1258) based on alert messages (1252, 1254) to the rest of the user communication devices (1206, 1236, 1246, 1202) in the web of devices 1290.

In some embodiments, a third communication device 1236, responsive to receiving the forwarded alert message, detects if it has received updated data from the communication device 1246 regarding whom the alert is received, indicating that user 1210 is not in need of emergency assistance. In some embodiments, the communication device 1236 generates an "all OK" message 1262 and sends it to the EMS 1230 to be forwarded to the communication devices (1206, 1207) that generated the alert message (1252, 1254). In some embodiments, the "all OK" message 1262 contains the latest health status of the user 1210, location data of the communication device 1246, sensed information from the user communication device 1236, and any other relevant information indicating user 1210 is not in need of an emergency assistance.

In some embodiments, Responsive to receiving the "all OK" message 1262, the EMS 1230 verifies the identity and association of the communication device 1236 to the web of devices 1290, and then forwards the "all OK" message 1262 to the communication devices (1206, 1207). Responsive to successfully receiving the "all OK" message 1238, in one embodiment, the communication devices (1206, 1207) updates the rest of the devices in the web of devices 1290 regarding the status of the user 1210 of the communication device 1246. In some embodiments, a particular communication device (e.g. 1236) in the web of devices 1290 has a direct data communication channel 1248 with communication device 1246, giving it the ability to receive the updated data. For example, in one embodiment, both users 1205 and 1210 (e.g. a husband and wife) are using one or more computers 1236, wherein the one or more computers 1236 are connected to the internet through a home wireless routing device. In such cases, user 1205 has updated information about the user 1210, which is not shared by other group members who do not share devices or are farther away.

Figure 13:
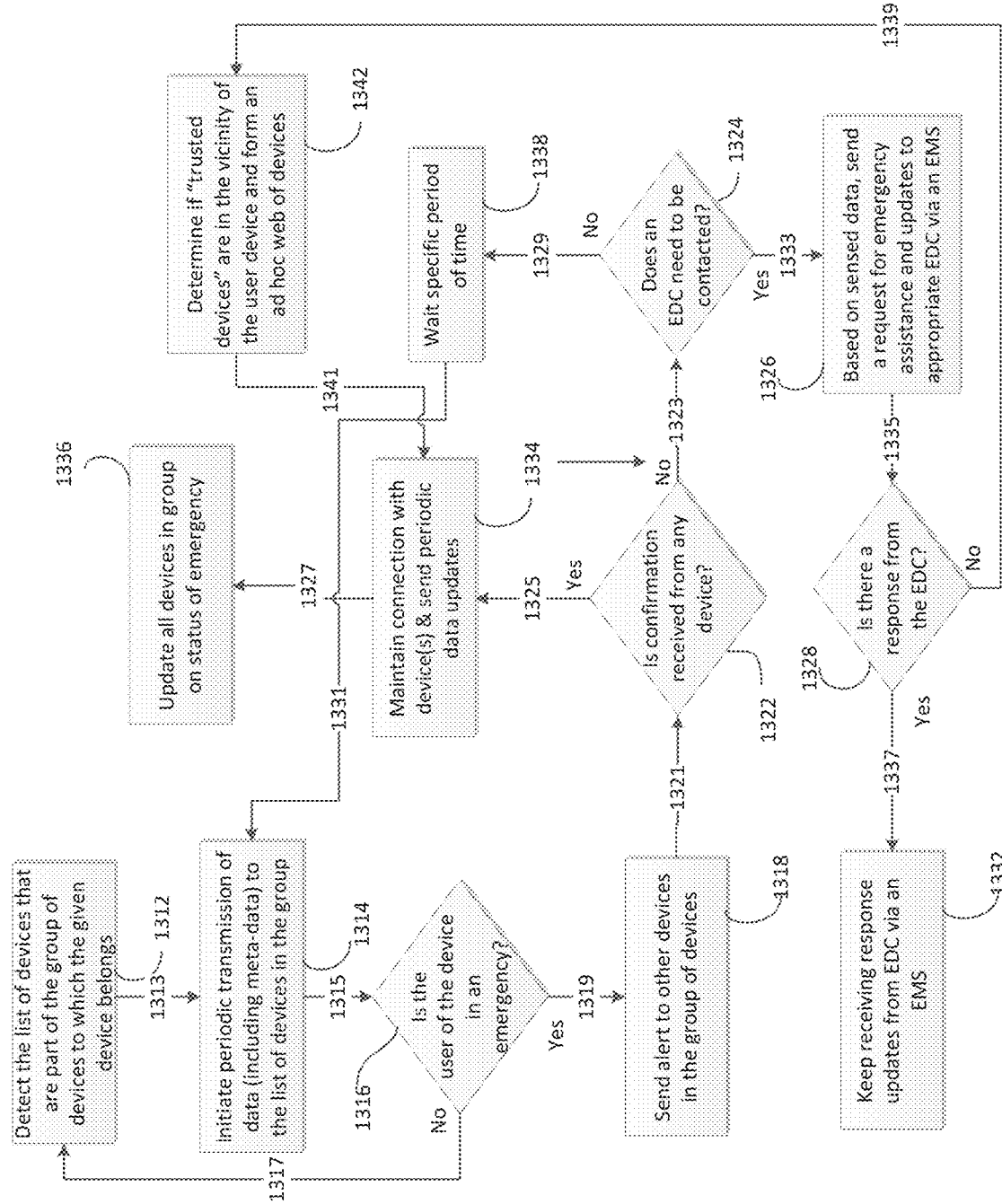
FIG. 13 illustrates an exemplary method for a communication device to inform other devices in a web of devices.

FIG. 13 illustrates an exemplary method for a communication device to inform other devices in a web of devices. In one embodiment, a user (e.g. 1100 in FIG. 11), detects via his or her communication device (1102, 1106) an emergency situation and send a request for emergency assistance to an EDC while informing other communication devices in its web of devices (e.g. 1190 in FIG. 11).

In some embodiments, the web of devices includes the member devices authorized by their users to share data with other devices in the group (e.g. a friends & family group). In further embodiments, the web of devices (e.g. group of devices) comprises devices used by individual group members that only share data with specific individual group members (e.g. a wearable device worn by a user only shares data with that user's communication/member device). In yet further embodiments, although the data from a device associated with an individual user is only shared with one or more devices belonging to that user, the data ultimately is sharable with other member devices in the group if the one or more devices belonging to the user is authorized to share data. For example, in some embodiments, sensor data from a wearable device associated with a user is shared only with the user's communication device (and not directly shared with other member devices in the web of devices), but the communication device itself is authorized to share this sensor data with other member devices in the web of devices.

In some embodiments, a web of devices is created ad hoc when an emergency is detected and one or more users have authorized sharing of information during emergencies. For example, in one embodiment, a user authorize his or her communication device to share an emergency alert and/or personal information (e.g. user data, location data, medical data, sensor data) with devices which are in their contact list. Similarly, in some embodiments, a user shares the alert and/or relevant data with devices that are in proximity with the user. For example, in some embodiments, a device is in proximity with the user when its location is within 5, 10, 20, 30, 40, 50, 60, 70, 80, 90, 100, 150, 200, 250, 300, 350, 400, 450, 500, 600, 700, 800, 900, or 1000 meters or more of the user (e.g. the user's communication device). In one embodiment, a device is in proximity with the user when its location is within 20 meters of the user. In some embodiments, a communication device shares a request for assistance it has detected or received from other devices with devices in its contact list or with devices in the without proximity without authorization.

In some embodiments, as shown in FIG. 13, a communication device (e.g. 1106 in FIG. 11) detects member devices in its web of devices (1190 in FIG. 11) (act 1312). In some embodiments, a user manually adds detected devices as member devices and associates them to the web of devices it belongs to and labels them as "trusted devices" group via their communication device (act 1312). In some embodiments, the communication device periodically generates and transmits data (including meta-data) identifying the health status of the user of the device (e.g. health data), location information (e.g. location data), sensor readings (e.g. sensor data), user data, and/or any other data relevant to user status to the devices in the web of devices (act 1314). In some embodiments, the communication device waits a certain duration of time for reception of periodically transmitted meta-data from member devices in the web of devices. In some embodiments, when a member device does not receive an expected periodic meta-data transmission from a communication device in the web of devices for a pre-determined number of times, it sends a request to the communication device to send the meta-data update.

In some embodiments, responsive to receiving periodically sent meta-data update from a member device (act 1314), the communication device analyzes the meta-data to check if the user associated with the received meta-data is in possible need of emergency assistance (act 1316). Upon determination by the communication device that the user of the device in the web of devices from whom the meta-data is received is not in possible need of emergency assistance (act 1316), the communication device then continues checking periodic meta-data updates received from the other devices in the web of devices.

In some embodiments, responsive to determining that more than a predetermined number of periodic meta-data updates have not been received at the communication device (not shown) or that certain meta-data updates were not received within a certain duration of time or over a defined number of update cycles (not shown), the user communication device determines that the user of the member device failing to provide the expected meta-data updates is in possible need of emergency assistance (e.g. possibility or existence of an emergency situation) (act 1316).

In some embodiments, the communication device verifies the received meta-data information with member devices in the web of devices by sending an alert to other member devices and receiving confirmation (act 1318, 1322). In some embodiments, the communication device verifies the lack of receipt of meta-data information from a certain member device in the web of devices with other member devices in the web of devices (not shown). In some embodiments, the communication device examines the meta-data associated with a member device and compares the version received directly from the member device against one or more versions received from other member devices in the web of devices to determine any differences. In some embodiments, responsive to concluding that the difference in the two sets of meta-data is not significant, or responsive to verifying the received meta-data successfully (act 1322), the device confirms the possibility of the need for emergency assistance by the member device and/or its user (act 1324) and maintains connections (act 1334) and updates all devices regarding the status of the emergency (act 1336). Responsive to determining that the difference in the two sets of meta-data is significant, in some embodiments, the communication device determines a need for emergency assistance is invalid (not shown).

In some embodiments, after the completion of a given time cycle (e.g. waiting for a specific period of time) (act 1338), the communication device returns to periodically generating and transmitting meta-data identifying the health status of the user of the member device, location information, and/or any other meta-data that is relevant to user status to the other devices in the web of devices (act 1314). Responsive to the requirement for emergency assistance for the user of the sending device not being invalidated, in some embodiments, the communication device generates a request for emergency assistance indicating that the user of member device needs assistance, and sends it to the appropriate EDC, for example, a PSAP, via an EMS (act 1326).

In some embodiments, having sent a request for emergency assistance indicating that the user of a member device is in need of emergency assistance, the communication device checks for updates from member devices in the web of devices (act 1322, 1334, 1336). In further embodiments, when there are updates, the communication device sends updated alert messages to the EMS with these updates (act 1326).

In some embodiments, the communication device sends an updated alert message to the EDC in addition to the EMS (act 1326). Having detected that there are no updates from other devices in the web of devices for an ongoing emergency response, the communication device proceeds to send the latest available information regarding the status of the emergency response to the rest of the devices in the web of devices (act 1336). In some embodiments, the communication device continues to receive updates from the EDC/EMS (act 1332) pertaining to the current emergency response and provides the updates to the rest of the devices in the web of device (act 1336). In some embodiments, the communication device verifies if there is any updated information from other devices in the web of device (act 1322) regarding an current emergency situation faced by any user of a communication device that belongs to the web of devices and updates all devices in the group (act 1336).

In some embodiments, when no response is received from the EDC in response to the emergency alert (act 1328), the device determines if there are "trusted devices" in the vicinity and forms an ad hoc web of devices (act 1342) and receives and send periodic data updates from those devices (act 1334).

Figure 14:
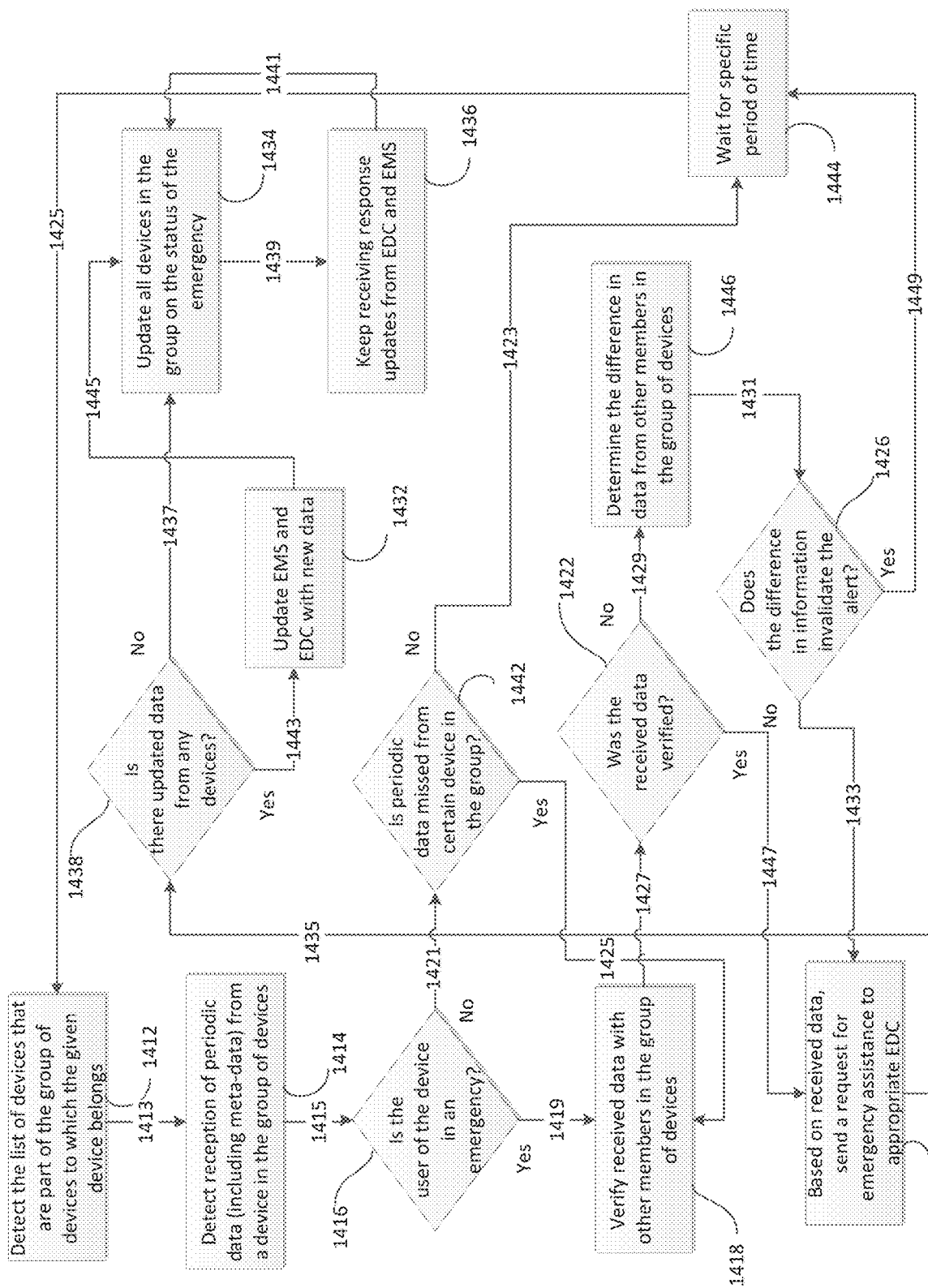
FIGS. 14-16 illustrate exemplary methods for a communication device to autonomously detect an emergency situation.

FIG. 14 is a flow chart illustrating an exemplary method for a communication device to autonomously detect an emergency situation. In some embodiments, a communication device in a web of devices (e.g. 1106 in 1190 in FIG. 11) autonomously detects an emergency situation faced by another user (e.g. user 1110) of a member device in the web of devices.

In some embodiments, a user (e.g. user 1100 in FIG. 11) uses his or her communication device (e.g. 1106) to add detected devices as member devices and associates them to the web of devices it belongs to and labels them as "trusted devices" (act 1412). In further embodiments, the communication device periodically receives data (including meta-data) from a member device identifying the health status of another user in the group (group member). In some embodiments, the group member is using a member device to send data (e.g. location information, and/or any other meta-data) that is relevant to the status of the group member to the devices in the web of devices (act 1414).

In some embodiments, responsive to receiving a periodically sent meta-data update from a member device (act 1414), the communication device analyzes the data (including meta-data) to determine if the user associated with the received data is in need of emergency assistance (act 1416). In further embodiments, after determining that the user of the member device in the web of devices from whom the data is received is not in need of emergency assistance (act 1416), the communication device continues to check periodic data updates received from the other devices in the web of devices.

In some embodiments, responsive to determining that it has not received a threshold number of periodic data updates (act 1442) or that certain data updates were not received within a duration of time or over a defined number of update cycles (act 1442), the communication device determines that the user of the sending device in the web of device is in need of emergency assistance (act 1416). In further embodiments, the communication device verifies the received meta-data information with other devices in the web of devices (act 1418).

In some embodiments, the communication device verifies the lack of receipt of data (including meta-data information) from a certain member device in the web of devices with other devices in the web of devices (act 1418). In some embodiments, the communication device determines the difference between data (including meta-data information) received from the member device and data from other devices in the web of devices (act 1446), wherein the data is associated with the member device (e.g. location data for the member device). In further embodiments, responsive to concluding that the difference in the two sets of data is not significant, or responsive to verifying the received data successfully (act 1422), the device determines the possibility of the user of the sending device requiring emergency assistance is not invalidated (act 1426). In some embodiments, the communication device waits for a duration of time for reception of periodically sent meta-data from another communication device in the web of devices (act 1426).

In some embodiments, responsive to determining that the difference in the two sets of data is significant, the communication device determines that the possibility of emergency assistance is invalidated (act 1426). In some embodiments, responsive to the requirement for emergency assistance for the user of the sending device not being invalidated, the communication device generates a request for emergency assistance indicating that the user of the member device needs assistance, and sends it to the appropriate EDC (e.g. a PSAP) via an EMS (act 1428). In some embodiments, after sending a request for emergency assistance indicating that the user of a member device is in need of emergency assistance, the communication device checks for updates from other devices in the web of devices (act 1438), and if there are updates (act 1438), the communication device sends updated alert messages to the EMS with these updates (act 1428).

In some embodiments, the communication device verifies if there is any updated information from other devices in the web of device (act 1438) regarding a current emergency situation faced by any user of any device within the web of devices (act 1432). In some embodiments, upon detecting that there is updated information available at the communication module of communication device (not shown), the device returns to interpreting and analyzing the information in the received meta-data update. In some embodiments, the device receives response updates from the EDC and/or EMS (e.g. message indicating first responder is on the way) (act 1436) and updates all devices in the group on the status of the emergency response (act 1434). In further embodiments, the loop between act 1436 and act 1434 terminates when the emergency communication session has terminated (e.g. when emergency is resolved or when user indicates there is no longer a need for assistance).

Figure 15:
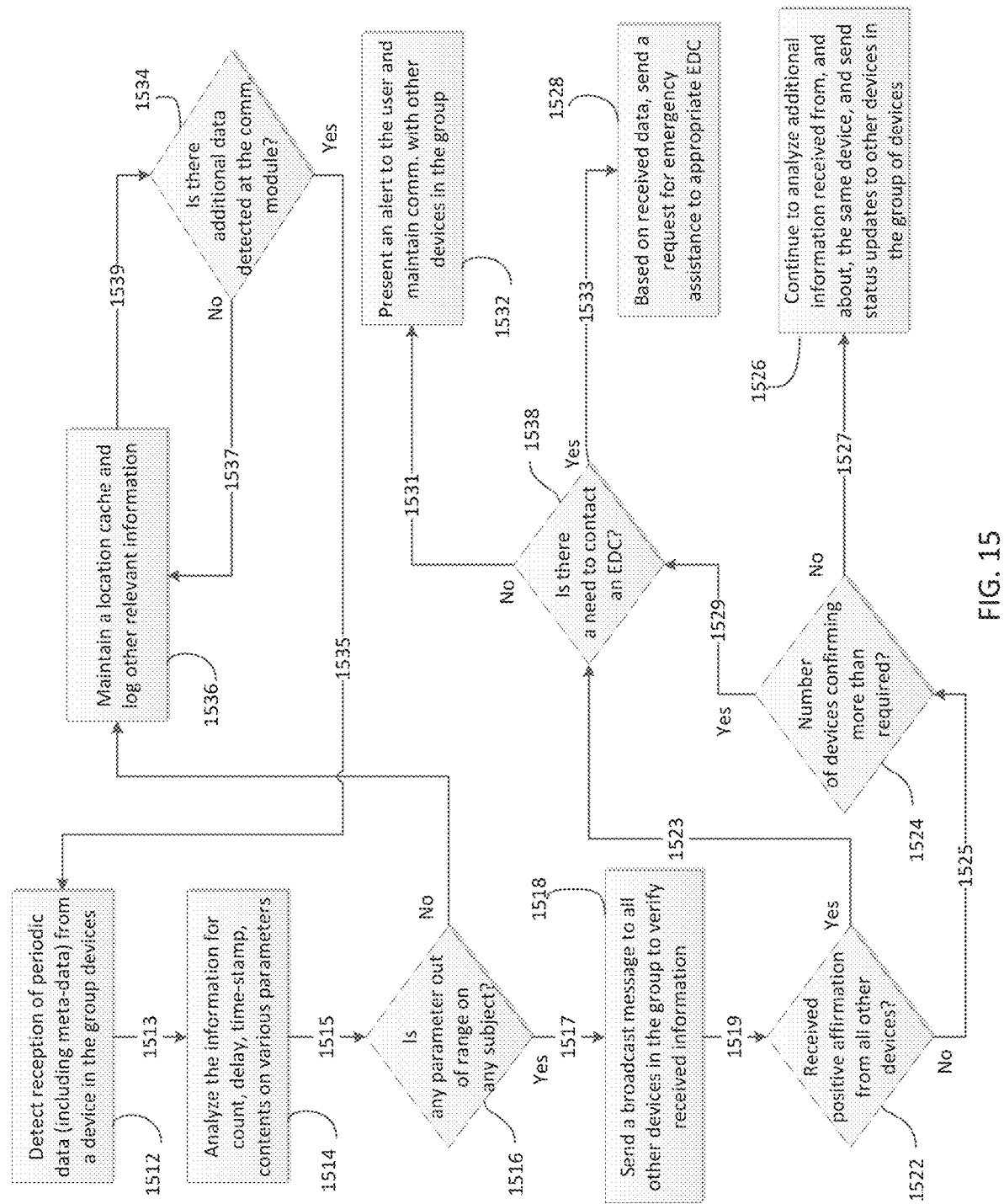

FIG. 15 is a flow chart illustrating an exemplary method for a communication device to autonomously detect an emergency situation. In some embodiments, the communication device detects reception of periodically transmitted data updates (including meta-data) from other member devices in the web of devices (act 1512), and analyzes the received data to check if a user of a member device is in need of emergency assistance (act 1514).

In some embodiments, the communication device decides if the user of a member device is in need of emergency assistance (act 1514) by verifying if any parameters measured over a certain period of time or number of data update cycles are not within their respective pre-defined ranges (act 1516). In some embodiments, the parameters measured selected from one or more of location or displacement of a communication device, number of missed data updates over a certain period of time or number of update cycles from a given device, missed status update in response to a status update request, parameters that measure the user's health such as sensed temperature information, blood pressure, pulse-rate, heart-rate, elevation, movement pattern, amount of daily movement of the user, blood oxygen levels, other health indicators of the user, and any other data that relates to the health status of the user. In some embodiments, the parameters are measured by one or more sensors installed on the communication device. In some embodiments, the parameters are measured by one or more sensors installed on one or more devices that are physically separate from the communication device, wherein the one or more devices are associated with the same user and are able to communicate with the communication device (e.g. for transmitting sensor data).

In some embodiments, upon verification that none of the parameters exceed a threshold indicating an emergency situation (act 1516), the communication device maintains a local cache of information comprising the most recent received data updates from one or more communication devices (act 1536). Upon verification that one or more of the parameters included in the received data update are out of their respective pre-defined range or threshold (act 1516), the communication device sends a broadcast alert message (e.g. 1252 in FIG. 12) to all other devices in the web of devices to verify the received meta-data information (act 1518).

In some embodiments, upon receiving updated information from member devices in the web of devices, or when not all of the member devices in the web of devices verify the parameters for the given user (allegedly needing emergency assistance) as exceeding a threshold or pre-defined range, the communication device re-analyzes the received data, wherein the communication device checks for a total count of missed data updates over a certain time duration or number of update cycles in order to verify the likelihood of an emergency situation and that an emergency alert is to be constructed for the same (act 1518). In some embodiments, upon detecting a positive response is received from more than a pre-defined threshold devices (act 1524) (e.g. at least half of the devices), then the communication device checks to verify if an EDC is required to be contacted to assist with the possible emergency situation (act 1538). In further embodiments, when an EDC is not required to be contacted for this emergency situation (act 1538), the communication device presents an alert to the user and maintains communications with the rest of the devices in the web of devices, and updates these devices based on the input from the user (act 1532).

In some embodiments, upon determining that it is required to contact an EDC (e.g. a PSAP) and/or an EMS (act 1538), the communication device sends a request for emergency assistance to the EMS and the EMS in turn sends the request to the required EDC (act 1528) either directly or indirectly by allowing the EMS to send the request to the EDC. In some embodiments, when all of the devices in the web of devices send a positive response confirming that one or more parameters associated with the member device and/or its user exceed a pre-defined threshold or range (e.g. heart rate monitor shows user of member device has a dangerously low heart rate) (act 1522), the communication device confirms an emergency situation exists (e.g. a medical emergency in this case) and contacts the EMS regarding the possible emergency situation.

In some embodiments, when the communication device does not receive one or more positive responses confirming the parameter is outside a pre-defined threshold from devices in the web of devices, then the communication device continues to analyze any additional data (including meta-data) received about the member device and send status updates to other devices in the web of devices (act 1526). In when embodiments, when the communication device determines that there is no new data available pertaining to the user of the member device (act 1534), the communication device continues to maintain a log of information from the latest data update(s) regarding the user.

Figure 16:
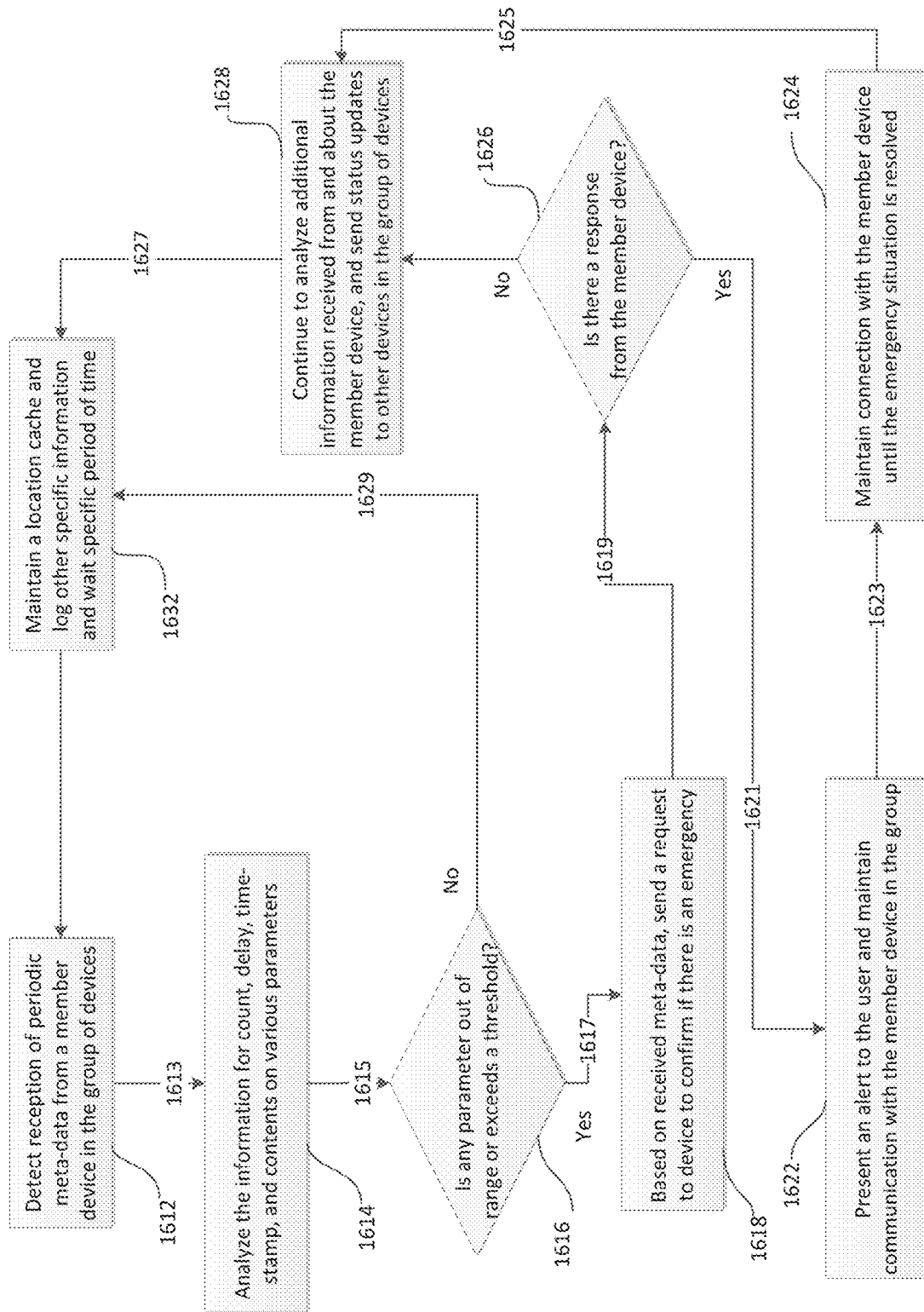

FIG. 16 is a flow chart illustrating an exemplary method for a communication device to autonomously detect an emergency situation. In some embodiments, the communication device detects reception of periodically transmitted data updates (including meta-data) from the other communication devices in the web of devices (act 1612), and analyzes the received meta-data to check if another user in the web is in need of emergency assistance (act 1614).

In some embodiments, a communication device detects that certain parameters measured over certain period of time or number of data (including meta-data) update cycles, are not within their respective pre-defined ranges or thresholds for example, periodic meta-data transmission from a member device in the web has not been received for a predetermined number of times (act 1616). In some embodiments, after analyzing the received data and determining that the user of one of the member devices sending the request is likely in need of emergency assistance (act 1614), the communication device sends a verification request (also referred to as confirmation request) to the member devices (act 1618). After sending the verification request to the particular device from whom the data update is received, and upon receiving a positive affirmation of the verification (e.g. confirming the emergency situation) (act 1626), the communication device presents an alert to its user and maintains communications with the member device associated with the parameter data (act 1622).

In some embodiments, the communication device persists to maintain a connection with the member device associated with the parameter data until there is an indication that the emergency situation is resolved (act 1624). In some embodiments, the communication device continues to analyze additional information received about the member device and/or its user, and send status updates to other devices in the web of devices (act 1628).

In some embodiments, the communication device continues to maintain a log of information about the latest meta-data update(s) regarding the user of the member device (e.g. information relevant to the health status of the user of the device, location information, and/or any other meta-data that is relevant to user status), waits for a period of time (act 1632), and then returns to detecting reception of periodically transmitted data updates (act 1612).

Figure 17:
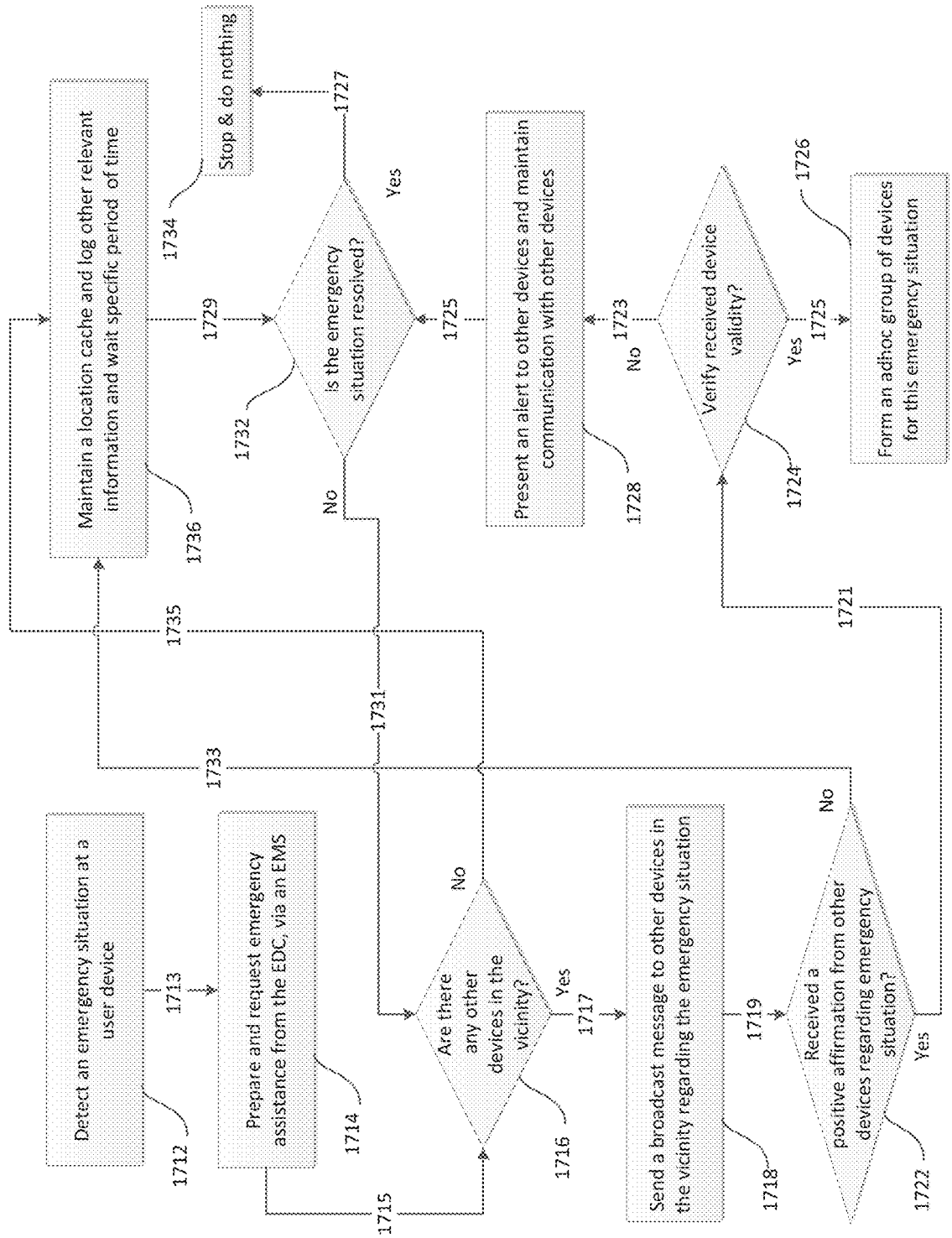
FIG. 17 illustrate an exemplary method for sending a broadcast message regarding an emergency situation to devices in the vicinity.

FIG. 17 illustrates an exemplary method for sending a broadcast message regarding an emergency situation to devices in the vicinity by creating an ad hoc web of devices. In some embodiments, the communication device detects an emergency situation being faced by its user (act 1712). In some embodiments, responsive to detecting emergency situation being faced by the user of the communication device (act 1712), the communication device generates a request for emergency assistance and sends it to the EMS and/or the EDC (act 1714).

In further embodiments, a communication device detects if there are other devices, either part of the web of devices or as new devices, in the vicinity of the communication device (act 1716). In some embodiments, a device is in the vicinity of the communication device when it is within a certain distance as described elsewhere in the specification herein. In some embodiments, a device is in the vicinity of the communication device when it is within 1, 5, 10, 20, 30, 40, 50, 60, 70, 80, 90, 100, 150, 200, 250, 300, 350, 400, 450, 500, 600, 700, 800, 900, or 1000 meters of the communication device. In some embodiments, the user of the communication device sets the distance parameter for a device being in the vicinity of the communication device. In further embodiments, upon detecting that there are no such devices, the communication device continues to maintain a log of information of the latest data (including meta-data) update(s) regarding the user and waits a specific pre-defined duration of time (act 1736). In some embodiments, the communication device checks if there is an emergency situation faced by the user of communication device (act 1712). Upon determining that the emergency situation is indeed resolved (act 1732), the device stops (act 1734).

In some embodiments, upon detecting that there is at least one device in the vicinity of the communication device (act 1716), the communication device sends a broadcast alert message to all devices in the vicinity of the communication device (act 1718). If the communication device receives a positive affirmation from at least one device in the vicinity of the communication device (act 1722), the device validates the device in the vicinity of the communication device (act 1724). Upon successfully validating the at least one of the devices, the communication device sets up an ad hoc web of devices (also referred to as an ad hoc group of devices) for this particular emergency situation (act 1726).

In some embodiments, upon failing to successfully validate at least one of the devices in the vicinity of the communication devices (act 1724), the communication device presents the alert message containing the information regarding the emergency situation to the un-validated devices (act 1728). In further embodiments, the communication device continues to maintain a log of information about the latest data update(s) (including meta-data) regarding the user of the communication device, for example, identifying the health status of the user of the device, location information, and/or any other meta-data that may identify user status and waits for a specific period of time (act 1736).

Figure 18:
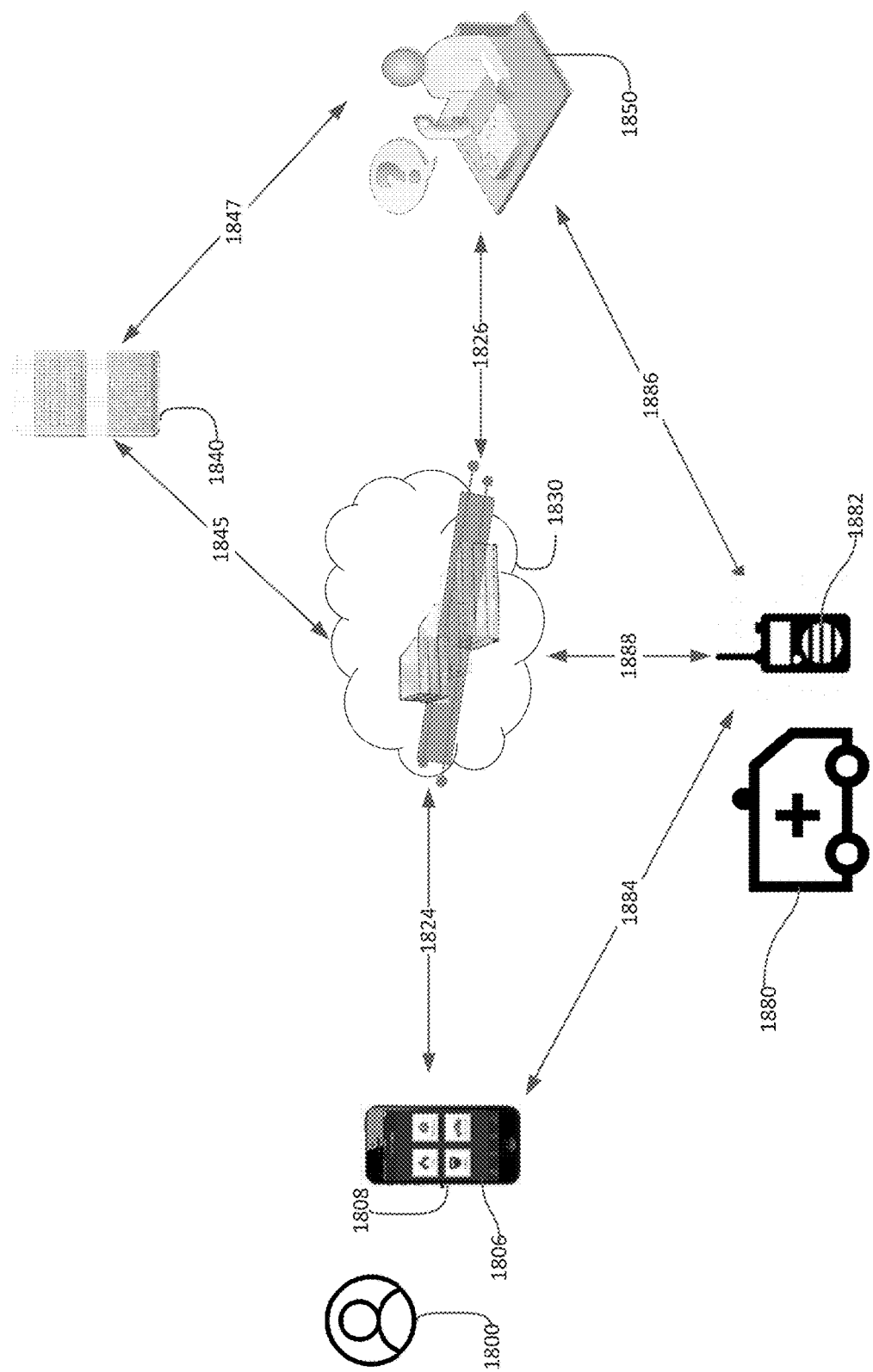
FIG. 18 is an illustration of a system for seamless data transfer between a user's communication device and a communication device of a first responder.

FIG. 18 illustrates an exemplary embodiment of a system for seamless data transfer between a user's communication device and a communication device of a first responder. In some embodiments, a user 1800 uses his or her communication device 1806 to send over a communication link 1824 a request for assistance to an EMS 1830, wherein the EMS 1830 shares this request, via communication link 1826, with an EDC 1850 (such as a PSAP) in a compatible format. In further embodiments, data such as location information regarding the communication device 1806 is provided to one or more of the EMS 1830, EDC 1850, and first responder 1882, in a format that is compatible with each entity, through secure and trusted pathways.

In other embodiments, the EMS 1830 first confirms that a request for emergency assistance needs to be sent to the EDC 1850 before sending the request to the EDC 1850. In some embodiments, the EMS 1830 identifies, with help from the EDC 1850, a first responder 1880 (e.g. a police unit, an ambulance, fire unit, or another first responder) assigned or to be assigned to the request for emergency assistance and forms a data communication link with the communication device of the first responder 1882. It is understood that the first responders are be dispatched to provide assistance by both private and public entities including municipalities, counties, hospitals, universities or colleges, private security agencies, road-side assistance companies, corporations, private groups, and other entities.

In other embodiments, the EMS 1830 establishes a data communication link 1888 over a data communication channel with the communication device of the first responder 1882. In other embodiments, the data communication channel is selected based on estimating the quality of the data connection based on various link quality parameters, for example, received signal strength indicator (RSSI) value measured at the communication device of the first responder of the power contained in the data signals sent from the EMS 1830 or the EDC 1850, channel latency, error-rate, congestion on the data channels, jitter, or the transmission delay on the communication channels (1886, 1888) between the EMS 1830 or EDC 1850 and the communication device of the first responder 1882.

In other embodiments, once a suitable data communication session (via link 1826) is established between the EMS 1830 and the EDC 1850, and between the EMS 1830 and the communication device of the first responder 1882 (via link 1886), these communication sessions are bridged together by the EMS 1830 so that information or data received, including multimedia media information, by any of the communication device or the EMS, is made available to the communication device of the first responder 1882. In some embodiments, when multiple communication devices are in communication with the EMS 1930 (FIG. 19), the EMS 1830 maintains a communication bridge between one or more communication devices (1906, 1907, 1916, 1917), the EMS 1930, and the communication device of the first responder 1982 via the communication links (1924, 1926).

In some embodiments, multimedia data is shared between the one or more communication devices, the EMS (1830, 1930), and the communication device of the first responder (1882, 1982), wherein the data includes one or more of video files, image files, streaming video data, multimedia messaging system data, short messaging system files, instant messaging data, GPS location and other multimedia media data available on the user communication device.

In some embodiments, the EMS (1830, 1930) also includes the EDC (1850, 1950) in the data communication bridge if the EDC (1850, 1950) is capable of communicating over a data communication channel (1826, 1926) directly. In some embodiments, if the EDC (1850, 1950) is incapable of receiving data directly (e.g. can only receive voice calls), then the EMS (1830, 1930) sends data received from the communication device (1806, 1906) or the communication device of the first responder (1882, 1982) via a data session over a data communication channel (1845, 1945) to a gateway (1840, 1940), which sends the information via a public switched telephone network (PSTN) call over a PSTN channel (1844, 1944) to the EDC (1850, 1950).

In some embodiments, once the communication bridge is formed between the communication device (1806, 1906) and the communication device of the first responder (1882, 1982), the EMS (1830, 1930) setups a direct data communication link (1884, 1984) between the communication device of the first responder (1882, 1982) and the communication device (1806, 1906) so that the data is shared over a shortest possible networking path over the given data communication network.

In some embodiments, the EMS (1830, 1930) maintains the communication bridge between the communication device (1806, 1906) and the communication device of the first responder (1882, 1982), while also setting up a direct communication session between these devices. In some embodiments, the EMS (1830, 1930) actively manages all the data communication sessions and keeps a cache of information, including multimedia information, shared between the various devices.

Exemplary communication devices of the first responders (1882, 1982) include mobile phones, smart phones, digital radios, walkie talkies, mobile data terminals in the vehicle or other devices. In some embodiments, the communication devices communicates wirelessly through secure and trusted paths.

In some embodiments, the communication links with the communication devices of the first responders (1881, 1982) utilize secured and encrypted communication pathways (e.g. encryption, password protection, authorization codes, anonymized networks, secure instant messaging, secure VoIP, secure email, etc.). In some embodiments, the EMS (1830, 1930) is added as a "trusted connection" on the responder devices (1882, 1982) and the communication may use a trusted path or channel so that attackers cannot interfere with the communication. In addition, the responder devices (1882, 1982) use techniques for anonymization including proxy connections, encryption, and other methods to maintain the integrity of one or more of the communication links (1884, 1984, 1888, 1988, 1886, 1986).

In some embodiments, communications and/or data received by the responder devices (1882, 1982) are screened by the EMS to prevent over-burdening the first responders (1880, 1980) with unhelpful and/or excessive data. In some embodiments, screening and filtering of the data is performed using available filters (e.g. spam or virus filters, limits on file size, type of files, etc.) or based on setting preferences of the first responders (1880, 1980) (e.g. first responder sets his or her device to not receive data, to only receive voice data, to only receive location data, to not receive sensor data, etc.).

Figure 19:
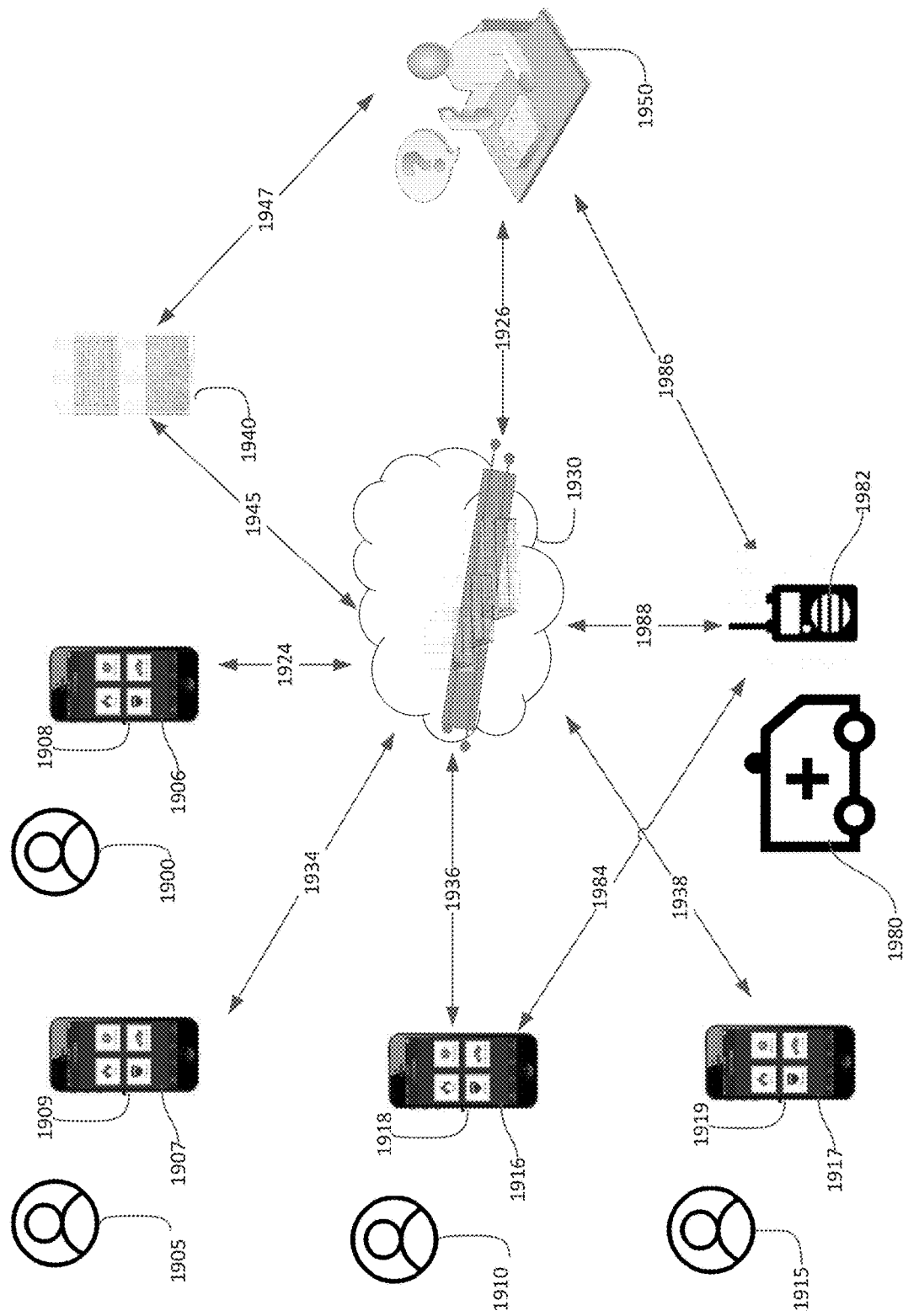
FIG. 19 is an illustration of one embodiment of a system for remotely accessing one or more communication devices by an Emergency Management System or a first responder.

FIG. 19 illustrates an exemplary embodiment of a system for remotely accessing one or more communication devices by an Emergency Management System or a first responder. As shown, a communication device of a first responder 1982 remotely accesses one or more communication devices of one or more users (1900, 1905, 1910, 1915) via a computer network managed by the EDC 1950 or EMS 1930.

In some embodiments, the communication device of a first responder 1982 remotely accesses a user communication device (e.g. 1906, 1907, 1916, 1917) via a secure network managed by an EDC 1950 or an EMS 1930. In some embodiments, the responder device 1982 remotely accesses a communication device (e.g. 1906, 1907, 1916, 1917) via a third party network (not shown). In some embodiments, the third-party is a public or private entity that provides a secured and trusted connection for the communications. In further embodiments, the third-party also screens the data being sent to the responder devices 1982. In some embodiments, the responder devices 1982 remotely access a communication device (e.g. 1906, 1907, 1916, 1917) directly via a peer to peer connection. In some embodiments, the responder devices 1982 remotely accesses a communication device (e.g. 1906, 1907, 1916, 1917) directly via a peer-to-peer network. In some embodiments, the EMS 1930 or the EDC 1950 detects a request from the responder devices 1982 over a data or analog communication channel 1986 to send a mass message (e.g. a warning) to a list of communication devices (e.g. 1906, 1907, 1916, 1917) regarding an emergency situation. In further embodiments, the warning message is based on one or more criteria such as location of devices, time of day, type of user, type of emergency, and other criteria.

In some embodiments, the EMS 1930, with or without assistance from the EDC 1950, determines a list of users (and associated devices) to be included in the mass messaging. In some embodiments, the list of users to be included in the request for mass messaging, is determined based on one or more of a criteria, for example, last known best location estimates of the communication devices, locations of the communication devices relative to the location of the emergency, time-of-day, type of user (student, elderly etc.), type of emergency, and other such pertinent information regarding an existing or a developing emergency situation.

In some embodiments, the EMS 1930 sends a mass message to the list of communication devices, as already determined by the EMS 1930, including any information sent to the EMS 1930 and the EDC 1950 by the responder devices 1982, and any additional information the EMS 1930 or the EDC 1950, decides to include in the mass message. Further, in certain embodiments, the EMS 1930 or the EDC 1950 receives an additional request from the responder devices 1982 for remotely accessing one or more communication devices. In some embodiments, the EMS 1930 and/or the EDC 1950 first authenticates an additional request from the responder device 1982 for remotely accessing one or more communication devices. Further, in some embodiments, the EMS 1930 and/or the EDC 1950 identifies a sub-list from the list of user communication devices, to send the mass message. In some embodiments, the EMS 1930 sends a mass message to the communication devices on the sub-list containing a request for remote access by the EMS 1930, the EDC 1950, and the responder devices 1982.

In some embodiments, the mass message contains a request for remote access by the EMS 1930, the EDC 1950, and the responder device 1982. In some embodiments, the EMS 1930 waits for a response from a communication device (e.g. 1906, 1907, 1916, 1917) for setting up a temporary remote access link 1984 between the communication devices and the responder devices 1982. In certain other embodiments, responsive to receiving a confirmation from a user (e.g. 1900, 1905, 1910, 1915) sets up via their communication device (e.g. 1906, 1907, 1916, 1917) a temporary remote access link 1984 for the purpose of allowing access to information about the emergency situation available on the communication devices (e.g. 1906, 1907, 1916, 1917) by the responder devices 1982.

In other embodiments, the information regarding the emergency (also referred to as "relevant information" on the communication devices (e.g. 1906, 1907, 1916, 1917) is routed through the EMS to responder devices 1982. In some embodiments, the EMS 1930 provides secured and trusted communication pathways and also screens and filters for relevant data before providing the relevant data to first responders 1980. In some embodiments, EMS 1982 forwards any relevant information received by the EMS 1930 to the EDC 1950. In some embodiments, the EMS 1930 connects to the EDC 1950, either via a data session over a data communication channel 1926 or over a combination of links 1945 to a gateway 1940 and a PSTN call over a PSTN channel 1947 to the EDC 1950. In further embodiments, the EMS 1930 continues to monitor all data communication sessions over various data communication links and shares relevant information about the emergency situation with the EDC 1950 and the responder devices 1982.

FIG. 20A depicts an exemplary screenshot of a communication device with "estimated time of arrival (ETA)" for responders. The screenshot 2010 shows that the user (e.g. user 200 from FIG. 2) is "connected" (2020) with a recipient, such as an EDC 250 or a private service provider. In some embodiments, the call is routed through EMS 230. After receiving a request for assistance, the EDC provides information (including location data and type of emergency) about the emergency to first responders who can provide assistance on the scene. In some embodiments, the EDC or EMS is aware of one or more units of responder units who will be deployed on the scene and is able to provide information about the emergency response to the user who is in the emergency situation. Providing information about the emergency response is helpful because the user is able to administer self-help while waiting for responders to come on the scene. For example, in the case of a fire, the EDC is able to advise the user to use a fire extinguisher to reduce flames while first responders are on their way. For a medical emergency, such as a person experiencing an allergy attack, the EDC is able to guide the user or nearby persons to find an epinephrine auto-injector while waiting for responders.

As shown, the "estimated time of arrival (ETA)" 2030 for responders is shown as "Responder will be arriving in 10 minutes." In some embodiments, the ETA is updated in real-time with accurate information. It is understood that the ETA may be displayed in various ways so that the user experiencing the emergency and/or near-by persons understands how long it will take for responders to arrive. In some embodiments, the screen 2010 includes instructions on what to do while waiting and/or self-help guidelines. In an alternative embodiment, the screen 2010 includes a map showing the location of responders (not shown). In further embodiments, the map showing the location of responders is updated in real-time.

In addition, FIG. 20A shows an exemplary embodiment of a screen 2010 allowing the user to choose 4-options while communicating with the EDC—text or SMS 2022, camera 2024, speaker phone 2026, can't speak 2028. In some embodiments, the screenshot includes a log 2032 about the location data that is being shared with the EMS and/or EDC. Here, the log 2032 indicates that the location of the device has been updated. The "End call" button 2034 allows the user to end the connection.

FIG. 20B depicts an exemplary screenshot of a communication device with location sharing settings. The screen 2040 shows "location sharing" settings on a communication device.

In some embodiments, the user is able to access screen 2040 through the settings button 2050 from other screens of the application client. By moving the toggle buttons 2056, a user provides permission or authorization to share his or her location information (e.g. geographical coordinates from GPS on the communication device or a pre-saved location, such as home address) with different users and entities through electronic communications (e.g. with other member devices in a group or web of devices the user's communication device belongs to). As shown, the data sharing settings allow a user to give permission to share his or her location with various location recipients 2042—"All", "Friends & Family", "Medical assets", "Safety Assets", "Responders", "Volunteers."

In some embodiments, the location recipients 2042 are user-defined groups or individuals such as a list of family members. For example, in one embodiment, an elderly user includes several family members into a group and shares his location with them periodically so that they stay informed about his well-being. In addition to family members, in some embodiments, a user creates a group of medical providers or medical assets who are able to view his location during an emergency.

In some embodiments, the location recipients 2042 are obtained from public or private databases. For example, in some embodiments, one or more contacts are automatically imported into a "friends & family" group. In some embodiments, medical assets include nearby hospitals and clinics from "yellow pages." In further embodiments, stored information about the medical assets include online reviews of the medical assets.

It is noted that the screen 2040 is exemplary, and multiple variations are contemplated including real-time authorization for specific communications, authorization at registration, and/or other variations. In some embodiments, the user chooses to share location information only during emergencies with users in an emergency contact list, users, responders and volunteers in the vicinity, and others. In some embodiments, the user chooses the type of security or encryption procedures used when sharing location information to protect the user's privacy.

FIG. 20C depicts an exemplary screenshot of a communication device showing a map of medical assets. The screen 2070 shows geographical location of medical assets on a map 2080. In some embodiments, medical assets include hospitals, clinics, doctors, nurses, pharmacies, first aid kits, and/or other assets. The navigation bar 2072 at the bottom of the screen 2070 shows individual medical assets and a button for adding assets 2074. In some embodiments, the locations of the medical assets are displayed based on their physical addresses listed on public and private lists or databases or from communication devices in those facilities.

In some embodiments, the map 2080 shows location pins or markers 2082 for medical assets (e.g. hospitals, clinics, etc.) and points of interest 2084 (e.g. train stations, public parks, etc.) in relation to streets and intersections. In addition, in some embodiments, if the user is located within the viewed area of the map 2080, a user location pin 2086 (not shown) is included. It is understood that the viewed area of the map is adjustable by zooming in or out, rotating the angle of view, and/or panning. In some embodiments, a user uses a "check-in" (such as button 2088) or an "all OK" button to instantly share his or her location with individuals and entities authorized to receive this information (e.g. providing a status update).

It is understood that the screen 2070 is exemplary and several variations are contemplated. In some embodiments, the map 2080 shows safety assets (such as police, private security personnel, fire extinguishers, fire hydrants, chemical showers, etc.), responders (EMTs, paramedics, etc.), volunteers (fire marshals, etc.).

Figure 21:
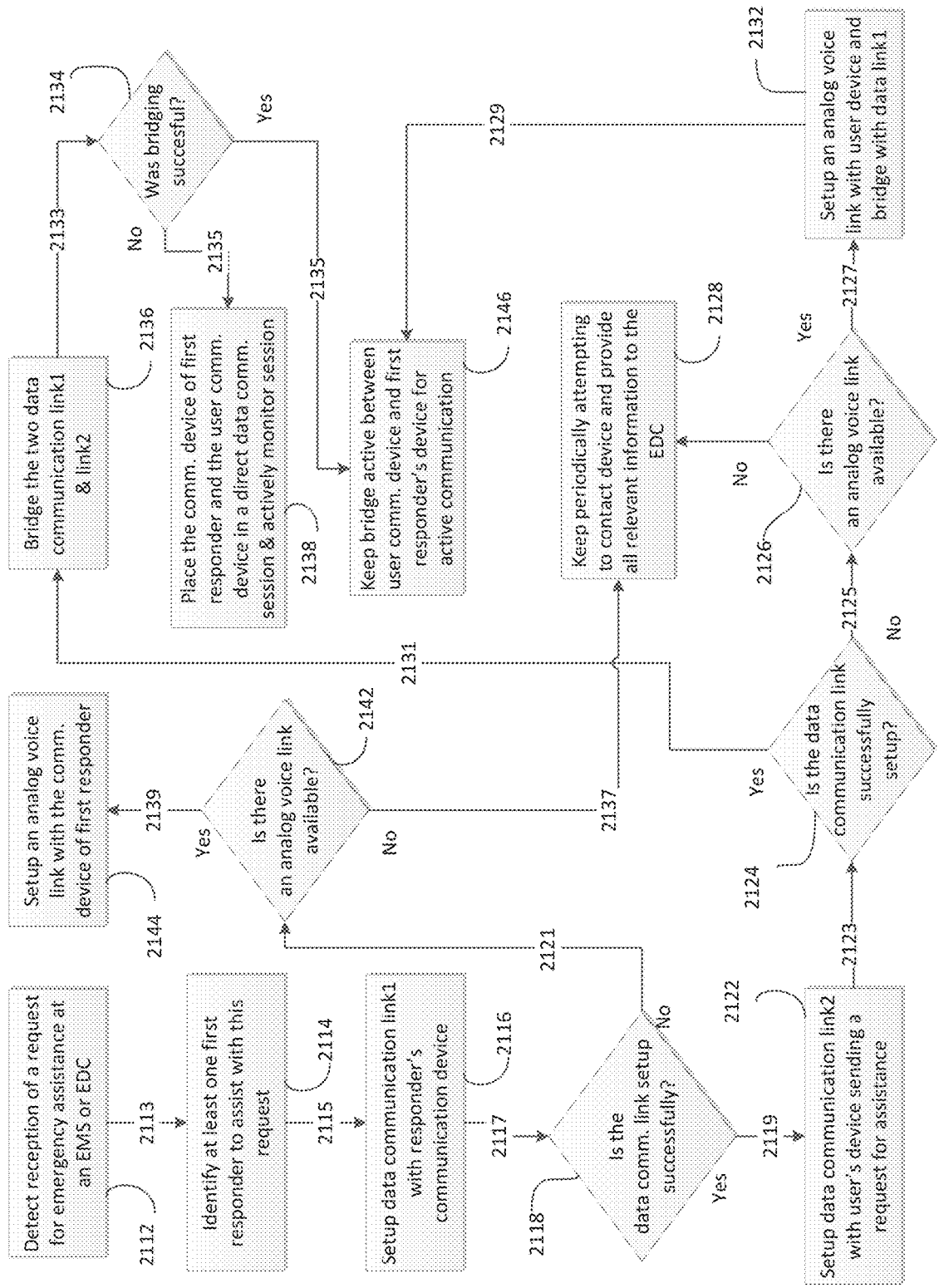
FIG. 21 illustrates an exemplary method for setting up a communication channel with a first responder's communication device.

FIG. 21 illustrates an exemplary method for setting up a communication channel with responder's communication device. In some embodiments, a data transfer channel is established between a communication device (e.g. 1806 in FIG. 18) and a communication device of a first responder (e.g. 1882 in FIG. 18).

In some embodiments, an EMS or an EDC detects a request for emergency assistance (act 2112) from a user via a communication device. In some embodiments, if multiple requests are received, the EMS or EDC recognizes that they are associated with the same emergency situation (e.g. an apartment fire wherein multiple residents call the EDC or fire department).

In some embodiments, the EMS, with assistance from the EDC, identifies at least one first responder in the vicinity of the user communication device calling for emergency assistance (act 2114) to assist with the request for emergency assistance. In some embodiments, upon successful identification of at least one first responder, the EMS establishes a data communication session with the communication device of the first responder (act 2116) and bridge the EDC in the communication session with the communication device of the first responder. In some embodiments, the data communication channel (e.g. 1888 from FIG. 18) is selected based on one or more channel quality indicators, for example, a received signal strength indicator, channel latency, error-rate, or other indicators.

In some embodiments, the EMS verifies if the data communication session with the communication device of the first responder is successfully established (act 2118). In further embodiments, upon identifying that the data communication session is not successfully established between the EMS and the communication device of the first responder (act 2121), the EMS checks to see if there is an analog voice channel available for communication with the communication device of the first responder (act 2142). Upon identifying that an analog voice channel is available, the EMS establishes an analog voice channel between the EMS and the communication device of the first responder (act 2144), and maintains a communication bridge between the communication device and the communication device of the first responder (not shown). If an analog voice channel is not available (act 2137), the EMS periodically attempts to set up a successful communication session with the communication device and updates the EDC, and the responder's device, via a data communication channel, regarding all pertinent information the EMS is privy to regarding the emergency situation (act 2128).

In some embodiments, the EMS checks if the data communication channel with the communication device has been successfully established (act 2124). In further embodiments, upon identifying that the data communication channel with the communication device of the first responder has been successfully set up (act 2131), the EMS sets up a data communication link with the communication device from which the request for emergency assistance was received, and bridges the two communication sessions (act 2136). In some embodiments, upon identifying that the data communication session has not successfully established between the EMS and the communication device (act 2125), the EMS checks to if there is an analog voice channel available to communicate with the communication device (act 2126). In further embodiments, upon identifying that an analog voice channel is available (act 2127), the EMS establishes an analog voice session using the analog voice channel between the EMS and the communication device (act 2132). In some embodiments, the EMS maintains a communication bridge between the communication device and the communication device of the first responder (act 2146).

In some embodiments, responsive to identifying that the data communication channel with the communication device has been successfully set up (act 2131), the EMS establishes a data communication bridge (act 2136) between the communication device and the communication device of the first responder. Upon detecting that the bridging of the communication sessions of the EMS with the communication device and the EMS and the communication device of the first responder is not successful (act 2135), the EMS places the communication device and the communication device of the first responder in a direct data communication channel with each other (act 2138).

In some embodiments, the EMS selects a data communication route such that the networking path taken for data messages to traverse between the communication device and the communication device of the first responder is via the shortest available path. In some embodiments, the shortest available path is a networking path that takes the least amount of time for data to be transmitted between end devices and/or systems (e.g. shortest path in time and not distance). In some embodiments, the EMS actively monitors the direct data communication route between the communication device and the responder device.

Figure 22:
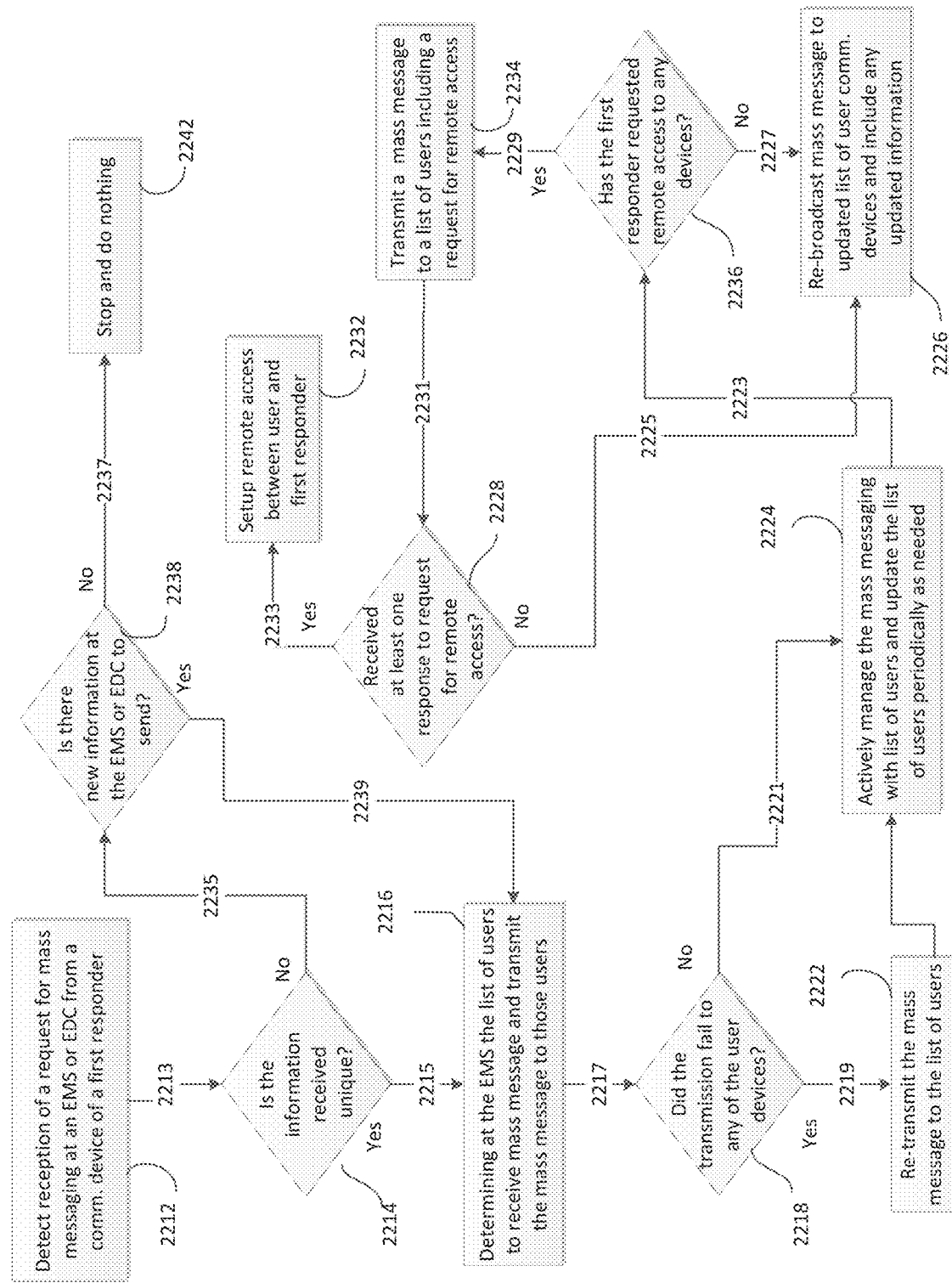
FIG. 22 illustrates an exemplary method for allowing remote access to a user's communication device by a responder.

FIG. 22 illustrates an exemplary method for allowing remote access to a user's communication device by a responder. In some cases, the EMS (1830 in FIG. 18) and/or the responder devices (1882 in FIG. 18) remotely accesses a user's communication device (1806 in FIG. 18).

In some embodiments, an EMS or EDC receives a message from the communication device of the first responder and determines that the message is a request for mass messaging a certain list of user communication devices (act 2212). In some embodiments, the mass message contains information regarding a current emergency situation and has been assigned to the first responder from whom the request is received. In some embodiments, the EMS, with assistance from the EDC, determines that the information (e.g. information in the mass message) in the mass message request from the communication device of the first responder is unique (act 2214), for example, if the message includes information the EMS or the EDC is not already privy to, and, based on this determination, decides to forward the mass message to one or more user communication devices. In further embodiments, the EMS, with assistance from the EDC, determines a list of communication devices (act 2216) to send a mass message. Alternatively, in some embodiments, the information contained in the request for mass messaging received at the EMS, or the EDC, from the communication device of the first responder is not unique (act 2214), and the EMS decides not to send the mass message to the list of user communication devices.

In some embodiments, the list of communication devices to send a mass message is chosen based on one or more of a variety of factors, for example, last known best location estimate of the communication devices, location of the communication devices relative to the emergency, time-of-day, type of user (professional, student, man, woman, elderly etc.), type of emergency, and other such pertinent information regarding an existing or a developing emergency situation that is relevant to the users or someone associated with the users.

In some embodiments, the EMS sends a mass message to the determined list of communication devices containing additional information about the emergency situation as decided by the EMS (act 2214). In some embodiments, after the EMS has transmitted the mass message to all communication devices in the determined list of communication devices, the EMS checks to verify if all of the communication devices in the list of communication devices received the mass message (act 2218). In further embodiments, upon determination that any one of the communication devices failed to receive the mass message (act 2218), the EMS re-transmits the mass message to those communication devices who were unable to receive the mass message and were listed to receive it (act 2222).

In some embodiments, the EMS actively manages future mass messaging to the list of communication devices (act 2224) and updates the list of communication devices on a periodic basis (act 2224). In some embodiments, the EMS determines if the information contained in the request for mass messaging received at the EMS or the EDC from the communication device of the first responder is not unique (act 2214). In some embodiments, the EMS, with assistance from the EDC, determines if the EMS or the EDC have updated information regarding the current emergency situation (act 2238).

In some embodiments, the EMS, with assistance from the EDC, determines that there is updated information available regarding the emergency situation currently being responded to, and subsequently sends a mass message to this list of communication devices containing the updated information possessed by the EMS (act 2238). In some embodiments, when the EMS decides that there is no updated information, the EMS stops and takes no more actions (act 2242).

In some embodiments, the EMS detects a request from the first responder to remotely access a specific user's communication device or devices or any of the communication device, that are part of a list of user communication devices (act 2236). In further embodiments, upon verifying the identity of the first responder, the EMS transmits a mass message containing a request for remote access to the communication devices in the list of communication devices (act 2234).

In some embodiments, upon determination that no communication device has responded with a positive affirmation to the request for remote access (act 2228), the EMS updates the list of communication devices and re-broadcasts the mass message to the updated list of user communication devices (act 2226).

In some embodiments, the EMS sends the re-broadcast of the mass message to the updated list of user communication devices 101 on a periodic basis (act 2226). In some embodiments, upon determination that at least one communication device has responded with a positive affirmation to the request for remote access (act 2228), the EMS sets up a remote access session via a data communication channel (act 2232) and bridges the communication session with the communication device of the first responder (act 2232). In some embodiments, the EMS detects that some or all of the users responded, via their communication devices, with a positive affirmation to the request for remote access (act 2228).

In some embodiments, upon determination that multiple or all of the users have responded, via their communication devices, with a positive affirmation to the request for remote access, the EMS sets up a remote access session via a data communication channel (act 2232) with one or more of the communication devices, and bridges the communication sessions with the communication device of the first responder (act 2232). In some embodiments, the EMS updates the list of communication devices and then re-broadcasts the mass message on a periodic basis to the updated list of communication devices (act 2226) and includes any updated information within the periodic broadcast.

Certain Embodiments for Seamless Data Transfer

Certain aspects and embodiments disclosed herein provide for systems, methods, and devices for seamless transmission of multimedia messages that pertain to an emergency situation including video files, image files, streaming video data, multimedia messaging system data, short messaging system files, instant messaging data, GPS location, and/or other multimedia media data available on or from a user communication device to a communication device of a first responder via a direct data channel. Also disclosed herein are certain aspects and embodiments of systems, methods, and devices for forming a communication bridge, at a EMS, between a user communication device, a communication device of the first responder, an EMS and an EDC, to seamlessly share real-time multimedia information and/or static and/or semi-static data, multimedia or otherwise, about an emergency alert initiated by the user communication device that the first responder is currently assigned to and managing the communication bridge established by the EMS. Also disclosed herein are aspects and embodiments of systems, methods, and devices for selecting a list of user communication devices and mass messaging the list of user communication devices upon request from a first responder currently assigned to an emergency situation that may impact users of the list of user communication devices or someone associated with the users of the list of user communication devices. Also disclosed herein are certain aspects and embodiments of systems, methods, and devices for selecting a sub-list of user communication devices from a list of user communication devices selected to receive a mass message from am EMS or EDC, and to send a message to the list of user communication devices requesting remote access to the user communication devices for a first responder currently assigned to an emergency situation that may impact users of the selected list of user communication devices, and managing any remote access sessions that are set up between any user communication devices and a communication device of a first responder.

In most countries across the world, designated 3-digit numbers exist to place calls for emergency assistance. Once such a call is received by an emergency dispatch center (EDC), the EDC verifies the purpose of the call and other information about the caller, such as name, address, location etc., and then assigns one or more first responders to assist the caller. The dispatcher at the EDC selects the first responders to assign to the call for emergency assistance based on a variety of factors including the location and availability of the first responders and the nature of the call for emergency assistance. The EDC also manages the call with the user calling for emergency assistance while the first responders respond to the emergency. The dispatcher at the EDC relays information from the caller to the first responders aiding in the emergency response. In many cases the dispatcher at the EDC relays the information to the first responders via an ongoing voice call between the EDC and the first responders. In many cases the information relayed to the first responders is not in the same format as the information received by the EDC. For example, the EDC sometimes transmits a digital request to the cellphone network of the mobile phone seeking the phone's location, and subsequently receives a location of the cell tower the cellular call is being routed through. This location is typically displayed on the dispatcher's computer workstation, but is not automatically provided to first responders. Instead, the dispatcher usually has to communicate the relevant information to the first responder(s) over an audio channel (e.g. voice call or radio). Moreover, various forms of information (e.g. multimedia messages, video feeds, text messages, etc) sent to the EDC from the caller have a format the EDC is either incapable of receiving (e.g. EDC is only able to receive voice calls) or is unable to provide to first responders efficiently without requiring the dispatcher to verbally relay the information.

Contemporary computerized user communication devices, for example, smart phones or tablet computers, are often capable of communicating information in a variety of modes including rich information formats such as, for example, multimedia messages including pictures or video messages. Contemporary computerized user communication devices are also often capable of communicating other forms of digital data messages such as GPS location information, device location calculated using triangulation of nearby access points, user data (e.g. health data), and/or an activity history (e.g. messages, emails, tweets, and other communications) associated with the user communication device in addition to voice and text messages. Moreover, these user communication devices also often have the ability to communicate multimedia information over various forms of wireless channels, for example, over Bluetooth or Wi-Fi communication, or over wired channels such as fiber optic cables using Ethernet technologies. In many instances, the user communication devices are also able to communicate with each other by forming an ad hoc wireless mesh network within an area of influence around the devices. The growing capabilities of modern user communication devices empowers users to send rich multimedia information pertaining to an emergency situation to any EDC capable of receiving this information or to a communication device of a first responder, if the communication device of the first responder is capable of receiving such messages and if there is a process by which the multimedia information can be sent directly between the two communication devices.

Despite the widespread adoption of multimedia communication capable user communication devices such as smart phones, tablets, and wearable devices, and given their increasingly varied capabilities such as to deliver Multimedia Messaging Service (MMS) messages, video messages, and other digital data messages such as meta-data about the user and the user communication device, these methods of communication often fail to interface with emergency services and/or third parties effectively so as to leverage their advantages for providing rapid and effective responses to emergency situations.

In accordance with one aspect, the subject matter disclosed herein allows information contained within a user communication device, about the user and the device, to be directly transferred to a communication device of a first responder in real-time responding to emergency situations. By providing rich message content and/or context of a message directly to a first responder about an emergency situation that the first responder is responding to, aspects and embodiments disclosed herein provide a means for the first responder to better respond to the situation. Aspects and embodiments disclosed herein also reduce the time and effort required to deliver the information to the first responders by removing the need for the dispatcher at the EDC to forward, and in many cases, to repeatedly transmit, the information to the first responders. Aspects and embodiments disclosed herein include a system and method for seamless data flow between the user communication device of a person requesting emergency response and that of a first responder of emergency situation.

Historically, a user requesting emergency assistance from a public-safety answering point (PSAP), such as a Police or a Fire response unit, has not been able to be placed directly in contact with a person responding to the emergency situation such as a police officer or a fire fighter. Normally, the user is connected to a dispatch center where a dispatcher responds to the call and then later instructs first responders, based on location, availability, and type of emergency response needed, on where and how to respond to the emergency on behalf of the user. Further, when calls for requesting emergency assistance are placed via mobile wireless devices the dispatcher also tries to confirm the location of the caller before identifying the best suited first responder unit to call for responding to this request for emergency assistance. Thus, users have not been able to receive benefit of being placed in direct contact, either via a data channel, voice channel, or both, with the first responders responding to their call for emergency assistance. Accordingly, a first responder, such as a fire fighter, wishing to communicate with the user or receive updated information about the emergency situation from the user has to rely on the EDC to deliver this information to the user communication device of the first responder, incurring additional delays and possibly loss of relevant information. Moreover, the inability of individuals to directly communicate with the first responders responding to their call for emergency assistance ties up resources at the EDC that could be used to service other callers. Finally, users have previously been unable to participate in the process of choosing an appropriate first responder to send their request for emergency assistance, in the case, for example, when the user is mobile, and the EDC (e.g. PSAP) is unable to pinpoint one first responder unit located closest to the user calling for emergency assistance.

In accordance with another aspect, disclosed herein are systems, devices, and methods that enable user communication devices to communicate directly with first responders, and for EDCs to initiate and setup such communication connections and send vital emergency situation related information directly to the first responders responding to an emergency situation. In some embodiments, multiple first responders are able to receive information about an emergency situation directly from a user so that a collective awareness can be generated about a user's emergency situation. In some embodiments, an EDC is able to add first responders to an active call for emergency response and provide the first responders direct access to the information being sent from the user's communication device and to the history of the information of the communication session from the user to the EDC and other first responders.

In accordance with another aspect, disclosed herein are systems, devices, and methods for transferring data from a user communication device to the communication device of a first responder in an emergency situation, for example, a fire incident or a medical incident, the first responder assigned to the emergency assistance request by a dispatcher at an EDC, directly without the need for information to be first transmitted to a communication device at the EDC and then from the EDC to the first responder, either via data communication channels or analog voice channels or by other means including human intervention, the information being relayed to the first responder in real-time. In some embodiment, the EDC, responsive to receiving an request for emergency assistance from a user via a user communication device, assigns a first responder to the call for emergency assistance based on various factors such as location of the user, information including meta-data regarding the user, location of the first responder, type of emergency, and other such relevant information, and then connects the user communication device and the communication device of the first responder via a data communication channel, if a data communication channel is available and both the user communication device and the communication device of the first responder are capable of communicating over data communication channels. In some embodiments, if the EDC is unable to connect to a communication device of a first responder via a data communication channel, due to the lack of the appropriate infrastructure or facilities at the EDC, the EDC requests an emergency management system (EMS) to connect the user communication device and the communication device of the first responder via a data communication channel so that the multimedia information from the user communication device pertaining to the call for emergency assistance can be seamlessly transmitted to the first responder via the first responder's communication device. In some embodiments, the user of the user communication device requests for the first responder to be connected to the user directly, via a data channel on their communication devices, by sending a request to the EDC, via the EMS or directly, requesting such a connection. In some embodiments, the first responder requests for the user of the user communication device to be connected to the first responder directly, via a data channel on their communication devices, by sending a request to the EDC, via the EMS or directly, requesting such a connection. In some embodiments, if the data channel between the user communication device and the communication device of the first responder becomes unavailable, the EMS, and/or the EDC if the EDC has the capabilities, saves the multimedia information from the user communication device for access by the first responder in real-time if the first responder needs to access this information. In certain embodiments, the user communication device hosts an application client and sends the request for emergency assistance and a request to be connected to the communication device of the first responder via the application client, and the application client manages the connection between the user communication device and the communication device of the first responder. In certain embodiments the communication device of the first responder hosts an application client and sends the request to be connected to the user communication device via the application client. In certain embodiments, the data communication channel is a three way communication channel between the user communication device, EMS, and the communication device of the first responder and in certain embodiments the data communication channel is a four-way communication channel between the user communication device, EMS, EDC, and the communication device of the first responder. In certain embodiments, data transferred between the user communication device and the communication device of the first responder is multimedia video data. In certain embodiments, data transferred between the user communication device and the communication device of the first responder is multimedia image data. In certain embodiments, data transferred between the user communication device and the communication device of the first responder is multimedia location data. In certain embodiments, the user communication device has a data channel with a plurality of communication devices, each of the plurality of communication devices belonging to a different first responder. In certain embodiments, multiple user communication devices, each device belonging to a different user, have a data channel with a single communication device belonging to a first responder. For example, in certain embodiments, the first responder (e.g. an EMT) is responding to an emergency involving multiple users (e.g. a two-way traffic collision) and benefits from obtaining user information over a data channel with each user communication device to better prepare for treating injuries (e.g. knowing blood types of accident victims/users for administering blood transfusion). In certain embodiments, multiple user communication devices, each device belonging to a different user, have a data channel with more than one communication device, each of the more than one communication device belonging to a different first responder.

In accordance with another aspect of the present invention, there is provided a method for a first responder to send a warning signal to certain selected users via their user communication devices, the users selected based on various factors such as location of the users relative to an emergency, time-of-day, type of user (professional, student, male, female, elderly etc.), type of emergency, and other pertinent information regarding an emergency situation and/or pertaining to an existing or a developing condition that may impact the user of the user communication device or someone associated with the user. In certain embodiments, when a new user of a user communication device is not a receiver of a warning signal from the first responder, and the new user qualifies to be a receiver of the warning signal from the first responder after the emergency situation is detected, and at least one first warning signal is sent from the communication device of the first responder to the selected user communication devices of other users who qualified to be receivers of the warning signal, then the first responder includes the new user in any new warning signals and also sends to the new users the information contained in the warning signals sent prior to the new users being selected to be receivers of the warning signal from the first responder about the particular emergency situation. In a similar fashion, in some embodiments, if a user communication device is selected to be receivers of a warning signal for an active emergency situation and the user of the user communication device stops to qualify to be a receivers of the warning signal while the emergency situation is still active, the user communication device is removed from the selected list of devices that are targeted to be receivers of the warning signal from the communication device of the first responder, until a time the user of the user communication device, or the user communication device itself, qualifies to be selected to be a receivers of the warning signal. Further, the at least one first responder may call the user communication device of a user using a data call, an analog voice call, or any other form of multimedia call, the user selected based on location, type of emergency, meta-data about the user, level of severity of threat to the user within an on-going emergency situation, or other factors relevant to the emergency situation, and provide further information to the user or receive certain information from the user pertaining to the on-going emergency situation via the user communication device. Further, in some embodiments, when the first responder believes that a user of a user communication device selected based on a location relevant to the user, type of emergency, meta-data about the user, level of severity of threat to the user within an on-going emergency situation, or other factors relevant to the emergency situation is capable of providing assistance to another user selected based on location relevant to the another user, type of emergency, meta-data about the another user, level of severity of threat to the another user within the on-going emergency situation, or other factors relevant to the emergency situation, the first responder connects the two users in a conference call with the communication device of the first responder, via their user communication devices, using a data call, an analog voice call, or any other form of multimedia call, to provide further assistance to the users in the on-going emergency situation. In certain embodiments the user communication device hosts an application client and sends the request for emergency assistance and a request to be connected to the communication device of the first responder via the application client, and the application client manages the connection between the user communication device and the communication device of the first responder. In certain embodiments the communication device of the first responder hosts an application client and sends the request to be connected to the user communication device via the application client. In certain embodiments, the user is selected based on the location of their user communication device relative to the location of the emergency situation being responded to. In certain embodiments, the data communication channel is a three way communication channel between the user communication device, EMS, and the communication device of the first responder. In certain embodiments the data communication channel is a four-way communication channel between the user communication device, EMS, EDC, and the communication device of the first responder. In certain embodiments, data transferred between the user communication device of a first user, the user communication device of a second user, and the communication device of the first responder includes multimedia video data. In certain embodiments, data transferred between the user communication device of a first user, the user communication device of a second user, and the communication device of the first responder includes multimedia image data. In certain embodiments, data transferred between the user communication device of a first user, the user communication device of a second user, and the communication device of the first responder includes multimedia location data. In certain embodiments, multiple user communication devices, each device belonging to a different user, communicate over a data channel with a communication device belonging to a first responder.

In another aspect, disclosed herein are methods for transferring data from a user communication device to a communication device of a first responder in an emergency situation, this methods comprising: receiving at an EMS and/or an EDC, a request for emergency assistance from the user communication device of a user requesting emergency assistance; selecting, at the EMS and/or the EDC, based on the request for emergency assistance, at least one first responder to be assigned to the request for emergency assistance; identifying a communication device currently being used by the first responder; determining the capabilities of the communication device of the at least one first responder; selecting, by the EMS and/or the EDC, a data channel between the EMS and/or the EDC, and the communication device of the first responder, the data channel selected based on one or more factors including one or more of a received signal strength indicator (RSSI) of the communication device of the first responder at the EMS and/or the EDC, channel link quality of the data channel from the EMS and/or the EDC to the communication device of the first responder, congestion on available data channels, RSSI at the communication device of the first responder of data signals sent from the EMS and/or the EDC, transmission delay on the available data channels between the EMS and/or EDC and the communication device of the first responder, and other factors indicative of quality of a data communication channel; detecting that a data communication channel is set up between the EMS and/or the EDC and the communication device of the first responder; setting up, by the EMS, a three-way communication channel between the EMS, the communication device of the first responder, and the user communication device of the user calling to request emergency assistance, the three-way communication channel providing multimedia data on the user communication device to the communication device of the first responder and to the EMS and the EDC; detecting that the EDC is capable of receiving data communication packets; setting up a communication session with the EDC; and sharing with the EDC any multimedia information received from the user communication device for the purpose of responding to the request for emergency assistance. In some embodiments, the method further comprises: detecting the data channel between the user communication device and the communication device of the first responder is unresponsive; storing the multimedia information received from the user communication device at the EMS and/or the EDC; and delivering the stored multimedia information to the communication device of the first responder. In some embodiments, the method further comprises actively managing communication sessions between the user communication device, the communication device of the first responder, the EDC, the EMS and any other communication device involved in responding to the request for emergency response received at the EMS. In further embodiments, the method comprises using Session Initiation Protocol (SIP) and/or H.323 standard for managing the data sessions. In some embodiments, setting up the three-way communication channel comprises setting up a three-way data communication channel In some embodiments, setting up the three-way communication channel comprises setting up a three-way communication channel providing for one or more of video files, image files, streaming video data, multimedia messaging system data, short messaging system files, instant messaging data, GPS location, and other multimedia media data available on the user communication device to be made available to the communication device of the first responder and to the EMS and the EDC, wherein the three-way communication is set up by the EMS such that there is a direct data communication link between the communication device of the first responder and the user communication device, a direct data communication link between the communication device of the first responder and the EMS, and a direct communication link between the user communication device and the EMS. In some embodiments, the method further comprises receiving a request from the user of the user communication device to be placed directly in communication with the communication device of the first responder via a direct communication link between the user communication device and the communication device of the first responder. In some embodiments, the method further comprises receiving a request from the first responder, via the communication device of the first responder, to be placed directly in communication with the user communication device of the user requesting emergency assistance. In some embodiments, the EMS and/or the EDC acts as a gateway between the user communication device and the communication device of the first responder when the user communication device is incapable of communicating via a data communication channel. In some embodiments, the EDC acts as a gateway between the user communication device and the communication device of the first responder when the EDC is required in the communication between the user and the first responder. In some embodiments, the three-way communication is set up by the EMS such that there is a direct data communication link between the communication device of the first responder and the user communication device, a direct data communication link between the communication device of the first responder and the EMS, and a direct communication link between the user communication device and the EMS.

In another aspect, disclosed herein are methods for a first responder to send a warning signal to selected users in a geographic region via user communication devices of the selected users, the method comprising: receiving, at an EMS, from a communication device of the first responder, a request for mass messaging information pertaining to an active emergency situation the first responder is assigned to residents who may be effected by the emergency situation and who may not be currently in possession of information pertaining to the emergency situation; determining, by the EMS, if the information received from the communication device of the first responder is unique and that the first responder is requesting a mass messaging; determining, by the EMS and/or an EDC, a list of users to be included in the mass messaging; responsive to determining the list of users and determining that the information received from the communication device of the first responder is unique, sending, by the EMS and/or EDC, the message received from the first responder to user communication devices of the list of users; and actively managing communication between the user communication devices of the list of users and the communication device of the first responder. In some embodiments, determining the list of users to be included in the mass messaging is based on one or more factors including one or more of a last known best location estimate of user communications device of the users, locations of the user communication devices relative to the emergency, time-of-day, types of users, type of emergency, and other pertinent information regarding an existing and/or developing emergency situation that may impact the users of the user communication devices and/or someone associated with the users of the user communication devices. In some embodiments, the method further comprises sending additional information about the emergency situation including one or more of cause of the emergency situation, geographic location affected by the emergency situation, latest status of the emergency response, instructions to safeguard self and property, and any other information relevant to the emergency situation along with the message by the first responder to the user communication devices of the list of users. In some embodiments, the method further comprises including additional user communication devices in subsequent mass messages and re-broadcasting previously sent mass messages to the additional user communication devices, the additional user communication devices selected based on information regarding the user communication devices including one or more of last known best location estimates of the additional user communication devices and location of the additional user communication devices relative to the emergency situation. In some embodiments, the method further comprises, responsive to the EMS and/or the EDC determining that a certain user needs special assistance, identifying at least one other user located within a maximum distance from the certain user and capable of providing assistance to the certain user and sending a request to the at least one other user to provide assistance to the certain user. In further embodiments, the method further comprises actively managing communication via user communication devices of the certain user and the at least one other user by the EMS. In some embodiments, the method further comprises sharing information, by the EMS, between the communication device of the first responder and the user communication devices of the list of users. In some embodiments, the method further comprises sharing information, by the EMS, between one user communication device of the user communication devices of the list of users and another user communication device of the user communication devices of the list of users. In some embodiments, the emergency situation is a natural disaster selected from the group consisting of a hurricane, an earthquake, a tornado, a flood, drought, a fire that is initiated by natural causes, a lightning strike, and any other natural disaster that results in an impact on humans or on geographic areas inhabited by humans. In some embodiments, the emergency situation is a man-made emergency selected from the group consisting of an act of terror, a robber, a theft, an active shooter situation, any kind of violence of one human or a group of humans against another human or a group of humans, a fire that is initiated by human actions, a riot, and any other human initiated action that results in an impact on other humans or on geographic areas inhabited by humans. In some embodiments, the mass message comprises information shared by a user communication device with the EMS and/or the EDC, wherein the information is determined by the EMS to be accurate and unique information that the EMS and/or EDC was not already privy to before receiving such information from the user communication device. In some embodiments, the EMS includes a message for certain user communication devices selected based on meta-data about users of the certain user communication devices, the meta-data including one or more of proximity of the users of the certain user communication devices to the emergency situation being responded to, a user being located within a certain maximum distance from the users of the certain user communication devices, an estimate of the location of the users of the certain user communication devices, and other information about the users of the certain user communication devices that allows the EMS to make a decision about the relevance of the users of the certain user communication devices to receive the message, the message containing a request for the user communication device to be remotely accessed by the communication device of the first responder and to allow temporary access to modules on the certain user communication devices, including one or more of a camera of the certain user communication devices to get a first-hand view of streaming video being captured by the camera, a sound system module to listen to certain sounds of interest, a gyroscope module to understand movement, certain application clients, a GPS location module, and other modules available on the certain user communication devices as allowed by the users of the certain user communication devices and as requested by the first responder via the communication device of the first responder, either received by the user communication device from an EMS or directly from the communication device of the first responder to the certain user communication devices. In some embodiments, the user communication devices host an application client configured to send a request for mass messaging a group of user communication devices, to receive a mass message from the EDC and/or the EMS, to respond to a request for remote access, to manage a data communication link for remote access to the user communication devices from the communication device of the first responder and/or the EMS and/or the EDC, and to give access to a module on the user communication devices to a remote communication device and/or the EMS and/or the EDC. In some embodiments, the user communication devices are digital communication devices selected from the group including a smart phone, a laptop computer, a tablet computer, a desktop computer, or any other form of digital computing device. In some embodiments, the communication device of the first responder is a digital communication device selected from the group including a smart phone, a laptop computer, a tablet computer, a desktop computer, or any other form of digital computing device. In some embodiments, the user communication devices are analog communication devices selected from the group including a land-line phone, a cordless phone, an analog computer, an analog desktop computer, a second or first generation cellular phone, or any other form of analog computing device. In another aspect, disclosed herein are communication devices, the communications device comprising: a user interface; physical interaction components; a communications module configured to send and receive messages over a communications network; and a processor configured to: receive a mass message containing information regarding an emergency situation that the user of the user communication device is impacted by, from an EMS over one of a wireless or a wired channel; format and send a request, if the communication device is a communication device of the first responder, for mass messaging a group of user communication devices to the EMS, the request containing information pertaining to an emergency situation the first responder is currently assigned to; establish a data communications link with another communication device, the another communication device being one of a communication device of the first responder and a user communication device, responsive to a request from the EMS and/or an EDC, the data communication link allowing a remote user communication device to access modules in the communication device based on the request for remote access and the status and type of emergency assistance currently being responded to; determine whether to send updates to the EMS when in a data communication session with the EMS regarding an emergency situation; and participate in a data communications bridge with at least one another communication device and the EMS over a data communication network.

In another aspect, disclosed herein are emergency management systems (EMS) containing a first computing system and a first communications system, the EMS comprising: at least one first input/output (I/O) system configured to receive a request for mass messaging from a communication device of a first responder over a data communication channel and to send a mass message to a list of user communication devices and receive a unicast message from a user communication device, in response to a request sent by the EMS, over at least one first I/O channel; a communications module configured to send and receive messages, including mass messages, over data communication networks and/or analog voice channels; and at least one first processing unit in communication with the at least one first I/O system and configured to: receive a request for mass messaging a list of user communication devices from a communication device of the first responder at the at least one first I/O system and interpret the received request from the communication device of the at least one first I/O system to be a request for mass messaging; verify an identity of the first responder using the communication device from the received request for mass messaging, and responsive to successful verification, to generate a list of user communication devices, the list generated based on one or more factors including one or more of a last known best location estimate of a user communication device, location of a user communication device relative to an emergency, time-of-day, type of user, type of emergency, and other such pertinent information regarding an existing and/or a developing emergency situation that may impact a user of the user communication device and/or someone associated with the user of the user communication device, and to send a mass message to the list of user communication devices, the message including information received from the first responder via the communication device of the first responder; initiate a data communication session with a user communication device to remotely access modules on the user communication device, via seeking confirmation from the user communication device, and share, on a temporary basis, access to the user communication device with a communication device of a first responder, including sharing multimedia data, from the user communication device; periodically analyze the list of user communication devices and update the list of user communication devices as necessary; and actively manage various data communication links between the communication device of the first responder and the user mobile communication devices and an emergency dispatch center. In some embodiments, the processor is further configured to include additional information about the emergency situation selected from the group consisting of cause of emergency, geographic information included in the emergency, latest status of an emergency response, instructions to safeguard self and property, and any other information relevant to the emergency situation that may or may not be included in the message by the first responder in the mass message.

Certain Embodiments for Proxy Calling

Aspects and embodiments disclosed herein provide for systems, methods, and devices for a user communication device to send a request for emergency assistance to an EDC on behalf of a user of another user communication device, or a smart device, for example, an Internet of Things device. The another user communication device may be in the same or different area code or location as the user communication device requesting emergency assistance. Also disclosed herein are aspects and embodiments of systems, methods, and devices for determining, at an EMS, from information received from the user communication device and information cached at the EMS or at an EDC, an EDC that serves the best location estimate of the user on whose behalf the request for emergency assistance is received, and setting up a data communication session between the EDC and the user communication device. Also disclosed herein are aspects and embodiments of systems, methods, and devices for setting up a covert data communication channel, for example, a data call that does not ring, with the user communication device of the user on whose behalf the request for emergency assistance was received, and to bridge the various data communication sessions. Also disclosed herein are aspects and embodiments of systems, methods, and devices for receiving from a user communication device, over a covert data communication session, at the EMS, location information cached on the device and meta-data about the user of the user communication device. Based on information received over the covert data communication session, and/or any other information the EMS is already privy to, the EMS selects an EDC that best serves the location indicated by the received location information. If the selected EDC is different from an EDC with whom a communication session is already established, the EMS sets up a new communication session with the selected EDC and bridges the communication session with the selected EDC with existing communication sessions with the user communication device calling for emergency assistance and the EDC with which a communication session is already setup.

In most countries across the world, designated 3-digit numbers exist to place calls for emergency assistance. Once such a call is received by an EDC, the EDC verifies the purpose of the call and other information about the caller, for example, name, address, location, etc., and then assigns one or more first responders to assist the caller. The information shared with the dispatcher at the EDC from the communication device of the caller, including any meta-data sent from the communication device of the caller, is typically information about the caller himself. In some instances, additional information about the caller is obtained from a database, for example, an automatic location identification (ALI) database, or a master street address guide (MSAG) based on address information sent from the caller's communication device. The EDC generally receives calls for emergency assistance from the person or persons who are in an emergency situation or are impacted directly by the emergency situation, for example, a fire in a building or a personal health condition. Calls for emergency assistance are typically placed from communication devices that belong to persons calling for emergency assistance. In many instances, the dispatcher at the EDC may gain additional information about the emergency situation by using the phone number of the calling device, referred to herein as the "user communication device," and may use this information to enhance the response to the emergency situation. However, in some instances, a call for emergency assistance is not made from the person or persons actually in an emergency. Rather, the call for emergency assistance is made by another person on behalf of the person or persons in an emergency. In some instances the person or persons needing the emergency assistance are not in the same geographic location or GPS position as the person or persons calling to request emergency assistance.

Modern user communication devices, for example, smart phones, tablet computers, wearable communication devices, smart sensor devices and/or systems, etc. are often equipped with a variety of features for determining location information of the communication device using, for example, GPS, or triangulation with cellular phone towers. Modern user communication devices also often include functionality to store meta-data regarding a user of the communication device, for example, health information about the user. Further, in some instances, modern user communication devices include functionality for extracting user meta-data, location information, and other information from a data cache of the device and relaying this information to a dispatcher at an EDC in case of an emergency situation.

In some instances, a user using their user communication device to call to report an emergency situation is calling on behalf of another person or persons who are not in a position to place a call for emergency assistance themselves from their own user communication device(s). Moreover, in some instances, the person or persons on whose behalf the call is being made are not in the same geographic location as the user who is calling on their behalf. In such situations, the meta-data on the user communication device(s) of the person or persons on whose behalf the call is being made are useful in assisting an emergency response operator to better respond to the emergency situation, for example, to locate the nearest public-safety access point (PSAP) to notify about the emergency situation and to position first responders for the specific emergency situation.

In another aspect, disclosed herein are systems, methods, and devices for harnessing the ability of modern user communication devices to identify the location of their operation and to store pertinent information, for example, meta-data about a user's health by allowing users of user communication devices to call for emergency assistance on behalf other users and by allowing EDCs to be given access information contained within a user communication device of a user on whose behalf the request for emergency assistance is placed. Obtaining direct access to location data and/or other meta-data cached on the user communication device of the beneficiary user to EDC personnel allows the EDC personnel to be better able to assign an appropriate response, for example, to mobilize the appropriate first responders, and provide assistance to someone who may not be in a position to ask for assistance for the emergency situation that the user might be facing.

Historically, a user requesting emergency assistance from a PSAP, for example, a police or a fire response unit, on behalf of another person or persons has not been able to provide the EDC with location information about the person or persons the user is calling about, other than information that the user may have from interacting with the person or persons or a user communication device of the person or persons before the call for emergency assistance is placed. In some embodiments, meta-data, for example, location information, health records, or other information cached on a user communication device of the user calling an EDC for emergency assistance is made accessible to the EDC personnel for the purpose of emergency response.

In some instances, when a call for requesting emergency assistance is placed via a mobile wireless device, an EDC dispatcher then confirms the location of the caller via interaction with the caller, in addition to or as an alternative to receiving location information from the mobile wireless device itself or the cellular network provider before identifying the best suited first responder unit to call for responding to the request for emergency assistance. Accordingly, a dispatcher at an EDC wishing to accurately estimate the location of a first user when a request for emergency assistance is received from another user from a user communication device other than that belonging to the first user, benefits from having access to meta-data including location information cached on the user communication device of the first user needing emergency assistance. Further, if the user communication device of the user needing assistance is not available, it is beneficial for there to be a cache of information including the latest location of the user needing assistance, received by other user communication devices of users associated with the user needing emergency assistance, that the EDC personnel can access to best trace the most current location of the user communication device of the user needing emergency assistance. Finally, it is beneficial to provide for a user to participate in the process of choosing an appropriate first responder to send their request for emergency assistance, for example, when the user is mobile and the PSAP is unable to pinpoint one first responder unit located closest to the user.

In accordance with another aspect, described herein are systems, methods, and devices that enable user communication devices and EDCs to send a request for emergency assistance on behalf of a user or users of another user communication device needing emergency assistance, and to allow EDCs to initiate a communication link to request location information from the user communication device of the user needing emergency assistance and to receive pertinent information about the user communication device of the user needing emergency assistance from other user communication devices associated with the user communication device of the user needing emergency assistance. In some embodiments, the communication link is used to request location information from the user communication device of the user needing emergency assistance be covert, for example, a data call that does not ring at the user communication device. In some embodiments, described herein is a system and method for a group of user communication devices to share location information about each other on a periodic basis and to keep a cache of this location information among each other for a specified period of time. In some embodiments, location information includes, for example, GPS location data, location information from triangulation of received signal strengths at cellular towers, Wi-Fi based locationing, location data manually input by the user in the user communication device, and/or any other form of location information.

In accordance with another aspect, described herein are systems, methods, and devices for placing a call for emergency assistance by a user of a user communication device and from the user communication device on behalf of another user of a different user communication device, to an EDC, for example, when the user, on whose behalf the call is being placed, is not is a position to place a call for emergency assistance. In some embodiments, the EDC verifies the identity of the user placing the call for emergency assistance, and then accesses meta-data including location information cached on the user communication device of the user needing emergency assistance. In some embodiments, the location information is obtained by the user communication device of the user needing emergency assistance. In some embodiments, the location information is selected from one or more of GPS locationing and location determined by cellular tower triangulation. In some embodiments, the EDC first ascertains the identity of the user sending the request after receiving the request for emergency assistance from a user via a user communication device on behalf of another user, and then checks on an internal database at the EDC or at an emergency management system (EMS) or at another location in the Internet in order to verify if the user sending the request is associated with the user on whose behalf the request for emergency assistance is being sent. In some embodiments, after the user sending the request for emergency assistance is verified, the EDC places a covert call (e.g. a call that does not ring at the user communication device), and forms a data communication channel (e.g. an IP connection) with the user communication device of the user for whom the request for emergency assistance is sent. In further embodiments, the EDC then accesses various forms of multimedia information (e.g. video, images, location information, and other forms of multimedia data) from the user communication device of the user needing emergency assistance. In some embodiments, when the EDC is unable to verify the user and the user communication device from which the request for emergency assistance was received, the EDC tries to verify the information provided by the calling user by tracing the user communication device identified in the request for emergency assistance, verifying the identity of the user for whom the emergency request is initiated, and contacting the nearest PSAP in the geographic location of the user for whom the emergency request is initiated. In some embodiments, when the EDC personnel is unable to connect with the user communication device of the user for whom the request for emergency request is initiated, the EDC requests the latest location of the user communication device of the user for whom the request for emergency assistance is sent from another location on the Internet (e.g. from an EMS), and designates first responders proximate to the latest location for the request for emergency assistance based on this location information. In some embodiments, the EDC, with assistance from the EMS, keeps track of the user communication device for whom the request for emergency assistance is initiated, determines if the user communication device is responsive to a request for data connection with the EMS or EDC, request meta-data including location information of the user communication device; and designates first responders proximate to the location of the user communication device for whom the request for emergency assistance is initiated. In certain embodiments, the user communication device of the user requesting assistance and of the user for whom emergency assistance is being requested hosts an application client and sends requests for emergency assistance and receives request for location information and meta-data etc. from the EDC or EMS via the application client. In certain embodiments, the data communication channel is a three way communication channel between the user communication device of the user requesting emergency assistance, the EMS, and the user communication device of the user for whom the request for emergency assistance is being requested. In certain embodiments, the data communication channel is a four-way communication channel between the two user communication devices, the EMS, and the EDC. In certain embodiments, data transferred between either user communication device and the EDC or the EMS is multimedia video data. In certain embodiments, the data transferred between either user communication device and the EDC or the EMS is multimedia image data. In certain embodiments, the data transferred between either user communication device and the EDC or the EMS is multimedia location data. In certain embodiments, a data channel over which the data is communicated is a SIP data channel or a H.323 data channel established between the user communication device and the EDC or the EMS.

In another aspect, disclosed herein a method for receiving a request for assistance from a user communication device on behalf of a user of another user communication device, the method comprising: determining, at the user communication device, that a user of another user communication device is in need of emergency assistance; and initiating, by the user communication device, a request for emergency assistance for the user of the another user communication device, based on the determination of the need for assistance for the user of the another user communication device, to one of an EMS and an EDC that is closest to and serving the location of the user communication device; responsive to detecting the request for emergency assistance at the one of the EMS and the EDC, verifying an identity of a user of the user communication device, and verifying an association between the user of the user communication device and the user of the another user communication device, identifying, at the one of the EMS and the EDC, based on information sent by the user communication device, an EDC that serves the best location estimate of the another user communication device; responsive to determining the EDC that serves the best location estimate of the another user communication device, sending a request for emergency assistance including the information sent by the user communication device and any other pertinent information that the EMS or the user communication device have regarding the emergency situation; and maintaining, by the EMS, a communication session between the EDC that serves the best location estimate of the another user communication device and the EMS, and the user communication device; initiating and maintaining a covert communication channel with the another user communication device; and actively managing, by the EMS, communication sessions between the EDC, the EMS, the another user communication device requesting emergency assistance, and the user communication device. In some embodiments, the user communication device autonomously detects that the user of the another user communication device is in need of emergency assistance. In some embodiments, the user communication device receives a user input indicative of the user of the another user communication device being in need of emergency assistance. In some embodiments, the user communication device determines that the user of the another user communication device is in need of emergency assistance based on periodic information exchanged between the user communication device and the another user communication device, the periodic information being one of a periodic location information update by the another user communication device being missed or an affirmative response indicating well-being of the user of the another user communication device not being received. In some embodiments, the user communication device includes one or more of location information cached on the user communication device of a best estimate of a location of the another user communication device, meta-data regarding a primary user of the another user communication device, and identifying information about the user of the user communication device calling for assistance indicating an association with the primary user of the another user communication device in the request for emergency assistance. In some embodiments, wherein determining the EDC that serves the best location estimate of the another user communication device comprises determining a PSAP, a corporate help line, a company providing physical security services, or any other emergency response unit that serves the best location estimate of the another user communication device. In some embodiments, initiating and maintaining the covert communication channel comprises initiating and maintaining a data call that does not ring at the another user communication device. In some embodiments, the method further comprises: responsive to receiving a response from the another user communication device, responsive to receiving location information in the response, and responsive to the location information being different from location information available at both the EDC and the EMS, informing the EDC about the location information received in the response; responsive to a positive affirmation from the EDC, selecting another EDC serving a location indicated by the location information received in the response, and contacting the another EDC; responsive to the another EDC being successfully contacted, setting up a data communication link with the another EDC and connecting the EMS, the EDC, and the another EDC in a conference communication; and sending the request for emergency assistance to the another EDC along with any information about the emergency situation hosted at the EDC and/or the EMS. In some embodiments, the user communication device hosts an application client and sends the request for emergency assistance and receives a request from the EDC and/or the EMS for a communication session via the application client, and the application client manages the connection between the user communication device and the EMS and/or the EDC, including sending meta-data and/or location data and/or any data requested from the EMS and/or the EDC to the EMS and/or the EDC. In some embodiments, the user communication device receives a request from the EDC and/or the EMS for a data communication session via the application client. In some embodiments, the user communication device and the another user communication device are in a same geographic location, and are served by a same EDC. In further embodiments, the user communication device and the another user communication device are in a same GPS location. In further embodiments, the user communication device and the another user communication device are served by a same PSAP. In some embodiments, the user communication device and the another user communication device are not in the same geographic location and are served by the different EDCs. In further embodiments, the user communication device and the another user communication device are not in a same GPS location. In further embodiments, the user communication device and the another user communication device are served by a different PSAPs. In some embodiments, the method further comprising initiating the request for emergency assistance by the user communication device using an analog voice call to the EDC, the EDC employing the EMS, if the EDC is not capable of initiating or receiving data communication messages, to locate the another user communication device. In some embodiments, the user communication device and the another user communication device are not of the same type. In further embodiments, one of the user communication device and the another user communication device is a smart phone and the other of the user communication device and the another user communication device is a tablet computer. In further embodiments, one of the user communication device and the another user communication device is an analog telephone using PSTN to make calls and the other of the user communication device and the another user communication device is a smart phone. In some embodiments, the another user communication device is one of a sensing and a routing device selected from the group including a smart temperature sensor in a house-hold, a Wi-Fi router in an indoor setting, or an Internet of Things device that is configured to send messages over one of a data communication network or an analog network.

In another aspect, disclosed herein is a mobile user communications device configured to send a request for emergency assistance and receive a request for sharing meta-data, including location information, from an EDC or EMS, the user communications device comprising: a user interface configured to display incoming call requests from an EDC and/or EMS as user interactive buttons, and, responsive to touch from the user, perform a task and/or display further options, including commands and/or messages from a processor of the user communication device as user interactive buttons on the user interface; physical interaction components; a communications module configured to send and receive messages over a communications network; and a processor configured to: receive a request for sharing the meta-data from a communication module of the user communication device, and upon validating an identity of a sender of the request, send the meta-data, including location information, to the EDC and/or EMS; send a request for emergency assistance, including an indication of a type of emergency, to the EDC and/or EMS on behalf of a user of another user communication device; establish and manage a data communications link to the EDC and/or EMS, and receive signals from the EDC and/or EMS regarding the request for emergency assistance; determine if the EDC and/or EMS is responsive to a request for emergency assistance; responsive to the EDC and/or EMS not being responsive to the request for emergency assistance, send the request for emergency assistance directly to an EDC serving a best estimate of a location of the another user communication device; and estimate a best known location of the another user communication device. In some embodiments, the processor is configured to validate the identity of the sender of the request by accessing one of an internal database or a database external to the user communication device. In some embodiments, the processor is configured to estimate the best known location of the another user communication device based, in part, on information periodically received on the communication module. In some embodiments, the device has no unique calling number assigned to it. In further embodiments, a device is a tablet computer without any 10 digit number for a cellular network or a PSTN to place a voice or a data call to. In some embodiments, the device has a unique calling number assigned to it. In further embodiments, the device is a smart phone with a 10 digit number for a cellular network or a PSTN to place a voice or a data call to. In some embodiments, the device comprises an application client configured to display information on the user interface and, responsive to touch from the user, perform a task and/or display further options, the application client further configured to receive commands from the processor and display pertinent information on the user interface.

In another aspect, disclosed herein is an emergency management system (EMS) containing a communications system comprising: at least one first input/output (I/O) system configured to receive a request for assistance from a user communication device on behalf of a user of another user communication device over a data communication link; a communications module configured to send and receive messages over data communication networks and/or analog voice channels; a processing unit in communication with the at least one first I/O system and configured to: receive an indication of receipt of the request for emergency assistance at the at least one first I/O system and interpret the request for emergency assistance; verify an identity of a user of the user communication device; verify an association between the user of the user communication device and the user of the another user communication device; initiate a covert data communication session with the another user communication device and receive meta-data, including location data, from the another user communication device; determine, based upon knowledge of capabilities of a plurality of EDCs and a best location estimate of the another user communication device, an EDC that is serving a location of the another user communication device and communicate an alert, including relevant information about the user communication devices involved in the request for assistance, to the determined EDC; and actively manage a data communication links between the EDC and the another user communication device. In some embodiments, the processing unit is further configured to connect EDCs involved in the emergency response via data communication channels. In some embodiments, the processing unit is further configured to determine if EDCs involved in the emergency response are able to communicate via a data communication channel and, upon determining that at least one of the EDCs is unable to communicate via a data communication channel, place a analog voice conference call between the EDCs.

Certain Embodiments for Status Aware
Communication for Emergency Response

Aspects and embodiments disclosed herein provide for a method for a group of user communication devices to share periodic, or aperiodic, critical meta-data with each other. The user communication devices can communicate directly or via an EMS. In some embodiments, based on the shared meta-data, a given user communication device is configured to make a decision regarding whether or not a user of a certain user communication device in the group is in need of emergency assistance.

Also disclosed herein are aspects and embodiments of methods including verifying at a user communication device, with other user communication devices in the group of user communication devices, if meta-data information cached at the user communication device is valid, and based on the responses determine if a perceived need for emergency assistance of the user of a certain user communication device is valid. Some embodiments include a method for sending a request for emergency assistance to an EDC, by a user communication device on behalf of the user of the certain user communication device in the group of user communication devices, after verification with other user communication devices in the group of the perceived need for emergency assistance.

Also disclosed herein are aspects and embodiments of a method to autonomously detect, at a user communication device, based on a count of periodic information received over a certain time, either consecutive, over a period of time, over a certain number of update cycles, or over any other form of measuring the status of the user via an update for various types of periodic information, the health status of a user of a certain user communication device in the web of devices, and to take certain actions based on the determination.

In most countries across the world, designated 3-digit numbers exist to place calls for emergency assistance. Once such a call is received by an EDC, the EDC verifies the purpose of the call and other information about the caller, for example, name, address, location etc., and then assigns one or more first responders to assist the caller. The information shared with the dispatcher at the EDC from the communication device of the caller, including any meta-data sent from the communication device of the caller is typically information about the caller himself. In some instances, in the case of a land-line or an Internet Protocol (IP) based wired phone, additional information about the caller is obtained from a database, for example, an automatic location identification (ALI) database, or a master street address guide (MSAG) based on address information sent from the caller's communication device, whereas in the case of a wireless calling device, additional location information is gained via global positioning system (GPS). The EDC generally receives calls for emergency assistance from the person or persons who are in an emergency situation or are impacted directly by the emergency situation, for example, a fire in a building or a personal health condition. Calls for emergency assistance are typically placed from communication devices that belong to persons calling for emergency assistance. In many instances, the dispatcher at the EDC may gain additional information about the emergency situation by using the phone number of the calling device, referred to herein as the "user communication device," and may use this information to enhance the response to the emergency situation. However, in some instances, a call for emergency assistance is not made from the person or persons actually in an emergency. Rather, the call for emergency assistance is made by another person on behalf of the person or persons in an emergency. In some instances the person or persons needing the emergency assistance may not even be in the same geographic location or GPS position as the person or persons calling to request emergency assistance.

Modern user communication devices, for example, smart phones, tablet computers, wearable communication devices, smart sensor devices and/or systems, etc. are often equipped with a variety of features for determining location information of the communication device using, for example, GPS, or triangulation with cellular phone towers. Modern user communication devices also often include functionality to store meta-data regarding a user of the communication device, for example, health information about the user. Further, in some instances, modern user communication devices may include functionality for extracting user meta-data, location information, and other information from a data cache of the device and relaying this information to a dispatcher at an EDC in case of an emergency situation.

Connectivity of user communication devices, for example, smart phones, tablet computers, laptop computers etc., is also at a peak. Devices are able to harness the power of data communication channels to communicate with each other with minimal user input, and in a fashion where a sequence of data packets is exchanged. In many instances, user communication devices can communication in a multicast fashion where one device can send a sequence of data packets to multiple user communication devices.

In some instances, a user using their user communication device to call to report an emergency situation is calling on behalf of another person or persons who are not in a position to place a call for emergency assistance themselves from their own user communication device(s). Moreover, in some instances, the person or persons on whose behalf the call is being made is not in the same geographic location as the user who is calling on their behalf. In such situations, the meta-data on the user communication device(s) of the person or persons on whose behalf the call is being made is useful in assisting an emergency response operator to better respond to the emergency situation, for example, to locate the nearest public-safety access point (PSAP) to notify about the emergency situation and to position first responders for the specific emergency situation.

Historically, if a user wished to request meta-data about another user, for example, another user's health status, location of user communication device of the other user, or any other meta-data that identifies user status, for example, how a particular user is doing or their location, the user was required to contact the other user and ask for this information. In one aspect, disclosed herein are systems, methods, and devices for requesting and receiving this information at the user communication device of the user from the user communication device of the other user, for example, to be used by the user to request emergency assistance from a public safety access point (PSAP), for example, a police or a fire response unit, on behalf of the other user, or just to get a status update on the other user, has not previously been available. Normally, if a user believes that another user is in need of emergency assistance, and hence places a request for emergency assistance to an emergency dispatch center (EDC) on behalf of the other user, the user is not able to provide the EDC with critical location information about the person or persons the user is calling about, other than information that the user may have from interacting with the other user or the user communication device of the other user before the call for emergency assistance is placed. Additionally, if a third user would also like to request meta-data about the other user, for example, the health status of the other user, location of the user communication device of the other user, or any other meta-data that may identify user status, the third user also is required to send a message to the other user's user communication device containing such a request. This in effect doubles the requests sent to the user communication device of the other user and burdens the communication networks. This process is repeated for each user requesting a status updated on the other user, further burdening the communication networks. Moreover, in some instances, the user experiencing the emergency situation is unable to respond to such requests for information (e.g. the user is physically or mentally unable to respond, the communication device is damaged/inoperable, etc.).

It is important for EDC personnel or first responders to have access to meta-data about a user in need of emergency assistance to facilitate providing effective assistance to the user. In many modern user communication devices, location information about the user communication device is cached on the device itself. In some instances, this location data includes GPS location information. In some instances, users store meta-data, for example, health records or other personal user information on their user communication devices. Making this information accessible to EDC personnel in emergency situations enhances the emergency assistance provided to the user, for example, by identifying the best suited first responder unit to call for responding to a request for emergency assistance for the user.

In another aspect, described herein are systems, methods, and devices for providing EDCs with access to meta-data, for example, location information cached on a user communication device of a user needing emergency assistance, including in instances when the user communication device may not be reachable or when the request for emergency assistance is received from a user communication device of a different user. In some embodiments, meta-data is stored in a database cache of meta-data for a user, for example, health status, location of a user communication device of the user, and any other meta-data that identifies user status within a group of user communication devices of users who are associated with the user, for example, family or friends of the user, so that EDC personnel are able to access such meta-data to facilitate the provision of an emergency response to the user should the user require emergency assistance.

Despite the widespread adaptation of modern user communication devices, for example, smart phones, tablets, wearable devices, etc., and the ability of such devices to autonomously generate and transmit messages in the form of sequences of data packets over data communication channels, including, for example, data regarding the location of their operation and/or meta-data about a user's health status, and to autonomously receive and store such messages from other user communication devices, there has not been a system and method to form groups of user communication devices that regularly or periodically autonomously share such messages among each other. In another aspect, disclosed herein are systems, methods, and devices for allowing user communication devices that are part of a group of user communication devices to autonomously share meta-data about each user and/or user communication device in the group, for example, location information, with each other on a periodic basis such that all the user communication devices are in possession of the unique meta-data about each of the users and associated user communication devices in the group and keep a cache of this location information among each other for a specified period of time. In another aspect, described herein are systems, methods, and devices for providing access to unique information of a user stored on any one, or more, of the user communication devices that are part of a group of user communication devices including the user communication device of the user needing emergency assistance to an EDC or other emergency service provider.

In accordance with another aspect, disclosed herein are systems, methods, and devices for a group of user communication devices, also referred to as a web of devices, to form connections amongst themselves, such that each of the user communication devices is able to communicate, for example, send and receive digital data messages, and share with each other, either in a one-to-one or one-to-many communication, unique meta-data about each user of the user communication devices in the web of devices. In some embodiments, the shared meta-data includes, for example, health status of users of user communication devices in the web of devices and/or meta-data of the user communication devices themselves, for example, location information. In some embodiments, a user communication device, upon detecting an update in the meta-data associated with the user of the user communication device or with the user communication device itself, for example, location information, sends a sequence of digital packets to the other user communication devices in the group to update the meta-data cached at the user communication devices in the group. In some embodiments, when a user communication device receives an update message from one, or more than one, user communication device that belong to the group of user communication devices, the user communication device updates the cached meta-data regarding the user or user communication device that is the subject of the update message in its memory and stores this information for later reference. In some embodiments, when a user communication device is unable to connect with a particular user communication device within the group of user communication devices, the user communication device attempts to connect with any of the other user communication devices within the group of user communication devices and verify with these other user communication devices if any of these devices were able to connect and communicate with the particular user communication device. In further embodiments, if the user communication device receives a positive affirmation from a user communication device in the group of the user communication devices regarding being able to connect to the particular user communication device, then the user communication device requests updated meta-data from the user communication device from which a positive affirmation was received, and upon receiving this meta-data, updates the cached information in a memory in the user communication device. In further embodiments, if the user communication device receives a negative affirmation, indicating that none of the user communication devices in the group of user communication device indicated that they were able to receive periodic meta-data, over certain previous periodic cycles, from the particular user communication device, then the user communication device determines if an alert has been sent for emergency assistance to an EDC for the user of the particular user communication device. In further embodiments, responsive to determining that an alert for emergency assistance has not been sent, the user communication device sends an alert to the EDC on behalf of the user of the particular user communication device. In some embodiments, the EDC, upon receiving the request for emergency assistance from the user communication device on behalf of the user of the particular user communication device, ascertains the identity and association of the user communication device with the particular user communication device. In further embodiments, the EDC responds to the request for emergency assistance after verifying the user sending the request. In certain embodiments the user communication device hosts an application client and sends meta-data, on a periodic basis or as decided by users of the group of user communication devices, and receives meta-data from user communication devices of the group of user communication devices it belongs to. In further embodiments, the communication device sends a request for emergency assistance to an EDC via this application client. In further embodiments, the application client manages the connection between the user communication device and other user communication devices in the group of user communication devices. In certain embodiments, the user communication devices that are members of a group of user communication devices share meta-data that is cached on the respective user communication devices autonomously. In further embodiments, meta-data is shared on a periodic basis. In further embodiments, meta-data is shared on a repetitive basis. In further embodiments, meta-data sharing is decided by users of the group of user communication devices. In certain embodiments, the user communication devices that are members of a group of user communication devices are all digital devices capable of communicating over a data network, for example, smart phones, tablet computers, or laptops. In certain embodiments, the user communication devices that are members of a group of user communication devices are of different types, for example, digital devices or analog devices. Some of the devices are not able to communicate over a data network (e.g. an analog communication device or a land-line phone). In some embodiments, the digital devices convert the digital signals to analog to send to the analog devices, wherein the analog devices convert the analog signals to digital to send to the digital devices. In some embodiments, the devices share their meta-data with an intermediary (e.g. an intermediate device or computing system), for example, an emergency management system (EMS), and the EMS then shares the meta-data with each of the devices in a format the individual devices can understand. In certain embodiments, data transferred between the user communication devices in the group includes multimedia location data. In certain embodiments, the data channel between the user communication devices that are members of the group of user communication devices is a SIP data channel or a H.323 data channel.

In accordance with another aspect, disclosed herein is a method for a user communication device that is a member of a group of user communication devices to autonomously detect that a user of another user communication device of the group of user communication devices is possibly involved in an emergency situation. In some embodiments, the user communication device detects the emergency situation via detecting that periodic meta-data scheduled to be received from the other user communication device was not received over a certain period of time or number of cycles. In some embodiments, the user communication device detects the emergency situation by detecting a request for emergency assistance. In some embodiments, the user communication device detects this the emergency situation by detecting a signal of an emergency situation contained in a sequence of data messages received in meta-data from the other user communication device, or by any other means. In some embodiments, upon detecting an emergency situation, the user communication device confirms with the other members of the group of user communication devices that the periodic meta-data was not received by the other members either. In some embodiments, responsive to confirming the lack of reception of the periodic meta-data, the user communication device alerts an EDC, for example a PSAP, regarding the possible that the user of the other user communication device is involved in an emergency situation, and requests emergency assistance for the user of the other user communication device. In certain embodiments, the user communication device counts the number of times, either consecutive, over a period of time, over a certain number of update cycles, or over any other form of measurement of expected updates, that certain meta-data is not received from a member of the group of user communication devices. In further embodiments, when the expected meta-data is not received for more than a predetermined number of times, the user communication device raises an alert for emergency assistance and sends this alert to the other members of the group of user communication devices and/or to an EDC. In certain embodiments, one or more user communication devices in the group of user communication devices, determines based on the received meta-data, where none, or not a significant number of periodic updates are missed, that a certain user of a user communication device within the group of user communication devices is in need of emergency assistance. Responsive to this determination, the user communication device raises an alert for emergency assistance and sends this alert to the other members of the group of user communication devices and/or to an EDC.

In another aspect, disclosed herein is a method for a group of user communication devices, also referred to as a web of devices, to share key status information, this method comprising: determining, at a given user communication device, either by user input or autonomously, if a certain user communication device belongs to the group of user communication devices that the given user communication device is a member of, this determination made based on one or more of the phone number of the certain user communication device, user input indicating association between the user of the given user communication device and a certain user of the certain user communication device, a subnet of an IP network the given user communication device belongs to, a home address associated with the user communication device, or any other form of association between the user communication devices; based on a determination that the certain user communication device belongs to the same group of user communication devices as the given user communication device, saving identification information of the certain user communication device, and including the certain user communication device in periodic meta-data updates that the given user communication device sends to the group of user communication devices; and initiating, by the given user communication device, transmission of a periodic or repeated in a non-periodic fashion meta-data update containing information about the user's health status, the information including at least one of a location of the given user communication device of the user, sensed information from sensors in the given user communication device, for example, temperature, blood pressure, pulse-rate, heart-rate, elevation, movement pattern, amount of daily movement, blood oxygen levels, displacement of the given user communication device and any other meta-data that may identify user status, to each of the devices in the group of user communication devices; receiving, from devices in the group of user communication devices, corresponding meta-data cached at the respective user communication devices, also on a periodic basis or received on a repeated basis as agreed upon by the group of user communication devices; determining, either autonomously or by user input, by a user communication device that is a member of the group of user communication devices, that another member of the group is in need of emergency assistance via detecting that a certain periodic meta-data update to be received from the another user communication device is not received over a certain period of time or certain cycles, that a certain periodic location information update is missed, that an affirmative response indicating well being of the user of the user communication device was not received, and/or by detecting a request for emergency assistance sent directly from a particular user communication device or a signal of an emergency situation contained in the sequence of data messages received in the meta-data from the particular user communication device or by any other means; responsive to detecting a possibility that another member of the group is in need of emergency assistance, confirming with the other members of the group of user communication devices the successful reception of periodic meta-data update by these user communication devices, and/or responsive to confirming lack of reception of the periodic meta-data update by the other members, confirming that the user of the particular user communication device is in need of emergency assistance and conveying this information to the other members of the group of user communication devices; generating, by an user communication device, a request for emergency assistance for a certain user communication device that is part of the group of user communication devices, the request including latest meta-data containing information about the user's health status, the information including one or more of the location of the given user communication device of the user, sensed information from sensors in the given user communication device, association between the users of the two user communication devices, and any other meta-data that may identify user status or the emergency situation; sending the request for emergency assistance to an EMS, preferably that is closest to and serving the location of the certain user communication device on whose behalf the request for emergency assistance is being placed; requesting that the EMS initiate an alert to an EDC, for example a PSAP, a corporate help line, a company providing physical security services, or any other emergency response unit, that serves the area containing the estimated location of the certain user communication device, included in the request for emergency assistance; maintaining a communication session between the selected EDC and the EMS receiving the request for emergency assistance; updating the other members of the group of user communication devices as to a response from the EDC and/or EMS regarding a status of the emergency assistance; responsive to receiving an updated response at a given user communication device, from any of the member user communication devices belonging to the same group of user communication devices as the given user communication device, sending an updated request for emergency assistance to the EDC serving this request, alternately via an EMS, and/or to an EMS; responsive to receiving a response from the EDC, alternately via an EMS, at the given user communication device, sharing this received information from the EDC about the certain user or the certain user communication device with the other members of the group of user communication devices of which the given user communication device is part of; and actively managing, by the given user communication device, the communication sessions between the device and the EDC, alternately via an EMS first receiving the request for emergency assistance, and sharing with other members of the group of user communication devices, any updated information received from the EDC, or EMS, and also sharing with the EDC, alternately via an EMS, any updated information received from other members of the group of user communication devices to which the given user communication device belongs. In some embodiments, the given user communication device hosts an application client and sends and receives all pertinent communication, including periodic information to the members of the group of user communication devices, and the request for emergency assistance to the EDC, or the EMS, via a communication session, for example a data communication session, via this application client, and the application client manages the connection between the user communication device and all other communication devices for example the communication device of the EMS or the EDC, or the member communication devices of the group of communication devices. In some embodiments, the given user communication device, a member of a group of user communication devices, detects autonomously that a user of a certain user communication device, also a member of the group of user communication devices, is in need of emergency assistance, and verifies information regarding the certain user communication device from other members of the group of user communication devices also autonomously, and alerts the user of the given user communication device of the need to send a request for emergency assistance on behalf of the user of the certain user communication device, and in certain instances, sends the request for emergency assistance autonomously, without user input, as well. In some embodiments, the user communication devices that are members of the group of user communication devices are all smart devices, that is to say that each device is capable of communicating over a data communication session, and is capable of storing information received over these data communication sessions in a memory on the user communication device. In some embodiments, the group of user communication devices each send their periodic information for example meta-data, and any other communication to each other or to an EDC, to the EMS, and the EMS then relays this periodic information to the other members of the group of user communication devices and if need be to an EDC, and the EMS also relays any responses from an EDC, or another member of the group of user communication devices, to the given member of the group of user communication device. In some embodiments, the user communication devices that are members of the group of user communication devices are not all smart devices, and are also not of the same type, for example one device is a smart phone and another is a Tablet computer or one device is an analog telephone using PSTN to make calls, that is to say not all devices are capable of communicating over a data communication session, and some of the devices require an analog communication session to communicate key information for example meta-data and location information to the other members of the group of user communication devices, and the EDC and also the EMS. In further embodiments, the group of user communication devices each send their periodic information for example meta-data regarding the user or the user communication device, and any other communication to each other or to an EDC, to the EMS, and the EMS then relays this periodic information to the other members of the group of user communication devices, and translates a digital messages to an analog messages and vice-versa if need me, and if need be sends the received information to an EDC, and the EMS also relays any responses from an EDC, or another member of the group of user communication devices, to the given member of the group of user communication device.

In another aspect, disclosed herein is a user mobile communications device configured to send data communication packets to, or receive from, other user communication devices or, an EDC, or an EMS, the user communications device comprising: a user interface configured to display alerts to the user of the user communication device, or messages sent from an EDC or EMS in response to a request for emergency assistance, and responsive to an input from the user, conduct a certain task; physical interaction components; a communications module configured to send and receive messages over a communications network; and a processor configured to: determine if a certain user communication device is a member of the same group of user communication devices that the given user communication device belongs to, this determination made either autonomously using various identifying information of the devices including past received messages, or via user input indicating association between the user of this given user communication device and certain user of certain user communication device, and upon successfully verifying the device as part of the same group of devices this device belongs to, include the device to receive any periodic information, for example meta-data regarding the user or the user communication device, from the user communication device; and upon receiving a request, from the communication module of the given user communication device, for sharing the meta-data, including location information, associated with a certain user communication device also part of the same group of user communication devices, and upon validating the identity of the sender of the request, share the latest received information regarding the certain user communication device with the sending user communication device; and determine, based on certain periodic meta-data received from the another user communication device or a certain periodic location information missed or by detecting at the communication module a request for emergency assistance sent directly from a particular user communication device, that the particular or another member device of the group is in need of emergency assistance, and confirming the validity of this determination that the user of the particular user communication device is indeed in need for emergency assistance, send a request for emergency assistance, via the communication module, including the type of emergency, to an EDC, alternately via an EMS, on behalf of the particular user communication device, and also send information contained in this request for emergency assistance to the other members of the group of user communication devices; and establish and manage data communications links with user communication devices that are part of the same group of user communication devices that this given user communication device belongs to; and periodically send meta-data, including location information, user health status, sensed information about health of the user from the sensors in the user communication device, to the other user communication devices of the group of user communication devices that the this given user communication device belongs to; and estimate the best known location of the user communication device, based on various parameters including GPS locationing, and include this information in the periodic information update send via the communication module of the user communication device to the group of user communication devices. In some embodiments, the mobile communication device is a smart device that does not have a unique calling number assigned to it, for example a Tablet computer without any 10 digit number for a cellular network or a PSTN to place a voice or a data call to. In some embodiments, the mobile communication device is a smart device that has a unique calling number assigned to it, for example a smart phone with a 10 digit number for a cellular network or a PSTN to place a voice or a data call to. In some embodiments, the mobile communication device further comprises an application client configured to receive user input via the user interface (e.g. a touch-enabled interface), and responsive to touch from the user to communicate certain information to the processor, display an alert to the user based on receiving commands from the processor of the user communication device and communicate any input the user provides, based on this alert, to the processor of the user communication device. In some embodiments, the processor autonomously determines, without any user input, that a user of a certain user communication device, that is part of the same group of user communication devices as the given user communication device, is in need of emergency assistance and based on this determination confirm the information about the certain user communication device with other members of the group of user communication devices, and after successfully confirming the information, send a request for emergency assistance to an EDC, alternately via an EMS, and manage the communication between the EDC and the group of communication devices. In some embodiments, the processor sends a wake-up message comprising a timestamp, location information, identification information about the user and the user communication device, and/or other relevant meta-data to determine user communication device status to the group of user communication devices, when the device is powered ON, and sends a similar sleep message when the device is powered OFF.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML, databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony PSP™ browser.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Example 1

Harry is 70 years old and has a heart condition that requires him to take medication daily to manage his blood pressure. Because his heart condition puts him at risk of fainting spells, Harry wears a heart monitor that monitors his pulse and blood pressure. Harry also lives alone on the $9^{th}$ floor of a high rise apartment building and refuses to move in with his children because he values his independence. Harry's daughter Emily lives the closest to him about 30 minutes away in a neighboring town. Out of concern for Harry's well-being, Emily installed an application on Harry's smart phone that allows data sharing with a group of devices, and added her phone to the same group as Harry's phone. Emily configured the application's data sharing settings to authorize Emily's phone to obtain both location data and sensor data from Harry's phone. In addition, Emily linked Harry's heart monitor to his smart phone via a Bluetooth communication link so that Harry's phone periodically obtains sensor data from the heart monitor. Accordingly, by virtue of the data sharing within the group of devices, Emily is able to access location and sensor data from Harry's phone on demand at any time. In addition, Emily configures the application settings to determine an emergency situation exists whenever the heart monitor sensor readings indicate Harry's blood pressure has dropped below a threshold number (in this case under 90 systolic is indicative of low blood pressure) for at least 10 seconds. Next, Emily enters user data about Harry including his name, address, and phone number. Emily also enters medical history including information about Harry's heart condition and his heart surgery from three years ago. In addition, Harry's medical history indicates that he is allergic to latex. Once Emily is satisfied that she can effectively monitor Harry through her phone, Emily returns to her home. Several months pass without incident. Then, Harry forgets to take his medicine one day while watching TV on his couch. Harry's blood pressure drops dangerously low, and Harry becomes lightheaded and dizzy. He is unable to react to the situation and loses consciousness. After Harry's blood pressure has dropped under 90 systolic for 10 seconds, his smart phone application determines that an emergency situation exists according to the programmed threshold set by Emily. The smart phone application then attempts to confirm the emergency situation by sending a push notification alert to Emily's phone and requesting confirmation of the emergency situation. Emily immediately realizes what is happening and sends a status update request to Harry's phone. Harry is still unconscious and does not respond. Emily checks Harry's location on a display on her phone showing a map and sees that Harry is still in his apartment. Emily queries Harry's phone for historical location and sees that Harry has not moved for the past two hours. Emily then queries Harry's phone requesting both current and historical sensor data from the heart monitor. After Harry's phone sends the data to Emily's phone (in accordance with its data sharing settings set by Emily), Emily realizes that Harry's blood pressure has dropped below 90 systolic for the past 60 seconds. The heart monitor sensor data also indicates that Harry is experiencing an irregular heartbeat. Emily recognizes that Harry must have fainted and uses her phone to send a request for assistance regarding a medical emergency to an emergency dispatch center (EDC). Her phone sends the request along with a data set comprising the emergency indication and the data associated with Harry (user data, sensor data, medical history data). In addition, her request indicates that the request for assistance is a proxy request made on behalf of Harry and not herself. The request is first routed through an emergency management system (EMS). The EMS processes the request and determines that it is a proxy request. Because this is a proxy request, the EMS uses the location data in the data set associated with Harry's phone to identify an EDC responsible for the jurisdiction where Harry is located. The EMS first establishes a data channel with Emily's phone and then establishes a data channel with the EDC and conveys the request for assistance through the channel. The EMS also provides the user data, location data, medical data, and sensor data to the EDC by uploading the information onto a database accessed by the EDC. The EMS also establishes a data channel with Harry's phone in order to extract data directly from his phone. As Harry's phone continues to receive new sensor data from his heart monitor, the EMS obtains the new sensor data and conveys it to the EDC as needed. A dispatcher at the EDC handles the emergency request and determines based on the sensor data indicating low blood pressure and irregular heart beat that a defibrillator is needed. Accordingly, the dispatcher assigns two emergency medical technicians (EMTs) in an ambulance supplied with a defibrillator to respond. This information is provided to the EMS, which then establishes a data channel with a communication device operated by one of the EMTs. As the ambulance speeds towards Harry's apartment building, the EMT requests updated information on Harry's condition from the EMS. Fortunately, the EMS is able to route the new sensor data to the EMT's communication device. Looking at the new sensor data through his device's display screen, the EMT notices that Harry's blood pressure, while still quite low, was not life-threatening yet. In addition, the EMT is aware that Harry is allergic to latex gloves, and so he makes sure that he and his partner wear nitrile gloves instead. The ambulance finally arrives at Harry's apartment building. Normally, poor GPS and cell phone signals make location determination difficult in such urban environments. However, Harry's apartment building has a multiple Wi-Fi access points located throughout the units, and Harry's phone is able to obtain an accurate location within 2 meters using Wi-Fi triangulation. This location matches Harry's home address, which was included in the user data sent to the EMS and EDC. As a result, the EMTs already know which floor and apartment Harry is in when they arrive at his building. The EMTs rush to Harry's apartment and force open the door. They are able to use the defibrillator stabilize Harry's heart beat and inject medicine to get his blood pressure back to normal before transporting him to the hospital. The entire time, Emily has been receiving updates from the EMS regarding the ongoing emergency response. Once the EMTs were assigned, Emily learns the hospital they are assigned to, so she is able to drive to the hospital and see Harry just as the EMTs are bringing him inside. Thanks to the rapid emergency response, Harry makes a quick recovery and is soon back to his old self.

Example 2

John is a patent litigator from California who is constantly traveling to the eastern district of Texas for trial. Although he is usually out of town and rarely gets to sleep on his own bed, John is very proud of his beautiful brick house in the suburbs. He bought the house at a bargain value after the housing crisis and has spent a considerable amount on renovations. A self-proclaimed technophile, John made sure to have the latest gadgets and sensors installed in his home. In addition to the standard smoke alarms, carbon monoxide detectors, and thermostat, John had a home security system installed replete with infrared sensors, acoustic sensors, and motion activated cameras. Everything was linked to a home Wi-Fi network, which was connected to the Internet. John had an application installed on his phone that allowed him to access and monitor all his home electronics in order to keep tabs on his home. Nothing was going to happen to his beautiful house while he was away. The only person who had permission to enter John's home during his trips was a friend of his who acted as a house-sitter. One weekend, John was out of town as usual preparing for an upcoming trial when a burglar attempted to break into his house. The burglar knew that John never locked the door in his backyard, so he climbed over the fence and let himself in. As the burglar walked through the house, he triggered a silent infrared sensor that is part of John's home security system. This caused the home security system to send an alert to John's phone as a push notification. Upon receiving the alert, John used his phone to access the feed from hidden cameras secreted throughout his house. The camera feed from his bedroom showed the burglar rifling through John's closet. John then pressed a button on his phone to make a proxy request for assistance on to a private security company responsible for his home security system. The private security company's server processes the proxy request and determines that it is made on behalf of the home security system (and also the house in which it is installed as well as the owner of the house). The proxy request contains an indication that this is a police emergency and contains sensor data from the infrared sensor as well as data from the camera feeds. A dispatcher at the private security company then assigns a private security team close by to respond. As the private security team closes in on John's house, the burglar senses something is awry and peeks outside the window. Upon seeing the private security team approaching, the burglar panics and runs down the stairs. Hoping to distract the security team, he tears down a set of curtains from the kitchen window and tosses them on the stove before turning on the fire. The flames spread quickly as the burglar runs out the back door. The private security team spots the burglar running through the backyard and give chase without noticing the fire inside the kitchen. Meanwhile, John is watching the kitchen camera feed through his device with growing horror. He immediately sends another request for assistance, this time indicating a fire emergency. The request is sent from his phone to an EMS that processes the request and determines it is a proxy request for assistance with a fire emergency. The EMS establishes a data channel with the EDC responsible for John's neighborhood and provides the relevant data (infrared sensor, thermostat, camera feed) along with the indication that this is a fire emergency. The dispatcher at the EDC contacts the nearest fire department responsible for John's neighborhood and assigns a team of firefighters to respond. Meanwhile, John switches to another camera feed to see what the burglar might have stolen. That is when he notices that his friend who occasionally house-sits for him sleeping in a guest room attached to the house. John tries to call his friend's phone to warn him of the fire, but his friend does not stir from his slumber. John then sends a message to the EMS indicating that there is a person inside the guest room in danger from the fire. The EMS relays this information to the EDC and the firefighters. Fortunately, the firefighters arrive quickly on the scene and drag John's groggy and half-asleep friend out of the guest room. Other firefighters rush to put out the fire before it gets out of control. Fortunately for John, his friend was safe, and only the kitchen suffered any damage.

Example 3

Greg is a taxi driver in New York and rather enjoys his job. He takes pleasure in talking to strangers and listening to their stories. However, Greg's boss, Jerry, is paranoid about possible hijackings and robberies and decides to have a panic button installed on all the taxis in his fleet. The panic button is located under the steering wheel where a passenger would be unable to see it. The panic button is coupled with the vehicle console which has a computer running an application for establishing covert communications. One night, Greg is working a late shift in his taxi and picks up one last passenger before he finishes his shift. Greg tries to strike up a conversation with the passenger, but gets no response. Greg notices that the passenger looked highly agitated and decides he should just keep his mouth closed. Suddenly, the passenger pulls out a gun and pushes its barrel into the back of Greg's head. The passenger screams at Greg to keep driving and gives him directions. Greg felt a cold knot in his stomach as he came to the realization that the directions were taking them away to the docks which would be empty at this time. It was the perfect place to dispose of an unwanted witness to the hijacking. In a moment of clarity, Greg remembered the panic button underneath the steering wheel. Trying to act nonchalant, Greg slid his left hand under the wheel and firmly pressed the button. At that moment, the computer in the vehicle console sent a silent alert message back to the taxi headquarters. The silent alert gave no indication that anything had happened. Jerry back at headquarters received the alert on his computer console and immediately opened a map of New York on his console display showing the location of all taxis in his fleet. Jerry selected Greg's taxi, and the map centered on its location. Noticing that Greg's taxi was outside of its normal area of operation and that it was headed to a relatively abandoned part of the city, Jerry became suspicious and opened a covert communication session with Greg's vehicle console, which was configured for two-way communications just like a phone. This covert communication session was established without any ringing or other noise or vibration that would normally follow a phone call. With the passenger completely unaware, Jerry was able to listen in on the inside of the taxi without producing any noise or notification of a communication session. Knowing this, Greg asked the passenger/hijacker why they were going to the docks. The passenger told Greg to shut up, but Greg was pleased that he had succeeded in letting Jerry know of their destination. Realizing this was a bona fide vehicular hijacking, Jerry immediately placed a proxy request for assistance to an EMS, which then established a communication session with an EDC serving the location where Greg's taxi was located using location data from the GPS transceiver in the taxi. Included with the proxy request is an indication this is a police emergency and a message from Jerry indicating that the emergency is a carjacking involving a taxi and that the hijacker appears to be taking the driver to the docks. The EDC dispatcher assigns several nearby police cars to respond to the emergency and relays the information from the proxy request to the officers. The police cars are equipped with computers with display screens that show the location of Greg's taxi (just like Jerry's computer console) using data obtained from the computer in Greg's taxi. The officers regularly request updated location data from Greg's taxi to keep apprised of its current location and direction of travel. Meanwhile, Greg has become increasingly worried that the panic button didn't work. They were almost at the docks, and help has yet to arrive. As Greg stops the car at a dead end in the docks, he begins to whisper a silent prayer. The hijacker exits the car and shouts for Greg to follow him. Thinking that the end was near, Greg slowly opened the door. Then Greg heard the faint echoes of the most beautiful sound he has ever heard in his life. The wailing of police sirens grew increasingly louder as a pack of police cars hurtled along the docks towards Greg's taxi. The hijacker tried to run but was quickly arrested. It was at this moment that Greg decided it was time for a new job.

Example 4

Angela is a college student who is about to embark on a week-long hiking trip in a wilderness preserve with her friends for spring break. Although Angela is eagerly looking forward to the adventure, her mother Pam is worried about all manner of possible dangers that could occur out in the wild far from civilization. To ease her mother's concerns, Angela agrees to install an application on her smart phone that allows data sharing with her mother's phone. Angela configures her phone data sharing settings to periodically send her current location data every 15 minutes. She also promises Pam that her friends all have the application installed as well with data sharing authorized between their phones. Likewise, Pam configures her phone settings to warn her with an alert whenever Angela's phone has missed sending periodic data four consecutive times. Moreover, Pam double-checks that Angela's phone has cell phone coverage and GPS in the area she will be hiking. The next day, Angela sets off on her trip with her friends. Halfway into the hiking trip, they set up camp at the base of a waterfall to prepare for the night. Angela decides to go for a short walk by herself along a ravine on the other side of the waterfall to find a scenic spot for a selfie with the sunset. What Angela doesn't realize is that recent rainstorms have weakened the path along the ravine. As she walks up the path, the soil suddenly crumbles underfoot, sending Angela tumbling down the ravine. Angela wakes up about 30 minutes later and finds herself at the bottom of the ravine with a broken ankle and unable to walk. She painfully pulls her phone out of her pocket only to discover it was destroyed in the fall. Angela tries shouting for help, but her camp is out of hearing range. Thirty minutes later, Pam gets an alert from her phone indicating that Angela's phone has not provided updated location data for the past 4 periods. Pam immediately presses a soft button to bring up a map on the display of her phone showing the historical location for Angela based on past periodic data updates. The map showed Angela's location from the last several updates centering around a waterfall, and then one last update showing her location behind the waterfall. Knowing that no emergency services would be readily available in such a remote area, Pam immediately sends an alert to other devices in the group. Angela's friends had already gotten in their tents for the night when she left and were still unaware of her absence. However, several of them were still awake and receive the alert from Pam, which contains a message asking about Angela. Although their phones are configured to share data with Angela's phone, Angela had only set her phone to periodically share data with her mother's phone. Her friends had to send a data request in order, and so none of them had location data from Angela's phone. Fortunately, Pam is able to share Angela's location data with them through the group of devices application. Angela's friends use this information to find Angela's last known location. When they arrive at the top of the ravine, Angela calls out to them for help. Hearing her cries for help, Angela's friends hike down to the bottom of the ravine. After reaching her, they are able to carry Angela back to camp where they then call the park service to airlift her to a hospital.

What is claimed is:

1. A method for sharing emergency data, by an emergency management system (EMS), the EMS comprising a server software application having an emergency communication module, the method comprising, via the emergency communication module:
receiving a request, from a first device associated with a first responder, for emergency data regarding an emergency;
obtaining emergency data regarding the emergency, wherein the emergency data comprises a location of a second device, wherein the second device is associated with a user in the emergency;
establishing a first data communication channel with the first device;
establishing a second data communication channel with the second device;
determining whether the second device is authorized to communicate directly with the first device; and
responsive to determining that the second device is authorized to communicate directly with the first device, establishing a third data communication channel between the first device and the second device, the third data communication channel permitting direct sharing of emergency data between the first device and the second device.

2. The method of claim 1, further comprising, via the emergency communication module, establishing a fourth data communication channel with a third device at an emergency dispatch center (EDC), wherein the EDC is a local emergency service responding to the emergency.

3. The method of claim 2, further comprising providing a user interface on the third device showing a plurality of locations of first responders on a map, wherein the plurality of locations comprises a current location of the first device.

4. The method of claim 2, further comprising, via the emergency communication module, monitoring at least one of the first, second, third, or fourth data communication channels associated with the emergency and sharing relevant information about the emergency with the EDC and one or more responder devices.

5. The method of claim 1, further comprising providing a user interface with an estimated time of arrival (ETA) for responders.

6. The method of claim 1, further comprising determining if there has been an update to the emergency data and sharing the update with a list of communication devices.

7. The method of claim 1, wherein the first device remotely accesses the second device to gather relevant information about the emergency.

8. The method of claim 7, further comprising receiving a request from the first device to remotely access the second device.

9. The method of claim 7, wherein the EMS or an EDC authenticates the request from the first device to remotely access the second device.

10. The method of claim 1, further comprising sending a mass message to a list of communication devices regarding the emergency.

11. The method of claim 10, further comprising verifying receipt of the mass message by the communication devices.

12. The method of claim 1, wherein the first device accesses a camera feed through the second device.

13. A system for sharing emergency data, the system comprising:
a first module executed on a first device, wherein the first device is associated with a first responder responding to an emergency;
a second module executed on a second device, wherein the second device is associated with a user in the emergency;
a third module executed on a third device at an emergency dispatch center (EDC),
wherein the EDC is a local emergency service responding to the emergency; and
an emergency management system (EMS) comprising a memory with program code, a server software application having an emergency communication module, and one or more processors so that the emergency communication module executes the program code to:
receive a request from the first device for emergency data regarding an emergency;
obtain emergency data regarding the emergency, wherein the emergency data comprises a location of the second device;
establish a first data communication channel with the first device;
establish a second data communication channel with the second device;
determine whether the second device is authorized to communicate directly with the first device; and
responsive to determining that the second device is authorized to communicate directly with the first device, establishing a third data communication channel between the first device and the second device, the third data communication channel permitting direct sharing of emergency data between the first device and the second device.

14. The system of claim 13, wherein the EMS receives a request from the first device to remotely access the second device.

15. The system of claim 14, wherein the EMS or the EDC authenticates the request from the first device to remotely access the second device.

16. The system of claim 13, wherein the EMS sends a mass message to a list of communication devices regarding the emergency.

17. The system of claim 13, wherein the EMS monitors the first, second, and third data communication channels associated with the emergency and shares relevant information about the emergency with the EDC and one or more responder devices.

18. The system of claim 13, wherein the first device accesses a camera feed through the second device.

19. The system of claim 13, further comprising providing a user interface on the third device showing the location of the first device on a map.

20. The method of claim 1, wherein the third data communication channel comprises the first data communication channel and the second data communication channel bridged together.

21. The system of claim 13, wherein the third data communication channel comprises the first data communication channel and the second data communication channel bridged together.

* * * * *